US012665536B2

(12) United States Patent
Mills

(10) Patent No.: US 12,665,536 B2
(45) Date of Patent: Jun. 23, 2026

(54) THERMOPHOTOVOLTAIC ELECTRICAL POWER GENERATOR

(71) Applicant: Brilliant Light Power, Inc., Cranbury, NJ (US)

(72) Inventor: Randell Lee Mills, Yardley, PA (US)

(73) Assignee: Brilliant Light Power, Inc., Newtown, PA (US)

( * ) Notice: Subject to any disclaimer, the term of this patent is extended or adjusted under 35 U.S.C. 154(b) by 0 days.

(21) Appl. No.: 15/572,898

(22) PCT Filed: Jan. 8, 2016

(86) PCT No.: PCT/US2016/012620
§ 371 (c)(1),
(2) Date: Nov. 9, 2017

(87) PCT Pub. No.: WO2016/182605
PCT Pub. Date: Nov. 17, 2016

(65) Prior Publication Data
US 2018/0159459 A1 Jun. 7, 2018

Related U.S. Application Data

(60) Provisional application No. 62/268,963, filed on Dec. 17, 2015, provisional application No. 62/263,395, (Continued)

(51) Int. Cl.
*H02S 10/30* (2014.01)
*B22F 9/08* (2006.01)

(52) U.S. Cl.
CPC ...... *H02S 10/30* (2014.12); *B22F 2009/0888* (2013.01); *B22F 2009/0896* (2013.01); *H05H 2240/00* (2013.01)

(58) Field of Classification Search
CPC ............... H01L 31/052; H01L 31/0525; H01L 31/0521; H02S 10/30; H02S 40/44; H02S 40/42; H02S 40/40; H02S 40/425
See application file for complete search history.

(56) References Cited

U.S. PATENT DOCUMENTS 3,820,767 A 6/1974 Metz
4,182,650 A 1/1980 Fischer
(Continued)

FOREIGN PATENT DOCUMENTS

JP 2004202420 A * 7/2004
WO 2017127447 A9 7/2017

OTHER PUBLICATIONS

N. Dombey, "The hydrino and other unlikely states", Physics Letters A 360, p. 62-65 (Year: 2006).*
(Continued)

*Primary Examiner* — Ryan S Cannon
(74) *Attorney, Agent, or Firm* — Greenberg Traurig, LLP

(57) ABSTRACT
A molten metal fuel to plasma to electricity power source that provides at least one of electrical and thermal power comprising (i) at least one reaction cell for the catalysis of atomic hydrogen to form hydrinos, (ii) a chemical fuel mixture comprising at least two components chosen from: a source of $H_2O$ catalyst or $H_2O$ catalyst; a source of atomic hydrogen or atomic hydrogen; reactants to form the source of $H_2O$ catalyst or $H_2O$ catalyst and a source of atomic hydrogen or atomic hydrogen; and a molten metal to cause the fuel to be highly conductive, (iii) a fuel injection system comprising an electromagnetic pump, (iv) at least one set of confinement electrodes that provide repetitive short bursts of low-voltage, high-current electrical energy to initiate rapid kinetics of the hydrin reaction and an energy gain due to forming hydrinos to form a brilliant-light emitting plasma.

17 Claims, 43 Drawing Sheets

Related U.S. Application Data filed on Dec. 4, 2015, provisional application No. 62/257,617, filed on Nov. 19, 2015, provisional application No. 62/254,104, filed on Nov. 11, 2015, provisional application No. 62/237,375, filed on Oct. 5, 2015, provisional application No. 62/220,582, filed on Sep. 18, 2015, provisional application No. 62/217, 411, filed on Sep. 11, 2015, provisional application No. 62/208,205, filed on Aug. 21, 2015, provisional application No. 62/200,672, filed on Aug. 4, 2015, provisional application No. 62/196,751, filed on Jul. 24, 2015, provisional application No. 62/191,204, filed on Jul. 10, 2015, provisional application No. 62/182,421, filed on Jun. 19, 2015, provisional application No. 62/173,911, filed on Jun. 10, 2015, provisional application No. 62/172,169, filed on Jun. 7, 2015, provisional application No. 62/165,340, filed on May 22, 2015, provisional application No. 62/159, 230, filed on May 9, 2015.

(56) References Cited

U.S. PATENT DOCUMENTS

| | | | |
|---|---|---|---|
| 4,603,043 | A | 7/1986 | Douglas et al. |
| 4,738,389 | A * | 4/1988 | Moshier .................. C22C 1/058 |
| | | | 228/198 |
| 7,559,494 | B1 | 7/2009 | Yadav et al. |
| 9,116,537 | B2 * | 8/2015 | Celanovic ................. G05F 1/67 |
| 10,443,139 | B2 | 10/2019 | Mills |
| 10,753,275 | B2 | 8/2020 | Mills |
| 2002/0150694 | A1 | 10/2002 | Ye et al. |
| 2004/0237499 | A1 | 12/2004 | Yogev et al. |
| 2004/0247522 | A1 | 12/2004 | Mills |
| 2005/0031870 | A1 | 2/2005 | Liu et al. |
| 2007/0041897 | A1 | 2/2007 | Eickhoff et al. |
| 2009/0098421 | A1 | 4/2009 | Mills |
| 2009/0129992 | A1 | 5/2009 | Mills |
| 2011/0305961 | A1 * | 12/2011 | Gladkov ................. F23G 7/061 |
| | | | 429/417 |
| 2014/0251599 | A1 * | 9/2014 | Linetskiy ................ E21B 43/30 |
| | | | 166/248 |
| 2017/0070180 | A1 | 3/2017 | Mills |
| 2019/0372449 | A1 | 12/2019 | Mills |
| 2020/0366180 | A1 | 11/2020 | Mills |

OTHER PUBLICATIONS

A. Rathke, "A critical analysis of the hydrino model", New Journal of Physics 7, 127 (Year: 2006).*

A. S. de Castro, "Orthogonality criterion for banishing hydrino states from standard quantum mechanics", Physics Letters A, p. 380-383 (Year: 2007).*

"Quantum Chemistry", 5th ed., Ira N. Levine, Prentice-Hall, Inc., p. 134-141 (Year: 2000).*

"Plasma (physics)" [retrieved from https://en.wikipedia.org/wiki/Plasma_(physics) on Nov. 18, 2022]. (Year: 2022).*

"Magnesium" [retrieved from https://en.wikipedia.org/wiki/Magnesium on Jun. 3, 2024] (Year: 2024).*

Machine translation of JP2004202420A (Year: 2004).*

"Black body" [retrieved from https://en.wikipedia.org/wiki/Black_body#:~:text=A%20black%20body%20or%20blackbody,is%20called%20black%2Dbody%20radiation. on Feb. 11, 2025]. (Year: 2025).*

"Photoelectric effect" [retrieved from https://en.wikipedia.org/wiki/Photoelectric_effect on Feb. 11, 2025] (Year: 2025).*

International Search Report & Written Opinion, PCT/US2016/012620, dated Mar. 28, 2016.

English translation of the Office Action and Search Report issued in corresponding Taiwan Patent Application No. 105100629, dated May 25, 2020 (3 pages).

Barkhordarian et al. "Catalytic Mechanism of Transition-Metal Compounds on Mg Hydrogen Sorption Reaction," J. Phys. Chem. B, vol. 110, (2006): 11020-11024.

Conrads et al. "Emission in the deep vacuum ultraviolet from a plasma formed by incandescently heating hydrogen gas with trace amounts of potassium ," Plasma Sources Science and Technology. 12 (2003) p. 389-395.

Measurment of over 500,000 w of Optical Power retrieved from https://brilliantlightpower.com/quantification-of-the-first-optical-power-measurements/. Brilliant Light Power. 2023.

Mills et al., "Formation of a hydrogen plasma from an incandescently heated hydrogen-catalyst gas mixture with an anomalous afterglow duration," International Journal of Hydrogen Energy 26 (2001) 749-762.

Phillips et al., "Evidence of catalytic production of hot atomic hydrogen in RF generated hydrogen/helium plasmas," International Journal of Hydrogen Energy vol. 33, p. 7185-7196. (2008).

Santjojo et al., "Ellipsometric characterization on multi-layered thin film systems during hydrogenation," Materials Transactions, vol. 48, No. 6 (2007): 1380-1386.

Suncell Optical Power Measurements, retrieved from https://brilliantlightpower.com/suncell-optical-power-measurements. Brilliant Light Power. 2023.

Watkins et al. "Reaction of Alkali Metal hydrides with Zinc Halides with Zinc Halides in Tetrahydrofuran. A Convenient and Economical Preparation of Zinc Hydride," Inorganic Chemistry, vol. 13, No. 10, (1974): 2350-2354.

Wu et al. "Effect of carbon/noncarbon addition on hydrogen storage behaviors of magnesium hydride," Journal of Alloys and Compounds, 414 (2006) 259-264.

* cited by examiner

Fig. 16

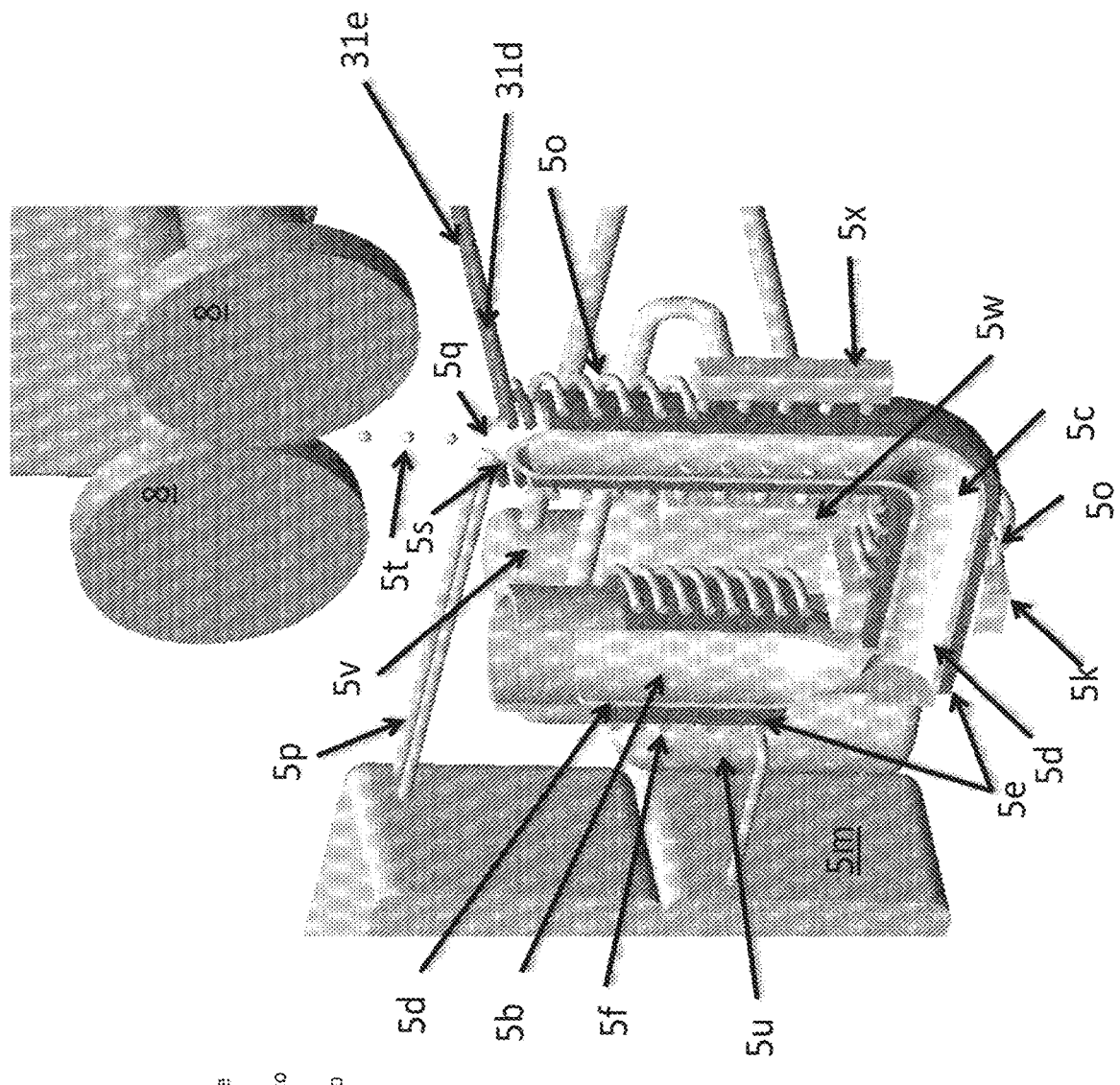

5a. Pelletizer
5b. First Vessel
5c. Second Vessel
5d. Crucible
5e. Insulation
5f. Inductively Coupled Heater Coil Section One
5k. Electromagnetic Pump
5m. Inductively Coupled Heater Power Supply to Coils
5o. Inductively Coupled Heater Coil Section Two
5p. Inductively Coupled Heater Leads
5q. Nozzle
5s. Nozzle Cooler
5t. Shot
5u. Hydrogen Tank and Line
5v. $H_2O$/Steam Tank and Line
5w. Hydrogen Manifold and Feed Lines
5x. $H_2O$/Steam Manifold and Feed Lines
8. Roller Electrode
31. Photovoltaic Converter Cooling System Chiller
31a. Nozzle Cooling System Chiller
31d. Nozzle Cooling System Chiller Inlet
31e. Nozzle Cooling System Chiller Outlet

Fig. 18

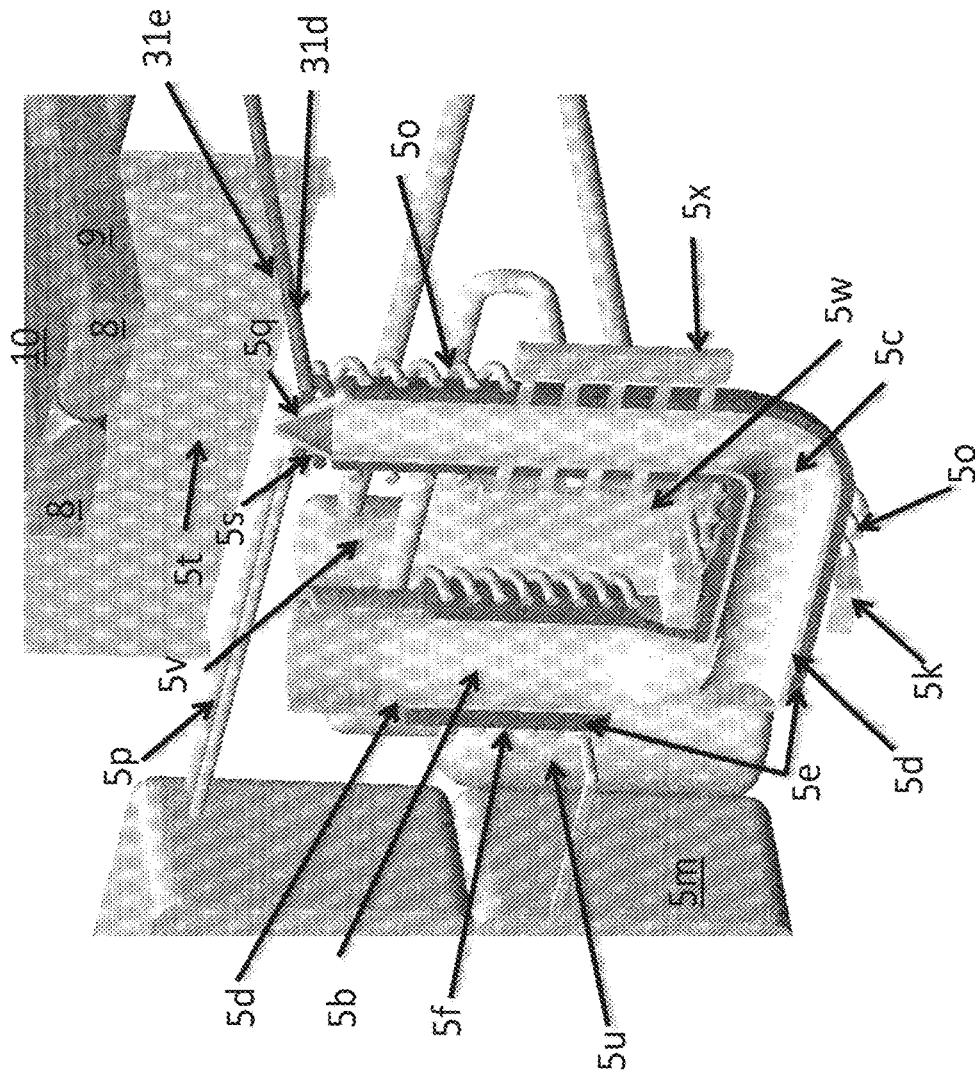

5a.  Pelletizer
5b.  First Vessel
5c.  Second Vessel
5d.  Crucible
5e.  Insulation
5f.  Inductively Coupled Heater Coil Section One
5k.  Electromagnetic Pump
5m.  Inductively Coupled Heater Power Supply to Coils
5o.  Inductively Coupled Heater Coil Section Two
5p.  Inductively Coupled Heater Leads
5q.  Nozzle
5s.  Nozzle Cooler
5t.  Shot
5u.  Hydrogen Tank and Line
5v.  H$_2$O/Steam Tank and Line
5w.  Hydrogen Manifold and Feed Lines
5x.  H$_2$O/Steam Manifold and Feed Lines
8.  Stationary Electrode
9.  Negative Electrode Bus Bar
10.  Positive Electrode Bus Bar
31.  Photovoltaic Converter Cooling System Chiller
31a.  Nozzle Cooling System Chiller
31d.  Nozzle Cooling System Chiller Inlet
31e.  Nozzle Cooling System Chiller Outlet

Fig. 20

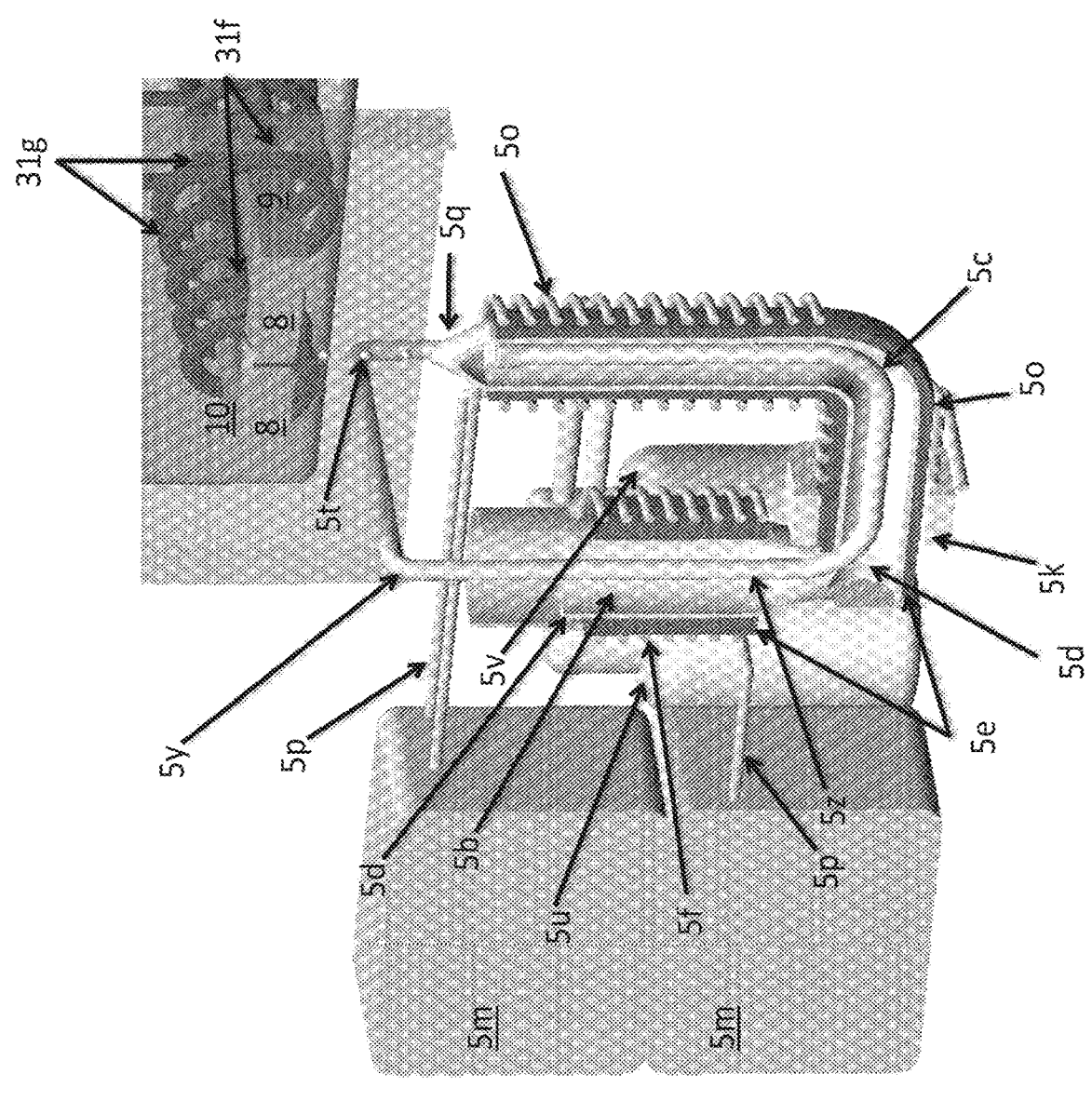

5a.  Pelletizer
5b.  First Vessel
5c.  Second Vessel
5d.  Crucible
5e.  Insulation
5f.  Inductively Coupled Heater Coil Section One
5k.  Electromagnetic Pump
5m.  Inductively Coupled Heater Power Supply to Coils
5o.  Inductively Coupled Heater Coil Section Two
5p.  Inductively Coupled Heater Leads
5q.  Nozzle
5s.  Nozzle Cooler
5t.  Shot
5u.  Hydrogen Tank and Line
5v.  $H_2O$/Steam Tank and Line
5w.  Hydrogen Manifold and Feed Lines
5x.  $H_2O$/Steam Manifold and Feed Lines
5y.  $H_2$/Steam Manifold
5z.  Pipe Bubbler
8.   Stationary Electrode
9.   Negative Electrode Bus Bar
10.  Positive Electrode Bus Bar
31.  Photovoltaic Converter Cooling System Chiller
31a. Nozzle Cooling System Chiller
31d. Nozzle Cooling System Chiller Inlet
31e. Nozzle Cooling System Chiller Outlet
31f. Electrode Cooling System Inlet
31g. Electrode Cooling System Outlet 6.    Output Power Terminal
26.   Cell
26a. Optical Distribution
      and Photovoltaic
      Conversion System
26b. PV Bus Bar 2. Source of Electrical Power
72. Shaft Drive Belt
73. Drive Shaft Bearing
74. Drive Shaft
84. Heat Exchanger Coolant Inlet Line
85. Heat Exchanger Coolant Outlet Line
86. Heat Exchanger, Boiler, Turbine, Generat
87. Heat Exchanger

1

THERMOPHOTOVOLTAIC ELECTRICAL POWER GENERATOR

CROSS-REFERENCES OF RELATED APPLICATIONS

This application claims the benefit of U.S. Provisional Application No. 62/159,230, filed May 9, 2015, U.S. Provisional Application No. 62/165,340, filed May 22, 2015, U.S. Provisional Application No. 62/172,169, filed Jun. 7, 2015, U.S. Provisional Application No. 62/173,911, filed Jun. 10, 2015, U.S. Provisional Application No. 62/182,421, filed Jun. 19, 2015, U.S. Provisional Application No. 62/191,204, filed Jul. 10, 2015, U.S. Provisional Application No. 62,196,751, filed Jul. 24, 2015, U.S. Provisional Application No. 62/200,672, filed Aug. 4, 2015, U.S. Provisional Application No. 62/208,205, filed Aug. 21, 2015, U.S. Provisional Application No. 62/217,411, filed Sep. 11, 2015, U.S. Provisional Application No. 62/220,582, filed Sep. 18, 2015, U.S. Provisional Application No. 62/237,375, filed Oct. 5, 2015, U.S. Provisional Application No. 62/254,104, filed Nov. 11, 2015, U.S. Provisional Application No. 62/257,617, filed Nov. 19, 2015, U.S. Provisional Application No. 62/263,395, filed Dec. 4, 2015, and U.S. Provisional Application No. 62/268,963, filed Dec. 17, 2015, all of which are incorporated herein by reference.

The present disclosure relates to the field of power generation and, in particular, to systems, devices, and methods for the generation of power. More specifically, embodiments of the present disclosure are directed to power generation devices and systems, as well as related methods, which produce optical power, plasma, and thermal power and produces electrical power via an optical to electric power converter, plasma to electric power converter, photon to electric power converter, or a thermal to electric power converter. In addition, embodiments of the present disclosure describe systems, devices, and methods that use the ignition of a water or water-based fuel source to generate optical power, mechanical power, electrical power, and/or thermal power using photovoltaic power converters. These and other related embodiments are described in detail in the present disclosure.

Power generation can take many forms, harnessing the power from plasma. Successful commercialization of plasma may depend on power generation systems capable of efficiently forming plasma and then capturing the power of the plasma produced.

Plasma may be formed during ignition of certain fuels. These fuels can include water or water-based fuel source. During ignition, a plasma cloud of electron-stripped atoms is formed, and high optical power may be released. The high optical power of the plasma can be harnessed by an electric converter of the present disclosure. The ions and excited state atoms can recombine and undergo electronic relaxation to emit optical power. The optical power can be converted to electricity with photovoltaics.

Certain embodiments of the present disclosure are directed to a power generation system comprising: a plurality of electrodes configured to deliver power to a fuel to ignite the fuel and produce a plasma; a source of electrical power configured to deliver electrical energy to the plurality of electrodes; and at least one photovoltaic power converter positioned to receive at least a plurality of plasma photons.

In one embodiment, the present disclosure is directed to a power system that generates at least one of electrical energy and thermal energy comprising:

at least one vessel capable of a maintaining a pressure of below, at, or above atmospheric;

reactants, the reactants comprising:

a) at least one source of catalyst or a catalyst comprising nascent $H_2O$;

b) at least one source of $H_2O$ or $H_2O$;

c) at least one source of atomic hydrogen or atomic hydrogen; and d) a molten metal;

at least one molten metal injection system comprising a molten metal reservoir and an electromagnetic pump;

at least one additional reactants injection system, wherein the additional reactants comprise:

a) at least one source of catalyst or a catalyst comprising nascent $H_2O$;

b) at least one source of $H_2O$ or $H_2O$, and c) at least one source of atomic hydrogen or atomic hydrogen;

at least one reactants ignition system comprising a source of electrical power to cause the reactants to form at least one of light-emitting plasma and thermal-emitting plasma wherein the source of electrical power receives electrical power from the power converter;

a system to recover the molten metal;

at least one power converter or output system of at least one of the light and thermal output to electrical power and/or thermal power;

wherein the molten metal ignition system comprises:

a) at least one set of electrodes to confine the molten metal; and b) a source of electrical power to deliver a short burst of high-current electrical energy sufficient to cause the reactants to react to form plasma;

wherein the electrodes comprise a refractory metal;

wherein the source of electrical power to deliver a short burst of high-current electrical energy sufficient to cause the reactants to react to form plasma comprises at least one supercapacitor;

wherein the molten metal injection system comprises an electromagnetic pump comprising at least one magnet providing a magnetic field and current source to provide a vector-crossed current component;

wherein the molten metal reservoir comprises an inductively coupled heater to at least initially heat a metal that forms the molten metal;

wherein the molten metal ignition system comprises at least one set of electrodes that are separated to form an open circuit, wherein the open circuit is closed by the injection of the molten metal to cause the high current to flow to achieve ignition; wherein the molten metal ignition system current is in the range of 500 A to 50,000 A;

wherein the molten metal ignition system wherein the circuit is closed to cause an ignition frequency in the range of 1 Hz to 10,000 Hz;

wherein the molten metal comprises at least one of silver, silver-copper alloy, and copper;

wherein the addition reactants comprise at least one of $H_2O$ vapor and hydrogen gas;

wherein the additional reactants injection system comprises at least one of a computer, $H_2O$ and $H_2$ pressure sensors, and flow controllers comprising at least one or more of the group of a mass flow controller, a pump, a syringe pump, and a high precision electronically controllable valve; the valve comprising at least one of a needle valve, proportional electronic valve, and stepper motor valve wherein the valve is controlled by the pressure sensor and the computer to maintain at least one of the $H_2O$ and $H_2$ pressure at a desired value;

wherein the additional reactants injection system maintains the $H_2O$ vapor pressure in the range of 0.1 Torr to 1 Torr;

wherein the system to recover the products of the reactants comprises at least one of the vessel comprising walls capable of providing flow to the melt under gravity, an electrode electromagnetic pump, and the reservoir in communication with the vessel and further comprising a cooling system to maintain the reservoir at a lower temperature than another portion of the vessel to cause metal vapor of the molten metal to condense in the reservoir;

wherein the recovery system comprising an electrode electromagnetic pump comprises at least one magnet providing a magnetic field and a vector-crossed ignition current component;

wherein the vessel capable of a maintaining a pressure of below, at, or above atmospheric comprises an inner reaction cell, a top cover comprising a blackbody radiator, and an outer chamber capable of maintaining the a pressure of below, at, or above atmospheric;

wherein the top cover comprising a blackbody radiator is maintained at a temperature in the range of 1000 K to 3700 K;

wherein at least one of the inner reaction cell and top cover comprising a blackbody radiator comprises a refractory metal having a high emissivity;

wherein the blackbody radiator further comprises a blackbody temperature sensor and controller;

wherein the at least one power converter of the reaction power output comprises at least one of the group of a thermophotovoltaic converter and a photovoltaic converter; wherein the light emitted by the cell is predominantly blackbody radiation comprising visible and near infrared light, and the photovoltaic cells are concentrator cells that comprise at least one compound chosen from crystalline silicon, germanium, gallium arsenide (GaAs), gallium antimonide (GaSb), indium gallium arsenide (InGaAs), indium gallium arsenide antimonide (InGaAsSb), and indium phosphide arsenide antimonide (InPAsSb), Group III/V semiconductors, InGaP/InGaAs/Ge; InAlGaP/AlGaAs/GaInNAsSb/Ge; GaInP/GaAsP/SiGe; GaInP/GaAsP/Si; GaInP/GaAsP/Ge; GaInP/GaAsP/Si/SiGe; GaInP/GaAs/InGaAs; GaInP/GaAs/GaInNAs; GaInP/GaAs/InGaAs/InGaAs; GaInP/Ga(In)As/InGaAs; GaInP—GaAs-wafer-InGaAs; GaInP—Ga(In)As—Ge; and GaInP—GaInAs—Ge, and the power system further comprises a vacuum pump and at least one chiller.

In another embodiment, the present disclosure is directed to a power system that generates at least one of electrical energy and thermal energy comprising:

at least one vessel capable of a pressure of below atmospheric;

shot comprising reactants, the reactants comprising:
  a) at least one source of catalyst or a catalyst comprising nascent $H_2O$;
  b) at least one source of $H_2O$ or $H_2O$;
  c) at least one source of atomic hydrogen or atomic hydrogen; and
  d) at least one of a conductor and a conductive matrix;

at least one shot injection system comprising at least one augmented railgun, wherein the augmented railgun comprises separated electrified rails and magnets that produce a magnetic field perpendicular to the plane of the rails, and the circuit between the rails is open until closed by the contact of the shot with the rails;

at least one ignition system to cause the shot to form at least one of light-emitting plasma and thermal-emitting plasma, at least one ignition system comprising:
  a) at least one set of electrodes to confine the shot; and
  b) a source of electrical power to deliver a short burst of high-current electrical energy;
  wherein the at least one set of electrodes form an open circuit, wherein the open circuit is closed by the injection of the shot to cause the high current to flow to achieve ignition, and the source of electrical power to deliver a short burst of high-current electrical energy comprises at least one of the following:
    a voltage selected to cause a high AC, DC, or an AC-DC mixture of current that is in the range of at least one of 100 A to 1,000,000 A, 1 kA to 100,000 A, 10 kA to 50 kA;
    a DC or peak AC current density in the range of at least one of 100 $A/cm^2$ to 1,000,000 $A/cm^2$, 1000 $A/cm^2$ to 100,000 $A/cm^2$, and 2000 $A/cm^2$ to 50,000 $A/cm^2$;
    the voltage is determined by the conductivity of the solid fuel or wherein the voltage is given by the desired current times the resistance of the solid fuel sample;
    the DC or peak AC voltage is in the range of at least one of 0.1 V to 500 kV, 0.1 V to 100 kV, and 1 V to 50 kV, and
   the AC frequency is in range of at least one of 0.1 Hz to 10 GHz, 1 Hz to 1 MHz, 10 Hz to 100 kHz, and 100 Hz to 10 kHz.

a system to recover reaction products of the reactants comprising at least one of gravity and an augmented plasma railgun recovery system comprising at least one magnet providing a magnetic field and a vector-crossed current component of the ignition electrodes;

at least one regeneration system to regenerate additional reactants from the reaction products and form additional shot comprising a pelletizer comprising a smelter to form molten reactants, a system to add $H_2$ and $H_2O$ to the molten reactants, a melt dripper, and a water reservoir to form shot, wherein the additional reactants comprise:
  a) at least one source of catalyst or a catalyst comprising nascent $H_2O$;
  b) at least one source of $H_2O$ or $H_2O$;
  c) at least one source of atomic hydrogen or atomic hydrogen; and
  d) at least one of a conductor and a conductive matrix; and at least one power converter or output system of at least one of the light and thermal output to electrical power and/or thermal power comprising at least one or more of the group of a photovoltaic converter, a photoelectronic converter, a plasmadynamic converter, a thermionic converter, a thermoelectric converter, a Sterling engine, a Brayton cycle engine, a Rankine cycle engine, and a heat engine, and a heater.

In another embodiment, the present disclosure is directed to a power system that generates at least one of electrical energy and thermal energy comprising:

at least one vessel capable of a pressure of below atmospheric;

shot comprising reactants, the reactants comprising at least one of silver, copper, absorbed hydrogen, and water;

at least one shot injection system comprising at least one augmented railgun wherein the augmented railgun comprises separated electrified rails and magnets that produce a magnetic field perpendicular to the plane of the rails, and the circuit between the rails is open until closed by the contact of the shot with the rails;

at least one ignition system to cause the shot to form at least one of light-emitting plasma and thermal-emitting plasma, at least one ignition system comprising:

a) at least one set of electrodes to confine the shot; and b) a source of electrical power to deliver a short burst of high-current electrical energy;

wherein the at least one set of electrodes that are separated to form an open circuit, wherein the open circuit is closed by the injection of the shot to cause the high current to flow to achieve ignition, and he source of electrical power to deliver a short burst of high-current electrical energy comprises at least one of the following:

a voltage selected to cause a high AC, DC, or an AC-DC mixture of current that is in the range of at least one of 100 A to 1,000,000 A, 1 kA to 100,000 A, 10 kA to 50 kA;

a DC or peak AC current density in the range of at least one of 100 A/cm² to 1,000,000 A/cm², 1000 A/cm² to 100,000 A/cm², and 2000 A/cm² to 50,000 A/cm²;

the voltage is determined by the conductivity of the solid fuel wherein the voltage is given by the desired current times the resistance of the solid fuel sample;

the DC or peak AC voltage is in the range of at least one of 0.1 V to 500 kV, 0.1 V to 100 kV, and 1 V to 50 kV, and the AC frequency is in range of at least one of 0.1 Hz to 10 GHz, 1 Hz to 1 MHz, 10 Hz to 100 kHz, and 100 Hz to 10 kHz.

a system to recover reaction products of the reactants comprising at least one of gravity and a augmented plasma railgun recovery system comprising at least one magnet providing a magnetic field and a vector-crossed current component of the ignition electrodes;

at least one regeneration system to regenerate additional reactants from the reaction products and form additional shot comprising a pelletizer comprising a smelter to form molten reactants, a system to add $H_2$ and $H_2O$ to the molten reactants, a melt dripper, and a water reservoir to form shot, wherein the additional reactants comprise at least one of silver, copper, absorbed hydrogen, and water;

at least one power converter or output system comprising a concentrator ultraviolet photovoltaic converter wherein the photovoltaic cells comprise at least one compound chosen from a Group III nitride, GaAlN, GaN, and InGaN.

In another embodiment, the present disclosure is directed to a power system that generates at least one of electrical energy and thermal energy comprising:

at least one vessel;

shot comprising reactants, the reactants comprising:

a) at least one source of catalyst or a catalyst comprising nascent H2O;

b) at least one source of H2O or H2O;

c) at least one source of atomic hydrogen or atomic hydrogen; and d) at least one of a conductor and a conductive matrix;

at least one shot injection system;

at least one shot ignition system to cause the shot to form at least one of light-emitting plasma and thermal-emitting plasma;

a system to recover reaction products of the reactants;

at least one regeneration system to regenerate additional reactants from the reaction products and form additional shot, wherein the additional reactants comprise:

a) at least one source of catalyst or a catalyst comprising nascent H2O;

b) at least one source of H2O or H2O;

c) at least one source of atomic hydrogen or atomic hydrogen; and d) at least one of a conductor and a conductive matrix;

at least one power converter or output system of at least one of the light and thermal output to electrical power and/or thermal power.

Certain embodiments of the present disclosure are directed to a power generation system comprising: a plurality of electrodes configured to deliver power to a fuel to ignite the fuel and produce a plasma; a source of electrical power configured to deliver electrical energy to the plurality of electrodes; and at least one photovoltaic power converter positioned to receive at least a plurality of plasma photons.

In one embodiment, the present disclosure is directed to a power system that generates at least one of direct electrical energy and thermal energy comprising:

at least one vessel;

reactants comprising:

a) at least one source of catalyst or a catalyst comprising nascent $H_2O$;

b) at least one source of atomic hydrogen or atomic hydrogen;

c) at least one of a conductor and a conductive matrix; and at least one set of electrodes to confine the hydrino reactants, a source of electrical power to deliver a short burst of high-current electrical energy;

a reloading system;

at least one system to regenerate the initial reactants from the reaction products, and at least one plasma dynamic converter or at least one photovoltaic converter.

In one exemplary embodiment, a method of producing electrical power may comprise supplying a fuel to a region between a plurality of electrodes; energizing the plurality of electrodes to ignite the fuel to form a plasma; converting a plurality of plasma photons into electrical power with a photovoltaic power converter; and outputting at least a portion of the electrical power.

In another exemplary embodiment, a method of producing electrical power may comprise supplying a fuel to a region between a plurality of electrodes; energizing the plurality of electrodes to ignite the fuel to form a plasma; converting a plurality of plasma photons into thermal power with a photovoltaic power converter; and outputting at least a portion of the electrical power.

In an embodiment of the present disclosure, a method of generating power may comprise delivering an amount of fuel to a fuel loading region, wherein the fuel loading region is located among a plurality of electrodes; igniting the fuel by flowing a current of at least about 2,000 A/cm$^2$ through the fuel by applying the current to the plurality of electrodes to produce at least one of plasma, light, and heat; receiving at least a portion of the light in a photovoltaic power converter; converting the light to a different form of power using the photovoltaic power converter; and outputting the different form of power.

In an additional embodiment, the present disclosure is directed to a water arc plasma power system comprising: at least one closed reaction vessel; reactants comprising at least one of source of H$_2$O and H$_2$O; at least one set of electrodes; a source of electrical power to deliver an initial high breakdown voltage of the H$_2$O and provide a subsequent high current, and a heat exchanger system, wherein the power system generates arc plasma, light, and thermal energy, and at least one photovoltaic power converter. The water may be supplied as vapor on or across the electrodes. The plasma may be permitted to expand into a low-pressure region of the plasma cell to prevent inhibition of the hydrino reaction due to confinement. The arc electrodes may comprise a spark plug design. The electrodes may comprise at least one of copper, nickel, nickel with silver chromate and zinc plating for corrosion resistance, iron, nickel-iron, chromium, noble metals, tungsten, molybdenum, yttrium, iridium, and palladium. In an embodiment, the water arc is maintained at low water pressure such as in at least one range of about 0.01 Torr to 10 Torr and 0.1 Torr to 1 Torr. The pressure range may be maintained in one range of the disclosure by means of the disclosure for the SF-CIHT cell. Exemplary means to supply the water vapor are at least one of a mass flow controller and a reservoir comprising H$_2$O such as a hydrated zeolite or a salt bath such as a KOH solution that off gases H$_2$O at the desired pressure range. The water may be supplied by a syringe pump wherein the delivery into vacuum results in the vaporization of the water.

Certain embodiments of the present disclosure are directed to a power generation system comprising: an electrical power source of at least about 2,000 A/cm$^2$ or of at least about 5,000 kW; a plurality of electrodes electrically coupled to the electrical power source; a fuel loading region configured to receive a solid fuel, wherein the plurality of electrodes is configured to deliver electrical power to the solid fuel to produce a plasma; and at least one of a plasma power converter, a photovoltaic power converter, and thermal to electric power converter positioned to receive at least a portion of the plasma, photons, and/or heat generated by the reaction. Other embodiments are directed to a power generation system, comprising: a plurality of electrodes; a fuel loading region located between the plurality of electrodes and configured to receive a conductive fuel, wherein the plurality of electrodes are configured to apply a current to the conductive fuel sufficient to ignite the conductive fuel and generate at least one of plasma and thermal power; a delivery mechanism for moving the conductive fuel into the fuel loading region; and at least one of a photovoltaic power converter to convert the plasma photons into a form of power, or a thermal to electric converter to convert the thermal power into a nonthermal form of power comprising electricity or mechanical power. Further embodiments are directed to a method of generating power, comprising: delivering an amount of fuel to a fuel loading region, wherein the fuel loading region is located among a plurality of electrodes; igniting the fuel by flowing a current of at least about 2,000 A/cm$^2$ through the fuel by applying the current to the plurality of electrodes to produce at least one of plasma, light, and heat; receiving at least a portion of the light in a photovoltaic power converter; converting the light to a different form of power using the photovoltaic power converter; and outputting the different form of power.

Additional embodiments are directed to a power generation system, comprising: an electrical power source of at least about 5,000 kW; a plurality of spaced apart electrodes, wherein the plurality of electrodes at least partially surround a fuel, are electrically connected to the electrical power source, are configured to receive a current to ignite the fuel, and at least one of the plurality of electrodes is moveable; a delivery mechanism for moving the fuel; and a photovoltaic power converter configured to convert plasma generated from the ignition of the fuel into a non-plasma form of power. Additionally provided in the present disclosure is a power generation system, comprising: an electrical power source of at least about 2,000 A/cm$^2$; a plurality of spaced apart electrodes, wherein the plurality of electrodes at least partially surround a fuel, are electrically connected to the electrical power source, are configured to receive a current to ignite the fuel, and at least one of the plurality of electrodes is moveable; a delivery mechanism for moving the fuel; and a photovoltaic power converter configured to convert plasma generated from the ignition of the fuel into a non-plasma form of power.

Another embodiments is directed to a power generation system, comprising: an electrical power source of at least about 5,000 kW or of at least about 2,000 A/cm$^2$; a plurality of spaced apart electrodes, wherein at least one of the plurality of electrodes includes a compression mechanism; a fuel loading region configured to receive a fuel, wherein the fuel loading region is surrounded by the plurality of electrodes so that the compression mechanism of the at least one electrode is oriented towards the fuel loading region, and wherein the plurality of electrodes are electrically connected to the electrical power source and configured to supply power to the fuel received in the fuel loading region to ignite the fuel; a delivery mechanism for moving the fuel into the fuel loading region; and a photovoltaic power converter configured to convert photons generated from the ignition of the fuel into a non-photon form of power. Other embodiments of the present disclosure are directed to a power generation system, comprising: an electrical power source of at least about 2,000 A/cm$^2$; a plurality of spaced apart electrodes, wherein at least one of the plurality of electrodes includes a compression mechanism; a fuel loading region configured to receive a fuel, wherein the fuel loading region is surrounded by the plurality of electrodes so that the compression mechanism of the at least one electrode is oriented towards the fuel loading region, and wherein the plurality of electrodes are electrically connected to the electrical power source and configured to supply power to the fuel received in the fuel loading region to ignite the fuel; a delivery mechanism for moving the fuel into the fuel loading region; and a plasma power converter configured to convert plasma generated from the ignition of the fuel into a non-plasma form of power.

Embodiments of the present disclosure are also directed to power generation system, comprising: a plurality of electrodes; a fuel loading region surrounded by the plurality of electrodes and configured to receive a fuel, wherein the plurality of electrodes is configured to ignite the fuel located in the fuel loading region; a delivery mechanism for moving the fuel into the fuel loading region; a photovoltaic power converter configured to convert photons generated from the ignition of the fuel into a non-photon form of power; a removal system for removing a byproduct of the ignited fuel; and a regeneration system operably coupled to the removal system for recycling the removed byproduct of the ignited fuel into recycled fuel. Certain embodiments of the present disclosure are also directed to a power generation system, comprising: an electrical power source configured to output a current of at least about 2,000 A/cm$^2$ or of at least about 5,000 kW; a plurality of spaced apart electrodes electrically connected to the electrical power source; a fuel loading region configured to receive a fuel, wherein the fuel loading region is surrounded by the plurality of electrodes, and wherein the plurality of electrodes is configured to supply power to the fuel to ignite the fuel when received in the fuel loading region; a delivery mechanism for moving the fuel into the fuel loading region; and a photovoltaic power converter configured to convert a plurality of photons generated from the ignition of the fuel into a non-photon form of power. Certain embodiments may further include one or more of output power terminals operably coupled to the photovoltaic power converter; a power storage device; a sensor configured to measure at least one parameter associated with the power generation system; and a controller configured to control at least a process associated with the power generation system. Certain embodiments of the present disclosure are also directed to a power generation system, comprising: an electrical power source configured to output a current of at least about 2,000 A/cm$^2$ or of at least about 5,000 kW; a plurality of spaced apart electrodes, wherein the plurality of electrodes at least partially surround a fuel, are electrically connected to the electrical power source, are configured to receive a current to ignite the fuel, and at least one of the plurality of electrodes is moveable; a delivery mechanism for moving the fuel; and a photovoltaic power converter configured to convert photons generated from the ignition of the fuel into a different form of power.

Additional embodiments of the present disclosure are directed to a power generation system, comprising: an electrical power source of at least about 5,000 kW or of at least about 2,000 A/cm$^2$; a plurality of spaced apart electrodes electrically connected to the electrical power source; a fuel loading region configured to receive a fuel, wherein the fuel loading region is surrounded by the plurality of electrodes, and wherein the plurality of electrodes is configured to supply power to the fuel to ignite the fuel when received in the fuel loading region; a delivery mechanism for moving the fuel into the fuel loading region; a photovoltaic power converter configured to convert a plurality of photons generated from the ignition of the fuel into a non-photon form of power; a sensor configured to measure at least one parameter associated with the power generation system; and a controller configured to control at least a process associated with the power generation system. Further embodiments are directed to a power generation system, comprising: an electrical power source of at least about 2,000 A/cm$^2$; a plurality of spaced apart electrodes electrically connected to the electrical power source; a fuel loading region configured to receive a fuel, wherein the fuel loading region is surrounded by the plurality of electrodes, and wherein the plurality of electrodes is configured to supply power to the fuel to ignite the fuel when received in the fuel loading region; a delivery mechanism for moving the fuel into the fuel loading region; a plasma power converter configured to convert plasma generated from the ignition of the fuel into a non-plasma form of power; a sensor configured to measure at least one parameter associated with the power generation system; and a controller configured to control at least a process associated with the power generation system.

Certain embodiments of the present disclosure are directed to a power generation system, comprising: an electrical power source of at least about 5,000 kW or of at least about 2,000 A/cm$^2$; a plurality of spaced apart electrodes electrically connected to the electrical power source; a fuel loading region configured to receive a fuel, wherein the fuel loading region is surrounded by the plurality of electrodes, and wherein the plurality of electrodes is configured to supply power to the fuel to ignite the fuel when received in the fuel loading region, and wherein a pressure in the fuel loading region is a partial vacuum; a delivery mechanism for moving the fuel into the fuel loading region; and a photovoltaic power converter configured to convert plasma generated from the ignition of the fuel into a non-plasma form of power. Some embodiments may include one or more of the following additional features: the photovoltaic power converter may be located within a vacuum cell; the photovoltaic power converter may include at least one of an antireflection coating, an optical impedance matching coating, or a protective coating; the photovoltaic power converter may be operably coupled to a cleaning system configured to clean at least a portion of the photovoltaic power converter; the power generation system may include an optical filter; the photovoltaic power converter may comprise at least one of a monocrystalline cell, a polycrystalline cell, an amorphous cell, a string/ribbon silicon cell, a multi junction cell, a homojunction cell, a heterojunction cell, a p-i-n device, a thin-film cell, a dye-sensitized cell, and an organic photovoltaic cell; and the photovoltaic power converter may comprise at multi junction cell, wherein the multi junction cell comprises at least one of an inverted cell, an upright cell, a lattice-mismatched cell, a lattice-matched cell, and a cell comprising Group III-V semiconductor materials.

Additional exemplary embodiments are directed to a system configured to produce power, comprising: a fuel supply configured to supply a fuel; a power supply configured to supply an electrical power; and at least one gear configured to receive the fuel and the electrical power, wherein the at least one gear selectively directs the electrical power to a local region about the gear to ignite the fuel within the local region. In some embodiments, the system may further have one or more of the following features: the fuel may include a powder; the at least one gear may include two gears; the at least one gear may include a first material and a second material having a lower conductivity than the first material, the first material being electrically coupled to the local region; and the local region may be adjacent to at least one of a tooth and a gap of the at least one gear. Other embodiments may use a support member in place of a gear, while other embodiments may use a gear and a support member. Some embodiments are directed to a method of producing electrical power, comprising: supplying a fuel to rollers or a gear; rotating the rollers or gear to localize at least some of the fuel at a region of the rollers or gear; supplying a current to the roller or gear to ignite the localized fuel to produce energy; and converting at least some of the energy produced by the ignition into electrical power. In some embodiments, rotating the rollers or gear may include rotating a first roller or gear and a roller or second gear, and supplying a current may include supplying a current to the first roller or gear and the roller or second gear.

Other embodiments are directed to a power generation system, comprising: an electrical power source of at least about 2,000 A/cm$^2$; a plurality of spaced apart electrodes electrically connected to the electrical power source; a fuel loading region configured to receive a fuel, wherein the fuel loading region is surrounded by the plurality of electrodes, and wherein the plurality of electrodes is configured to supply power to the fuel to ignite the fuel when received in the fuel loading region, and wherein a pressure in the fuel loading region is a partial vacuum; a delivery mechanism for moving the fuel into the fuel loading region; and a photovoltaic power converter configured to convert plasma generated from the ignition of the fuel into a non-plasma form of power.

Further embodiments are directed to a power generation cell, comprising: an outlet port coupled to a vacuum pump; a plurality of electrodes electrically coupled to an electrical power source of at least about 5,000 kW; a fuel loading region configured to receive a water-based fuel comprising a majority $H_2O$, wherein the plurality of electrodes is configured to deliver power to the water-based fuel to produce at least one of an arc plasma and thermal power; and a power converter configured to convert at least a portion of at least one of the arc plasma and the thermal power into electrical power. Also disclosed is a power generation system, comprising: an electrical power source of at least about 5,000 A/cm²; a plurality of electrodes electrically coupled to the electrical power source; a fuel loading region configured to receive a water-based fuel comprising a majority $H_2O$, wherein the plurality of electrodes is configured to deliver power to the water-based fuel to produce at least one of an arc plasma and thermal power; and a power converter configured to convert at least a portion of at least one of the arc plasma and the thermal power into electrical power. In an embodiment, the power converter comprises a photovoltaic converter of optical power into electricity.

Additional embodiments are directed to a method of generating power, comprising: loading a fuel into a fuel loading region, wherein the fuel loading region includes a plurality of electrodes; applying a current of at least about 2,000 A/cm² to the plurality of electrodes to ignite the fuel to produce at least one of an arc plasma and thermal power; performing at least one of passing the arc plasma through a photovoltaic converter to generate electrical power; and passing the thermal power through a thermal-to-electric converter to generate electrical power; and outputting at least a portion of the generated electrical power. Also disclosed is a power generation system, comprising: an electrical power source of at least about 5,000 kW; a plurality of electrodes electrically coupled to the power source, wherein the plurality of electrodes is configured to deliver electrical power to a water-based fuel comprising a majority $H_2O$ to produce a thermal power; and a heat exchanger configured to convert at least a portion of the thermal power into electrical power; and a photovoltaic power converter configured to convert at least a portion of the light into electrical power. In addition, another embodiment is directed to a power generation system, comprising: an electrical power source of at least about 5,000 kW; a plurality of spaced apart electrodes, wherein at least one of the plurality of electrodes includes a compression mechanism; a fuel loading region configured to receive a water-based fuel comprising a majority $H_2O$, wherein the fuel loading region is surrounded by the plurality of electrodes so that the compression mechanism of the at least one electrode is oriented towards the fuel loading region, and wherein the plurality of electrodes are electrically connected to the electrical power source and configured to supply power to the water-based fuel received in the fuel loading region to ignite the fuel; a delivery mechanism for moving the water-based fuel into the fuel loading region; and a photovoltaic power converter configured to convert plasma generated from the ignition of the fuel into a non-plasma form of power.

BRIEF DESCRIPTION OF THE DRAWINGS

The accompanying drawings, which are incorporated in and constitute a part of this specification, illustrate several embodiments of the disclosure and together with the description, serve to explain the principles of the disclosure. In the drawings:

FIG. 16 (also referred to herein as 2I9) is a schematic drawing of a SF-CIHT cell power generator showing the cross section of the pelletizer shown in FIG. 2I8 in accordance with an embodiment of the present disclosure.

FIG. 18 (also referred to herein as 2I11) is a schematic drawing of a SF-CIHT cell power generator showing the cross section of the pelletizer shown in FIG. 2I10 in accordance with an embodiment of the present disclosure.

FIG. 20 (also referred to herein as 2I13) is a schematic drawing of a SF-CIHT cell power generator showing the cross section of the pelletizer shown in FIG. 2I10 having a pipe bubbler to introduce the gasses such as $H_2$ and steam to the melt in accordance with an embodiment of the present disclosure.

Figure 1:
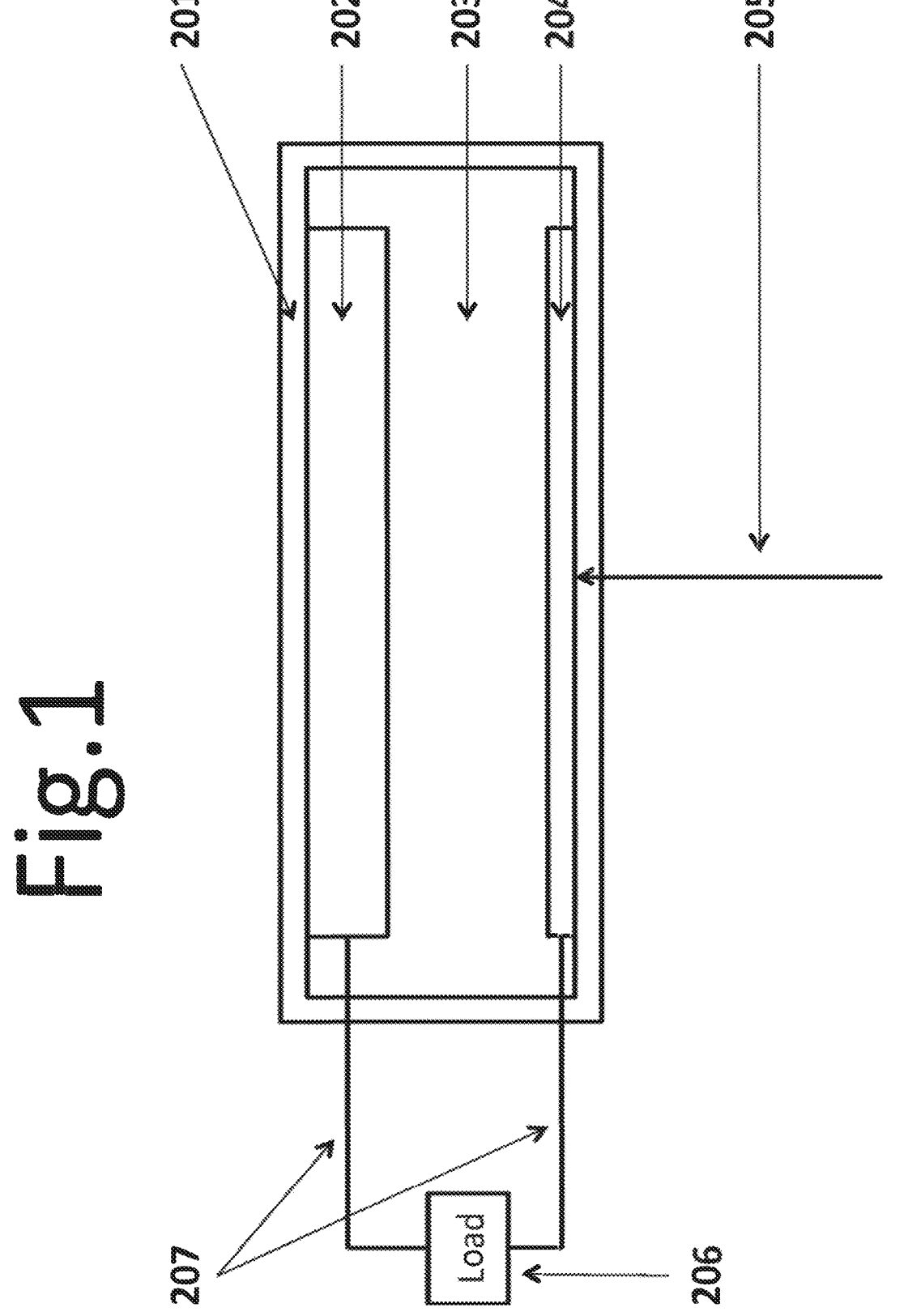
FIG. 1 (also referred to herein as 2G1e4) is a schematic drawing of a photoelectronic cell of the transmission or semitransparent type in accordance with an embodiment of the present disclosure.

Disclosed herein are catalyst systems to release energy from atomic hydrogen to form lower energy states wherein the electron shell is at a closer position relative to the nucleus. The released power is harnessed for power generation and additionally new hydrogen species and compounds are desired products. These energy states are predicted by classical physical laws and require a catalyst to accept energy from the hydrogen in order to undergo the corresponding energy-releasing transition.

Classical physics gives closed-form solutions of the hydrogen atom, the hydride ion, the hydrogen molecular ion, and the hydrogen molecule and predicts corresponding species having fractional principal quantum numbers. Atomic hydrogen may undergo a catalytic reaction with certain species, including itself, that can accept energy in integer multiples of the potential energy of atomic hydrogen, $m \cdot 27.2$ eV, wherein m is an integer. The predicted reaction involves a resonant, nonradiative energy transfer from otherwise stable atomic hydrogen to the catalyst capable of accepting the energy. The product is $H(1/p)$, fractional Rydberg states of atomic hydrogen called "hydrino atoms," wherein $n = 1/2, 1/3, 1/4, \ldots, 1/p$ ($p \le 137$ is an integer) replaces the well-known parameter n=integer in the Rydberg equation for hydrogen excited states. Each hydrino state also comprises an electron, a proton, and a photon, but the field contribution from the photon increases the binding energy rather than decreasing it corresponding to energy desorption rather than absorption. Since the potential energy of atomic hydrogen is 27.2 eV, m H atoms serve as a catalyst of $m \cdot 27.2$ eV for another (m+1)th H atom [1]. For example, a H atom can act as a catalyst for another H by accepting 27.2 eV from it via through-space energy transfer such as by magnetic or induced electric dipole-dipole coupling to form an intermediate that decays with the emission of continuum bands with short wavelength cutoffs and energies of $$m^2 \cdot 13.6 \text{ eV} \left( \frac{91.2}{m^2} \text{ nm} \right).$$

In addition to atomic H, a molecule that accepts $m \cdot 27.2$ eV from atomic H with a decrease in the magnitude of the potential energy of the molecule by the same energy may also serve as a catalyst. The potential energy of $H_2O$ is 81.6 eV. Then, by the same mechanism, the nascent $H_2O$ molecule (not hydrogen bonded in solid, liquid, or gaseous state) formed by a thermodynamically favorable reduction of a metal oxide is predicted to serve as a catalyst to form $H(1/4)$ with an energy release of 204 eV, comprising an 81.6 eV transfer to HOH and a release of continuum radiation with a cutoff at 10.1 nm (122.4 eV).

In the H-atom catalyst reaction involving a transition to the $$H\left[ \frac{a_H}{p = m + 1} \right]$$

state, m H atoms serve as a catalyst of m·27.2 eV for another (m+1)th H atom. Then, the reaction between m+1 hydrogen atoms whereby m atoms resonantly and nonradiatively accept m·27.2 eV from the (m+1)th hydrogen atom such that mH serves as the catalyst is given by $$m \cdot 27.2 \text{ eV} + mH + H \rightarrow mH_{fast}^+ + me^- + H*\left[\frac{a_H}{m+1}\right] + m \cdot 27.2 \text{ eV} \quad (1)$$

$$H*\left[\frac{a_H}{m+1}\right] \rightarrow H\left[\frac{a_H}{m+1}\right] + [(m+1)^2 - 1^2] \cdot 13.6 \text{ eV} - m \cdot 27.2 \text{ eV} \quad (2)$$

$$mH_{fast}^+ + me^- \rightarrow mH + m \cdot 27.2 \text{ eV} \quad (3)$$

And, the overall reaction is $$H \rightarrow H\left[\frac{a_H}{p=m+1}\right] + [(m+1)^2 - 1^2] \cdot 13.6 \text{ eV} \quad (4)$$

The catalysis reaction (m=3) regarding the potential energy of nascent $H_2O$ [1] is $$81.6 \text{ eV} + H_2O + H[a_H] \rightarrow 2H_{fast}^+ + O^- + e^- + H*\left[\frac{a_H}{4}\right] + 81.6 \text{ eV} \quad (5)$$

$$H*\left[\frac{a_H}{4}\right] \rightarrow H\left[\frac{a_H}{4}\right] + 122.4 \text{ eV} \quad (6)$$

$$2H_{fast}^+ + O^- + e^- \rightarrow H_2O + 81.6 \text{ eV} \quad (7)$$

And, the overall reaction is $$H[a_H] \rightarrow H\left[\frac{a_H}{4}\right] + 81.6 \text{ eV} + 122.4 \text{ eV} \quad (8)$$

After the energy transfer to the catalyst (Eqs. (1) and (5)), an intermediate $$H*\left[\frac{a_H}{m+1}\right]$$

is formed having the radius of the H atom and a central field of m+1 times the central field of a proton. The radius is predicted to decrease as the electron undergoes radial acceleration to a stable state having a radius of 1/(m+1) the radius of the uncatalyzed hydrogen atom, with the release of $m^2 \cdot 13.6$ eV of energy. The extreme-ultraviolet continuum radiation band due to the $$H*\left[\frac{a_H}{m+1}\right]$$

intermediate (e.g. Eq. (2) and Eq. (6)) is predicted to have a short wavelength cutoff and energy $$E_{\left(H \rightarrow H\left[\frac{a_H}{p=m+1}\right]\right)}$$

given by $$E_{\left(H \rightarrow H\left[\frac{a_H}{p=m+1}\right]\right)} = m^2 \cdot 13.6 \text{ eV}; \lambda_{\left(H \rightarrow H\left[\frac{a_H}{p=m+1}\right]\right)} = \frac{91.2}{m^2} \text{nm} \quad (9)$$

and extending to longer wavelengths than the corresponding cutoff. Here the extreme-ultraviolet continuum radiation band due to the decay of the $H*[a_H/4]$ intermediate is predicted to have a short wavelength cutoff at $E=m^2 \cdot 13.6 = 9 \cdot 13.6 = 122.4$ eV (10.1 nm) [where p=m+1=4 and m=3 in Eq. (9)] and extending to longer wavelengths. The continuum radiation band at 10.1 nm and going to longer wavelengths for the theoretically predicted transition of H to lower-energy, so called "hydrino" state H(1/4), was observed only arising from pulsed pinch gas discharges comprising some hydrogen. Another observation predicted by Eqs. (1) and (5) is the formation of fast, excited state H atoms from recombination of fast $H^+$. The fast atoms give rise to broadened Balmer $\alpha$ emission. Greater than 50 eV Balmer $\alpha$ line broadening that reveals a population of extraordinarily high-kinetic-energy hydrogen atoms in certain mixed hydrogen plasmas is a well-established phenomenon wherein the cause is due to the energy released in the formation of hydrinos. Fast H was previously observed in continuum-emitting hydrogen pinch plasmas.

Additional catalyst and reactions to form hydrino are possible. Specific species (e.g. $He^+$, $Ar^+$, $Sr^+$, K, Li, HCl, and NaH, OH, SH, SeH, nascent $H_2O$, nH (n=integer)) identifiable on the basis of their known electron energy levels are required to be present with atomic hydrogen to catalyze the process. The reaction involves a nonradiative energy transfer followed by q·13.6 eV continuum emission or q·13.6 eV transfer to H to form extraordinarily hot, excited-state H and a hydrogen atom that is lower in energy than unreacted atomic hydrogen that corresponds to a fractional principal quantum number. That is, in the formula for the principal energy levels of the hydrogen atom:

$$E_n = -\frac{e^2}{n^2 8\pi\varepsilon_o a_H} = -\frac{13.598 \text{ eV}}{n^2}. \quad (10)$$

$$n = 1, 2, 3, \ldots \quad (11)$$

where $a_H$ is the Bohr radius for the hydrogen atom (52.947 pm), e is the magnitude of the charge of the electron, and $\varepsilon_0$ is the vacuum permittivity, fractional quantum numbers:

$$n = 1, \frac{1}{2}, \frac{1}{3}, \frac{1}{4}, \ldots, \frac{1}{p}; \text{where } p \leq 137 \text{ is an integer} \quad (12)$$

replace the well known parameter n=integer in the Rydberg equation for hydrogen excited states and represent lower-energy-state hydrogen atoms called "hydrinos." The n=1 state of hydrogen and the $$n = \frac{1}{\text{integer}}$$

states or nyarogen are nonradiative, but a transition between two nonradiative states, say n=1 to n=1/2, is possible via a nonradiative energy transfer. Hydrogen is a special case of the stable states given by Eqs. (10) and (12) wherein the corresponding radius of the hydrogen or hydrino atom is given by $$r = \frac{a_H}{p}, \quad (13)$$

where p=1,2,3, . . . . In order to conserve energy, energy must be transferred from the hydrogen atom to the catalyst in units of an integer of the potential energy of the hydrogen atom in the normal n=1 state, and the radius transitions to $$\frac{a_H}{m+p}.$$

Hydrinos are formed by reacting an ordinary hydrogen atom with a suitable catalyst having a net enthalpy of reaction of $$m \cdot 27.2 \ eV \qquad (14)$$

where m is an integer. It is believed that the rate of catalysis is increased as the net enthalpy of reaction is more closely matched to m·27.2 eV. It has been found that catalysts having a net enthalpy of reaction within ±10%, preferably ±5%, of m·27.2 eV are suitable for most applications.

The catalyst reactions involve two steps of energy release: a nonradiative energy transfer to the catalyst followed by additional energy release as the radius decreases to the corresponding stable final state. Thus, the general reaction is given by $$m \cdot 27.2 \ eV + Cat^{q+} + H\left[\frac{a_H}{p}\right] \rightarrow \qquad (15)$$

$$Cat^{(q+r)+} + re^- + H*\left[\frac{a_H}{(m+p)}\right] + m \cdot 27.2 \ eV$$

$$H*\left[\frac{a_H}{(m+p)}\right] \rightarrow \qquad (16)$$

$$H\left[\frac{a_H}{(m+p)}\right] + [(p+m)^2 - p^2] \cdot 13.6 \ eV - m \cdot 27.2 \ eV$$

$$Cat^{(q+r)+} + re^- \rightarrow Cat^{q+} + m \cdot 27.2 \ eV \text{ and the overall reaction is} \qquad (17)$$

$$H\left[\frac{a_H}{p}\right] \rightarrow H\left[\frac{a_H}{(m+p)}\right] + [(p+m)^2 - p^2] \cdot 13.6 \ eV \qquad (18)$$

q, r, m, and p are integers.

$$H*\left[\frac{a_H}{(m+p)}\right]$$

has the radius of the hydrogen atom (corresponding to the 1 in the denominator) and a central field equivalent to (m+p) times that of a proton, and $$H\left[\frac{a_H}{(m+p)}\right]$$

is the corresponding stable state with the radius of $$\frac{1}{(m+p)}$$

that of H.

The catalyst product, H(1/p), may also react with an electron to form a hydrino hydride ion H⁻(1/p), or two H(1/p) may react to form the corresponding molecular hydrino $H_2(1/p)$. Specifically, the catalyst product, H(1/p), may also react with an electron to form a novel hydride ion H⁻(1/p) with a binding energy $E_B$:

$$E_B = \qquad (19)$$

$$\frac{\hbar^2 \sqrt{s(s+1)}}{8\mu_e a_0^2 \left[1 + \frac{\sqrt{s(s+1)}}{p}\right]^2} - \frac{\pi\mu_0 e^2 \hbar^2}{m_e^2}\left(\frac{1}{a_H^3} + \frac{2^2}{a_0^3 \left[\frac{1 + \sqrt{s(s+1)}}{p}\right]^3}\right)$$

where p=integer>1, s=1/2, $\hbar$ is Planck's constant bar, $\mu_0$ is the permeability of vacuum, $m_e$ is the mass of the electron, $\mu_e$ is the reduced electron mass given by $$\mu_e = \frac{m_e m_p}{\frac{m_e}{\sqrt{\frac{3}{4}}} + m_p}$$

where $m_p$ is the mass of the proton, $a_0$ is the Bohr radius, and the ionic radius is $$r_1 = \frac{a_0}{p}\left(1 + \sqrt{s(s+1)}\right).$$

From Eq. (19), the calculated ionization energy of the hydride ion is 0.75418 eV, and the experimental value is 6082.99±0.15 cm⁻¹ (0.75418 eV). The binding energies of hydrino hydride ions may be measured by X-ray photoelectron spectroscopy (XPS).

Upheld-shifted NMR peaks are direct evidence of the existence of lower-energy state hydrogen with a reduced radius relative to ordinary hydride ion and having an increase in diamagnetic shielding of the proton. The shift is given by the sum of the contributions of the diamagnetism of the two electrons and the photon field of magnitude p (Mills GUTCP Eq. (7.87)):

$$\frac{\Delta B_T}{B} = -\mu_0 \frac{pe^2}{12m_e a_0\left(1 + \sqrt{s(s+1)}\right)}(1 + p\alpha^2) = \qquad (20)$$

$$-(p29.9 + p^2 1.59 \times 10^{-3})ppm$$

where the first term applies to H⁻ with p=1 and p=integer>1 for H⁻(1/p) and α is the fine structure constant. The predicted hydrino hydride peaks are extraordinarily upfield shifted relative to ordinary hydride ion. In an embodiment, the peaks are upfield of TMS. The NMR shift relative to TMS may be greater than that known for at least one of ordinary H⁻, H, $H_2$, or H⁺ alone or comprising a compound. The shift may be greater than at least one of 0, −1, −2, −3, −4, −5, −6, −7, −8, −9, −10, −11, −12, −13, −14, −15, −16, −17, −18, −19, −20, −21, −22, −23, −24, −25, −26, −27, −28, −29, −30, −31, −32, −33, −34, −35, −36, −37, −38, −39, and −40 ppm. The range of the absolute shift relative to a bare proton, wherein the shift of TMS is about −31.5 relative to a bare proton, may be −(p29.9+p²2.74) ppm (Eq. (20)) within a range of about at least one of ±5 ppm, ±10 ppm, ±20 ppm, ±30 ppm, ±40 ppm, ±50 ppm, ±60 ppm, ±70 ppm, ±80 ppm, ±90 ppm, and ±100 ppm. The range of the absolute shift relative to a bare proton may be −(p29.9+p²1.59×10⁻³) ppm (Eq. (20)) within a range of about at least one of about 0.1% to 99%, 1% to 50%, and 1% to 10%. In another embodiment, the presence of a hydrino species such as a hydrino atom, hydride ion, or molecule in a solid matrix such as a matrix of a hydroxide such as NaOH or KOH causes the matrix protons to shift upfield. The matrix protons such as those of NaOH or KOH may exchange. In an embodiment, the shift may cause the matrix peak to be in the range of about −0.1 ppm to −5 ppm relative to TMS. The NMR determination may comprise magic angle spinning $^1$H nuclear magnetic resonance spectroscopy (MAS $^1$H NMR).

H(1/p) may react with a proton and two H(1/p) may react to form $H_2(1/p)^+$ and $H_2(1/p)$, respectively. The hydrogen molecular ion and molecular charge and current density functions, bond distances, and energies were solved from the Laplacian in ellipsoidal coordinates with the constraint of nonradiation.

$$(\eta - \zeta)R_\xi \frac{\partial}{\partial\xi}\left(R_\xi \frac{\partial\phi}{\partial\xi}\right) + \tag{21}$$

$$(\zeta - \xi)R_\eta \frac{\partial}{\partial\eta}\left(R_\eta \frac{\partial\phi}{\partial\eta}\right) + (\xi - \eta)R_\zeta \frac{\partial}{\partial\zeta}\left(R_\zeta \frac{\partial\phi}{\partial\zeta}\right) = 0$$

The total energy $E_T$ of the hydrogen molecular ion having a central field of +pe at each focus of the prolate spheroid molecular orbital is $$E_T = -p^2\left\{\frac{e^2}{8\pi\varepsilon_o a_H}(4\ln 3 - 1 - 2\ln 3)\left[1 + p\sqrt{\frac{2\hbar\sqrt{\frac{2e^2}{4\pi\varepsilon_o(2a_H)^3}}}{m_e c^2}}\right] - \frac{1}{2}\hbar\sqrt{\frac{\sqrt{\frac{pe^2}{4\pi\varepsilon_o\left(\frac{2a_H}{p}\right)^3} - \frac{pe^2}{8\pi\varepsilon_o\left(\frac{3a_H}{p}\right)^3}}}{\mu}}\right\} \tag{22}$$

$$= -p^2 16.13392 \text{ eV} - p^3 0.118755 \text{ eV}$$

where p is an integer, c is the speed of light in vacuum, and μ is the reduced nuclear mass. The total energy of the hydrogen molecule having a central field of +pe at each focus of the prolate spheroid molecular orbital is $$E_T = -p^2\left\{\frac{e^2}{8\pi\varepsilon_o a_0}\left[\left(2\sqrt{2} - \sqrt{2} + \frac{\sqrt{2}}{2}\right)\ln\frac{\sqrt{2}+1}{\sqrt{2}-1} - \sqrt{2}\right]\left[1 + p\sqrt{\frac{2\hbar\sqrt{\frac{e^2}{4\pi\varepsilon_o a_0^3}}}{m_e c^2}}\right] - \frac{1}{2}\hbar\sqrt{\frac{\sqrt{\frac{pe^2}{8\pi\varepsilon_o\left(\frac{a_0}{p}\right)^3} - \frac{pe^2}{8\pi\varepsilon_o\left(\frac{\left(1+\frac{1}{\sqrt{2}}\right)a_0}{p}\right)^3}}}{\mu}}\right\} \tag{23}$$

$$= -p^2 31.351 \text{ eV} - p^3 0.326469 \text{ eV}$$

The bond dissociation energy, $E_D$, of the hydrogen molecule $H_2(1/p)$ is the difference between the total energy of the corresponding hydrogen atoms and $E_T$ $$E_D = E(2H(1/p)) - E_T \tag{24}$$

where $$E(2H(1/p)) = -p^2 27.20 \text{ eV} \tag{25}$$

$E_D$ is given by Eqs. (23–25):

$$E_D = -p^2 27.20 \text{ eV} - E_T \tag{26}$$

$$= -p^2 27.20 \text{ eV} - (-p^2 31.351 \text{ eV} - p^3 0.326469 \text{ eV})$$

$$= p^2 4.151 \text{ eV} + p^3 0.326469 \text{ eV}$$

$H_2(1/p)$ may be identified by X-ray photoelectron spectroscopy (XPS) wherein the ionization product in addition to the ionized electron may be at least one of the possibilities such as those comprising two protons and an electron, a hydrogen (H) atom, a hydrino atom, a molecular ion, hydrogen molecular ion, and $H_2(1/p)^+$ wherein the energies may be shifted by the matrix.

The NMR of catalysis-product gas provides a definitive test of the theoretically predicted chemical shift of $H_2(1/p)$. In general, the $^1$H NMR resonance of $H_2(1/p)$ is predicted to be upfield from that of $H_2$ due to the fractional radius in elliptic coordinates wherein the electrons are significantly closer to the nuclei. The predicted shift, $$\frac{\Delta B_T}{B},$$

for $H_2(1/p)$ is given by the sum of the contributions of the diamagnetism of the two electrons and the photon field of magnitude p (Mills GUTCP Eqs. (11.415-11.416)):

$$\frac{\Delta B_T}{B} = -\mu_0\left(4 - \sqrt{2}\ln\frac{\sqrt{2}+1}{\sqrt{2}-1}\right)\frac{pe^2}{36a_0 m_e}(1 + p\alpha^2) \tag{27}$$

$$\frac{\Delta B_T}{B} = -(p28.01 + p^2 1.49 \times 10^{-3}) \, ppm \tag{28}$$

where the first term applies to $H_2$ with p=1 and p=integer>1 for $H_2(1/p)$. The experimental absolute $H_2$ gas-phase resonance shift of −28.0 ppm is in excellent agreement with the predicted absolute gas-phase shift of −28.01 ppm (Eq. (28)). The predicted molecular hydrino peaks are extraordinarily upfield shifted relative to ordinary $H_2$. In an embodiment, the peaks are upfield of TMS. The NMR shift relative to TMS may be greater than that known for at least one of ordinary $H^-$, H, $H_2$, or $H^+$ alone or comprising a compound. The shift may be greater than at least one of 0, −1, −2, −3, −4, −5, −6, −7, −8, −9, −10, −11, −12, −13, −14, −15, −16, −17, −18, −19, −20, −21, −22, −23, −24, −25, −26, −27, −28, −29, −30, −31, −32, −33, −34, −35, −36, −37, −38, −39, and −40 ppm. The range of the absolute shift relative to a bare proton, wherein the shift of TMS is about −31.5 ppm relative to a bare proton, may be −(p28.01+p²2.56) ppm (Eq. (28)) within a range of about at least one of ±5 ppm, ±10 ppm, ±20 ppm, ±30 ppm, ±40 ppm, ±50 ppm, ±60 ppm, ±70 ppm, ±80 ppm, ±90 ppm, and ±100 ppm. The range of the absolute shift relative to a bare proton may be −(p28.01+p²1.49× 10⁻³) ppm (Eq. (28)) within a range of about at least one of about 0.1% to 99%, 1% to 50%, and 1% to 10%.

The vibrational energies, $E_{vib}$, for the υ=0 to υ=1 transition of hydrogen-type molecules $H_2(1/p)$ are $$E_{vib} = p^2 0.515902 \text{ eV} \tag{29}$$

where p is an integer.

The rotational energies, $E_{rot}$, for the J to J+1 transition of hydrogen-type molecules $H_2(1/p)$ are $$E_{rot} = E_{J+1} - E_J = \frac{\hbar^2}{I}[J+1] = p^2(J+1)0.01509 \text{ eV} \quad (30)$$

where p is an integer and I is the moment of inertia. Ro-vibrational emission of $H_2(1/4)$ was observed on e-beam excited molecules in gases and trapped in solid matrix.

The $p^2$ dependence of the rotational energies results from an inverse p dependence of the internuclear distance and the corresponding impact on the moment of inertia I. The predicted internuclear distance 2c' for $H_2(1/p)$ is $$2c' = \frac{a_0\sqrt{2}}{p} \quad (31)$$

At least one of the rotational and vibration energies of $H_2(1/p)$ may be measured by at least one of electron-beam excitation emission spectroscopy, Raman spectroscopy, and Fourier transform infrared (FTIR) spectroscopy. $H_2(1/p)$ may be trapped in a matrix for measurement such as in at least one of MOH, MX, and $M_2CO_3$ (M=alkali; X=halide) matrix.

In an embodiment, the molecular hydrino product is observed as an inverse Raman effect (IRE) peak at about 1950 $\text{cm}^{-1}$. The peak is enhanced by using a conductive material comprising roughness features or particle size comparable to that of the Raman laser wavelength that supports a Surface Enhanced Raman Scattering (SERS) to show the IRE peak.

I. Catalysts

In the present disclosure the terms such as hydrino reaction, H catalysis, H catalysis reaction, catalysis when referring to hydrogen, the reaction of hydrogen to form hydrinos, and hydrino formation reaction all refer to the reaction such as that of Eqs. (15-18)) of a catalyst defined by Eq. (14) with atomic H to form states of hydrogen having energy levels given by Eqs. (10) and (12). The corresponding terms such as hydrino reactants, hydrino reaction mixture, catalyst mixture, reactants for hydrino formation, reactants that produce or form lower-energy state hydrogen or hydrinos are also used interchangeably when referring to the reaction mixture that performs the catalysis of H to H states or hydrino states having energy levels given by Eqs. (10) and (12).

The catalytic lower-energy hydrogen transitions of the present disclosure require a catalyst that may be in the form of an endothermic chemical reaction of an integer m of the potential energy of uncatalyzed atomic hydrogen, 27.2 eV, that accepts the energy from atomic H to cause the transition. The endothermic catalyst reaction may be the ionization of one or more electrons from a species such as an atom or ion (e.g. m=3 for $Li\rightarrow Li^{2+}$) and may further comprise the concerted reaction of a bond cleavage with ionization of one or more electrons from one or more of the partners of the initial bond (e.g. m=2 for $NaH\rightarrow Na^{2+}+H$). $He^+$ fulfills the catalyst criterion—a chemical or physical process with an enthalpy change equal to an integer multiple of 27.2 eV since it ionizes at 54.417 eV, which is 2·27.2 eV. An integer number of hydrogen atoms may also serve as the catalyst of an integer multiple of 27.2 eV enthalpy. catalyst is capable of accepting energy from atomic hydrogen in integer units of one of about 27.2 eV±0.5 eV and $$\frac{27.2}{2} \text{ eV} \pm 0.5 \text{ eV}.$$

In an embodiment, the catalyst comprises an atom or ion M wherein the ionization of t electrons from the atom or ion M each to a continuum energy level is such that the sum of ionization energies of the t electrons is approximately one of m·27.2 eV and $$m \cdot \frac{27.2}{2} \text{ eV}$$

where m is an integer.

In an embodiment, the catalyst comprises a diatomic molecule MH wherein the breakage of the M-H bond plus the ionization of t electrons from the atom M each to a continuum energy level is such that the sum of the bond energy and ionization energies of the t electrons is approximately one of m·27.2 eV and $$m \cdot \frac{27.2}{2} \text{ eV}$$

where m is an integer.

In an embodiment, the catalyst comprises atoms, ions, and/or molecules chosen from molecules of AlH, AsH, BaH, BiH, CdH, ClH, CoH, GeH, InH, NaH, NbH, OH, RhH, RuH, SH, SbH, SeH, SiH, SnH, SrH, TlH, $C_2$, $N_2$, $O_2$, $CO_2$, $NO_2$, and $NO_3$ and atoms or ions of Li, Be, K, Ca, Ti, V, Cr, Mn, Fe, Co, Ni, Cu, Zn, As, Se, Kr, Rb, Sr, Nb, Mo, Pd, Sn, Te, Cs, Ce, Pr, Sm, Gd, Dy, Pb, Pt, Kr, $2K^+$, $He^+$, $Ti^{2+}$, $Na^+$, $Rb^+$, $Sr^+$, $Fe^{3+}$, $Mo^{2+}$, $Mo^{4+}$, $In^{3+}$, $He^+$, $Ar^+$, $Xe^+$, $Ar^{2+}$ and $H^+$, and $Ne^+$ and $H^+$.

In other embodiments, $MH^-$ type hydrogen catalysts to produce hydrinos provided by the transfer of an electron to an acceptor A, the breakage of the M-H bond plus the ionization of t electrons from the atom M each to a continuum energy level such that the sum of the electron transfer energy comprising the difference of electron affinity (EA) of MH and A, M-H bond energy, and ionization energies of the t electrons from M is approximately m·27.2 eV where m is an integer. $MH^-$ type hydrogen catalysts capable of providing a net enthalpy of reaction of approximately m·27.2 eV are $OH^-$, $SiH^-$, $CoH^-$, $NiH^-$, and $SeH^-$ In other embodiments, $MH^+$ type hydrogen catalysts to produce hydrinos are provided by the transfer of an electron from an donor A which may be negatively charged, the breakage of the M-H bond, and the ionization of t electrons from the atom M each to a continuum energy level such that the sum of the electron transfer energy comprising the difference of ionization energies of MH and A, bond M-H energy, and ionization energies of the t electrons from M is approximately m·27.2 eV where m is an integer.

In an embodiment, at least one of a molecule or positively or negatively charged molecular ion serves as a catalyst that accepts about m27.2 eV from atomic H with a decrease in the magnitude of the potential energy of the molecule or positively or negatively charged molecular ion by about m27.2 eV. Exemplary catalysts are $H_2O$, OH, amide group $NH_2$, and $H_2S$.

$O_2$ may serve as a catalyst or a source of a catalyst. The bond energy of the oxygen molecule is 5.165 eV, and the first, second, and third ionization energies of an oxygen atom are 13.61806 eV, 35.11730 eV, and 54.9355 eV, respectively. The reactions $O_2 \rightarrow O + O^{2+}$, $O_2 \rightarrow O + O^{3+}$, and $2O \rightarrow 2O^+$ provide a net enthalpy of about 2, 4, and 1 times $E_h$, respectively, and comprise catalyst reactions to form hydrino by accepting these energies from H to cause the formation of hydrinos.

II. Hydrinos

A hydrogen atom having a binding energy given by $$E_B = \frac{13.6 \text{ eV}}{(1/p)^2}$$

where p is an integer greater than 1, preferably from 2 to 137, is the product of the H catalysis reaction of the present disclosure. The binding energy of an atom, ion, or molecule, also known as the ionization energy, is the energy required to remove one electron from the atom, ion or molecule. A hydrogen atom having the binding energy given in Eqs. (10) and (12) is hereafter referred to as a "hydrino atom" or "hydrino." The designation for a hydrino of radius $$\frac{a_H}{p},$$

where $a_H$ is the radius of an ordinary hydrogen atom and p is an integer, is $$H\left[\frac{a_H}{p}\right].$$

A hydrogen atom with a radius $a_H$ is hereinafter referred to as "ordinary hydrogen atom" or "normal hydrogen atom." Ordinary atomic hydrogen is characterized by its binding energy of 13.6 eV.

According to the present disclosure, a hydrino hydride ion ($H^-$) having a binding energy according to Eq. (19) that is greater than the binding of ordinary hydride ion (about 0.75 eV) for p=2 up to 23, and less for p=24 ($H^-$) is provided. For p=2 to p=24 of Eq. (19), the hydride ion binding energies are respectively 3, 6.6, 11.2, 16.7, 22.8, 29.3, 36.1, 42.8, 49.4, 55.5, 61.0, 65.6, 69.2, 71.6, 72.4, 71.6, 68.8, 64.0, 56.8, 47.1, 34.7, 19.3, and 0.69 eV. Exemplary compositions comprising the novel hydride ion are also provided herein.

Exemplary compounds are also provided comprising one or more hydrino hydride ions and one or more other elements. Such a compound is referred to as a "hydrino hydride compound."

Ordinary hydrogen species are characterized by the following binding energies (a) hydride ion, 0.754 eV ("ordinary hydride ion"); (b) hydrogen atom ("ordinary hydrogen atom"), 13.6 eV; (c) diatomic hydrogen molecule, 15.3 eV ("ordinary hydrogen molecule"); (d) hydrogen molecular ion, 16.3 eV ("ordinary hydrogen molecular ion"); and (e) $H_3^+$, 22.6 eV ("ordinary trihydrogen molecular ion"). Herein, with reference to forms of hydrogen, "normal" and "ordinary" are synonymous.

According to a further embodiment of the present disclosure, a compound is provided comprising at least one increased binding energy hydrogen species such as (a) a hydrogen atom having a binding energy of about $$\frac{13.6 \text{ eV}}{\left(\frac{1}{p}\right)^2},$$

such as within a range of about 0.9 to 1.1 times $$\frac{13.6 \text{ eV}}{\left(\frac{1}{p}\right)^2}$$

where p is an integer from 2 to 137; (b) a hydride ion ($H^-$) having a binding energy of about $$\text{Binding Energy} = \frac{\hbar^2 \sqrt{s(s+1)}}{8\mu_e a_0^2 \left[\frac{1 + \sqrt{s(s+1)}}{p}\right]^2} - \frac{\pi\mu_0 e^2 \hbar^2}{m_e^2} \left(\frac{1}{a_H^3} + \frac{2^2}{a_0^3 \left[\frac{1 + \sqrt{s(s+1)}}{p}\right]^3}\right),$$

such as within a range of about 0.9 to 1.1 times $$\text{Binding Energy} = \frac{\hbar^2 \sqrt{s(s+1)}}{8\mu_e a_0^2 \left[\frac{1 + \sqrt{s(s+1)}}{p}\right]^2} - \frac{\pi\mu_0 e^2 \hbar^2}{m_e^2} \left(\frac{1}{a_H^3} + \frac{2^2}{a_0^3 \left[\frac{1 + \sqrt{s(s+1)}}{p}\right]^3}\right)$$

where p is an integer from 2 to 24; (c) $H_4^+(1/p)$; (d) a trihydrino molecular ion, $H_3^+(1/p)$, having a binding energy of about $$\frac{22.6}{\left(\frac{1}{p}\right)^2} \text{ eV}$$

such as within a range of about 0.9 to 1.1 times $$\frac{22.6}{\left(\frac{1}{p}\right)^2} \text{ eV}$$

where p is an integer from 2 to 137; (e) a dihydrino having a binding energy of about $$\frac{15.3}{\left(\frac{1}{p}\right)^2} \text{ eV}$$

such as within a range of about 0.9 to 1.1 times $$\frac{15.3}{\left(\frac{1}{p}\right)^2} \text{ eV}$$

where p is an integer from 2 to 137; (f) a dihydrino molecular ion with a binding energy of about $$\frac{16.3}{\left(\frac{1}{p}\right)^2} \text{ eV}$$

such as within a range of about 0.9 to 1.1 times $$\frac{16.3}{\left(\frac{1}{p}\right)^2} \text{ eV}$$

where p is an integer, preferably an integer from 2 to 137.

According to a further embodiment of the present disclosure, a compound is provided comprising at least one increased binding energy hydrogen species such as (a) a dihydrino molecular ion having a total energy of about $$E_T = -p^2 \left\{ \frac{\frac{e^2}{8\pi\varepsilon_o a_H}(4\ln 3 - 1 - 2\ln 3)}{\left[1 + p\sqrt{\frac{2\hbar\sqrt{\frac{2e^2}{4\pi\varepsilon_o(2a_H)^3}}}{m_e c^2}}\right] - \frac{1}{2}\hbar\sqrt{\frac{\frac{pe^2}{4\pi\varepsilon_o\left(\frac{2a_H}{p}\right)^3} - \frac{pe^2}{8\pi\varepsilon_o\left(\frac{3a_H}{p}\right)^3}}{\mu}}} \right\}$$

$$= -p^2 16.13392 \text{ eV} - p^3 0.118755 \text{ eV}$$

such as within a range of about 0.9 to 1.1 times $$E_T = -p^2 \left\{ \frac{\frac{e^2}{8\pi\varepsilon_o a_H}(4\ln 3 - 1 - 2\ln 3)}{\left[1 + p\sqrt{\frac{2\hbar\sqrt{\frac{2e^2}{4\pi\varepsilon_o(2a_H)^3}}}{m_e c^2}}\right] - \frac{1}{2}\hbar\sqrt{\frac{\frac{pe^2}{4\pi\varepsilon_o\left(\frac{2a_H}{p}\right)^3} - \frac{pe^2}{8\pi\varepsilon_o\left(\frac{3a_H}{p}\right)^3}}{\mu}}} \right\}$$

$$= -p^2 16.13392 \text{ eV} - p^3 0.118755 \text{ eV}$$

where p is an integer, $\hbar$ is Planck's constant bar, $m_e$ is the mass of the electron, c is the speed of light in vacuum, and $\mu$ is the reduced nuclear mass, and (b) a dihydrino molecule having a total energy of about $$E_T = -p^2 \left\{ \frac{\frac{e^2}{8\pi\varepsilon_o a_0}\left[\left(2\sqrt{2} - \sqrt{2} + \frac{\sqrt{2}}{2}\right)\ln\frac{\sqrt{2}+1}{\sqrt{2}-1} - \sqrt{2}\right]}{\left[1 + p\sqrt{\frac{2\hbar\sqrt{\frac{e^2}{4\pi\varepsilon_o a_0^3}}}{m_e c^2}}\right] - \frac{1}{2}\hbar\sqrt{\frac{\frac{pe^2}{8\pi\varepsilon_o\left(\frac{a_0}{p}\right)^3} - \frac{pe^2}{8\pi\varepsilon_o\left(\frac{\left(1+\frac{1}{\sqrt{2}}\right)a_0}{p}\right)^3}}{\mu}}} \right\}$$

$$= -p^2 31.351 \text{ eV} - p^3 0.326469 \text{ eV}$$

such as within a range of about 0.9 to 1.1 times $$E_T = -p^2 \left\{ \frac{\frac{e^2}{8\pi\varepsilon_o a_0}\left[\left(2\sqrt{2} - \sqrt{2} + \frac{\sqrt{2}}{2}\right)\ln\frac{\sqrt{2}+1}{\sqrt{2}-1} - \sqrt{2}\right]}{\left[1 + p\sqrt{\frac{2\hbar\sqrt{\frac{e^2}{4\pi\varepsilon_o a_0^3}}}{m_e c^2}}\right] - \frac{1}{2}\hbar\sqrt{\frac{\frac{pe^2}{8\pi\varepsilon_o\left(\frac{a_0}{p}\right)^3} - \frac{pe^2}{8\pi\varepsilon_o\left(\frac{\left(1+\frac{1}{\sqrt{2}}\right)a_0}{p}\right)^3}}{\mu}}} \right\}$$

$$= -p^2 31.351 \text{ eV} - p^3 0.326469 \text{ eV}$$

where p is an integer and $a_0$ is the Bohr radius.

According to one embodiment of the present disclosure wherein the compound comprises a negatively charged increased binding energy hydrogen species, the compound further comprises one or more cations, such as a proton, ordinary $H_2^+$, or ordinary $H_3^+$.

A method is provided herein for preparing compounds comprising at least one hydrino hydride ion. Such compounds are hereinafter referred to as "hydrino hydride compounds." The method comprises reacting atomic hydrogen with a catalyst having a net enthalpy of reaction of about $$\frac{m}{2} \cdot 27 \text{ eV},$$

where m is an integer greater than 1, preferably an integer less than 400, to produce an increased binding energy hydrogen atom having a binding energy of about $$\frac{13.6 \text{ eV}}{\left(\frac{1}{p}\right)^2}$$

where p is an integer, preferably an integer from 2 to 137. A further product of the catalysis is energy. The increased binding energy hydrogen atom can be reacted with an electron source, to produce an increased binding energy hydride ion. The increased binding energy hydride ion can be reacted with one or more cations to produce a compound comprising at least one increased binding energy hydride ion.

The novel hydrogen compositions of matter can comprise:

(a) at least one neutral, positive, or negative hydrogen species (hereinafter "increased binding energy hydrogen species") having a binding energy (i) greater than the binding energy of the corresponding ordinary hydrogen species, or (ii) greater than the binding energy of any hydrogen species for which the corresponding ordinary hydrogen species is unstable or is not observed because the ordinary hydrogen species' binding energy is less than thermal energies at ambient conditions (standard temperature and pressure, STP), or is negative; and (b) at least one other element. The compounds of the present disclosure are hereinafter referred to as "increased binding energy hydrogen compounds."

By "other element" in this context is meant an element other than an increased binding energy hydrogen species. Thus, the other element can be an ordinary hydrogen species, or any element other than hydrogen. In one group of compounds, the other element and the increased binding energy hydrogen species are neutral. In another group of compounds, the other element and increased binding energy hydrogen species are charged such that the other element provides the balancing charge to form a neutral compound. The former group of compounds is characterized by molecular and coordinate bonding; the latter group is characterized by ionic bonding.

Also provided are novel compounds and molecular ions comprising (a) at least one neutral, positive, or negative hydrogen species (hereinafter "increased binding energy hydrogen species") having a total energy (i) greater than the total energy of the corresponding ordinary hydrogen species, or (ii) greater than the total energy of any hydrogen species for which the corresponding ordinary hydrogen species is unstable or is not observed because the ordinary hydrogen species' total energy is less than thermal energies at ambient conditions, or is negative; and (b) at least one other element.

The total energy of the hydrogen species is the sum of the energies to remove all of the electrons from the hydrogen species. The hydrogen species according to the present disclosure has a total energy greater than the total energy of the corresponding ordinary hydrogen species. The hydrogen species having an increased total energy according to the present disclosure is also referred to as an "increased binding energy hydrogen species" even though some embodiments of the hydrogen species having an increased total energy may have a first electron binding energy less that the first electron binding energy of the corresponding ordinary hydrogen species. For example, the hydride ion of Eq. (19) for p=24 has a first binding energy that is less than the first binding energy of ordinary hydride ion, while the total energy of the hydride ion of Eq. (19) for p=24 is much greater than the total energy of the corresponding ordinary hydride ion.

Also provided herein are novel compounds and molecular ions comprising (a) a plurality of neutral, positive, or negative hydrogen species (hereinafter "increased binding energy hydrogen species") having a binding energy (i) greater than the binding energy of the corresponding ordinary hydrogen species, or (ii) greater than the binding energy of any hydrogen species for which the corresponding ordinary hydrogen species is unstable or is not observed because the ordinary hydrogen species' binding energy is less than thermal energies at ambient conditions or is negative; and (b) optionally one other element. The compounds of the present disclosure are hereinafter referred to as "increased binding energy hydrogen compounds."

The increased binding energy hydrogen species can be formed by reacting one or more hydrino atoms with one or more of an electron, hydrino atom, a compound containing at least one of said increased binding energy hydrogen species, and at least one other atom, molecule, or ion other than an increased binding energy hydrogen species.

Also provided are novel compounds and molecular ions comprising (a) a plurality of neutral, positive, or negative hydrogen species (hereinafter "increased binding energy hydrogen species") having a total energy (i) greater than the total energy of ordinary molecular hydrogen, or (ii) greater than the total energy of any hydrogen species for which the corresponding ordinary hydrogen species is unstable or is not observed because the ordinary hydrogen species' total energy is less than thermal energies at ambient conditions or is negative; and (b) optionally one other element. The compounds of the present disclosure are hereinafter referred to as "increased binding energy hydrogen compounds."

In an embodiment, a compound is provided comprising at least one increased binding energy hydrogen species chosen from (a) hydride ion having a binding energy according to Eq. (19) that is greater than the binding of ordinary hydride ion (about 0.8 eV) for p=2 up to 23, and less for p=24 ("increased binding energy hydride ion" or "hydrino hydride ion"); (b) hydrogen atom having a binding energy greater than the binding energy of ordinary hydrogen atom (about 13.6 eV) ("increased binding energy hydrogen atom" or "hydrino"); (c) hydrogen molecule having a first binding energy greater than about 15.3 eV ("increased binding energy hydrogen molecule" or "dihydrino"); and (d) molecular hydrogen ion having a binding energy greater than about 16.3 eV ("increased binding energy molecular hydrogen ion" or "dihydrino molecular ion"). In the disclosure, increased binding energy hydrogen species and compounds is also referred to as lower-energy hydrogen species and compounds. Hydrinos comprise an increased binding energy hydrogen species or equivalently a lower-energy hydrogen species.

III. Chemical Reactor

The present disclosure is also directed to other reactors for producing increased binding energy hydrogen species and compounds of the present disclosure, such as dihydrino molecules and hydrino hydride compounds. Further products of the catalysis are power and optionally plasma and light depending on the cell type. Such a reactor is hereinafter referred to as a "hydrogen reactor" or "hydrogen cell." The hydrogen reactor comprises a cell for making hydrinos. The cell for making hydrinos may take the form of a chemical reactor or gas fuel cell such as a gas discharge cell, a plasma torch cell, or microwave power cell, and an electrochemical cell. In an embodiment, the catalyst is HOH and the source of at least one of the HOH and H is ice. In an embodiment, the cell comprises an arc discharge cell and that comprises ice at least one electrode such that the discharge involves at least a portion of the ice.

In an embodiment, the arc discharge cell comprises a vessel, two electrodes, a high voltage power source such as one capable of a voltage in the range of about 100 V to 1 MV and a current in the range of about 1 A to 100 kA, and a source of water such as a reservoir and a means to form and supply $H_2O$ droplets. The droplets may travel between the electrodes. In an embodiment, the droplets initiate the ignition of the arc plasma. In an embodiment, the water arc plasma comprises H and HOH that may react to form hydrinos. The ignition rate and the corresponding power rate may be controlled by controlling the size of the droplets and the rate at which they are supplied to the electrodes. The source of high voltage may comprise at least one high voltage capacitor that may be charged by a high voltage power source. In an embodiment, the arc discharge cell further comprises a means such as a power converter such as one of the present invention such as at least one of a PV converter and a heat engine to convert the power from the hydrino process such as light and heat to electricity.

Exemplary embodiments of the cell for making hydrinos may take the form of a liquid-fuel cell, a solid-fuel cell, a heterogeneous-fuel cell, a CIHT cell, and an SF-CIHT cell. Each of these cells comprises: (i) a source of atomic hydrogen; (ii) at least one catalyst chosen from a solid catalyst, a molten catalyst, a liquid catalyst, a gaseous catalyst, or mixtures thereof for making hydrinos; and (iii) a vessel for reacting hydrogen and the catalyst for making hydrinos. As used herein and as contemplated by the present disclosure, the term "hydrogen," unless specified otherwise, includes not only proteum ($^1$H), but also deuterium ($^2$H) and tritium ($^3$H). Exemplary chemical reaction mixtures and reactors may comprise SF-CIHT, CIHT, or thermal cell embodiments of the present disclosure. Additional exemplary embodiments are given in this Chemical Reactor section. Examples of reaction mixtures having $H_2O$ as catalyst formed during the reaction of the mixture are given in the present disclosure. Other catalysts may serve to form increased binding energy hydrogen species and compounds. The reactions and conditions may be adjusted from these exemplary cases in the parameters such as the reactants, reactant wt %'s, $H_2$ pressure, and reaction temperature. Suitable reactants, conditions, and parameter ranges are those of the present disclosure. Hydrinos and molecular hydrino are shown to be products of the reactors of the present disclosure by predicted continuum radiation bands of an integer times 13.6 eV, otherwise unexplainable extraordinarily high H kinetic energies measured by Doppler line broadening of H lines, inversion of H lines, formation of plasma without a breakdown fields, and anomalously plasma afterglow duration as reported in Mills Prior Publications. The data such as that regarding the CIHT cell and solid fuels has been validated independently, off site by other researchers. The formation of hydrinos by cells of the present disclosure was also confirmed by electrical energies that were continuously output over long-duration, that were multiples of the electrical input that in most cases exceed the input by a factor of greater than 10 with no alternative source. The predicted molecular hydrino $H_2(1/4)$ was identified as a product of CIHT cells and solid fuels by MAS H NMR that showed a predicted upfield shifted matrix peak of about −4.4 ppm, ToF-SIMS and ESI-ToFMS that showed $H_2(1/4)$ complexed to a getter matrix as m/e=M+n2 peaks wherein M is the mass of a parent ion and n is an integer, electron-beam excitation emission spectroscopy and photoluminescence emission spectroscopy that showed the predicted rotational and vibration spectrum of $H_2(1/4)$ having 16 or quantum number p=4 squared times the energies of $H_2$, Raman and FTIR spectroscopy that showed the rotational energy of $H_2(1/4)$ of 1950 cm$^{-1}$, being 16 or quantum number p=4 squared times the rotational energy of $H_2$, XPS that showed the predicted total binding energy of $H_2(1/4)$ of 500 eV, and a ToF-SIMS peak with an arrival time before the m/e=1 peak that corresponded to H with a kinetic energy of about 204 eV that matched the predicted energy release for H to H(1/4) with the energy transferred to a third body H as reported in Mills Prior Publications and in R. Mills X Yu, Y. Lu, G Chu, J. He, J. Lotoski, "Catalyst Induced Hydrino Transition (CIHT) Electrochemical Cell", International Journal of Energy Research, (2013) and R. Mills, J. Lotoski, J. Kong, G Chu, J. He, J. Trevey, "High-Power-Density Catalyst Induced Hydrino Transition (CIHT) Electrochemical Cell" (2014) which are herein incorporated by reference in their entirety.

Using both a water flow calorimeter and a Setaram DSC 131 differential scanning calorimeter (DSC), the formation of hydrinos by cells of the present disclosure such as ones comprising a solid fuel to generate thermal power was confirmed by the observation of thermal energy from hydrino-forming solid fuels that exceed the maximum theoretical energy by a factor of 60 times. The MAS H NMR showed a predicted $H_2(1/4)$ upfield matrix shift of about −4.4 ppm. A Raman peak starting at 1950 cm$^{-1}$ matched the free space rotational energy of $H_2(1/4)$ (0.2414 eV). These results are reported in Mills Prior Publications and in R. Mills, J. Lotoski, W. Good, J. He, "Solid Fuels that Form HOH Catalyst", (2014) which is herein incorporated by reference in its entirety.

IV. Solid Fuel Catalyst Induced Hydrino Transition (SF-CIHT) Cell and Power Converter In an embodiment, a power system that generates at least one of direct electrical energy and thermal energy comprises at least one vessel, reactants comprising: (a) at least one source of catalyst or a catalyst comprising nascent $H_2O$; (b) at least one source of atomic hydrogen or atomic hydrogen; and (c) at least one of a conductor and a conductive matrix, and at least one set of electrodes to confine the hydrino reactants, a source of electrical power to deliver a short burst of high-current electrical energy, a reloading system, at least one system to regenerate the initial reactants from the reaction products, and at least one direct converter such as at least one of a plasma to electricity converter such as PDC, a photovoltaic converter, and at least one thermal to electric power converter. In a further embodiment, the vessel is capable of a pressure of at least one of atmospheric, above atmospheric, and below atmospheric. In an embodiment, the regeneration system can comprise at least one of a hydration, thermal, chemical, and electrochemical system. In another embodiment, the at least one direct plasma to electricity converter can comprise at least one of the group of plasma-dynamic power converter, $\vec{E} \times \vec{B}$ direct converter, magneto-hydrodynamic power converter, magnetic mirror magneto-hydrodynamic power converter, charge drift converter, Post or Venetian Blind power converter, gyrotron, photon bunching microwave power converter, and photoelectric converter. In a further embodiment, the at least one thermal to electricity converter can comprise at least one of the group of a heat engine, a steam engine, a steam turbine and generator, a gas turbine and generator, a Rankine-cycle engine, a Brayton-cycle engine, a Stirling engine, a thermionic power converter, and a thermoelectric power converter. The converter may be one given in Mills Prior Publications and Mills Prior Applications.

In an embodiment, $H_2O$ is ignited to form hydrinos with a high release of energy in the form of at least one of thermal, plasma, and electromagnetic (light) power. ("Ignition" in the present disclosure denotes a very high reaction rate of H to hydrinos that may be manifest as a burst, pulse or other form of high power release.) $H_2O$ may comprise the fuel that may be ignited with the application a high current such as one in the range of about 2000 A to 100,000 A. This may be achieved by the application of a high voltage such as about 5,000 to 100,000 V to first form highly conducive plasma such as an arc. Alternatively, a high current may be passed through a compound or mixture comprising $H_2O$ wherein the conductivity of the resulting fuel such as a solid fuel is high. (In the present disclosure a solid fuel is used to denote a reaction mixture that forms a catalyst such as HOH and H that further reacts to form hydrinos. However, the reaction mixture may comprise other physical states than solid. In embodiments, the reaction mixture may be at least one state of gaseous, liquid, molten matrix such as molten conductive matrix such a molten metal such as at least one of molten silver, silver-copper alloy, and copper, solid, slurry, sol gel, solution, mixture, gaseous suspension, pneumatic flow, and other states known to those skilled in the art.) In an embodiment, the solid fuel having a very low resistance comprises a reaction mixture comprising $H_2O$. The low resistance may be due to a conductor component of the reaction mixture. In embodiments, the resistance of the solid fuel is at least one of in the range of about $10^{-9}$ ohm to 100 ohms, $10^{-8}$ ohm to 10 ohms, $10^{-3}$ ohm to 1 ohm, $10^{-4}$ ohm to $10^{-1}$ ohm, and $10^{-4}$ ohm to $10^{-2}$ ohm. In another embodiment, the fuel having a high resistance comprises $H_2O$ comprising a trace or minor mole percentage of an added compound or material. In the latter case, high current may be flowed through the fuel to achieve ignition by causing breakdown to form a highly conducting state such as an arc or arc plasma.

In an embodiment, the reactants can comprise a source of $H_2O$ and a conductive matrix to form at least one of the source of catalyst, the catalyst, the source of atomic hydrogen, and the atomic hydrogen. In a further embodiment, the reactants comprising a source of $H_2O$ can comprise at least one of bulk $H_2O$, a state other than bulk $H_2O$, a compound or compounds that undergo at least one of react to form $H_2O$ and release bound $H_2O$. Additionally, the bound $H_2O$ can comprise a compound that interacts with $H_2O$ wherein the $H_2O$ is in a state of at least one of absorbed $H_2O$, bound $H_2O$, physisorbed $H_2O$, and waters of hydration. In embodiments, the reactants can comprise a conductor and one or more compounds or materials that undergo at least one of release of bulk $H_2O$, absorbed $H_2O$, bound $H_2O$, physisorbed $H_2O$, and waters of hydration, and have $H_2O$ as a reaction product. In other embodiments, the at least one of the source of nascent $H_2O$ catalyst and the source of atomic hydrogen can comprise at least one of: (a) at least one source of $H_2O$; (b) at least one source of oxygen, and (c) at least one source of hydrogen.

In an embodiment, the hydrino reaction rate is dependent on the application or development of a high current. In an embodiment of an SF-CIHT cell, the reactants to form hydrinos are subject to a low voltage, high current, high power pulse that causes a very rapid reaction rate and energy release. In an exemplary embodiment, a 60 Hz voltage is less than 15 V peak, the current ranges from 10,000 A/cm² and 50,000 A/cm² peak, and the power ranges from 150,000 W/cm² and 750,000 W/cm². Other frequencies, voltages, currents, and powers in ranges of about 1/100 times to 100 times these parameters are suitable. In an embodiment, the hydrino reaction rate is dependent on the application or development of a high current. In an embodiment, the voltage is selected to cause a high AC, DC, or an AC-DC mixture of current that is in the range of at least one of 100 A to 1,000,000 A, 1 kA to 100,000 A, 10 kA to 50 kA. The DC or peak AC current density may be in the range of at least one of 100 A/cm² to 1,000,000 A/cm², 1000 A/cm² to 100,000 A/cm², and 2000 A/cm² to 50,000 A/cm². The DC or peak AC voltage may be in at least one range chosen from about 0.1 V to 1000 V, 0.1 V to 100 V, 0.1 V to 15 V, and 1 V to 15 V. The AC frequency may be in the range of about 0.1 Hz to 10 GHz, 1 Hz to 1 MHz, 10 Hz to 100 kHz, and 100 Hz to 10 kHz. The pulse time may be in at least one range chosen from about $10^{-6}$ s to 10 s, $10^{-5}$ s to 1 s, $10^{-4}$ s to 0.1 s, and $10^{-3}$ s to 0.01 s.

In an embodiment, the transfer of energy from atomic hydrogen catalyzed to a hydrino state results in the ionization of the catalyst. The electrons ionized from the catalyst may accumulate in the reaction mixture and vessel and result in space charge build up. The space charge may change the energy levels for subsequent energy transfer from the atomic hydrogen to the catalyst with a reduction in reaction rate. In an embodiment, the application of the high current removes the space charge to cause an increase in hydrino reaction rate. In another embodiment, the high current such as an arc current causes the reactant such as water that may serve as a source of H and HOH catalyst to be extremely elevated in temperature. The high temperature may give rise to the thermolysis of the water to at least one of H and HOH catalyst. In an embodiment, the reaction mixture of the SF-CIHT cell comprises a source of H and a source of catalyst such as at least one of nH (n is an integer) and HOH. The at least one of nH and HOH may be formed by the thermolysis or thermal decomposition of at least one physical phase of water such as at least one of solid, liquid, and gaseous water. The thermolysis may occur at high temperature such as a temperature in at least one range of about 500K to 10,000K, 1000K to 7000K, and 1000K to 5000K. In an exemplary embodiment, the reaction temperature is about 3500 to 4000K such that the mole fraction of atomic H is high as shown by J. Lede, F. Lapicque, and J Villermaux [J. Lédé, F. Lapicque, J. Villermaux, "Production of hydrogen by direct thermal decomposition of water", International Journal of Hydrogen Energy, 1983, V8, 1983, pp. 675-679; H. H. G. Jellinek, H. Kachi, "The catalytic thermal decomposition of water and the production of hydrogen", International Journal of Hydrogen Energy, 1984, V9, pp. 677-688; S. Z. Baykara, "Hydrogen production by direct solar thermal decomposition of water, possibilities for improvement of process efficiency", International Journal of Hydrogen Energy, 2004, V29, pp. 1451-1458; S. Z. Baykara, "Experimental solar water thermolysis", International Journal of Hydrogen Energy, 2004, V29, pp. 1459-1469 which are herein incorporated by reference]. The thermolysis may be assisted by a solid surface such as that of at least one of the nozzle 5q, the injector 5z1, and the electrodes 8 of FIGS. 2I10-2I23. The solid surface may be heated to an elevated temperature by the input power and by the plasma maintained by the hydrino reaction. The thermolysis gases such as those down stream of the ignition region may be cooled to prevent recombination or the back reaction of the products into the starting water. The reaction mixture may comprise a cooling agent such as at least one of a solid, liquid, or gaseous phase that is at a lower temperature than the temperature of the product gases. The cooling of the thermolysis reaction product gases may be achieved by contacting the products with the cooling agent. The cooling agent may comprise at least one of lower temperature steam, water, and ice.

In an embodiment, the SF-CIHT generator comprises a power system that generates at least one of electrical energy and thermal energy comprising:

at least one vessel;

shot comprising reactants, the reactants comprising:
  a) at least one source of catalyst or a catalyst comprising nascent H2O;
  b) at least one source of H2O or H2O;
  c) at least one source of atomic hydrogen or atomic hydrogen; and
  d) at least one of a conductor and a conductive matrix;

at least one shot injection system;

at least one shot ignition system to cause the shot to form at least one of light-emitting plasma and thermal-emitting plasma;

a system to recover reaction products of the reactants;

at least one regeneration system to regenerate additional reactants from the reaction products and form additional shot,
  wherein the additional reactants comprise:
    a) at least one source of catalyst or a catalyst comprising nascent H2O;
    b) at least one source of H2O or H2O;
    c) at least one source of atomic hydrogen or atomic hydrogen; and
    d) at least one of a conductor and a conductive matrix; and at least one power converter or output system of at least one of the light and thermal output to electrical power and/or thermal power such as at least one of the group of a photovoltaic converter, a photoelectronic converter, a plasmadynamic converter, a thermionic converter, a thermoelectric converter, a Sterling engine, a Brayton cycle engine, a Rankine cycle engine, and a heat engine, and a heater.

In an embodiment, the shot fuel may comprise at least one of a source of H, $H_2$, a source of catalyst, a source of $H_2O$, and $H_2O$. Suitable shot comprises a conductive metal matrix and a hydrate such as at least one of an alkali hydrate, an alkaline earth hydrate, and a transition metal hydrate. The hydrate may comprise at least one of $MgCl_2 \cdot 6H_2O$, $BaI_2 \cdot 2H_2O$, and $ZnCl_2 \cdot 4H_2O$. Alternatively, the shot may comprise at least one of silver, copper, absorbed hydrogen, and water.

The ignition system may comprise:
  a) at least one set of electrodes to confine the shot; and
  b) a source of electrical power to deliver a short burst of high-current electrical energy wherein the short burst of high-current electrical energy is sufficient to cause the shot reactants to react to form plasma. The source of electrical power may receive electrical power from the power converter. In an embodiment, the shot ignition system comprises at least one set of electrodes that are separated to form an open circuit, wherein the open circuit is closed by the injection of the shot to cause the high current to flow to achieve ignition. In an embodiment, the ignition system comprises a switch to at least one of initiate the current and interrupt the current once ignition is achieved. The flow of current may be initiated by a shot that completes the gap between the electrodes. The switching may be performed electronically by means such as at least one of an insulated gate bipolar transistor (IGBT), a silicon controlled rectifier (SCR), and at least one metal oxide semiconductor field effect transistor (MOSFET). Alternatively, ignition may be switched mechanically. The current may be interrupted following ignition in order to optimize the output hydrino generated energy relative to the input ignition energy. The ignition system may comprise a switch to allow controllable amounts of energy to flow into the fuel to cause detonation and turn off the power during the phase wherein plasma is generated. In an embodiment, the source of electrical power to deliver a short burst of high-current electrical energy comprises at least one of the following:
  a voltage selected to cause a high AC, DC, or an AC-DC mixture of current that is in the range of at least one of 100 A to 1,000,000 A, 1 kA to 100,000 A, 10 kA to 50 kA;
  a DC or peak AC current density in the range of at least one of 100 A/cm$^2$ to 1,000,000 A/cm$^2$, 1000 A/cm$^2$ to 100,000 A/cm$^2$, and 2000 A/cm$^2$ to 50,000 A/cm$^2$;
  wherein the voltage is determined by the conductivity of the solid fuel wherein the voltage is given by the desired current times the resistance of the solid fuel sample;
  the DC or peak AC voltage is in the range of at least one of 0.1 V to 500 kV, 0.1 V to 100 kV, and 1 V to 50 kV, and
  the AC frequency is in range of at least one of 0.1 Hz to 10 GHz, 1 Hz to 1 MHz, 10 Hz to 100 kHz, and 100 Hz to 10 kHz.

The output power of the SF-CIHT cell may comprise thermal and photovoltaic-convertible light power. In an embodiment, the light to electricity converter may comprise one that exploits at least one of the photovoltaic effect, the thermionic effect, and the photoelectron effect. The power converter may be a direct power converter that converts the kinetic energy of high-kinetic-energy electrons into electricity. In an embodiment, the power of the SF-CIHT cell may be at least partially in the form of thermal energy or may be at least partially converted into thermal energy. The electricity power converter may comprise a thermionic power converter. An exemplary thermionic cathode may comprise scandium-doped tungsten. The cell may exploit the photon-enhanced thermionic emission (PETE) wherein the photo-effect enhances electron emission by lifting the electron energy in a semiconductor emitter across the bandgap into the conduction band from which the electrons are thermally emitted. In an embodiment, the SF-CIHT cell may comprise an absorber of light such as at least one of extreme ultra-violet (EUV), ultraviolet (UV), visible, and near infrared light. The absorber may be outside if the cell. For example, it may be outside of the window 20. The absorber may become elevated in temperature as a result of the absorption. The absorber temperature may be in the range of about 500° C. to 4000° C. The heat may be input to a thermophotovoltaic or thermionic cell. Thermoelectric and heat engines such as Stirling, Rankine, Brayton, and other heat engines known in the art are within the scope of the disclosure.

At least one first light to electricity converter such as one that exploits at least one of the photovoltaic effect, the thermionic effect, and the photoelectron effect of a plurality of converters may be selective for a first portion of the electromagnetic spectrum and transparent to at least a second portion of the electromagnetic spectrum. The first portion may be converted to electricity in the corresponding first converter, and the second portion for which the first converter is non-selective may propagate to another, second converter that is selective for at least a portion of the propagated second portion of electromagnetic spectrum.

In an embodiment, the plasma emits a significant portion of the optical power and energy as EUV and UV light. The pressure may be reduced by maintaining a vacuum in the reaction chamber, cell 1, to maintain the plasma at condition of being less optically thick to decease the attenuation of the short wavelength light. In an embodiment, the light to electricity converter comprises the photovoltaic converter of the disclosure comprising photovoltaic (PV) cells that are responsive to a substantial wavelength region of the light emitted from the cell such as that corresponding to at least 10% of the optical power output. In an embodiment, the fuel may comprise silver shot having at least one of trapped hydrogen and trapped $H_2O$. The light emission may comprise predominantly ultraviolet light such as light in the wavelength region of about 120 nm to 300 nm. The PV cell may be response to at least a portion of the wavelength region of about 120 nm to 300 nm. The PV cell may comprise a group III nitride such as at least one of InGaN, GaN, and AlGaN. In an embodiment, the PV cell comprises SiC. In an embodiment, the PV cell may comprise a plurality of junctions. The junctions may be layered in series. In another embodiment, the junctions are independent or electrically parallel. The independent junctions may be mechanically stacked or wafer bonded. An exemplary multi junction PV cell comprises at least two junctions comprising n-p doped semiconductor such as a plurality from the group of InGaN, GaN, and AlGaN. The n dopant of GaN may comprise oxygen, and the p dopant may comprise Mg. An exemplary triple junction cell may comprise InGaN//GaN//AlGaN wherein // may refer to an isolating transparent wafer bond layer or mechanical stacking. The PV may be run at high light intensity equivalent to that of concentrator photovoltaic (CPV). The substrate may be at least one of sapphire, Si, SiC, and GaN wherein the latter two provide the beast lattice matching for CPV applications. Layers may be deposited using metalorganic vapor phase epitaxy (MOVPE) methods known in the art. The cells may be cooled by cold plates such as those used in CPV or diode lasers such as commercial GaN diode lasers. The grid contact may be mounted on the front and back surfaces of the cell as in the case of CPV cells. In an embodiment, the PV converter may have a protective window that is substantially transparent to the light to which it is responsive. The window may be at least 10% transparent to the responsive light. The window may be transparent to UV light. The window may comprise a coating such as a UV transparent coating on the PV cells. The coating may comprise may comprise the material of UV windows of the disclosure such as a sapphire or $MgF_2$ window. Other suitable windows comprise LiF and $CaF_2$. The coating may be applied by deposition such as vapor deposition.

The SF-CIHT cell power converter may comprise a photoelectron (PE) converter. The photoelectron effect comprises the absorption of a photon by a material such as a metal having a work function $\Phi$ with the ejection of an electron when the photon energy given by Planck's equation exceeds the work function. For a photon of energy hv, the total energy of the excited electron is hv, with the excess over the work function $\Phi$ required to escape from the metal appearing as kinetic energy $$\frac{1}{2} m_e v^2$$

wherein h is Planck's constant, v is the photon frequency, $m_e$ is the electron mass, and v is the electron velocity. Conservation of energy requires that the kinetic energy is the difference between the energy of the absorbed photon and the work function of the metal, which is the binding enemy. The relationship is $$\frac{1}{2} m_e v^2 = hv - \Phi \tag{32}$$

The current due to the emitted electrons is proportional to the intensity of the radiation. A light to electricity converter of the present disclosure such as an ultraviolet light to electricity converter exploits the photoelectron effect to convert the photon energy into electrical energy. Heat may also assist in the ejection of electrons that may contribute to the current of the device. The light to electricity converter may comprise a photoelectric power converter comprising at least one cell shown in FIG. 2G1e4, each capable of receiving incident light such as ultraviolet light 205 comprising a transparent casing 201, a photocathode or electron emitter 204, an anode or electron collector 202, a separating space such as an evacuated inter-electrode space 203, and external electrical connections 207 between the cathode and anode through a load 206. When exposed to at least one of light and heat, the cathode 204 emits electrons that are collected by the anode 202 that is separated from the cathode by a gap or space 203. In an embodiment, the photocathode 204 has a higher work function than the anode 202 wherein the former serves and an electron emitter and the latter serves as an electron collector when the cell is exposed to light such as ultraviolet light. The difference in work functions between the different materials of the two electrodes serves to accelerate electrons from the higher work function photocathode to the lower work function anode to provide a voltage to perform useful work in an external circuit. The work function of the anode may be low to enhance the cell power output to the load. The photoelectron cell further comprises an electrical connection 207 for conducting electrons to the photocathode and an electrical connection for removing electrons from the anode. The electrical connections may comprise a circuit by attaching across a load 206 through which the current flows. The cell may be sealed. The gap 203 may be under vacuum.

Figure 4:
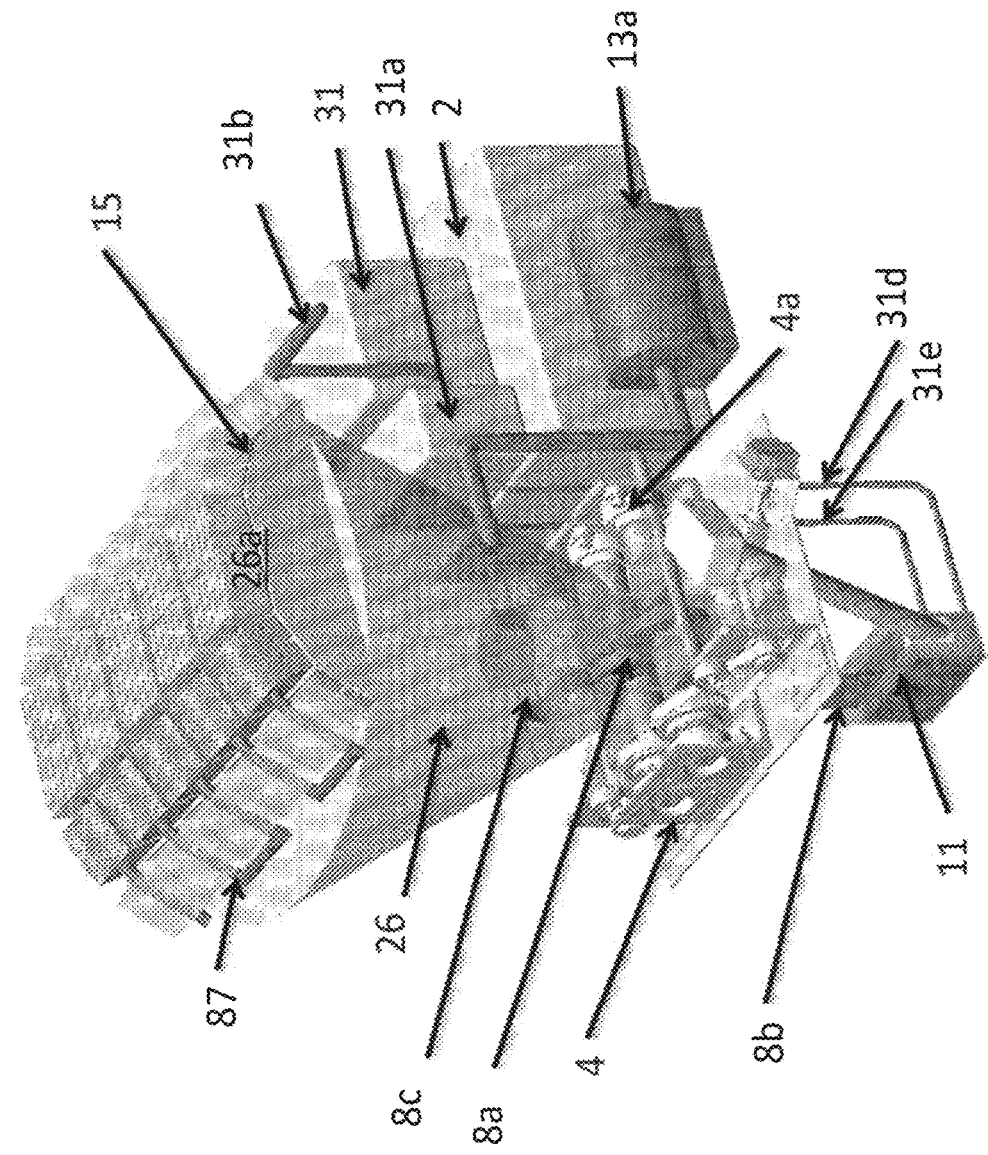
FIG. 4 (also referred to herein as 2H1) is a schematic drawing of a SF-CIHT cell power generator showing a cell capable of maintaining a vacuum, an ignition system having a railgun shot injection system fed by two transporters, augmented plasma railgun and gravity recovery systems, a pelletizer, and a photovoltaic converter system in accordance with an embodiment of the present disclosure.

In embodiments, photocathodes can be divided into two groups transmission or semitransparent shown in FIG. 2G1e4, and reflective or opaque shown in FIGS. 2G1e5 and 2G1e6. Referring to FIG. 2G1e4, a semitransparent photoelectronic cell embodiment typically comprises a coating upon a transparent window 201 such as sapphire, LiF, $MgF_2$, and $CaF_2$, other alkaline earth halides such as fluorides such as $BaF_2$, $CdF_2$, quartz, fused quartz, UV glass, borosilicate, and Infrasil (ThorLabs) where the light strikes one surface of the photocathode 204 and electrons exit from the opposite surface of 204. In a "semitransparent" mode embodiment, the cell comprises a photocathode 204, an anode 202, and a separating gap between the electrodes 203, and radiation 205 enters the cell through a window 201 onto which the photocathode 204 is deposited on the interior of the cell. Electrons are emitted from the inner face of the photocathode 204 such as the gap or vacuum interface 203.

Figure 5:
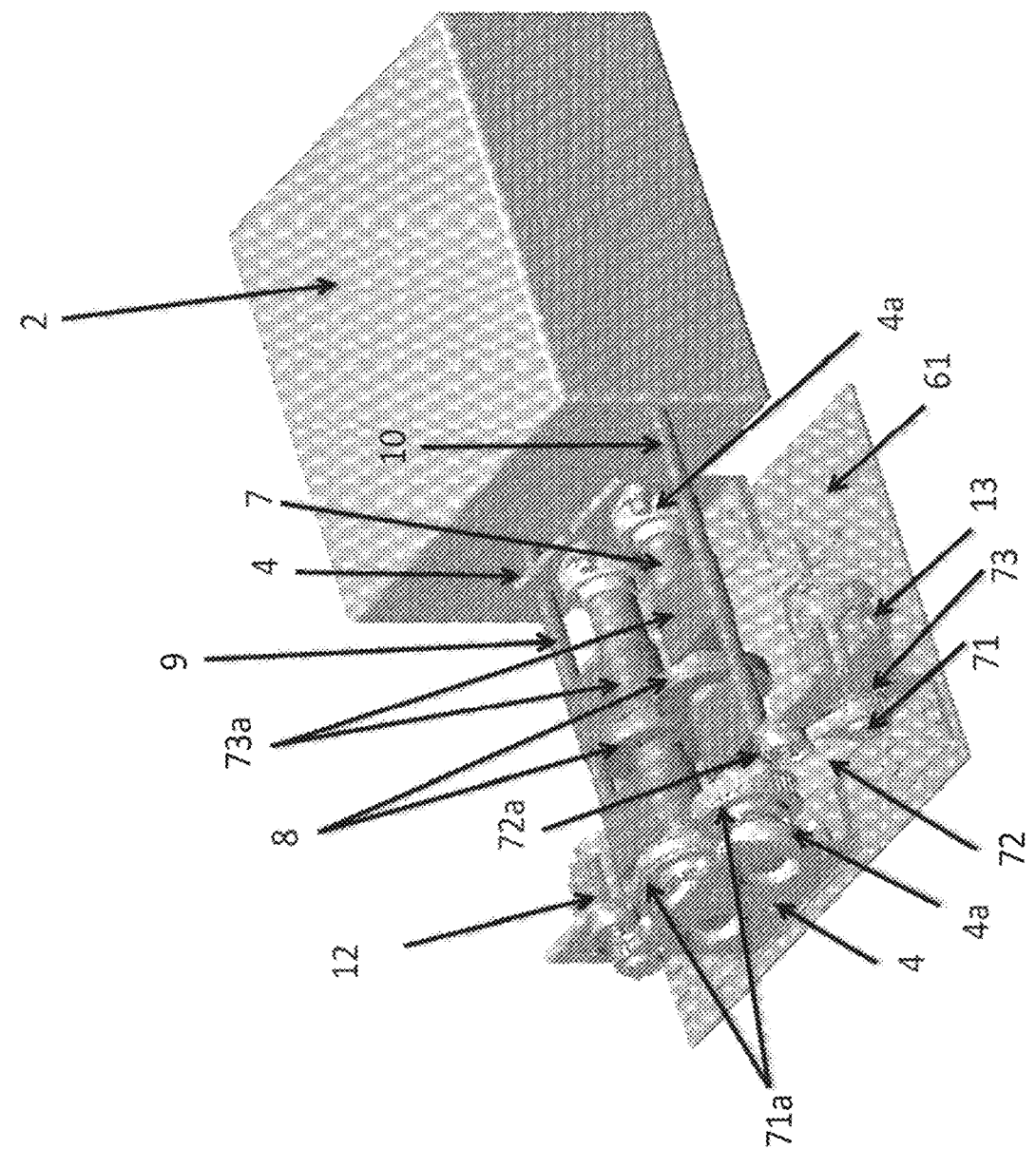
FIG. 5 (also referred to herein as 2H2) is a schematic drawing of a SF-CIHT cell power generator showing the details of the ignition system and it power supply in accordance with an embodiment of the present disclosure.
Figure 6:
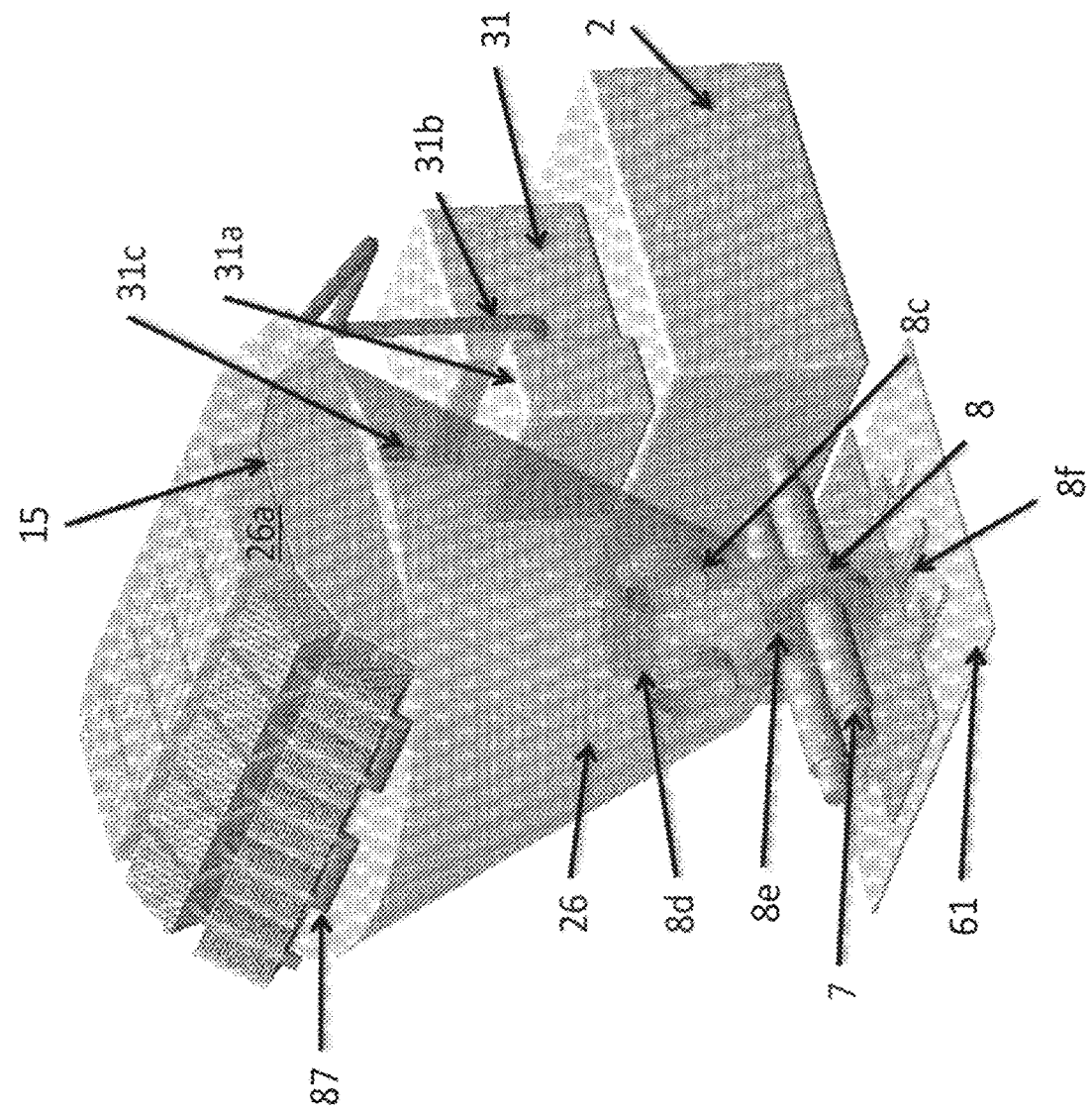
FIG. 6 (also referred to herein as 2H3) is a schematic drawing of a SF-CIHT cell power generator showing a cell capable of maintaining a vacuum, an ignition system having a railgun shot injection system fed by two transporters, augmented plasma railgun and gravity recovery systems, a pelletizer, and a photovoltaic converter system showing the details of the ignition system and the photovoltaic converter system in accordance with an embodiment of the present disclosure.

An opaque or reflective photoelectronic cell embodiment shown in FIGS. 2G1e5 and 2G1e6 typically comprises a photocathode material formed on an opaque metal electrode base, where the light enters and the electrons exit from the same side. A variation is the double reflection type, where the metal base is mirror-like, causing light that passed through the photocathode without causing emission to be bounced back for a second pass at absorption and pho-toemission. In an "opaque" mode embodiment, the cell shown in FIG. 2G1e5 comprises a transparent casing 201, a photocathode 204, a transparent anode 208, a separating space such as an evacuated inter-electrode space 203, and external electrical connections 207 between the cathode and anode through a load 206 wherein radiation such as UV radiation 205 enters the cell and is directly incident on the photocathode 204. Radiation enters the cathode 204 at the gap 203 such as vacuum gap interface, and electrons are emitted from the same interface. Referring to FIG. 2G1e6, the light 205 may enter the cell through a transparent window 201 having the anode such as a grid anode 209 on the interior side of the window 201. The opaque mode may be considered to comprise a directly illuminated cathode wherein the incident radiation first traverses the window 201, anode 208 or 209, and gap 203.

In an embodiment, the cell of the SF-CIHT generator may be maintained under vacuum. The photoelectric (PE) con-verter may comprise a photocathode, a grid anode, and a vacuum space between the electrodes wherein the vacuum is in continuity with the vacuum of the cell. The PE converter may be absent a window in an embodiment.

Figure 32:
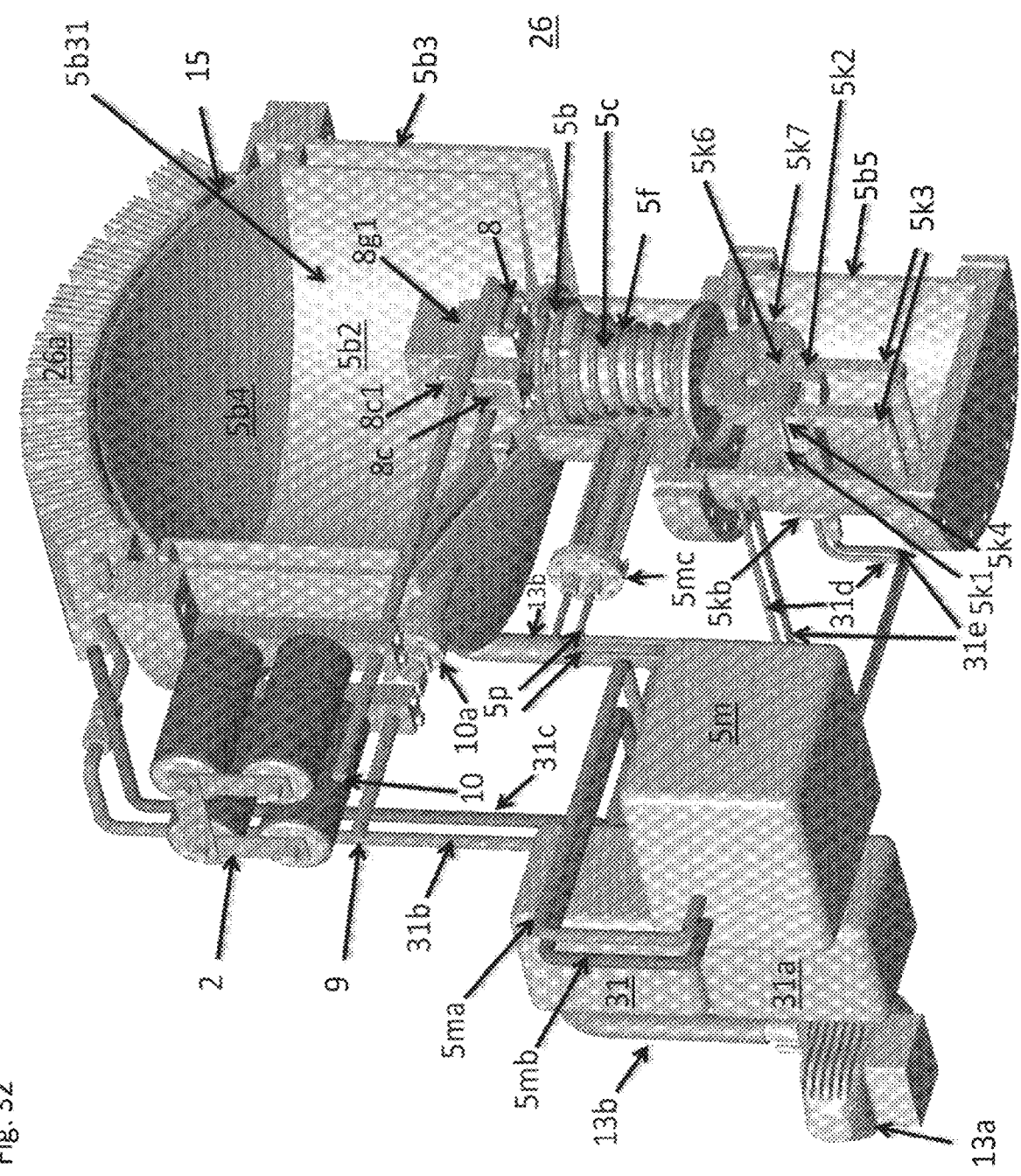
FIG. 32 (also referred to herein as 2125) is a schematic drawing of an internal view of the SF-CIHT cell power generator shown in FIG. 2124 in accordance with an embodiment of the present disclosure.

The electrical connection grid of an electrode may com-prise that of a photovoltaic cell such as a grid of fine wires wherein light may pass between the grid wires. Such grids are known to those skilled in the art. A plurality of photo-electron effect cells may be connected in at least one of series and parallel to achieve a desired voltage and current. The collections may achieve at least one of higher current and higher voltage. For example, the cells may be connected in series to increase the voltage, and the cells may be connected in parallel to increase the cell current. The grid and interconnections may be connected to at least one bus bar 26b to carry the higher power to a load such as to power conditioning equipment and parasitic loads and power out-put 6 of the SF-CIHT cell (FIG. 2I32). In an embodiment, high initiation or startup up current may be provided by a startup circuit that may comprise at least one of a power storage element such as one comprising at least one capaci-tor and battery, and a power source wherein the storage elements may be recharged with output from the power converter 26a. The DC PV output may be power conditioned with at least one of a DC/DC, AC/DC, and DC/AC converter and other condition equipment know to those skilled in the art and output at terminals 6.

The emission of current as a free electron flow from the photocathode to the anode gives rise to space charge in the gap. The opposing negative voltage $V_{SC}$ due to space charge is given by the Child Langmuir equation:

$$V_{SC} = -\left(\frac{81J^2 m_e}{32\varepsilon_0^2 e}\right)^{1/3} d^{4/3} \tag{33}$$

where J is the current density, $m_e$ is the mass of the electron, $\varepsilon_0$ is the permittivity, e is the electron charge, and d is the electrode separation distance corresponding to the gap between the electrodes. In an embodiment, the voltage of the photoelectric cell $V_{PE}$ is given by the difference in the work functions of the photocathode $\Phi_C$ and anode $\Phi_A$, corrected by the opposing negative space charge voltage $V_{SC}$ $$V_{PE} = \Phi_C - \Phi_A + V_{SC} \tag{34}$$

The photoelectron cell power density $P_{PE}$ may be given by the product of the photoelectric cell voltage $V_{PE}$ and the current density J:

$$P_{PE} = V_{PE} J \tag{35}$$

Using Eqs. (33-35) with selected values of the current density J and the electrode separation d, the opposing space charge voltage $V_{SC}$, the photoelectric cell voltage $V_{PE}$, and the power density $P_{PE}$ are given in TABLE 1.

TABLE 1

Parameters of the photoelectric cell with photocathode and anode work functions of the of $\Phi_C$ = 5 V and $\Phi_A$ = 0.75 V, respectively.

| Current Density J (kA/m²) | Electrode Separation d (um) | Space Charge Voltage $V_{SC}$ (−V) | Photoelectric Cell Voltage $V_{PE}$ (V) | Power Density $P_{PE}$ (kW/m²) |
|---|---|---|---|---|
| 10 | 3 | 0.114 | 4.14 | 41.4 |
| 50 | 3 | 0.334 | 3.92 | 196 |
| 100 | 3 | 0.530 | 3.72 | 372 |
| 150 | 3 | 0.694 | 3.56 | 533 |
| 200 | 3 | 0.841 | 3.41 | 682 |
| 250 | 3 | 0.976 | 3.27 | 819 |
| 10 | 5 | 0.226 | 4.02 | 40.2 |
| 50 | 5 | 0.659 | 3.59 | 180 |
| 100 | 5 | 1.047 | 3.20 | 320 |
| 150 | 5 | 1.372 | 2.88 | 432 |
| 200 | 5 | 1.662 | 2.59 | 518 |
| 250 | 5 | 1.93 | 2.32 | 580 |
| 10 | 7 | 0.353 | 3.90 | 39 |
| 50 | 7 | 1.033 | 3.22 | 161 |
| 100 | 7 | 1.64 | 2.61 | 261 |
| 150 | 7 | 2.148 | 2.10 | 315 |

In an embodiment, the gap or electrode separation d is in at least one range of about 0.1 um to 1000 um, 1 um to 100 um, about 1 um to 10 um, and about 1 to 5 um. The gap spacing may be achieved with insulating spacers such as alumina or beryllium oxide. In an embodiment, a photoelec-tron effect cell further comprises a voltage source to apply an electron collection voltage to ameliorate the space charge and its voltage at given current and power densities. Exem-plary applied voltages are the opposite of those given by Eq. (33) within about ±50%. The temperature may be main-tained low such as less than 500° C. to avoid thermal distortion effects that may result in shorting across the gap. In an embodiment operated at an elevated temperature, the gap may be greater than 3 to 5 um to avoid near infrared losses. Thermionic as well as photoelectron emission may be exploited at elevated temperature such as in the range of 500° C. to 3500° C.

In an embodiment, individual photoelectronic cells each comprising the two electrodes separated by a gap may be individually sealed. The gap may be maintained at a pressure of less than atmospheric, atmospheric, or above atmo-spheric. The gap may be maintained under vacuum. In embodiments, the gap pressure may be maintained in at least one range of about 0 Torr to 10,000 Torr, $10^{-9}$ Torr to 760 Torr, $10^{-6}$ Torr to 10 Torr, and $10^{-3}$ Torr to 1 Torr. In an embodiment, individual photoelectronic cells each compris-ing the two electrodes separated by a gap may be individu-ally unsealed and contained in a vessel capable of maintain-ing the pressure of the sealed cells. The vessel may be a vessel containing just the photoelectronic cells. In another embodiment, the vessel may comprise the SF-CIHT cell. In an embodiment, the gap may contain a material to reduce the space charge from the electrons emitted from the cathode. Exemplary materials are alkali metals such as cesium vapor. In an embodiment, the space charge may be reduced with an alkali metal vapor such as cesium vapor and oxygen. The material may produce plasma in an ignited mode and not produce plasma in an un-ignited mode. With a small gap such as 1 to 10 um, the cesium may ionize at the cathode other than being ionized by plasma. The ionization may be by at least one of thermal and electrical energy from the cathode.

In an embodiment to eliminate space charge, the cell may comprise a gate electrode in the gap and a longitudinal magnetic field to cause the electrons to avoid being collected at the gate electrode. The gate electrode may be perforated to allow the electrons trapped on the magnetic field lines to pass through it without being collected.

In an ignited mode, the density of cesium atoms may be about $10^{16}/cm^3$ (1 Torr), and the plasma density may be about $10^{13}/cm^3$ to $10^{14}/cm^3$ in the inter-electrode space. The material may be present in a larger enclosure beyond the inter-electrode space and may receive at least one of electrical and thermal energy to form plasma from at least one of the electrodes and contact surfaces other than the electrodes. In an embodiment, an arc drop of less than about 0.5 eV is required to maintain the plasma. In another embodiment, the arc voltage drop is in the range of about 0.01 V to 5 V. Ions may be formed by emission from the cathode surface that may be hot especially in the case of low material pressure and close inter-electrode spacing that minimize electron scattering. The ionization may be due to at least one of thermal and electrical energy from the cathode. In an embodiment known as Knudsen discharge, the pressure between the electrodes is maintained low enough so that the electron mean free path is greater than the inter-electrode gap such that electron transport occurs essentially without scattering. In the limit, no voltage drop due to space charge occurs. In an embodiment, the material such as a gaseous material such as a vaporized alkali metal is selected and maintained to provide a reduced work function for removal of electrons from the cathode (emitter) and a reduced work function for their collection at the anode (collector). In another embodiment, the photocathode may have a surface that is angled relative to the direction of incidence of light such that the radiation pressure may reduce the space charge.

The photocathode comprises a photoelectron effect active material. The photocathode may comprise a material with a work function that matches that of the ionization spectrum of the incident radiation. The photocathode work function may be greater than that of the anode. The magnitude of the photocathode work function may be greater than the sum of the magnitudes of the opposing voltage energy of the space charge and the work function of the collector or anode. Representative energy magnitudes are 0.8 eV and 1 eV, respectively. In an embodiment, the radiation from the SF-CIHT cell comprises short wavelength radiation such as extreme ultraviolet (EUV) and ultraviolet (UV). The cell gas such as helium or the operating pressure such as about vacuum may favor the emission of short wavelength light. In an embodiment, the photocathode is responsive to ultraviolet radiation from the SF-CIHT cell. Since radiation of higher energy than the work function may be lost to kinetic energy and potentially heat, the work function of the photocathode may be matched to be close to the energy of the light such as ultraviolet radiation. For example, the photocathode work function may be greater than 1.8 eV for radiation of shorter wavelength than 690 nm, and the photocathode work function may be greater than 3.5 eV for radiation of shorter wavelength than 350 nm. The photocathode work function may be within at least one range of about 0.1 V to 100 V, 0.5 V to 10 V, 1 V to 6 V, and 1.85 eV to 6 V. The photocathode may be at least one of GaN having a bandgap of about 3.5 eV that is responsive to light in the wavelength region 150-400 nm and its alloys such as $Al_xGa_{1-x}N$, $In_xGa_{1-x}N$, alkali halide such as KI, KBr, and CsI having a bandgap of about 5.4 eV that is responsive to light in the wavelength region less than 200 nm, multi-alkali such as S20 Hamamatsu comprising Na—K—Sb—Cs that is responsive to light in the wavelength region greater than 150 nm, GaAs that is responsive to light in the wavelength region greater than 300 nm, CsTe that is responsive to light in the wavelength region 150-300 nm, diamond having a bandgap of about 5.47 eV that is responsive to light in the wavelength region less than 200 nm, Sb—Cs that is responsive to light in the wavelength region greater than 150 nm, Au that is responsive to light with a peak wavelength 185 nm, Ag—O—Cs that is responsive to light in the wavelength region 300-1200 nm, bi-alkali such as Sb—Rb—Cs, Sb—K—Cs, or Na—K—Sb, and InGaAs. An exemplary opaque photocathode may comprise at least one of GaN, CsI, and SbCs. An exemplary semitransparent photocathode may comprise CsTe. Type III-V material UV photocathodes have suitable large bandgaps such as 3.5 eV for GaN and 6.2 eV for AlN. The energy or wavelength responsive region may be fine tuned by means such as by changing the material composition of the photocathode such as by changing the ratio of GaN to AlN in $Al_xGa_{1-x}N$. Thin films of p-doped material can be activated into negative electron affinity by proper surface treatments with cesium or Mg and oxygen, for example. Additional exemplary photocathodes comprise MgO thin-film on Ag, $MgF_2$, MgO, and $CuI_2$. Exemplary metal photocathodes comprise Cu, Mg, Pb, Y, and Nb. Exemplary coated metal photocathodes comprise Cu—CsBr, Cu—$MgF_2$, Cu—Cs, and Cu—CsI. Exemplary metal alloy photocathodes comprise CsAu and alloys of pure metals such as Al, Mg, and Cu, with small amounts of Li, Ba, and BaO, respectively. Exemplary semiconductor photocathodes comprise CsTe, RbTe, alkali antimonides, $Cs_3Sb$, $K_2CsSb$, $Na_2KSb$, $NaK_2Sb$, $CsK_2Sb$, $Cs_2Te$, superalkalies, positive election affinity (PEA) type; Cs:GaAs, Cs:GaN, Cs:InGaN, Cs:GaAsP, graded doping, tertiary structures, negative electron affinity (NEA) type. Semiconductor photocathodes may be maintained in high vacuum such as less than about $10^{-7}$ Pa. The size of the PE cell may that desired and capable of being fabricated. For example, PE cells of sub-millimeter dimensions to a as large as 20 cm by 20 cm have been fabricated that are hermetically sealed comprising a photocathode, an anode, and a window as a component of the sealing structure. In an embodiment, the photoelectric cell may comprise a cathode comprising a metal contact with a work function about matched to the photocathode such as Pt, a photocathode comprising at least one of GaN, AlN, and $Al_xGa_{1-x}N$, a spacer such as vacuum or one comprised of posts such as posts of an etched AlN layer, and an anode such as a metal thin film or grid. The anode metal may have a work function that may be about matched to the contact material. In another embodiment, the photoelectric cell may comprise a cathode comprising a metal contact with a work function about matched to the photocathode such as Pt, a photocathode comprising at least one of p-doped GaN, AlN, and $Al_xGa_{1-x}N$ such as one comprising about 50% AlN, an n⁺GaN layer such as Si δ-doped GaN, and an anode such as a metal thin film or grid wherein the work function may about match that of the contact layer. The photoelectric cell may comprise a cathode comprising a metal contact with a work function about matched to the photocathode such as Pt, a photocathode comprising p-GaN, an n⁺GaN layer such as Si δ-doped GaN, and an anode such as a metal thin film or grid wherein the work function may about match that of the contact layer. The photoelectric cell may comprise a cathode comprising a metal contact with a work function about matched to the photocathode such as Pt, a photocathode comprising p-$Al_xGa_{1-x}N$ such as about 50% AlN, an n$^+$GaN layer such as Si $\delta$-doped GaN, and an anode such as a metal thin film or grid wherein the work function may about match that of the contact layer. The photoelectric cell may comprise a cathode comprising a metal contact with a work function about matched to the photocathode such as Pt, a photocathode comprising p-$Al_xGa_{1-x}N$ such as about 50% AlN, an n$^+$InGaN layer, and an anode such as a metal thin film or grid wherein the work function may about match that of the contact layer. The n$^+$GaN layer such as Si $\delta$-doped GaN may be formed substantially precisely. The layer may comprise a monolayer. Molecular beam epitaxy may be used to form the monolayer. Molecular beam epitaxy (MBE) or metal-organic chemical vapor deposition (MOCVD) may be used to form the n$^+$doped InGaN layer.

At least one of the cathode and anode contacts may comprise a grid or a thin film. The film may be transparent to at least one of ultraviolet (UV) and extreme ultraviolet (EUV) radiation. The film may have a thickness in at least one range of about 1 Å to 1 um, 1 Å to 100 Å, and 1 Å to 50 Å. In an embodiment, the photoelectric cell may comprise a solid-state device such as one having a solid spacer through which the photoelectrons may tunnel. The solid spacer may have a thickness in at least one range of about 1 Å to 10 um, 1 Å to 1 um, 1 Å to 100 Å, and 1 Å to 50 Å. An exemplary cell comprises a cathode comprising at least one of GaN, AlN, $Al_xGa_{1-x}N$, and SiC, a solid spacer such as one comprised of a thin AlN, sapphire, $MgF_2$, or UV window layer, and a metal grid anode. Exemplary metal grid anodes that are transparent to UV and EUV light are thin films of at least one of Yb, Eu, and Al. The anode may be selected to be transparent to cell radiation such as UV and EUV radiation and have a low work function such as at least one of Yb, Eu, and cessiated Al thin films. Other PV and PE cell contacts comprise at least one of Au, Ni, NiAu alloy, and Pt. In other embodiments, the metal contact to the photocathode may be on the front or top rather than the bottom or backside of the layer. An exemplary cell comprises metal/spacer or insulator/metal/photocathode wherein the metal may be a thin film of the disclosure and the spacer or insulator and photocathode are ones of the disclosure.

In an embodiment, the effectiveness of a photocathode is expressed as quantum efficiency defined as the ratio of the emitted electrons and the impinging photons or quanta of light. In an embodiment, the quantum efficiency is optimized by at least one of providing a strong electric field and optimizing the geometry, temperature, and material composition by means such as adding additives such as alkali metals. In an embodiment, the photocathode is selected to optimize the photon absorption parameters, electron transport properties, and surface energy states to achieve maximum photoelectron efficiency. In the latter case, the surface may be treated or activated to negative electron affinity such that conduction electrons reaching the surface have a higher energy than vacuum electrons and consequently optimally form photoelectrons. The surface of diamond, for example, can be treated or activated to negative electron affinity by cesiation, hydrogenation, coating with monolayers of LiF and RbF, and phosphorous doping using $PH_3$ chemical vapor deposition. The surface of GaN photocathodes may be activated with Cs and oxygen. Other exemplary dopants comprise silicon and germanium. In a semitransparent mode embodiment, the film thickness on the back on the window is selected to optimize the quantum efficiency wherein a wavelength dependent manner, the absorption of incident photons increases with film thickness while the probability of electron transport to the surface deceases. In an exemplary semitransparent embodiment, the photocathode film thickness may be in at least one range of about 0.1 nm to 100 um, 1 nm to 10 um, 10 nm to 5 um, and 100 nm to 1 um. In general, the electrode, cathode or anode, thickness such as the electrode film thickness may be in at least one range of about 0.1 nm to 100 um, 1 nm to 10 um, 10 nm to 5 um, and 100 nm to 1 um.

In an embodiment, the photocathode comprises multiple layers to convert a wider range of photon wavelengths. The multi-layer photocathode may comprise thin layers that are transparent for photons for successive layers along the propagation path. In an exemplary embodiment, the top layer may be selective to the least penetrating light, and the successive layers are arranged to be selective based on the rate of attenuation or the penetration depth in the layered structure. In an exemplary three layer photocathode, the top layer may be selective for the least penetrating wavelengths and have the corresponding highest work function, the middle layer may be selective for the intermediate penetrating wavelengths and have the corresponding intermediate work function, and the bottom or farthest layer along the light propagation path may be selective for the most penetrating wavelengths and have the corresponding lowest work function. Other combinations of penetration depth, relative layer position, and work function are within the scope of the disclosure.

The anode comprises a material capable of collecting electrons. The anode work function may be as low as possible to increase the cell voltage according to Eq. (34). The anode work function may be lower than at least one of about 2 V, 1.5 V, 1 V, 0.9 V, 0.8 V, 0.7 V, 0.6 V, 0.5 V, 0.4 V, and 0.3 V. The anode may comprise at least one of an alkali metal such as cesium, calcium aluminate electride (C12A7:e) having a work function of about 0.76 eV, phosphorus doped diamond nanofilm having a work function of about 0.9 eV, and scandium-doped tungsten.

At least one electrode of the cathode and anode may have at least a portion of its surface structured or non-planar such that a portion of the incident light may reflect to at least one of another photocathode, a portion of the photocathode, and an optical element such as a mirror that is reflective of the light and reflects it onto another portion of the photocathode or at least one other photocathode. In this manner, the photocathodes received multiple bounces (reflections) of the incident light to increase the absorption cross section of the photocathode for producing photoelectrons. In an embodiment, the photocathode comprises a structured substrate to increase the efficiency wherein the photon absorption path in the photocathode is increased while the electron escape path remains the same or less than as for a planar substrate. An exemplary structured surface has zigzags with alternate interior angles of 45°. In another embodiment, the zigzag angles can alternate between 45° and 90°. Other angles are within the scope of the disclosure.

In an embodiment, increased photon absorption within the material while decreasing the distance the photoelectrons have to travel to the surface can be achieved by at least one of changing the angle of incoming radiation and using multiple total internal reflections within the photocathode. Using the latter method, regarding reflection of photoelectrons from the back surface of the photocathode, facilitates the attainment of greater than 50% conversion efficiency for some materials when each photon produces at most a single photoelectron. For example, some GaN photocathodes are grown on a thin buffer layer of AlN, which has large bandgap energy and serves as a reflection layer. The efficiency of the photo-conversion as a function of incoming radiation angle increases with angle relative to normal incidence until reaching the point of total reflection. Moreover, if the photocathode that is operated in a semitransparent mode can be grown on a transparent substrate such that it has a zigzag photo-active layer, the conduction electrons are produced closer to the escape surface than in the case of a flat substrate, and therefore should have higher probability to escape into vacuum. Alternatively, the photocathode is grown on a planar surface to avoid substantial degradation from lattice mismatch. For example, GaN is typically grown on a matching crystal lattice of sapphire or silicon carbide substrates with C-plane at the surface. In another embodiment, similar reflective systems and methods may be applied to the anode. In a semitransparent mode cell, the anode may comprise a double reflection type where the metal base is mirror-like, causing light that passed through the photocathode without causing emission to be bounced back to the photocathode for a second illumination.

The window for the passage of light into the cell may be transparent to the light such as short wavelength light such as ultraviolet light. Exemplary ultraviolet light has energy greater than about 1.8 eV corresponding to a wavelength of about less than 690 nm. The window may comprise at least one of sapphire, LiF, $MgF_2$, and $CaF_2$, other alkaline earth halides such as fluorides such as $BaF_2$, $CdF_2$, quartz, fused quartz, UV glass, borosilicate, and Infrasil (ThorLabs).

In an embodiment, at least one of the photoelectric (PE) and photovoltaic (PV) converter may be mounted behind the baffle 8d (FIG. 2I10) of the recirculation system of the disclosure. In an embodiment, PE or PV converter replaces the baffle 8d. The windows of the PE or PV converter may serve the functions of the baffle as a means to impede the upward trajectory of the ignition product flow and provide transparency for the light into the light to electricity converter, the PE or PV converter in this embodiment. In an embodiment, at least on of the baffle 8d and the window may be very thin such as about 1 Å to 100 Å thick such that it is transparent to the UV and EUV emission from the cell. Exemplary thin transparent thin films are Al, Yb, and Eu thin films.

In an embodiment, the expanding plasma is comprised of positively charged particles and electrons. In an embodiment, the electrons have a higher mobility than the positive ions. A space charge effect may develop. In an embodiment, the space charge is eliminated by grounding at least one conductive component of the cell such as the cell wall. In another embodiment, both electrodes are electrically connected to the cell wherein essentially all of the current from the source of electrical power 2 (FIG. 2I2) to the roller electrodes flows through the fuel to cause ignition due to the much lower electrical resistance of the fuel such as that of a fuel shot or pellet. The elimination of the space charge and it corresponding voltage may increase the hydrino reaction rate. In an embodiment, the cell is run under vacuum. The vacuum condition may facilitate the elimination of at least one of space charge and confinement that may decrease the hydrino reaction rate. The vacuum condition may also prevent the attenuation of UV light that may be desired for PE conversion to electricity.

In the case that the cell is operated under evacuated conditions such as vacuum, SF-CIHT cell generator may comprise a vacuum pump to maintain the evacuation at a desired pressure controlled by a pressure gauge and controller. The product gases such as oxygen may be removed by at least one of pumping and a getter such as an oxygen getter that may be at least one of continuously and periodically regenerated. The latter may be achieved by removing the getter and regenerating it by applying hydrogen to reduce the getter to form a product such as water.

The cell may be operated under evacuated conditions. The cell may comprise a vacuum chamber such as a cylindrical chamber or conical cylindrical chamber that may have domed end caps. In an embodiment, the recovery of the upward expanding ignition plasma is achieved by gravity which works against the upward velocity to slow, stop, and then accelerate the ignition product downwards to be collected ultimately in the regeneration system to be reformed into fuel. The collection may be by means of the disclosure. The height of the cell can be calculated by equating the initial kinetic energy to the gravitation potential energy:

$$1/2mv^2=mgh \tag{36}$$

where m is the particle mass, v is the initial particle velocity, g is the gravitational acceleration (9.8 m/s²), and h is the maximum particle trajectory height due to gravitational deceleration. For a particle initially traveling at 5 m/s, the maximum height is 1.2 m such that the cell may be higher than 1.2 m. In an embodiment, the upward speed may be slowed by the baffle of the disclosure to reduce the cell height requirement.

In another embodiment, the fuel recirculation is achieved by using the Lorentz force, exploiting the principles of the railgun such as a plasma armature type that may further comprise an augmented railgun type. The Lorentz force causes the ignition plasma to be directed and flow into a collection region such as a plate or a collection bin that may feed the product material into the regeneration system. The current and the magnetic field may be in the horizontal or xy-plane such that the Lorentz force according to Eq. (37) is directed downward along the negative z-axis to the collection system components such as a plate or bin. In another embodiment, the current may be in the xy-plane and the B-field directed along the z-axis such that the Lorentz force according to Eq. (37) is directed transversely in the xy-plane to the collection system components. The ignition plasma may carry current from the source of electrical power 2 (FIG. 2I2) to the electrodes 8 or from an external power source to serve as the current in Eq. (37). Using at least a portion of the ignition current, at least one of the electrodes and bus bar and the corresponding circuits may be designed to provide at least one of the plasma current and magnetic field during ignition to produce the desired Lorentz force to move the plasma in a desired manner such as out of the zone wherein the plasma is formed during ignition. The ignition current that powers at least one of plasma current and magnetic flux to provide the Lorentz force may be delayed by a delay circuit element such as a delay line to provide the current and magnetic flux at a later time than the ignition event. The delay may permit the plasma to emit light before it is removed by the Lorentz force. The delay may be controlled by circuit or control means known in the art. The current such as high DC current may also be applied by a power source in a desired direction by parallel plate electrodes with the current direction along the inter-plate axis. The current source power may be derived from the power converter such as the PE or PV converter wherein power may be stored in a capacitor bank. The magnetic field of Eq. (37) may be provided by at least one of the current flowing through the electrodes during ignition and augmented magnetic fields (augmented railgun design referred to herein as an augmented plasma railgun recovery system). The sources of the augmented magnetic fields may comprise at least one of electromagnets and permanent magnets. The magnetic field of the augmented plasma railgun may be applied by Helmholtz coils such as a pair of separated, axial-aligned coils with the field in the desired direction along the inter-coil axis. The strength of the magnetic field may be controlled by a current controller to control the strength of the Lorentz force and consequently, the rate of recovery of the ignition products. A plurality of electromagnets may have different controlled magnetic fields to direct the plasma and the ignition products to a desired location for collection. In an embodiment, at least one of the augmented electric and magnetic field may be produced inductively by at least one induction coil and an alternating voltage or current driver. In another embodiment, the magnetic field may be provided by a pair of separated, axial-aligned permanent magnets with the field in the desired direction along the inter-pole-face axis. The permanent magnets may comprise AlNiCo, neodymium, rare earths, or other high field magnet known in the art. The magnetic flux may be any desired such as in at least one range of about 0.001 T to 10 T, 0.01 T to 1 T and 0.1 T to 0.5 T. The electromagnets may be powered by a power supply wherein the electromagnetic power may be derived from the power converter such the PE or PV converter wherein power may be stored in a capacitor bank. The magnetic field from at least one of the source of electrical power 2 (FIG. 2I2) to the electrodes and the sources of the augmented magnetic fields is configured to cause the desired flow of the ignition product plasma into the collection system according to the Lorentz force. The collection system may comprise that of the disclosure such as at least one of a collection plate and a bin that may feed into the regeneration system. The bin may comprise a vessel of the regeneration system. In another embodiment, the augmented plasma railgun (electromagnetic pump) may be used to at least one of focus the plasma and to pump the plasma to a desired location in the cell to cause the plasma emitted light to be directed to the photovoltaic converter. The augmented plasma railgun (electromagnetic pump) may achieve the effect of focusing or collimating the plasma light onto the power converter by at least one of spatially and temporally directing the plasma. In other embodiments, the plasma may be confined magnetically using a magnetic bottle and other means of plasma confinement that are well known in the art.

In the case that the pressure of the cell is low such as vacuum, the recirculation of the ignition product may be achieved using other means of the disclosure such as electrostatic precipitation (ESP). The ESP collection electrodes may be out of sight of the ray paths of the light created by the hydrino reaction. The ESP may be operated in the ignition plasma region. The plasma operation may be supported by the low cell gas pressure such as vacuum. The ESP may operate with the ignition plasma in a region that does not substantially contact at least one type of the ESP electrodes such as the collection electrodes, being the cathode or anode. The ESP collection electrodes may be circumferential to the ignition plasma with at least one of a vacuum and a low-pressure region having a high resistance in the electrical path from the counter to the collection electrodes. At least one of the ESP electrodes of a pair may comprise a barrier electrode. The barrier electrode may limit the current and maintain a high field to collect the ignition product electrostatically. One electrode type may be covered with a highly resistive layer to be permissive of DC operation called resistive barrier discharge. The electrode barrier may comprise a semiconductor such as a layer of gallium arsenide to replace a dielectric barrier layer to enable the use of high voltage DC. The voltage may be in the range of 580 V to 740 V, for example. The high voltage may be pulsed. The ignition product may be transported from the collection electrodes to the regeneration system. The transport may be at least one of gravity-assisted transport and achieved by other methods of the disclosure such as electrostatic and electromagnetic methods.

In an embodiment, the regeneration system to regenerate the initial reactants from the reaction products and form shot comprises a pelletizer comprising a smelter to form molten reactants, a system to add $H_2$ and $H_2O$ to the molten reactants, a melt dripper, and a coolant to form shot. The pelletizer may comprise first and second vessels that may comprise heaters or furnaces to serve as melters of the ignition product that may comprise a metal such as a pure metal or alloy such as Ag, Cu, or Ag—Cu alloy. The heater to form the melt may comprise one of the disclosure such as a resistive, arc, or inductively coupled heater. The light output from the SF-CIHT cell may be used to heat the fuel sample to form the pellet. Heat from a heat exchanger may deliver heat to the melt from another component of the SF-CIHT cell. The heater may comprise a resistive heater with heating elements capable of high temperature such as ones comprising at least one of Nichrome, tungsten, tantalum, molybdenum, SiC, $MoSi_2$, precious metals, and refractory metals. The elements may be hermetically sealed. The heater may comprise a non-filament type such as an electric arc heater. In an embodiment, the ignition product is collected by a means such as gravity and an augmented plasma railgun recovery system. The collected product may be flowed into the first vessel, crucible, or hopper that further comprises a heater. The product may be melted by the heater, and the melt may flow into the second vessel through a connecting passage. The passage outlet into the second vessel may be submerged below the surface of the melt such as the molten ignition product in the second vessel. The first vessel may discharge the melt under the surface of the second. The melt level in either vessel may be sensed by electrical resistance probes such as a refractor wire such as a W or Mo wire that is electrically isolated from the vessel wall to sense an open circuit in the absence of contact with the melt and a low resistance when in contact with the melt. The flow from the first to the second may be controlled by the pressure differential between the first and second based on the level of melt in the first and second vessel and any gas pressures in the first and second vessels. The melt levels may be changed to control the flow between the vessels. In an embodiment, the column height of molten ignition product in at least one of the passage and the first vessel is such that the corresponding pressure given by the product of the melt density, gravitational acceleration, and the column height plus the gas pressure in the first vessel is greater than or equal to the pressure in the second vessel. The gas pressure in the first vessel may comprise that of the SF-CIHT cell. In an embodiment, the pressure in at least one of the first and second vessel is controlled with at least one pressure sensor, at least one valve, at least on gas pressure controller, at least one pump, and a computer. The flow through the passage may also or further be controlled by a valve, petcock, or sluice valve.

The second vessel or crucible further comprises at least one nozzle or dipper to form shot. The melt may flow out an orifice or nozzle of the second vessel to a water reservoir to form shot, and the resulting level and pressure change may cause melt to flow from the first vessel to the second. In an embodiment, the orifice or nozzle opening size may be controlled to control at least one of the shot size and metal flow rate. Exemplary orifices of adjustable size may comprise a solenoid valve, a shutter valve, or a sluice valve. The high temperature nozzle valve may comprise a refractory lined butterfly valve. The opening size may be controlled with a solenoid or other mechanical, electronic, or electromechanical actuator. In another embodiment, the orifice may have a fixed size such as 1 mm diameter for an alloy such as Ag—Cu (72 wt %/28 wt %). The orifice may have a diameter in the range of about 0.01 mm to 10 mm. The size of the shot may be controlled by controllably adjusting at least one of the orifice size, the fuel melt temperature, the diameter of the connecting passage between vessels, the pressure in the first vessel, the pressure in the second vessel, the pressure difference between the first and second vessel, the fuel composition such as the composition of at least one of the conductive matrix such as the weight percentages of pure metal components of a metal alloy such as a Ag—Cu alloy, and at least one of the percentage composition of a water binding compound, the water content, and the hydrogen content.

In an embodiment, the ignition product is melted in a first region or vessel having intense heating such as that provided by an electrical arc such as at least one of an arc having the ignition product directly carrying at least some of the arc current and an arc on in proximity to the first vessel such as a refractory metal tube through which the ignition product powder flows. The melt may flow into another region or vessel having a temperature above the ignition product melting point that may be maintained by a second vessel heater such as a resistive heater such as one comprising at least one of Nichrome, SiC, and MoSi.

Alternatively, the heater to heat the ignition products such as the first vessel heater may comprise an inductive heating element such as an electromagnetic heater such as an alternating frequency (AC) inductively coupled heater. The second vessel heater may comprise and inductively coupled heater. The frequency may be in at least one range of about 1 Hz to 10 GHz, 10 Hz to 100 MHz, 10 Hz to 20 MHz, 100 Hz to 20 MHz, 100 kHz to 1 MHz, 500 Hz to 500 kHz, 1 kHz to 500 kHz, and 1 kHz to 400 kHz. The vessel may comprise a heat resistant AC or RF-transparent material such as a ceramic such as silicon nitride such as $Si_3N_4$, $Al_2O_3$, alumina, sapphire, or zirconia, zirconium oxide. The heater may comprise high insulation between the vessel and the inductively coupled coil that may be cooled by means such as water-cooling. In another embodiment, the second vessel may be at least one of partially and solely heated by the melt that is formed and elevated in temperature in the first vessel. The first vessel heater such as an inductively coupled heater may heat the melt to a higher temperature than that desired in the second vessel to provide heat to the second vessel. The temperature and flow rate of the metal flowing from the first vessel to the second vessel may be controlled to achieve the desired temperature in the second vessel. In an embodiment, the heater of at least one of the first and second vessels comprises at least one of an inductively coupled heater, a heat exchanger to transfer thermal power sourced from the reaction of the reactants, and at least one optical element to transfer optical power sourced from the reaction of the reactants.

In an embodiment, the heater may comprise a microwave heater such as one that operates at about 2.4 GHz. In other embodiments, the microwave frequency may be the range of about 300 MHz to 300 GHz. The microwave heater may comprise at least one microwave generator such as at least one magnetron. The microwave heater may comprise a cavity that surrounds the vessels such as 5b and 5c containing the solid fuel such as the solid fuel comprising molten silver. The cavity may be pumped with microwaves by an antenna output of the microwave generator. The vessel walls may comprise a material such as a metal that absorbs microwaves and heats the solid fuel indirectly. In another embodiment, the vessel walls may comprise a material such as quartz, alumina, sapphire, zirconia, or silica that may be transparent to microwaves such that the microwaves directly heat the solid fuel to melt it. An exemplary solid fuel comprises silver that is injected with at least one of $H_2O$ and $H_2$. In an embodiment, an inert microwave absorbing material is added to the solid fuel to absorb microwaves. The microwave absorber may be at least one of $H_2O$ and $H_2$.

The pelletizer may also comprise one or more electromagnetic pumps to control the flow of at least one of the powder and melt through the pelletizer. In an embodiment, the pelletizer further comprises a heat recuperator to recovery or reclaim at least some heat from the cooling shot and transfer it to incoming ignition product to preheat it as it enters the smelter or first vessel comprising a heater. The melt may drip from the dripper into the water reservoir and form hot shot that is recovered while hot. The heat from the cooling shot may be at least partially recovered or reclaimed by the recuperator. The recovered or reclaimed heat may be used to at least one of preheat the recovered ignition product powder, melt the powder, heat the melt, and maintain the temperature of at least a portion of the pelletizer. The pelletizer may further comprise a heat pump to increase the temperature of the recovered heat.

The second vessel may be capable of maintaining a gas at a pressure less than, equal to, or greater than atmospheric. The second vessel may be sealed. The second vessel may be capable of maintaining a desired controlled atmosphere under gas flow conditions. A gas such as at least one of a source of H, $H_2$, a source of catalyst, a source of $H_2O$, and $H_2O$ may be supplied to the second vessel under static or flow conditions. In an embodiment, the gas such as hydrogen and water vapor and mixtures may be recirculated. The recirculation system may comprise one or more of the group of at least one valve, one pump, one flow and pressure regulator, and one gas line. In an embodiment, a plurality of gases such as $H_2$ and $H_2O$ may be at least one of flowed into or out of the vessel using a common line or separate lines. To permit the gases to bubble through the melt, inlet gas ports may be submerged in the melt, and the gas outlet may be above the melt. Both $H_2$ and $H_2O$ may be supplied by flowing at least one of $H_2$, $H_2O$, and a mixture of $H_2$ and $H_2O$. A carrier gas may flow through a $H_2O$ bubbler to entrain $H_2O$ in a gas stream such as one comprising a $H_2$ gas stream, and then mixture may flow into the melt. Hydrogen may comprise the carrier gas bubbled through $H_2O$ to also serve as a reactant in the hydrino reaction. In another embodiment, the carrier gas may comprise an inert gas such as a noble gas such as argon. The gas-treated melt may be dripped into $H_2O$ to form the shot with incorporation of the gases such as at least one of $H_2O$ and $H_2$. The added or flowing gas may comprise $H_2$ alone and $H_2O$ alone. The melt may comprise an oxide to further increase the shot content of at least one of a source of H, a source of catalyst, $H_2$, and $H_2O$. The oxide may be formed by the addition of a source of $O_2$ or $O_2$ gas that may be flowed into the melt. The oxide may comprise those of the disclosure such as a transition metal oxide. The oxide such as CuO may be reducible with $H_2$ (CuO+$H_2$ to Cu+$H_2O$), or it may comprise an oxide that is resistant to $H_2$ reduction such as an alkaline, alkaline earth, or rare earth oxide. The oxide may be capable of being reversibly hydrated. The hydration/dehydration may be achieved by $H_2O$ addition and heating or ignition, respectively. In an embodiment, a fluxing agent such as borax may be added to the melt to enhance the incorporation of at least one of $H_2$ and $H_2O$ into the shot.

The cell may be operated under evacuated conditions. The cell may comprise a vacuum chamber such as a cylindrical chamber or conical cylindrical chamber that may have domed end caps. The conical cylindrical chamber may be beneficial for optimizing the propagation of the light from the cone emitted from the electrodes at a minimum cell volume. In another embodiment, the cell has sufficient diameter such that the ignition plasma light does not contact the walls substantially before exiting to at least one of a window of the PV or PE converter and being directly incident on the PV or PE converter. The ignition product may collect on the cell walls and be dislodged mechanically such as by vibration. The ignition electrodes 8 may be at least partially rigidly connected to the walls to transfer vibrations from the ignition of shot fuel to the walls to dislodge ignition products from the walls. The connection may electrically isolate the electrodes from the cell wall. The ignition product may be collected in a vessel such as the first chamber of the pelletizer by gravity or by other means of the disclosure such as electromagnetically or electrostatically. The cell may be operated at a low pressure such as vacuum.

In an embodiment, the ignition product may be removed by at least one of (i) gravity wherein the cell may be operated under reduced pressure such as a vacuum in the range of 0 to 100 Torr, (ii) an augmented railgun with the ignition plasma as the armature referred to herein as an augmented plasma railgun recovery system, and (iii) an electrostatic precipitator. In an embodiment, the larger particles may be charged by a means such as corona discharge and repelled from the light to electricity converter by an electric field such as an electrostatic field that may be applied to a repelling grid by a power supply. In an embodiment, the augmented plasma railgun recovery system removes or recovers essentially all of the fine particles such that the cell is transparent to the light produced by the ignition. Gravity may remove or recover the remainder. In an embodiment, the cell height is sufficient such that particles not removed or recovered by the augmented plasma railgun recovery system or stopped in an upward trajectory by gravity are cooled to a temperature that causes the particles to be non-adherent to either of the window of the converter or the converter such as the PV or PE converter. The SF-CIHT generator may comprise a means to remove ignition product from the surface of the window or the converter such as an ion-sputtering beam that may be swept or rastered over the surface. Alternatively, the cleaning means to remove ignition product from the surface of the window or the converter may comprise a mechanical scraper such as a knife such as a razor blade that is periodically moved across the surface. The motion may be a sweep for a blade of the width of the window or a raster motion in the case of a smaller blade. The baffle of the disclosure may further comprise the mechanical scraper such as a knife or the ion beam cleaner to remove ignition product from the baffle in the same manner. In the case of a cylindrically symmetrical cell such as a cylindrical conical cell, the symmetrical wiper may travels around the inside of the cell such as on the conical surface. The surface clearing system may comprise a cell wiper and wiper on PV converter. The wiper or blade may be moved by an electric motor controlled by a controller. The scraper may comprise carbon that is not wetted by silver and also is non-abrasive.

The carbon wiper may maintain a thin coating of graphite on the window to prevent melt adhesion such as silver or copper adhesion.

In an embodiment, the injector is at least one of electrostatic, electric, electrodynamic, magnetic, magnetodynamic, and electromagnetic. The trajectory of the path is in the inter-electrode region such as in the center point of closest contact of the opposed roller electrodes. The aimed transport may comprise an injection of the fuel shot or pellet. The injection may result in the completion of the electrical contact between the rollers that may result in high current flow to cause the shot or pellet to be ignited. In an embodiment, the injector comprises and electrostatic injector such as one of the disclosure. The shot or pellet may be electrostatically charged, the roller electrodes may be oppositely charged, and the shot or pellet may be propelled by the electric field to be injected into the inter-electrode region to be ignited. In an embodiment, the high conductivity of the fuel shot or pellet is permissive of the induction of a surface current due to a time dependent application of at least one of a magnetic field and an electric field wherein the induced current gives rise to a magnetic field produced by the shot or pellet. The correspondingly magnetized shot or pellet may be accelerated along a path such as that provided by guiding magnetic fields such as those provided by current carrying rails. A gradient of magnetic field may be caused over time to accelerate the shot or pellet along the path.

In another embodiment, the shot or pellet injector comprises a railgun. In an embodiment, the railgun comprises a high current source, at least one pair of rails comprising a high conductor, and an armature that comprises the shot or pellet that also serves as the projectile. The railgun injector may comprise a sabot that may be reusable. Alternatively, the railgun may use a plasma armature that may comprise metal that may be at least one of ignition product and fuel that vaporizes and becomes plasma behind the shot or pellet as it carries the high current and causes the shot or pellet to be accelerated along the rails of the railgun injector. The source of current may provide a pulse of current in at least one range of about 1 A to 100 MA, 10 A to 10 MA, 100 A to 1 MA, 1000 A to 100 KA, and 1 kA to 10 kA. The source of current may comprise the source of electrical power 2 (FIG. 2I2) to the roller electrodes that causes ignition such as one comprising a bank of capacitors charged by the light to electricity converter such as the PV or PE converter. The rails may comprise a positive rail and a negative rail comprising a high conductor such as at least one of copper and silver. The railgun injector may be activated at a desired frequency such as 1000 Hz to provide sufficient fuel to maintain the desired fuel ignition rate wherein the conductive arriving shot or pellet may complete the electrical circuit between the roller electrodes to cause the shot or pellet ignition. In an embodiment, the injection activation frequency may be controlled to be within at least one range of about 0.01 Hz to 1 MHz, 1 Hz to 10 kHz, and 10 Hz to 1 kHz. The injection activation frequency may be controlled to control the power output of the SF-CIHT cell. The injection activation control may comprise a switch. The switch may comprise one of the switches of the disclosure for the source of electrical power 2 (FIG. 2I2) to the roller electrodes such as mechanical or electronic switch such as one comprising at least of a IGBT, SCR, and a MOSFET transistor. In another embodiment, the rails are continuously energized as an open circuit that is closed to allow high current to flow with the completion of the circuit by a fuel shot or pellet. In an embodiment, each time that a shot or pellet contacts the rails to complete the circuit, it is accelerated and injected into the electrodes to be ignited. The power source may be capable of maintaining the desired current to each shot or pellet of a plurality of shots or pellets accelerated along the rails at any given time. The current may be controlled by at least one of circuit elements and a controller. In another embodiment, the railgun current is divided amongst an integer n number of shots or pellets that are accelerating on the rails at a given instance such that the decrease in speed of injection of a single shot or pellets according to Eq. (37) is compensated by the simultaneous acceleration and sequential injection of the n shots or pellets. This compensation mechanism may maintain about a constant injection rate dependent on the railgun current. In another embodiment, the voltage across the rails is maintained about constant independent of the number of shots or pellets such that the current per shot or pellet is about the same due to the similar resistances of the shots or pellets. The about constant voltage may be supplied by a power source comprising a large capacitance such as one comprising a bank of capacitors. In an embodiment, the rails may provide a continuous guide path, but comprise segmented sections for electrical current such that the current may be variable and controlled as the shot propagates along the different sections. The current in each section may be controlled by a computer, sensors, and a plurality of current sources to control the speed and energy of the shot in any given section to control the timing of injection or injections wherein multiple shots may be on the rails comprising the variable current sections.

The constant voltage may be kept below a voltage that causes arcing and consequent shot-to-rail welding or rail arc damage. In an embodiment, the voltage may be at least one of less than about 100 V, less than about 50 V, less than about 20 V, less than about 10 V, less than about 5 V, less than about 1 V, less than about 0.5 V, and less than about 0.25 V. The power may be supplied by at least one of a capacitor bank such a one comprising super-capacitors, the PV converter, and a battery with a high shorting current. In an embodiment, the rails may be heat sunk to avoid shot-to-rail welding. The heat sink may be electrically isolated from the circuit comprising the rails and shot. An electrical insulator that may also be a good heat conductor may provide the electrical isolation. An exemplary heat sink comprises a high mass of a high heat conductive material such as a block of Al, Cu, or Ag that may be electrically insulated with a top layer of diamond film that is also a good thermal conductor as well being an electrical insulator. In another embodiment, the rails may comprise a conductor such as graphite that is resistant to welding. In another embodiment, the rails may comprise a refractory metal conductor such as tungsten or molybdenum that is resistant to welding. The rails may be cooled by means such as air or water cooling to prevent welding. In an embodiment, the rails are at least partially submerged in water that cools the rails and shot and prevents welding. The water may also prevent electrical arcing between the shot and rails. A conducting lubricant and electrical contact agent that may have a higher breakdown voltage than the cell gas such as graphite or $MoS_2$ may be coated on the rails to decrease arcing. The current may be less than that which causes shot-to-rail welding. In an embodiment, the rails may be long cylinders that are rotated about their longitudinal axes (z-axis in cylindrical coordinates) to make better contact with the shot. The relative rail rotation may be counter-rotating towards the center of the pair to push the shot tighter against the rails. The tighter connection may abate welding of the shot to the rails. In an embodiment, one roller driven by a pulley drive, in turn drives the other in counter rotation by a pulley or chain linkage for example. In another embodiment, the rollers run in the same direction with one driving the other with the shot as the linkage. This configuration may apply downward pressure on the shot to make better electrical contact, and the rolling of the shot may further decrease the arc damage.

The Lorentz force may be high with a low magnetic field contribution from the rail current by augmenting the magnetic field with an applied magnetic field by a magnet such as an electromagnet or a permanent magnet. In an exemplary augmented railgun embodiment, the applied magnetic field may be provided by a pair of Helmholtz coils with one above and one below the plane of the rails (xy-plane); each parallel to the xy-plane to provide a magnetic field perpendicular to the xy-plane. A similar z-axis oriented magnetic field may be generated by two permanent magnet such as discs replacing the Helmholtz coils in the xy-plane. In another embodiment, the permanent magnets may comprise rectangular bars that run above and below and parallel to the rails having the field oriented along the z-axis. The permanent magnets may comprise AlNiCo, rare earths, or other high field magnet known in the art. The magnetic flux may be any desired such as in at least one range of about 0.001 T to 10 T, 0.01 T to 1 T and 0.1 T to 0.5 T. In an embodiment, multiple shots may be present on the rails to divide the applied power to prevent arcing and corresponding welding of the shot to the rails or arc damage to the rails. A current surge that causes welding or rail damage may be ameliorated by a damping circuit element such as at least one of a shunt diode, a delay line, and circuit inductor. The railgun injectors may have redundancy such that if one fails another may serve in its place until the failed railgun is repaired. In the case that the failure is due to a pellet welding on the rails, it may be removed mechanically by grinding or lathing for example or electrically such as by vaporization at high current.

The railgun injector may comprise a low-friction, low-pressure spring-loaded top guide to facilitate the electrical contact between the shot and rails. In an embodiment, the shot-to-rail electrical contact is assisted by vibration applied to the injector. Vibration may be applied to cause a low-resistance electrical contact between the rails and the shot. The contact may also be facilitated by an agitator such as the mechanical and water jet agitators shown in FIGS. 2I4 and 2I5. In an embodiment, the applied magnetic field of the augmented railgun injector may comprise a component parallel to the direction of pellet motion and transverse to the current through the shot such that the shot is forced down on the rails according to the Lorentz force given by Eq. (37) to make and maintain good electrical contact between the shot and the rails. The motion-parallel magnetic field may be provided by at least one of permanent magnets and electromagnets. In the latter case, the magnetic field may be varied to control the downward force on the shot to optimize the contact while avoiding excess friction. The control of the magnetic field may be provided by a computer, sensors, and a variable current power supply. In an embodiment, the rails may comprise an oxidation resistant material such as silver rails to limit rail oxidation and corresponding resistance increase.

The railgun injector may comprise a plurality of railgun injectors that may have synchronous injection activation that may be controlled with a controller such as a microprocessor or computer. The plurality of injectors may increase the injection rate. The plurality of railgun injectors may comprise an array of injectors to increase the injection rate. The rails of the railgun may be straight or curved to achieve a desired injection path from the shot or pellet supply to the inter-electrode region where ignition occurs. The rotational velocity of the roller electrodes may be increased to accommodate more fuel and increase the power output of the SF-CIHT cell. The roller diameter may be scaled to achieve the increased rotational speed. The maximum rotational speed for steel for example is approximately 1100 m/s [J. W. Beams, "Ultrahigh-Speed Rotation", pp. 135-147]. Considering the exemplary case wherein the diameter of a shot or pellet plus the separating space of a series of shots or pellets is 3 mm, then the maximum fuel flow rate supplied by the railgun or plurality of railguns is 367,000 per second. With exemplary energy of 500 J per shot or pellet, the corresponding total power to be converted into electricity may be 180 MW. Additional power can be achieved by adding a plurality of roller electrode pairs with injectors wherein the electrodes may be on the same or different shafts.

In another embodiment, the injector comprises a Gauss gun or coilgun wherein the pellet or shot comprises the projectile. The pellet or shot may comprise a ferromagnetic material such as at least one of Ni, Co, or Fe. An exemplary shot comprises Ag with trapped $H_2$ and $H_2O$ and a ferromagnetic material. The coilgun may comprise at least one current coil along a barrel comprising a guide for the pellet or shot, a power supply to provide a high current and a magnetic field in the at least one coil, and a switch to cause the current to flow to pull the shot or pellet towards the center of the coil wherein the current is switched off before the shot or pellet experiences a reverse force by passing the coil center. The switch may be one of the disclosure such as one comprising an IGBT. The power supply may comprise at least one capacitor. In an embodiment, current is flowed through the shot or pellet to create a shot or pellet magnetic field by the application of external power or by an external time dependent field such as a time dependent magnetic field. The shot or pellet current flow may be achieved by magnetic induction. The magnetic induction may be caused by the time-varying magnetic field of the current coils. In an embodiment, the temporal current flow to the at least one current coil is controlled to propel the shot or pellet along the barrel.

In an embodiment, the speed and location of the delivery of a shot or pellet on the roller electrode surface can be controlled to controllably repair any ignition damage to the surface. The control can be achieved by controlling the timing of the shot or pellet accelerating current pulse, as well as the current, position, and steering capability of the railgun injector, for example. The controlled-position delivery with the control of the roller speed and ignition current can facilitate the bonding of the shot or pellet to the electrode. The bonding may be by at least one of sintering, fusing, and welding of the shot or pellet to the electrode surface at the desired position. In an embodiment, a specific percentage of shot or pellets may be made to have less to none of the hydrino reactants such as at least one of hydrogen and HOH. In an embodiment, this can be achieved by forming the shot without the addition of at least one of steam and $H_2$ in the pelletizer. The reduction or elimination of $H_2O$ and $H_2$ may be achieved by eliminating the supply or reducing the solubility in the melt by lowering the melt temperature during shot formation. Alternatively, pellets may be made absent or with diminished amounts of at least one of $H_2$ and $H_2O$. The corresponding "dud" shots or pellets may be applied separately or mixed with ordinary ones at a desired percentage. In an example, one shot or pellet out of integer n is a dud that becomes bonded to the electrodes when injected. The integer n can be controlled to be larger or smaller depending on the amount of damage there is to be repaired. In an embodiment, ignition powder is recovered, forgoes the shot forming process, and is injected into the electrodes by a plasma railgun injector or augmented plasma railgun wherein some of the powder supports the plasma to cause it to be propelled. At least one of the ignition current and ignition plasma supported by ignition of other shots may cause the powder to bond to the electrodes. Excess material may be machined off by means such as by use of a precision grinder or lathe. Alternatively, the excess material may be removed by electrical discharge machining (EDM) wherein the EDM system may comprise the electrodes and power supply.

In an embodiment of the railgun injector, the electric current runs from the positive terminal of the power supply, up the positive rail, across the armature comprising the fuel shot or pellet, and down the negative rail back to the power supply. The current flowing in the rails creates an azimuthal or circular magnetic field about each rail axis. The magnetic field lines run in a counterclockwise circle around the positive rail and in a clockwise circle around the negative rail with the net magnetic field between the rails directed vertically. In other embodiments such as an augmented railgun, current is channeled through additional pairs of parallel conductors, arranged to increase the magnetic field applied to the shot or pellet. Additionally, external magnetic fields may be applied that act on the shot or pellet when current is flowed through it. The shot or pellet projectile experiences a Lorentz force directed perpendicularly to the magnetic field and to the direction of the current flowing across the armature comprising the shot or pellet. The Lorentz force F that is parallel to the rails is given by $$F = Li \times B \tag{37}$$

where i is the current, L is the path length of the current through the shot or pellet between the rails, and B is the magnetic flux. The force may be boosted by increasing either the diameter of the fuel shot or pellet or the amount of current. The kinetic energy of the shot or pellet may be increased by increasing the length of the rails. The projectile, under the influence of the Lorentz force, accelerates to the end of the rails and exits to fly to the inter-electrode region. The exit may be through an aperture. With the exit, the circuit is broken, which ends the flow of current. For an exemplary current of 1 kA, shot diameter of 3 mm, and B flux of 0.01 T, the force is 0.03 N. The corresponding kinetic energy for 5 cm length rails is 0.0015 J. From the kinetic energy, the final velocity of an 80 mg shot is 6 m/s.

The shots or pellets may be fed into the injector. The feed may be from a hopper. The feeder may comprise one of the disclosure such as a mechanical feeder. The feeder may comprise a vibrator. The feeder may comprise at least one of a piezoelectric vibrator and an actuator. The feeder may comprise at least one of an auger and a trough. The latter may have a slot along the bottom to feed along the railgun. The shot or pellets may be fed from a plurality of positions along the railgun injector. The feeding may be achieved by at least one method of mechanically and hydraulically.

In an embodiment, the shots recovered from the quenching water bath are dried in a dryer such as an oven such as a vacuum oven before entering the evacuated region of the injector system such as the feed to the injector such as a railgun injector. In an embodiment, at least one of the pelletizer, the water reservoir or bath for cooling and forming of the shots, and the transporter to remove the shots from the water reservoir are connected to the cell under vacuum conditions. The transporter may drain excess water from the shot. An exemplary transporter comprises a conveyor that is permeable to water. The shot may be removed when sufficiently hot that surface absorbed water is evaporated. The water evaporated from at least one of the shot and the water reservoir may be removed from the cell atmosphere to maintain a desired low pressure by a pump such as a vacuum pump or a cryopump. The cryopump may comprise a water condenser. A condenser may be used in lieu of a vacuum pump to at least one of partially evacuate the cell and maintain the cell under reduced pressure. A water condenser may decrease the pressure due to the water vapor by condensing the water. The water may be recycled to the reservoir or bath. The water from the condenser may be recirculated to the reservoir or bath by a return water line such as a return water drip line. The water condenser may be chilled with chiller such as at least one of an air-cooled radiator, refrigerator chiller, and Peltier chiller. Other chillers known in the art may be used to chill the condenser to a desired temperature. In an embodiment, the water vapor pressure in the cell is determined by the temperature of the condenser that may be in the range of about 0° C. to 100° C. In an exemplary embodiment, a typical industrial water chiller operates at about 17° C. corresponding to a water vapor pressure of about 13 Torr. In another embodiment, the chiller may directly chill the reservoir or bath so that the water vapor is condensed directly into the reservoir or bath and the water return line is eliminated. The dry shot may be transported to the injector by a second transporter such as an auger to the shot injector. The shot injector may comprise a railgun injection system wherein the highly conductive shot may serve as the armature and its contact with the electrified rails may trigger the current across the rails to cause the Lorentz force propulsion of the shot into the electrodes such as the roller electrodes.

Exemplary shot comprises silver spheres having entrapped gases such as at least one of $H_2$ and $H_2O$. The shot may be formed by dripping and quenching the corresponding melted material in a bath or reservoir such as a water bath or reservoir. In an embodiment, the shot transporter auger and shot injector feed auger are replaced. In an embodiment, water jets make a water fluidized bed feed to the railgun injector wherein the inlet to the railgun is in the water bath and travels outside of bath to the injection site. The fluidized water bath may serve a purpose of preventing adhesion of hot/cooling shots and transporting and loading shot. In an embodiment, the water bath or reservoir to cool the melt and form shot further comprises an agitator to stir the shot. The agitator may comprise water jets that may be driven by at least one water pump. The action of the water jets may form a fluidized bed. The agitator may further comprise a mechanical agitator such as an auger, a stirrer, or a vibrator such as an electromagnetic or piezoelectric vibrator and other agitators known in the art. In an embodiment, the bath comprises a railgun in a position to receive shot and propel it into the electrodes for ignition. A shot input section of the railgun may be positioned in the bottom of the bath and may comprise a trough or hopper to receive shot agitated in the water bath by the agitator. The railgun injector may penetrate the wall of the bath to be directed at the ignition region of the electrodes. The railgun may have a guide path shape the transports the shot form the bottom of the bath to the ignition region of the electrodes such as roller electrodes. The railgun may comprise a means to drain any water moved with the shot back into the bath as the shot travels with at least some vertical travel above the water level of the bath. Water that does not flow back into the bath such as water that is ejected with the shot may fall to a receiving hopper at the bottom of the cell and be pumped back into the bath with a drainage water pump. Water that is vaporized by the hot shot may be condensed into the bath by the bath chiller. The shot may be hot to provide drying. The elevated temperature of the shot may be from the residual heat from the melted state that has not fully cooled and from the resistive heating in the railgun from the current flow through the shot to cause the Lorentz force. In an embodiment, the cell, the pelletizer such as the one comprising to chambers, the water bath, and the injection railgun may be maintained in continuity regarding the gas pressure and evacuated cell atmosphere.

In an embodiment, the SF-CIHT cell may operate according to at least one of independent of its orientation relative to Earth and independent of gravity. The shot water bath may be sealed, expandable, and capable of maintaining a pressure in the range of about 0.001 Torr to 100 atm. The pressure P may about match or exceed that of the water pressure column of the bath of height h given by Eq. (38) wherein the density ρ is the density of water and g is the gravitational acceleration (9.8 m/s²).

$$P=\rho gh \tag{38}$$

The shot dripper may be very highly thermally insulated to prevent excessive cooling of the melt in the dripper by contact with the bath water. The systems that transport fuel and the ignition product may operate using the Lorentz force applied by intrinsic or augmented magnetic fields and currents. The shot injection system may comprise an augmented railgun of the disclosure. The ignition product recovery system may comprise an augment plasma railgun of the disclosure. The pelletizer may transport at least one of the powder ignition product and the melt using an augmented railgun comprising applied magnetic fields and applied current flowed through at least one of the powder and melt. In an embodiment, the current and magnetic field are transverse to the desired direction of flow and are mutually perpendicular according to Eq. (37). The system may comprise the appropriate current electrodes and magnets to achieve the transport. The railgun transporters may have sensors and controllers to monitor the Lorentz forces, the flow rates, and apply current to achieve the desired forces and flow rates. The means to transport at least one of the powder and melt through the pelletizer may comprise a pump such as an electromagnetic pump such as those known in the literature. The agitator such as water jets may agitate shot in the bath to be input to the railgun. A mechanical agitator may also feed shot into the augmented railgun injector. In an embodiment, the mechanical agitator may be large relative to the water bath such that the agitator may function irrespective of the cell's orientation relative to gravity. In an exemplary embodiment, a large diameter auger with an equal gap with the top and bottom of the water reservoir may push shot to the railgun independent of the cell's orientation. The water pump may return any water lost from the shot water bath through the railgun injector by pumping it at a rate that matches any loss.

Figure 10:
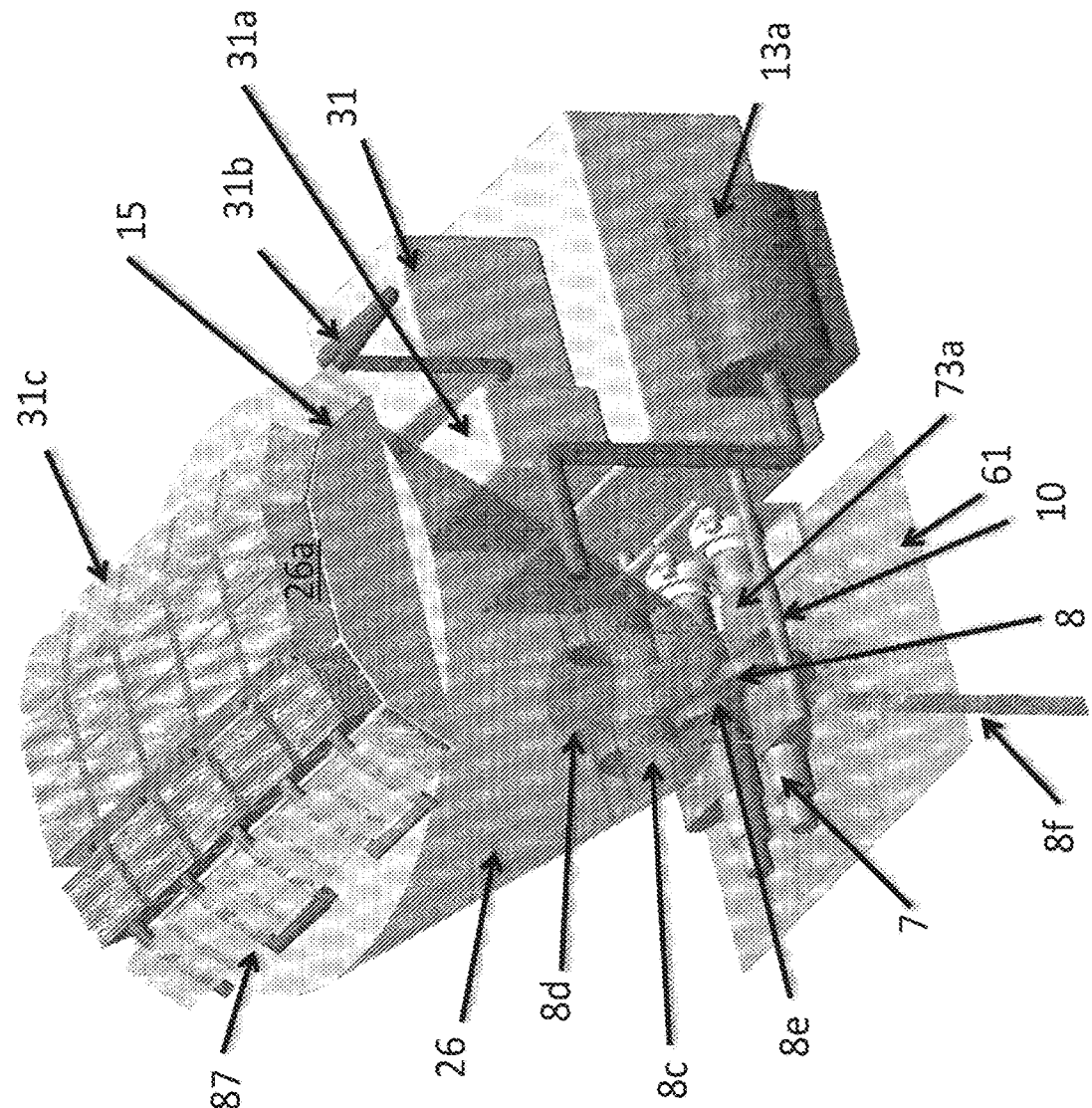
FIG. 10 (also referred to herein as 2I3) is a schematic drawing of a SF-CIHT cell power generator showing a cell capable of maintaining a vacuum, an ignition system having a railgun shot injection system fed directly from a pelletizer, augmented plasma railgun and gravity recovery systems, the pelletizer, and a photovoltaic converter system showing the details of the railgun injector and ignition system and the photovoltaic converter system in accordance with an embodiment of the present disclosure.

In an embodiment, the SF-CIHT cell such as embodiments shown in FIGS. 2I10-2I120 may operate according to at least one of independent of its orientation relative to Earth and independent of gravity. The cell may be secured on a gimbal such that it is always maintained with the z-axis away from the center of gravity of the Earth. Then, the cell will operate independent of the orientation of a craft to which the gimbal is mounted. In an environment absent gravity, the SF-CIHT cell may comprise a centrifugal platform that spins or permits t least one of the SF-CIHT cell, at least one component, and at least one system to spin or rotate wherein the components or systems such as the injection system and pelletizer system are positioned in a location in the cell that permits the development of a centrifugal force that replaces the force of gravity in gravity's role in the operation of the cell such as in returning the shot or ignition product to the pelletizer. In an embodiment, the spinning or rotation may force the ignition particles to the perimeter. The particles forced to the perimeter may be transported to the pelletizer inlet. The transporting may be by means and methods of the disclosure such as mechanical transport or pumping. An electromagnetic pump may achieve the pumping. Current may be flowed through the ignition product from a source of current and magnetic field may be applied magnets located along the perimeter that provide a field crossed with the current to produce a Lorentz force to cause the transport. In other embodiment, at least one component or system such as the cell wall, electrodes, injection system, ignition product recovery system, and pelletizer may comprise a mechanism that causes it to spin to develop a centrifugal force to replace the action of gravity. The spinning mechanism may be one known to those skilled in the art such as a platform or structural support holding the component or system mounted on bearings and driven by an electric motor.

The system may comprise (i) a cell such as a vacuum cell, (ii) an ignition system comprising the roller electrodes and bus bars, (iii) an injector such as a railgun injector, (iv) a ignition product recovery system that may comprise at least one of an augmented plasma railgun recovery system and gravity flow into (v) a hopper connected to the bottom of the cell, (vi) a pelletizer comprising a first vessel to receive ignition product from the hopper, a heater to melt the ignition product, and a second vessel to apply at least one of hydrogen and steam to the melt, (vii) a bath such as an $H_2O$ bath to receive dripping melt from a dripper of the second vessel to form shot, (viii) a shot conveyor, (ix) a drier such as a vacuum oven to receive the shot, (x) a means to transport the shot to the injector such as a chute with controllable vacuum lock passage, (xi) a conveyor such as an auger to transport the shot to the injector such as the railgun injector, and (xii) a vacuum pump to evacuate the cell.

Figure 2:
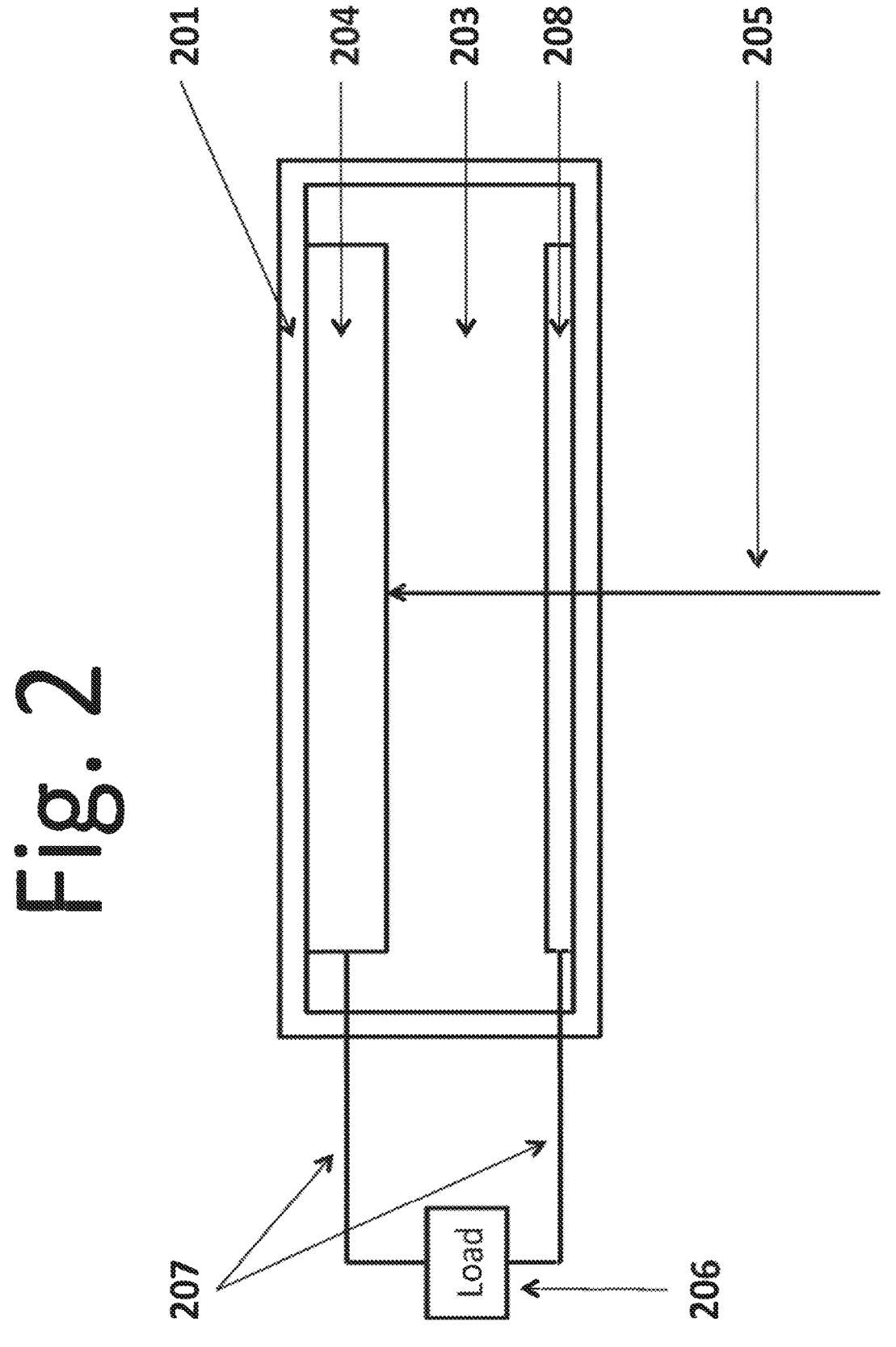
FIG. 2 (also referred to herein as 2G1e5) is a schematic drawing of a photoelectronic cell of the reflective or opaque type in accordance with an embodiment of the present disclosure.
Figure 3:
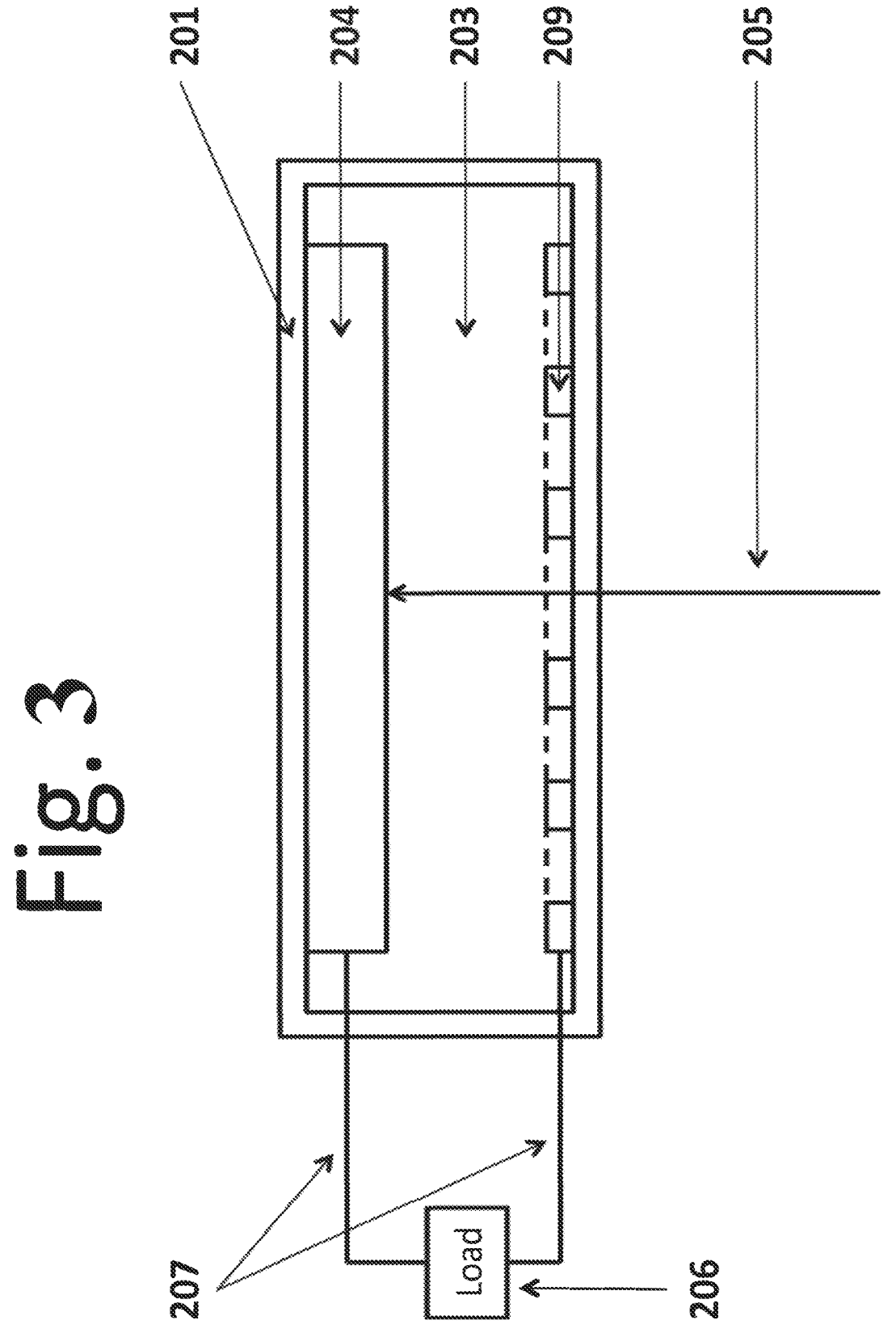
FIG. 3 (also referred to herein as 2G1e6 ) is a schematic drawing of a photoelectronic cell of the reflective or opaque type comprising a grid anode or collector in accordance with an embodiment of the present disclosure.

An embodiment of a SF-CIHT cell power generator showing a cell capable of maintaining a vacuum, an ignition system having a railgun shot injection system fed by two transporters, augmented plasma railgun and gravity recovery systems, a pelletizer, and a photovoltaic converter system is shown in FIG. 2H1. As shown in FIG. 2H1 the SF-CIHT cell power generator may comprise i.) a cell 26 such as a vacuum cell that may comprise a conical cylinder having a vacuum pump 13a; ii.) an ignition system 8a with a power supply 2; iii) a photovoltaic converter system 26a comprising photovoltaic cells or panels 15 to receive the light from the ignited fuel and convert it into electricity, the converter having a heat exchanger 87 for cooling wherein the hot coolant flows into the photovoltaic converter cooling system 31 through inlet 31b and chilled coolant exits through outlet 31c; and iv) a fuel formation and delivery system 8b having a water reservoir for quenching dripped melt to form shot, the reservoir having a cooling system 31a wherein the hot coolant flows into the water reservoir cooling system 31a through inlet 31d and chilled coolant exits through outlet 31e. Details of the ignition system 8a and its power supply 2 are shown in FIG. 2H2. In an embodiment, the ignition system 8a comprises a source of electrical power 2 to flow a high current through bus bars 9 and 10, slip rings 73a, shafts 7, and the roller electrodes 8 that are mounted on the shafts 7 suspended by bearings 4a attached to structural support 4 being mounted on base support 61. The shafts and attached electrodes 8 are turned by roller drive pulleys 71a that are driven by belts 72 each having a belt tensioner 72a, motor shafts and pulleys 71 suspended on bearings 73, and motors 12 and 13. Details of the ignition system 8a and the photovoltaic converter system 26a are shown in FIG. 2H3. In an embodiment, the fuel may be injected by augmented railgun injector 8f. The power supply 2 may receive power from the photovoltaic converter 26a and supply a high current to roller electrodes 8 to cause ignition of fuel to form plasma in ignition location 8e. The upward trajectory of the ignition products may be interrupted by the light transparent baffle 8d that may be concave. The ignition products may be recovered by at least one of gravity in the evacuated cell 26 and by the augmented plasma railgun recovery system comprising Helmholtz coil magnets 8c and the current flowing between electrodes 8 through the plasma. Details of the ignition 8a and the fuel formation and delivery system 8b comprising the ignition product recovery system 8c, and the pelletizer to form shot fuel 5a, and the injection system 8f are shown in FIG. 2H4. In an embodiment, shot fuel may be injected into the roller electrodes 8 by the augmented railgun injector 8f that is fed pellets from water reservoir 11 of pelletizer 5a, conveyed by shot transport auger 66a into injector auger hopper 66b and then injection auger 66 driven by injector auger motor and drive shaft 67. The roller electrodes 8 may receive high current from power supply 2 that flows through each sequentially injected shot to cause ignition of the fuel to form a brilliant light emitting plasma that is converted into electricity by photovoltaic converter 26a (FIGS. 2H1 and 2H3). The upward trajectory of the ignition products may be interrupted by the light transparent baffle 8d, and the ignition products may be recovered by at least one of gravity in the evacuated cell 26 and by the augmented plasma railgun recovery system comprising Helmholtz coil magnets 8c and the current flowing between electrodes 8 through the plasma. The ignition products may flow into a first vessel 5b of the pelletizer 5a that may comprise a crucible 5d that may be insulated with insulation 5e. The products may heated by inductively coupled heater 5f to a melt. Shot that does not ignite may flow to the first vessel 5b of the pelletizer 5a along with the recovered ignition products. The melt may flow into the second vessel 5c of the pelletizer 5a wherein the melt may be exposed to at least one of steam and hydrogen gas supplied by inlet lines 5g and 5h. The gases may be recirculated to incorporate the gases into the melt that drips out the shot dripper 5i and quenched in the water reservoir 11 to form shot. The hydrogen may be supplied from a tank refilled by the electrolysis of water, and the water may be supplied for a water tank wherein the water in both cases is periodically refilled as water is consumed. The water may be absorbed from the atmosphere by a water absorbing material such as a hydroscopic material. Alternatively, the water may be condensed from the atmosphere using a condenser powered by the SF-CIHT cell. Excess potable water may be generated in the same manner. The reservoir may have a cooling system 31a wherein the hot coolant flows into the water reservoir cooling system 31a through inlet 31d, and chilled coolant exits through outlet 31e. The temperature of the bath in connection with the evacuated cell 26 may be controlled to control the vapor pressure of water vapor in the cell. The cell pressure may also be controlled using vacuum pump 13a shown in FIG. 2H1.

An embodiment of a SF-CIHT cell power generator showing a cell capable of maintaining a vacuum, an ignition system having a railgun shot injection system fed directly from a pelletizer, augmented plasma railgun and gravity recovery systems, the pelletizer, and a photovoltaic converter system is shown from two perspectives in FIG. 2I1. As shown from one of the perspectives in FIG. 2I2, the SF-CIHT cell power generator may comprise i.) a cell 26 such as a vacuum cell that may comprise a conical cylinder having a vacuum pump 13*a*; ii.) an ignition system 8*a* with a power supply 2; iii) a photovoltaic converter system 26*a* comprising photovoltaic cells or panels 15 to receive the light from the ignited fuel and convert it into electricity, the converter having a heat exchanger 87 for cooling wherein the hot coolant flows into the photovoltaic converter cooling system 31 through inlet 31*b* and chilled coolant exits through outlet 31*c*; and iv) a fuel formation and delivery system 8*b* having a water reservoir for quenching dripped melt to form shot, the reservoir having a cooling system 31*a* wherein the hot coolant flows into the water reservoir cooling system 31*a* through inlet 31*d* and chilled coolant exits through outlet 31*e*. Details of the ignition system 8*a* and its power supply 2 are shown in FIG. 2H2. Details of the ignition system 8*a* and the photovoltaic converter system 26*a* are shown in FIG. 2I3. In an embodiment, the fuel may be injected by augmented railgun injector 8*f.* The power supply 2 may receive power from the photovoltaic converter 26*a* and supply a high current to roller electrodes 8 to cause ignition of fuel to form plasma in ignition location 8*e*. The upward trajectory of the ignition products may be interrupted by the light transparent baffle 8*d* that may be concave. The ignition products may be recovered by at least one of gravity in the evacuated cell 26 and by the augmented plasma railgun recovery system comprising Helmholtz coil magnets 8*c* and the current flowing between electrodes 8 through the plasma. The augmented plasma railgun recovery system may comprise permanent magnets with electromagnets such as Helmholtz coils as adjustable or shimming magnets to refine the magnetic field to give fine control over the fuel recovery process. Details of the ignition 8*a* and the fuel formation and delivery system 8*b* comprising the ignition product recovery system 8*c*, and the pelletizer to form shot fuel 5*a*, and the injection system 8*f* are shown in FIG. 2H4. In an embodiment, the magnets such as 8*c* may be located outside of the cell 26 wherein the cell material is permeable to the magnetic field of the magnets. In an embodiment, shot fuel may be injected into the roller electrodes 8 by the augmented railgun injector 8*f* that is fed pellets from water reservoir 11 of pelletizer 5*a*, conveyed by auger agitator 16*a* or a water jet agitator fed by agitator water jet line 15 (FIG. 2I5). The roller electrodes 8 may receive high current from power supply 2 that flows through each sequentially injected shot to cause ignition of the fuel to form a brilliant light emitting plasma that is converted into electricity by photovoltaic converter 26*a* (FIGS. 2I1, 2I2, and 2I3). The upward trajectory of the ignition products may be interrupted by the light transparent baffle 8*d*, and the ignition products may be recovered by at least one of gravity in the evacuated cell 26 and by the augmented plasma railgun recovery system comprising Helmholtz coil magnets 8*c* and the current flowing between electrodes 8 through the plasma. The ignition products may flow into a first vessel 5*b* of the pelletizer 5*a* that may comprise a crucible 5*d* that may be insulated with insulation 5*e*. The products may be heated by inductively coupled heater 5*f* to a melt. Shot that does not ignite may flow to the first vessel 5*b* of the pelletizer 5*a* along with the recovered ignition products. The melt may flow into the second vessel 5*c* of the pelletizer 5*a* wherein the melt may be exposed to at least one of steam and hydrogen gas supplied by inlet lines 5*g* and 5*h*. The gases may be recirculated to incorporate the gases into the melt that drips out the shot dripper 5*i* and quenched in the water reservoir 11 to form shot. The reservoir may have a cooling system 3 la wherein the hot coolant flows into the water reservoir cooling system 3 la through inlet 31*d*, and chilled coolant exits through outlet 3 le. The temperature of the bath in connection with the evacuated cell 26 may be controlled to control the vapor pressure of water vapor in the cell. The cell pressure may also be controlled using vacuum pump 13*a* shown in FIGS. 2I1, 2I2, and 2I3.

Figure 7:
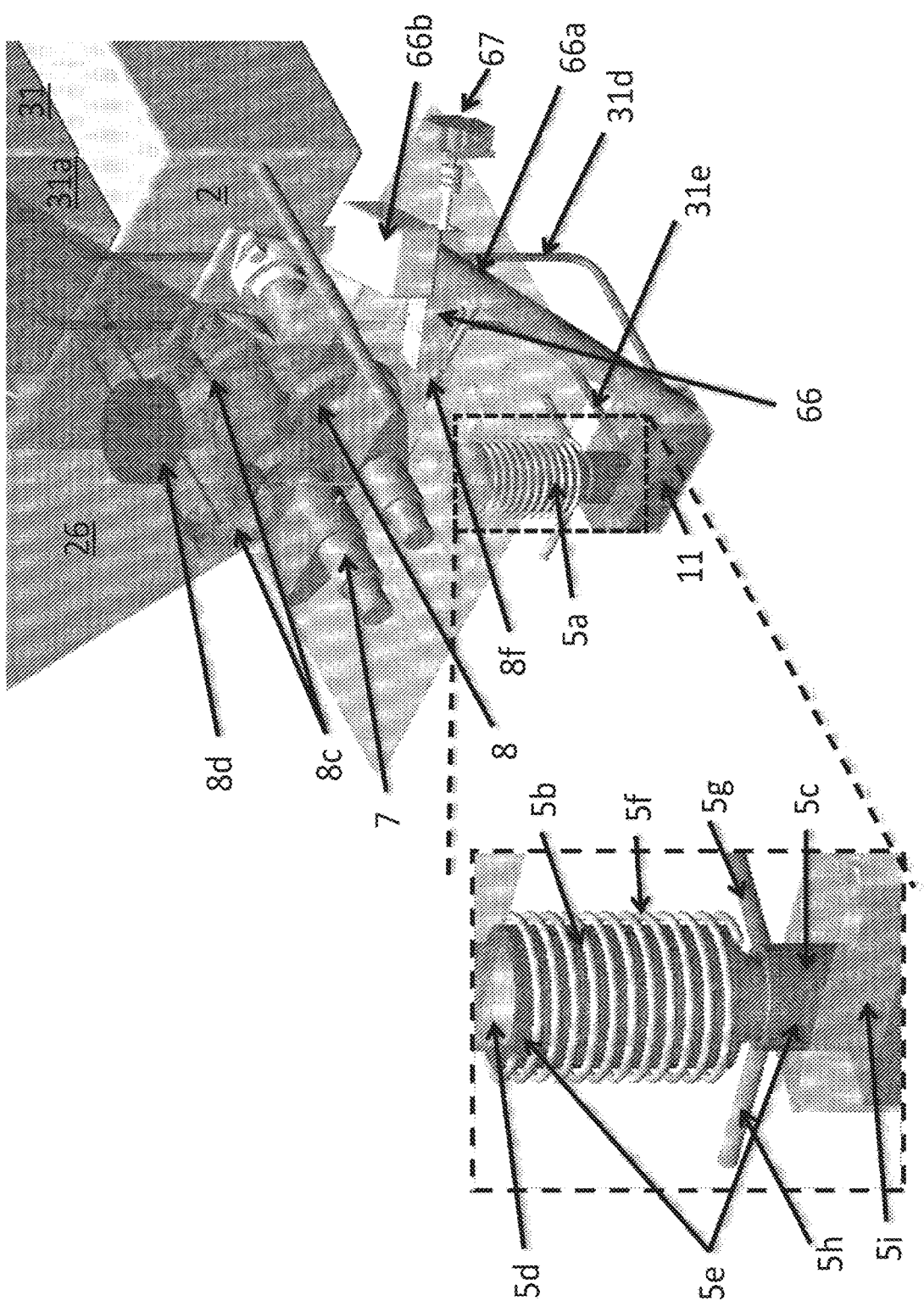
FIG. 7 (also referred to herein as 2H4) is a schematic drawing of a SF-CIHT cell power generator showing a cell capable of maintaining a vacuum, an ignition system having a railgun shot injection system fed by two transporters, augmented plasma railgun and gravity recovery systems, a pelletizer, and a photovoltaic converter system showing the details of the ignition and injection systems, the ignition product recovery systems, and the pelletizer to form shot fuel in accordance with an embodiment of the present disclosure.

In an embodiment shown in FIGS. 2I6 and 2I7, the pressure in the first vessel 5*b* and the second vessel 5*c* of the pelletizer 5*a* are the same such that the metal head pressures are equilibrated wherein the metal head pressure in the second vessel 5*c* may be determined by the height from the exit of the metal passage 5*j* to the metal level in the second vessel 5*c* and the metal head pressure in the first vessel 5*b* may be determined by the height from the exit of the metal passage 5*j* to the metal level in the first vessel. The metal level in the second vessel may automatically adjust due to this principle to be maintained nearly constant on average. In another embodiment, the pressure in the two vessels is different such as in the case that elevated pressure gas such as at least one of hydrogen and steam is added to the second vessel to be incorporated into the shot. In this case, a pump such as an electromagnetic pump 5*k* may control the metal level in the second vessel 5*c*. The level may be sensed with a sensor such as a conductivity sensor or an optical one such as an infrared sensor and the level controlled by the electromagnetic pump power supply and a computer. The pelletizer may comprise at least one sensor for the flow of metal into the input of the pump 5*k* with a safety shut off valve to turn off the current to the pump when there is at least one of reduced volume or flow of metal into the pump. Similarly, flow sensors may be located in the vessels such as 5*b* and 5*c* that serve to provide input data such as at least one of melt flow and melt volume to a controller to shut off the heaters such as 5*f* and 5*o* when there is inadequate melt volume or flow in these sections of the pelletizer.

In an embodiment shown in FIGS. 2I6 and 2I7, each shot dripper produces shot in single file at a rate that matches the injection rate and the ignition rate to achieve a steady state power output and continuity of mass flow. This matching rate and single file aspect of the shot stream from the dripper may be used to load the injector such as the railgun injector at the matching rate. Each shot discharged from the dripper is initially in a molten state. The shot may be cooled in route to the input to the injector. The shot may be flowed single file along a water slide 5*l*. The water slide 5*l* may comprise a conduit such as a channel, chute, or trough having streaming water such as that provided by water jet 16 or a water bath 11 that cools the shot as it flows from the dripper to the input to the injector such as the railgun. The channel may direct shot directly to the railgun injector without discharging them into the water bath 11. The water may flow around the rails in a manner to load the shot onto the rails to be injected. Alternatively, the channel may discharge the shot into a water bath 11 that may be shallow enough to maintain a single file shot stream that flows to the injector input. The water may be recirculated through a chiller 31*a* to maintain a low temperature and remove the heat released in the partial cooling of the shot. The shots may arrive in single file to the railgun injector 8*f* such that at least one of the slide and shallow bath may replace the agitator such as the auger 16 or water jet 16*a* (FIG. 2I5) to facilitate loading the railgun injector 8*f.*

When the shot cooling is ceased with the shot having an elevated temperature, less cooling load will result from the water-stream slide versus the full water reservoir system of cooling the shot to a much lower temperature. In an embodiment, the shot may be cooled just sufficiently to form a thin solid shell on the outer surface such as a shell having a thickness in at least one range of about 1 nm to 100 um, 10 nm to 10 um, and 100 nm to 1 um. In an embodiment, the hot shots will require at least one of less energy, lower ignition current, and less time under ignition power to ignite by arriving preheated; thus, some of the heat from the pelletizer is recovered. Moreover, the ignition may be more complete such that the fuel formation and power release is more efficient with higher gain. The only partial cooling with the injection of preheated shot may serve as the heat recuperator. The preheated temperature may be in at least one range of about 100° C. to 950° C., 300° C. to 900° C., and 400° C. to 900° C. The ignition energy per shot may be essentially that to melt the thin shell. The ignition product may comprise at least one of plasma, molten metal, and elevated temperature molten metal. The products may be recovered to the input to the pelletizer while still at an elevated temperature such as at least one temperature range of about 100° C. to 950° C., 300° C. to 850° C., and 400° C. to 900° C. The hot powder may be further elevated in temperature by the heater such as the inductively coupled heater. The elevated temperature may be in at least one range of about 965° C. to 3000° C., 965° C. to 2000° C., and 965° C. to 1500° C. With preheated power, the pelletizer input heat energy may be a small fraction of that to melt room temperature ignition product. In an optimized flow of reactants, the round trip energy consumption comprising the contributions from melting the preheated thin-shelled shot and melting the hot recovered products to an elevated melt temperature may be minimized. Consider an exemplary embodiment of a 77 mg Ag shot corresponding to a sphere of 2.5 mm diameter having a density of 90% of the of pure Ag due to incorporated $H_2$ and $H_2O$ wherein the powder temperature at the inlet to the first vessel of the pelletizer is about 900° C., the Ag melt is heated to 1300° C., the shot shell thickness is about 1 um, the temperature of the shot injected into the roller electrodes is about 800° C., and the shot may ignite when the shot melts. Then, considering just the metal as the dominant contributor, the round-trip input energy for the reactants is about 20 J compared to about 400 J of output light.

Figure 8:
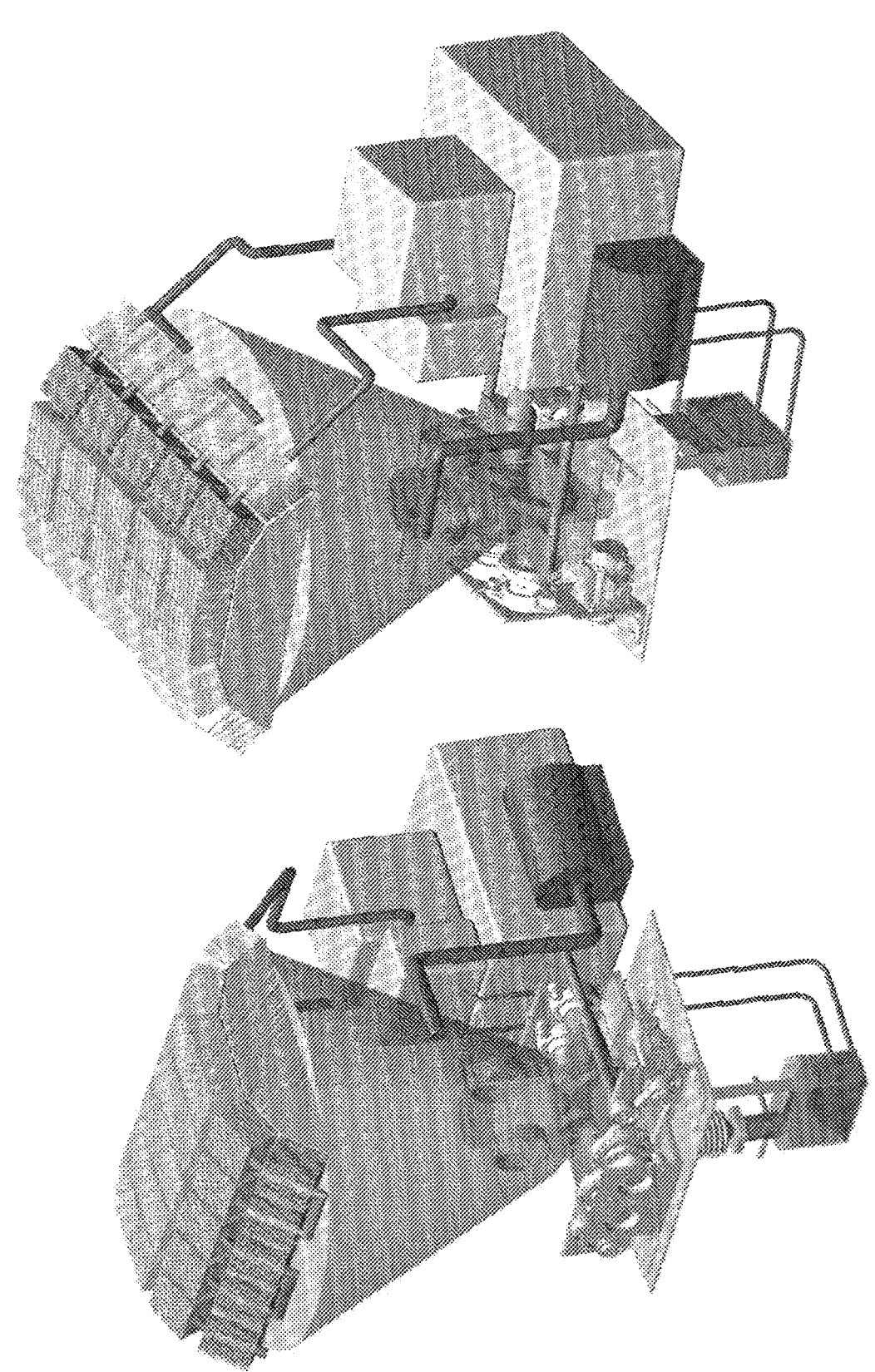
FIG. 8 (also referred to herein as 2I1) is a schematic drawing of a SF-CIHT cell power generator showing two views of a cell capable of maintaining a vacuum, an ignition system having a railgun shot injection system fed directly from a pelletizer, augmented plasma railgun and gravity recovery systems, the pelletizer, and a photovoltaic converter system in accordance with an embodiment of the present disclosure.
Figure 9:
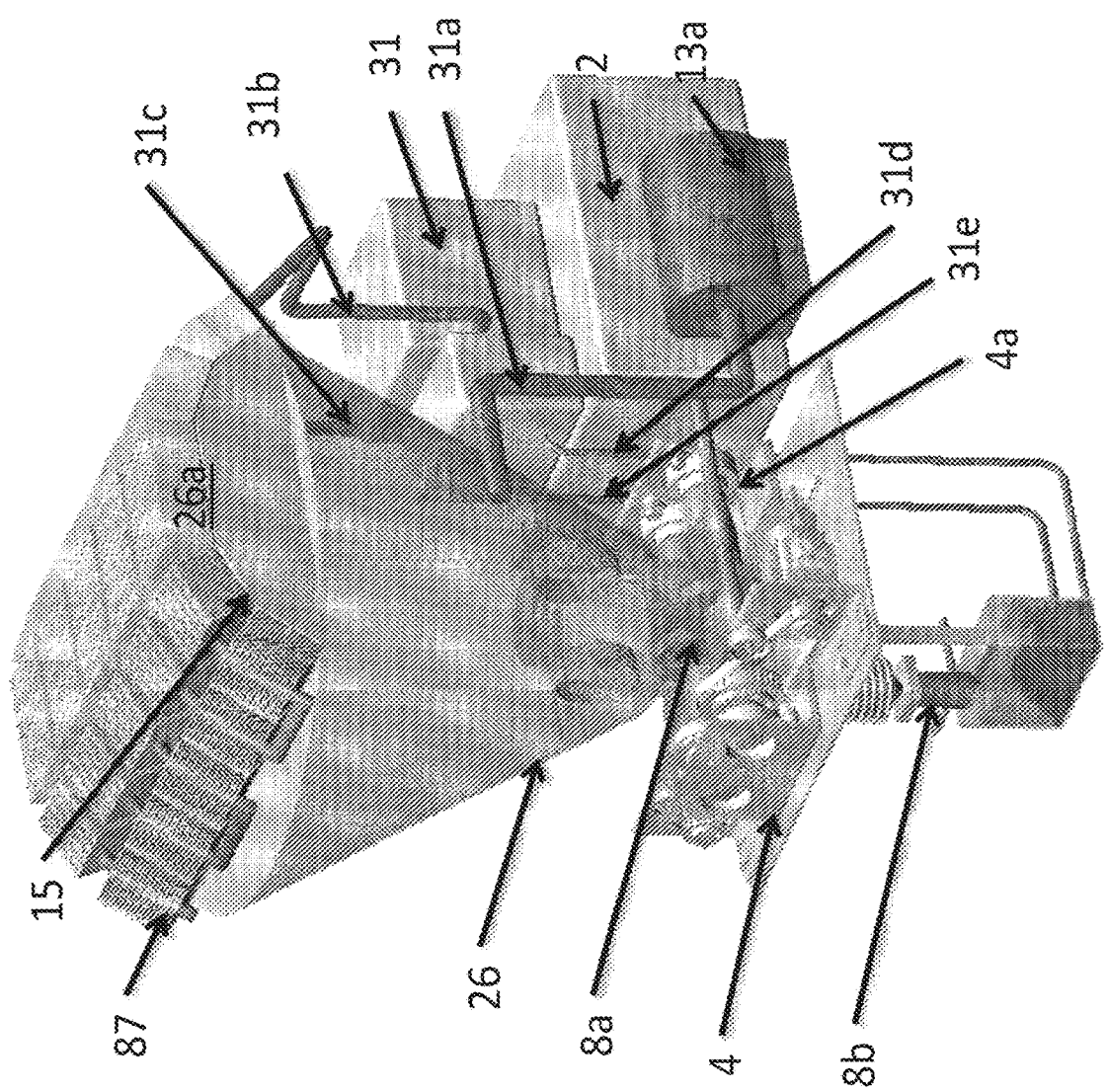
FIG. 9 (also referred to herein as 2I2) is a schematic drawing of a SF-CIHT cell power generator showing a cell capable of maintaining a vacuum, an ignition system having a railgun shot injection system fed directly from a pelletizer, augmented plasma railgun and gravity recovery systems, the pelletizer, and a photovoltaic converter system in accordance with an embodiment of the present disclosure.

In an embodiment shown in FIGS. 2I8 and 2I9, the injector comprises a pump such as an electromagnetic pump 5$k$ that pumps molten fuel such as molten silver metal treated with a source of hydrogen and a source of catalyst such as $H_2$ and steam into the gap between the electrodes such as roller electrodes 8. The pump 5$k$ may operate by the same principle as that of the railgun wherein a current is passed through the melt and a perpendicularly applied magnetic field creates a Lorentz force in the desired direction of flow. Other electromagnetic pumps known in the art capable of pumping the molten fuel such as those using special coils that work on the principle of induction are within the scope of the disclosure. The pump may also comprise a mechanical pump. In an embodiment, mechanical molten metal pumps incorporate graphite or ceramic impellers.

The pump 5$k$ may comprise and electromagnetic pump that comprise powerful, permanent magnets and DC current to propel the molten metal, eliminating a mechanical pump impeller. A motive force is directly applied to the liquid metal by supplying an electrical current through the metal within a strong magnetic field according to the Lorentz Force Law. In an embodiment, the strength of the current directly controls the force on the metal, and hence the volume of flow. In an embodiment, the magnetic field is supplied by high-strength, permanent magnets, and the current is direct, or DC current, supplied by industry standard rectifier power supplies. In an embodiment, the result is an electromagnetic pump with higher flow rates at reduced energy consumption compared to AC electromagnetic pumps. Exemplary manufacturers and vendors of suitable electromagnetic pumps and flow meters for liquid metal are Hazelett, CMI Novacast, Suzhou Debra Equipment Corporation, and Creative Engineers, Inc.

In an embodiment of the electromagnetic pump 5$k$, the metal flows through a straight pipe that is partially flattened over part of its length, where the faces of an electromagnet are positioned (keeping the gap between the pole faces small). To operate at high temperature such as that of the melting point of silver such as in the range of 962° C. to 1300° C., the tube of the electromagnetic pump may comprise a high-temperature metal such as a refractory metal such as molybdenum, tantalum, niobium, or tungsten pump tube. In the case that the pump tube is difficult to machine, it may be fabricated by other methods known in the art such as casting, electrical discharge machining, and metal printing. In an embodiment, the melt may comprise one having a lower melting point than at least one of stainless steel and a non-refractory metal. For example, the melt may comprise an alloy such as a silver-copper alloy such as Ag—Cu (72 wt %/28 wt %) that has a melting point of 779° C. Exemplary pump tubes that have a higher melting point are high-temperature stainless steel such as Haynes 188, Haynes 230, Haynes HR-160, Hastelloy X, nickel, and titanium. In an embodiment, the pump tube has at least one property of wettability by silver such that it is protected from reaction with $H_2O$ and is non-reactive with water. Suitable exemplary materials for the tube that lack $H_2O$ reactivity with sufficient melting points are at least one of the metals and alloys from the group of Cu, Ni, CuNi, Haynes 188, Haynes 230, Haynes HR-160, Hastelloy C, Hastelloy X, Inconel, Incoloy, carbon steel, stainless steel, chromium-molybdenum (chromoly) steel such as modified 9Cr-1Mo—V (P91), 21/4Cr-1Mo steel (P22), Co, Ir, Fe, Mo, Os, Pd, Pt, Re, Rh, Ru, Tc, Ta, Nb, and W. Any oxide coat on the inner wall of the pump tube that may decrease the current through the pump tube walls and the connection with the melt such as silver melt inside of the tube may be removed by methods known by those skilled in the art such as at least one of chemical, mechanical, and plasma etching and electroplating. The chemical method of removing the inner wall oxide may comprise etching with acid and neutralization. The plasma method of removing the inner wall oxide may comprise at least one of electrical discharge machining and vapor deposition. In an embodiment, any oxide coat is removed for the inside of the pump tube by means known in the art such as acid or plasma etching. The inside of the tube may be coated with the metal of the fuel melt such as silver or silver-copper alloy to protect the inside wall from oxidation until put into use. The coating may be achieved by at least one method comprising application of the molten metal, electroplating, electroless plating, vapor deposition, chemical deposition, and other methods known by those skilled in the art.

The pump further comprises bus bas or metal tabs having electrical connections to the side of the tube in this same area that introduce an electrical current flow into the molten metal. The bus bars may be attached with high resistance welds, or ceramic feed-throughs 5k31 (FIGS. 2124 and 2127) may be used for the bus bars of the EM pump tube that supply current to the pumped molten metal such as the Ag metal. Ceramic feed-throughs may be cooled by means such as gas or water cooling. Each EM pump bus bar or tab may be contacted directly to the molten metal such as molten silver by the steps of (i) machining penetrations such as rectangular penetrations in the sides of the tube wall on opposite walls that are each a tight fit with the bus bar when the tube is at an elevated temperature, (ii) heating the tube to expand the penetrations to accommodate the bus bars, (iii) inserting the bus bars through the penetrations, (iv) cooling the tube to compression bond the bus bars to the pump tube, and (v) operating the pump at a lower temperature than that used to expand the penetrations to accommodate the insertion of the bus bars. Alternatively, each EM pump bus bar or tab may be contacted directly to the molten metal such as molten silver by the steps of (i) machining flaps in the sides of the tube wall on opposite walls that are each a tight fit with the bus bar, (ii) inserting the bus bars through the slits of the flaps, and (iii) mechanically squeezing the flaps onto the bus bars to form a compression bond of the bus bars to the pump tube. In another embodiment, the tabs may be welded to inwardly projecting dimples made in the opposite side walls of the flattened tube. In another embodiment, the current may be selectively supplied to the melt inside of the tube by increasing the contact area of the pump bus bar with the metal relative to the area in contact with the pump tube wall. The contact area with the melt may be increased by inserting the bus bar into the melt by having it protrude through the pump tube wall inside of the tube. The inner protrusion may comprise a shape or structure such as a curved plate to increase the surface area of contact with the melt. The bus bar may be fastened to the pump tube wall by at least one of welds and compression bonding. Exemplary pump tubes and bus bars comprise at least one from the group of zirconium, niobium, titanium, and tantalum.

The bus bars may each comprise a coating of low conductively such as an oxide coat at the region of contact of the bus bar with the tube wall at the penetration. Exemplary bus bars and the corresponding low conductivity coatings are zirconium and zirconium oxide, niobium and niobium oxide, titanium and titanium oxide, nickel and nickel oxide, and tantalum and tantalum oxide, respectively. The oxide may be formed by heating in oxygen or by anodizing. The sections that are desired to be conductive that contact the melt may be masked during oxidation, or the oxide may be removed from the melt contact regions after the bus bar is coated with oxide by means such as mechanical abrasion, chemical etching, or chemical reduction. The high resistance between the bus bar and the cell wall causes the low resistance electrical path to be through the metal melt inside the pump tube. The electrical current may flow across the flattened section while the magnetic flux may pass through the flattened section at right angles to the current flow, and this may produce a force on the metal that is at right angles to the current and magnetic flux. The electromagnetic pumps may operate on direct current or alternating current. In the former case, the magnets may comprise permanent magnets or DC electromagnets. When operated with alternating current, the magnets comprise AC electromagnets. In the AC case, the direction of the flow of electricity in the metal may change every half-cycle, and the electromagnets may also be powered by the same alternating current such that the magnetic field may also change direction every half-cycle, so the force on the metal may pulsate but may always be in the same direction. The pump may be convection cooled.

Although, if the pumped metal temperature such as silver is high such as 1000° C. and higher, the pump may be cooled with supplemental cooling such as forced convection and water-cooling. In an embodiment, energy is dissipated as ohmic heating of the metal by the flow of current through the metal to cause pumping by electromagnetic pump 5k, and this energy supplements the heating by the heater 5o of the second vessel 5c. In an embodiment, the metal may be directly resistively heated by flowing current through it using electrodes in contact with the metal.

The pump 5k may comprise a 3-phase linear annular induction pump. The pump may comprise two annular tubes separated by a space. The metal may flow through the annular space between two concentric tubes wherein the inner of the two tubes may contain a magnetic core, through which the lines of a moving radial magnetic field are looped. A 3-phase stator around the tube may develop the field. The flow of induced currents may be circular, within the annular space, cutting the lines of the field. An axially exerted force may result that may move the liquid metal through the pump.

The pelletizer may comprise a flow meter such as one known by those skilled in the art. The flow meter may comprise a Lorentz force velocimeter or Lorentz flow meter that measures the integrated or bulk Lorentz force resulting from the interaction between the liquid metal in motion and an applied magnetic field. The flow meter may comprise one based on Faraday's law of induction wherein a magnetic field is applied along the transverse x-axis, a set electrodes are applied along the transverse y-axis, and the flow of the conducting molten metal along the z-axis produces a voltage across the electrodes that is linearly proportional to the velocity of the flow according to Faraday's law of electromagnetic induction. The flow meter may comprise a contactless electromagnetic flow meter that operates by measuring the amount of distortion in a magnetic field that is caused by movement of a conductor within that magnetic field. To achieve this, permanent magnets may be set near the moving material. The moving material may or may not be contained within a pipe or conduit. The amount of shift of the magnetic field may be measured in the direction of melt flow corresponding to the velocity of the melt that is read out by a calibrated indicator as a flow rate.

The pressure of the molten fuel may be sufficient to form shot 5t as it ejects out of a nozzle 5q. The gas pressure may be elevated relative to the cell pressure such as in at least one range of about 0.01 Torr to 100 atm, 1 Torr to 10 atm, 10 Torr to 5 atm, and 100 Torr to 1 atm. The electromagnetic pump 5k may develop a pressure greater than that of the gas pressure to cause melt flow and ejection from the vessel and nozzle. The shot 5t may comprise projectiles that enter the inter-electrode region to cause contract between the otherwise non-contacting electrodes 8. The consequential high current flow results in ignition of the fuel such as the formation of plasma. In an embodiment, the fuel may comprise a continuous stream rather than shot or a combination of intervals of continuous stream mixed with shots. In an embodiment, the pressure in the pelletizer 5a developed by the pump 5k is greater than at least one of the pressure of any gases applied to the melt such as $H_2$ and steam and the pressure corresponding to gravity at a height of the electrodes over the nozzle 5q. In the latter case, after leaving the nozzle 5q, the ejected fuel has sufficient kinetic energy to transport it to the ignition site between the electrodes against gravity.

In an embodiment, the ignition products are recovered and collected in the first vessel of the pelletizer 5b and are melted. The melt may be pumped by at least one electromagnetic pump 5k. In an embodiment, the inlet of the first vessel 5b may be aligned along the vertical axis (z-axis) of the cell 26. The melt may flow from the first vessel 5b into the pump 5k that pumps the melt into the second vessel 5c. The second vessel 5c may have a section that bends such that the melt flow direction gradually changes from along the negative z-axis to along the positive z-axis towards the injection or ignition site comprising the region of closest proximity of the opposing separated electrodes 8. At least one of the first vessel 5b and the second vessel 5c may be pipe-like. The vessels comprise an arc, semicircle, U-shape, or other such shape to permit the receipt of ignition product from the cell at the inlet and ejection of regenerated fuel into the electrodes of the cell at the outlet or nozzle. In an embodiment for improved packaging of the electromagnetic (EM) pump in the pelletizer, the EM pump height from the pump tube to the top of the EM pump is reduced. The height of the permanent magnet such as a neodymium magnet and a shallow magnetic pole piece of the magnetic circuit may give the desired overall height. This EM pump section distal to the pump tube may be cooled. The distal section may comprise a thermally insulating spacer and a cold plate in the magnetic circuit to thermally isolate and cool the distal magnet. The cool or cold plate may comprise a microchannel plate such as one of a concentrator photovoltaic cell such as one made by Masimo or a diode laser cold plate that are known in the art.

The second vessel 5c may comprise at least one manifold that supplies at least one of $H_2$ and gaseous $H_2O$ to the melt such as hydrogen manifold and input lines 5w and steam manifold and input lines 5x as the melt flows towards a nozzle 5q at the end of the pipe-like second vessel 5c directed at the injection site. In an embodiment, the $H_2$ and $H_2O$ injection system comprises gas lines, manifolds, pressure gauges, regulators, flow meters, and injectors and may further comprise a $H_2$-steam mixer and regulator in case that both gas are injected with a common manifold. In an embodiment, liquid water may be injected into the melt. The injection may be achieved by at least one of a pump such as a peristaltic pump and gravity feed. In an embodiment, the metal of the fuel may comprise a copper-silver alloy. $H_2$ gas injected into the melt through hydrogen manifold and input lines 5w may be used to reduce any oxide of the alloy such as CuO formed during the operation of the cell. Additionally, oxide of the alloy may be reduced in situ in the cell by addition of hydrogen gas that may be intermittent. Oxide of the alloy may also be reduced by hydrogen treatment outside of the cell.

The pelletizer 5a may be heated with at least one heater such as at least one inductively coupled heater. In an embodiment, the inductively couple heater may comprise and inductively coupled heater power supply 5m. The pelletizer 5a may be heated with a first inductively coupled heater coil 5f that may extend along the first vessel 5b from its inlet to the inlet of the electromagnetic pump 5k. The first inductively couple heater comprising coil 5f may be circumferential to the first vessel 5b having crucible 5d and insulation 5e. The heater may further comprise a second inductively coupled heater coil 5o that may extend along the second vessel 5c from the outlet of the electromagnetic pump 5k to the nozzle 5q of the second vessel 5c. The second inductively couple heater comprising coil 5o may be circumferential to the second vessel 5c having crucible 5d and insulation 5e. The corresponding first and second heating coils define a first and second heating section or zone. The first section may be heated to a temperature that is at least above the melting point of silver (962° C.) to form the melt that is pumped. The vessel and coil may comprise a high Q cavity further comprising the recovered product melt. In an embodiment, a gas such as at least one of $H_2O$ and $H_2$ may be injected to increase the resistivity of the melt to improve the coupling of the radiation from the inductively coupled heater with the melt. The second section may be superheated relative to the first. The temperature of the melt in the second section may be maintained in at least one range of about 965° C. to 3000° C., 965° C. to 2000° C., and 965° C. to 1300° C. An optical pyrometer, thermistor, or thermocouple may be used to monitor the temperature of the melt. In an embodiment, power dissipated in the pump 5k due to mechanisms such as resistive heating may contribute to heating the melt. The superheating may increase the absorption of at least one treatment gas such as at least one of $H_2$ and steam in the melt.

In an embodiment, the pelletizer may comprise a plurality of heaters such as inductively coupled heaters each comprising an antenna such as a coil antenna and an inductively coupled heater power supply 5m to supply electromagnetic power to heater coils 5f and 5o through inductively coupled heater leads 5p. The inductively coupled heater power supply 5m may comprise a shared power supply to the plurality of antennas wherein the power to each antenna may be adjusted by a circuit such as a matching or tuning circuit. In another embodiment, each antenna may be driven by its independent power supply. In the case, of shared or separate power supplies, each heater may further comprise a controller of the power delivered by each coil. In another embodiment, the inductively coupled heater comprises one antenna driven by one power supply wherein the antenna is designed to selectively deliver a desired proportion of the power to each of the first heating section and second heating section. The heating power may be divided between the two sections according partition means such as fixed differences in (i) antenna gain achieved by different numbers coil turns for example, (ii) variable, controllable antenna gain, (iii) switches, and (iv) matching or tuning networks. The two coil sections may be connected by additional inductively coupled heater leads 5p between the sections that may bridge the electromagnetic pump 5k. The leads may be designed to transmit rather than dissipate power such that the heating power is selectively delivered and dissipated into the fuel melt by the coils 5f and 5o.

The sections heated by inductively coupled heaters may each comprise a crucible comprising material transparent to the radiation such as RF radiation of the inductively coupled heater. Exemplary materials are silicon dioxide such as quartz or silica, zirconia, and sapphire, alumina, $MgF_2$, silicon nitride, and graphite. Each crucible may be insulated with high temperature insulation 5e that is also transparent to the radiation of the inductively coupled heater. The portion of the second vessel 5c that is in contact with the electromagnetic pump 5k may comprise a conductor and a magnetic-field-permeable material such that the applied current and magnetic field of the pump 5k may pass through the melt. The RF transparent sections may be connected to the conductive and magnetic-field-permeable section by joints such as ones comprising a flange and a gasket. The joint may comprise a clamp such as a C-clamp, clamshell type, bolted fittings, or tightened wires. The joints may operate at high temperature and may be stable to molten fuel. An exemplary gasket is a graphite gasket. Alternatively, the gaskets may comprise a wet seal type common in molten fuel cells wherein the fuel is liquid in the vessel and is solid at the perimeter of the joints or unions of the vessel with the pump wherein the temperature is below the melting point. The union may comprise at least one of the penetration for the pipe bubbler and the valve.

In the case that the pump is of a type suitable for a common crucible and tube material and the pump tube, the pump tube through the electromagnetic pump 5*k* may comprise a material that is transparent to the radiation of the inductively coupled heater. The material of the pump tube may be the same material as that of at least one of the first vessel and the second vessel. The joint may comprise a ceramic-to-ceramic joint wherein ceramic comprises a material that is transparent to the radiation of the inductively coupled heater such as at least one of silica, quartz, alumina, sapphire, zirconia, $MgF_2$, and silicon nitride. Alternatively, in the case that the pump is of a type suitable for a common crucible and tube material and the pump tube comprises the common or the same material as at least one of the vessels, the joint may be eliminated such that there is continuity of the vessel through the pump. An exemplary material of at least one of the vessels and the pump tube of an exemplary induction-type or mechanical pump is silicon nitride. In another embodiment, at least one component from the group of the first vessel, the second vessel, the manifold section of the second vessel, and the pump tube may be comprise a material that absorbs the radiation of the inductively coupled heater such as a metal or graphite such that the fuel metal contained in the component is heated indirectly. The heater may heat the component, and heat transfer from the heated component may secondarily heat the fuel metal inside of the component.

In a specific exemplary embodiment, the first vessel 5*b* comprises an RF transparent material such as quartz. The quartz section of the first vessel is connected to a metal elbow such as a high-temperature stainless steel (SS) elbow that connects to a metal pipe tube such as a high-temperature stainless steel (SS) pipe tube of the electromagnetic pump 5*k*. The tube connects to the second vessel 5*c* that comprises a metal elbow such as a high-temperature stainless steel (SS) elbow that further connects to an RF transparent material such as quartz. The quartz tube ends in the nozzle 5*q*. The second vessel may further comprise an S or C-shaped section that may penetrate the cell and align the nozzle 5*q* with the gap 8*g* of the electrodes 8. The each joint between sections that connect may comprise a clamp and a gasket such as a graphite gasket. In an embodiment, the pelletizer comprises a short heating section 5*b* such as an RF transparent section, a metal joint transition to the pump tube, the electromagnetic pump 5*k* that may be in a vertical section of the vessel 5*b*, a transition to an elbow such as a metal elbow having a metal fitting or penetration for a pipe bubbler 5*z* that runs through a second longer RF transparent heating section 5*c* that ends in the nozzle 5*q*. The RF transparent sections comprising the first and second vessels may comprise quartz, the quartz to metal joints may comprise quartz and metal lips on the joined sections held together with clamps. An exemplary pipe tube size and vessel size are 1 cm ID and 2 cm ID, respectively. The pipe tube may comprise a high temperature stainless steel, and the RF transparent vessel may comprise quartz.

Figure 11:
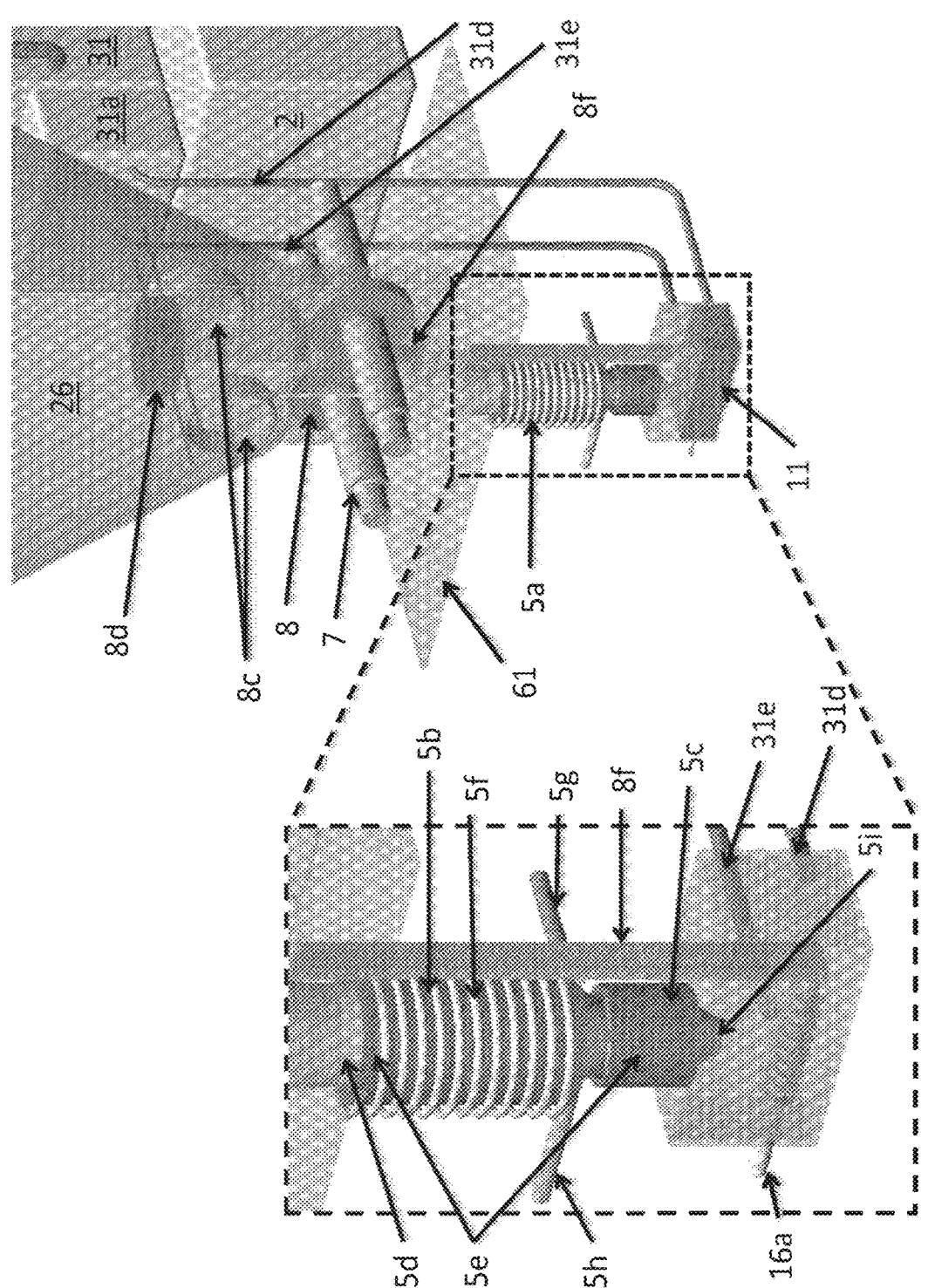
FIG. 11 (also referred to herein as 2I4) is a schematic drawing of a SF-CIHT cell power generator showing a cell capable of maintaining a vacuum, an ignition system having a railgun shot injection system fed directly from a pelletizer, augmented plasma railgun and gravity recovery systems, the pelletizer, and a photovoltaic converter system showing the details of the injection system having a mechanical agitator, the ignition system, the ignition product recovery systems, and the pelletizer to form shot fuel in accordance with an embodiment of the present disclosure.

In another embodiment, at least one of the pelletizer components such as the melt conduit components and gas delivery component comprising at least one of the first vessel 5*b*, second vessel 5*c*, pump tube, manifold section of the second vessel 5*c* (FIG. 2I11), and pipe bubbler 5*z* (FIG. 2I13) may comprise a material that absorbs at least some power from the inductively coupled heater(s) and indirectly heats the fuel melt such as silver or Ag—Cu alloy melt. In the latter case, the vessel walls such as quartz, silica, sapphire, zirconia, alumina, or ceramic walls may be transparent to the RF power of the inductively coupled heater. The pelletizer components may comprise high temperature stainless steel, niobium, nickel, chromium-molybdenum steel such as modified 9 Cr-1Mo—V (P91), 21/4Cr-1Mo steel (P22), molybdenum, tungsten, H242, TZM, titanium, chromium, cobalt, tungsten carbide, and other metals and alloys that have a melting point higher than that of the fuel melt. The metal may have a high efficiency for absorbing the radiation from the heater. The components such as the vessels may be narrow to effectively heat the fuel melt indirectly. Exemplary vessels are tubes having tube sizes of the ¼ inch to ⅜ inch ID. The melt contact surfaces of the components such as the vessels, pump tube, and pipe bubbler may be pre-oxidized by means such as heating in an oxygen atmosphere in order to form a passivation layer to prevent reaction with injected steam or water that becomes steam. In an embodiment, the walls of the component may be wetted with the melt such as silver melt that protects the walls form reaction with water. In this case, water reactive metals may be used for the pelletizer component. The joints may be welds, Swagelok, and others known in the art for connecting metal parts. The parts may be made of the same materials as the pump tube such as at least one of zirconium, niobium, titanium, tantalum, other refractory metal, and high temperature stainless steel such as at least one of Haynes 188, Haynes 230 and Haynes HR-160.

In an embodiment, at least one vessel of the pelletizer that is heated by at least one of the inductively coupled heaters such as 5*f* and 5*o* comprises a material such as a metal that absorbs the radiated power of the inductively coupled heater and indirectly heats the metal such as silver that is contained in the vessel. Exemplary metals that are very efficiency at absorbing the RF radiation of the inductively coupled heater are tantalum, niobium, ferrous metals, and chromoly metal. In an embodiment, at least one vessel of the pelletizer comprises tubing comprising a material that efficiently absorbs the radiation from the inductively coupled heater such as tantalum, niobium, or a ferrous metal such as chromoly. The tubing may be coiled to be permissive of heating a longer length section within a coil of an inductively coupled heater. The tubing may have a small diameter such as in the range of about 1 mm to 10 mm to effectively indirectly heat the metal inside of the tubing. The tubing such as polished or electro-polished tubing may have a low emissivity. The tubing may be wrapped with insulation such as insulation substantially transparent to the radiation of the inductively coupled heater. The insulation may be effective at minimizing the conductive and convective heat losses and may further at least partially reflect infrared radiation from the tubing to decrease radiative power losses. In an embodiment, the pelletizer may further comprise a vacuum chamber or a cell extension that provides a vacuum chamber around at least of portion of the pelletizer. The vacuum about the vessels may decrease conductive and convective heat losses and lower the required heater power to maintain the melt at the desired temperatures. The vacuum may further decrease oxidation of the tubing that maintains its desired low emissivity.

In the gas treatment section comprising gas manifolds, the vessel wall may be comprised of a material that has a diminished to low permeability to hydrogen and is capable of a high temperature. Suitable materials are refractory metals such as tungsten and molybdenum and nitride bonded silicon nitride tube. The vessel may be lined with insulation in the absence of the inductively couple heater in the manifold section. This section may be insulated and heated by the contiguous section of the second vessel from which the melt flows into this section. If necessary, in addition to insulation, the temperature may be maintained by an inductively coupled heater that heats the metal wall and indirectly heats the melt. Alternatively, another type of heater such as a resistive heater may be used. In an embodiment, the manifold section further comprises a mixer to increase the rate of incorporation $H_2$ and gaseous $H_2O$ into the melt. The mixer may comprise an electromagnetic type such as one that utilizes at least one of current and magnetic fields to produce eddy currents in the melt or mechanical type that comprises a moving stirrer blade or impeller. The $H_2$ and gaseous $H_2O$ become incorporated into the melt to form molten fuel that is ejected from a nozzle $5q$ at the ignition site. The pelletizer $5a$ further comprises a source of $H_2$ and $H_2O$ such as gas tanks and lines $5u$ and $5v$ that connect to the manifolds $5w$ and $5x$, respectively. Alternatively, $H_2O$ is provided as steam by $H_2O$ tank, steam generator, and steam line $5v$. The hydrogen gas may be provided by the electrolysis of water using electricity generated by the generator.

The ejection of elevated pressure melt from the nozzle $5q$ achieves injection of fuel into the electrodes wherein the elevated pressure is produced by the at least one electromagnetic pump $5k$. The pressure may be increased by controlling the cross sectional area of the ejection nozzle $5q$ relative to that of the melt vessel $5c$. The nozzle orifice may be adjustable and controllable. Sensors such as conductivity or optical sensors such as infrared sensors and a computer may control the pressure of pump $5k$ and the injection rate. The nozzle $5q$ may further comprise a valve such as one of the disclosure that may provide additional injection control. The valve may comprise a needle type with the nozzle opening as the valve seat. In an embodiment of the SF-CIHT cell comprising an electromagnetic pump $5k$, a fast controller such as a fast current controller of the electromagnetic pump serves as a valve since the pressure produced by the pump is eliminated at essentially the same time scale as the current according to the Lorentz force (Eq. (37)) that depends on the current. The shot size may be controlled by controlling at least one of the nozzle size, the pressure across the nozzle orifice, vibration applied to the nozzle with a vibrator such as an electromagnetic or piezoelectric vibrator, and the temperature, viscosity and surface tension of the melt. The movement of the shots may be sensed with a sensor such as an optical sensor such as an infrared sensor. The position data may be feedback into at least one of the controller of the injection and the ignition to synchronize the flow of fuel into the ignition process. The nozzle $5q$ may be surrounded by a Faraday cage to prevent the RF field from inducing eddy currents in the shot and causing the shot to deviate from a straight course into the electrode gap where ignition occurs.

The shot formed by surface tension following ejection from the nozzle $5q$ may radiate heat and cool. The flight distance from the nozzle $5q$ to the point of ignition between the electrodes $8$ may be sufficient such that the metal forms spheres, and each sphere may cool sufficiently for a shell to form on the outside. To enhance the cooling rate to assist in the formation of at least one of spherical shot and spherical shot with an outer solid shell, the ejected molten fuel stream may be sprayed with water such as water droplets with a sprayer such as one of the disclosure. An exemplary water sprayer is Fog Buster Model #10110, U.S. Pat. No. 5,390, 854. Excess water may be condensed with a chiller to maintain a rough vacuum in the cell. In an embodiment, the sprayer and water condenser or chiller may be replaced with a nozzle cooler $5s$ that may cool the shot $5t$ just as it is ejected. The cooling may comprise at least one of a heat sink such as one comprising a thermal mass that radiates heat, a heat exchanger on the nozzle with lines $31d$ and $31e$ to a chiller, and a chiller $31a$, and a Peltier chiller on the nozzle $5s$. The melt flowing into the nozzle section of the pelletizer $5a$ may have a substantially elevated temperature in order to absorb applied gases such as $H_2$ and $H_2O$ in the upstream gas application section. The melt temperature may be quenched with the nozzle cooling. The temperature may be lowered to just above the melting point just as the melt is ejected. The lower-temperature melt may form spheres, and each may subsequently form a solid shell with radiative cooling as it travels from the nozzle to the electrodes. Using a rough, high capacity cooling means such the heat sinking and the heat exchanger and chiller, the temperature at ejection may be established to within a rough temperature range such as to within about 50° C. of the melting point of the melt. A more precise temperature near the desired temperature such as to within about 1 to 5° C. of the melting point of the melt may be achieved with a highly controllable, low capacity cooler such as the Peltier chiller.

The pelletizer $5a$ may further comprise a chiller to cool the inductively coupled heater which may comprise a separate chiller or the same chiller as at least one of the nozzle chiller $31a$ and power converter chiller such as the PV converter chiller $31$. The ignition system $8a$ (FIG. 2H2) may also be cooled with a heat exchanger that rejects the heat to a chiller that may comprise one such as $31$ that also cools another system such as the PV converter. The ignition system cooler may cool at least one of the electrical connecting bearing such as the plain bearing or slip ring, the roller shafts, and the roller electrodes. The ignition system cooler may comprise a heat exchanger such as a water jacket about the slip ring. The water jacket water may also flow through the shafts $7$ and roller electrodes $8$. The water flow may be connected with the shafts $7$ through water tight, shaft sealing bearings or watertight slip rings at the ends of the shafts that are well known in the art.

The ignition of the fuel forms hydrinos and oxygen that may be pumped off with a vacuum pump $13a$ (FIG. 2I2) such as a root pump, a scroll pump, a cryopump, a diaphragm pump, a dry vacuum root pump, and others known to those skilled in the art. Excess water and hydrogen may be recovered and recirculated. The water may be removed by differential pumping. In an embodiment, hydrogen and oxygen formed in the plasma may be removed by pumping and other means of the disclosure such as by the separatory means. The removal of the hydrogen and oxygen may be used as a means to remove excess water. In the case that an atmosphere comprising water is maintained at the electrodes, excess water may be removed by pumping. The water may be condensed at a chiller in the cell $26$ or connected with the inside of the cell $26$ and reused. Hydrogen may be recovered with a scrubber such as a hydrogen storage material. Alternatively, it may be pumped off as well using pump $13a$, for example. The pressure may be maintained in a pressure range that prevents at least one of excessive attenuation of the light emitted by the cell and allows the ignition particles to fall substantially unimpeded under the influence of gravity. The pressure may be maintained in at least one pressure range of about 1 nanoTorr to 100 atm, 0.1 milliTorr to 1 atm and 10 milliTorr to 2 Torr.

The ignition of hot fuel may require less energy than that of cold fuel; so, the timing of the ignition may be earlier in the hot-fuel case. The timing of the ignition may be controlled to achieve the formation of light in a desired region such as one that provided light directed towards the power converter such as the photovoltaic converter 26a (FIG. 2I2). In the case that fuel is injected from below the roller electrodes 8, the roller speed may be increased to transport the fuel upward to cause the light to be emitted in the desired region. The system may comprise an ignition current delay element such as a delay line to delay the ignition as the fuel is transported by the rollers such that the light is produced in the desired region. The power may be controlled by controlling the injection rate and size of the shot. The flow rate may be controlled by controlling the pumping rate. The $H_2$ and $H_2O$ content may also be controlled by controlling the gas absorption conditions such as gas pressures, exposure time, and melt temperature to control the power output of the SF-CIHT cell.

In an embodiment to in situ repair the electrodes such as roller electrodes 8, the melt such as molten silver may be injected absent at least one of gas treatment and cooling such as with the water spray, the heat exchanger and chiller, or the Peltier chiller. The untreated metal serves as "dud" material in that the ignition to form hydrinos is absent such that the material may bond to the electrode surface. The bonding may be more dispersed and uniform in the case that the melt is not cooled into shot having an external shell. Molten droplets may impact the electrode surface with injection to cover the surface over time with new metal. The excess metal may be machined by means of the disclosure such as by use of at least one of a dressing wheel, precision grinder, and lathe. The milling may be achieved with a fixed abrasive blade that mills the surface as the roller electrode rotates. The height of the blade may be adjustable. Alternatively, the excess material may be removed by electrical discharge machining (EDM) wherein the EDM system may comprise the electrodes and power supply. Each electrode may have a dressing wheel to condition the surface. The rollers may be smoothed and formed to a desired radius by at least one of milling, grinding, lapping, super finishing and heat-treating. In another embodiment, the electrode mending or repair system comprises a sensor such as an optical sensor such as a laser to detect roller damage. A controller may control the deposition, removal of excess material, and dressing to repair blast damage to maintain the electrodes within certain desired size tolerances.

In an embodiment that may be independent of the cell's orientation with respect to gravity, the ignition products may be recovered by at least one of an electrostatic and an electromagnetic recovery system. In an embodiment, the electrostatic recovery system comprises at least one set of electrodes that may be maintained at high voltage that causes the ignition product powder to become charged by one electrode such as the positive (negative) electrode and the charged particles are collected by the oppositely charged electrode such as the Negative (positive) electrode. The particles may be charged by electrons produced by a discharge at the negative electrode such as a coronal discharge. Alternatively, particles such as ones comprising silver may become positively charged in a high field between the ESP electrodes. The direction of the electric fields created by the electrodes may be such that the particles travel in a trajectory that is along at least two directions of a Cartesian coordinate system. The particles may travel directly to a collector that may be the input of the pelletizer. The powder may be melted in the pelletizer, and an electromagnetic pump may pump the melt to transport it. The melt may be treated with gases to become fuel and injected into the electrodes.

In another embodiment, the ignition product powder may be transported predominantly along one axis of the Cartesian coordinate system to be collected on at least one collection electrode. The powder may then be transported to the pelletizer by at least one transporter such as a mechanical and electrostatic transporter. The electrodes may comprise barrier electrodes wherein a charge is maintained on the surface of the collection electrodes. The collected charged powder may be maintained in a charged state. The power may be transported by a series of electrically isolated collection electrodes wherein electrode n+1 of the series of integer n electrodes is electrically charged by the application of a voltage while electrode n is discharged or oppositely charged such that the powder is attracted to electrode n+1 and no longer attached or is repelled by electrode n. The series of electrodes may be sequentially activated and deactivated electrically to move the powered to a desired location such as to the pelletizer. The n series of electrodes may move the powder in any desired direction such as vertically in the case that the standard design with the light directed vertically is operated in an upside-down orientation. In an embodiment, the series of electrodes may move the powder to a plasma-containing region of the cell wherein the augmented plasma railgun recovery system of the disclosure may complete the recovery of the powder. In the case that the plasma conductivity is low, an electrostatic precipitator may be used to collect the ignition products or direct them to a region that has a high conductivity. In a region of high plasma conductivity, the ignition product may be recovered by at least one of a barrier electrode electrostatic precipitator and an augmented plasma railgun recovery system.

The electrostatic precipitator (ESP) may comprise a high voltage power supply that may be run off of at least one of the photovoltaic (PV) converter and the power conditioner of the PV converter power. The power supply may supply power between the ESP electrodes to cause the electrostatic precipitation. In an embodiment, the ESP precipitator further comprises a set of electrodes such as a central electrode such as a wire electrode 88 (FIG. 2I23) of a polarity and at least one counter electrode 89 of opposite polarity. The wire electrode may create a coronal discharge with the counter electrode(s). The wire may comprise objects such as sharp needles to intensify the electric field. The counter electrodes such as the collection or precipitator electrodes may comprise at least one of the cell walls and the inlet or region around the inlet to the pelletizer. The ESP power supply such as a high voltage power supply may apply a high negative voltage to the central electrode such as the wire electrode, and the collection electrodes such as at least one of the cell walls and inlet may be grounded. The particles such as ones comprising silver become positively charged and are collected on the negative wire or rod. In an alternative embodiment, the high voltage power supply may apply a high positive voltage to the central electrode such as the wire or rod electrode, and the collection electrodes such as at least one of the cell walls and inlet may be grounded such that the positively charged silver particles collect on the cell walls and inlet. (The opposite occurs for the two cases, when the particles are negatively charged.) The collected particles may be transported to the inlet to the pelletizer. The transport may by at least one of gravity, electrostatic fields, electromagnetic fields, and mechanically. Alternatively, at least one electrode may comprise at least one wire (88 of FIG. 2I23), wire gauze (89 of FIG. 2I23), or a wire mesh that is substantially non-blocking of the emission of the cell to the PV converter. The electrodes may comprise a refractory conductor such as a refractory metal such as Mo or W such that cooling may be achieved predominantly by radiation. In an exemplary embodiment, a central wire was charged negatively to between 500 V and 1500 V while two counter electrode plates at a radius of 10 cm were grounded. The cell pressure was about 30 to 50 mTorr. Positively charged silver particles were electrostatically collected at 50 mA on the negative central electrode. The particles were neutralized upon contacting the central wire, and the neutralized sliver particles fell by gravity to a collector. The electric field strength may be increased to provide a higher ESP force and ESP effect by decreasing the spacing of the electrodes, and by increasing the applied ESP electrode voltage. The time of action and the ESP effect may be increase by increasing the vertical length of the electrodes along the trajectory of the ignition products.

In an embodiment, the cell 26 may comprise a transmission line or waveguide designed to have impedance that reflects the plasma and particles at a desired distance from the blast region based on the impedance matching of the plasma medium for propagating alternating frequency power along the cell. The alternating frequency may be characteristic of the ignition waveform that may be controlled. The dimensions of the cell may be controlled. The controls may facilitate plasma power propagation into a region of the cell until the impedance for the plasma power propagation is no longer matched to the cell impedance. The plasma impedance may be controllably changed through the conductivity of the plasma that may drop along the propagation path due to ion-electron recombination. The plasma propagation may be halted or reflected. The recovery of the ignition products may be at least partially facilitated by the halting or the reflection of the plasma.

At least one polarity of electrode may comprise a UV mirror surface such as those of the disclosure such as $MgF_2$ coated Al to at least one of reflect the emission of the cell and prevent the ignition product from adhering. In the latter case, another anti-adhering coating comprises sapphire. In another embodiment, the walls may comprise aluminum foil such as Al foil that may comprise a thin protective oxide coat as an anti-adhering surface. The walls may comprise at least one of molybdenum such as Mo foil with an oxide coat, tungsten carbide (WC), WC coated metal such as WC-coated Mo or W, tungsten, Ta, Nb, TaW, carburized metal such as steel or related alloys, anodized aluminum, alumina such as alpha alumina that may be sputter coated on a substrate such as stainless steel, graphite, Grafoil, graphene, and graphite coated conductor such as graphite coated Cu, Mo, or W as an anti-adhesion material. In an embodiment, the walls may comprise carbon-coated support such as a ceramic or metal support. The carbon may comprise graphite. The graphite may be applied by means known in the art such as a liquid spray that is cured on the support. Other means comprise vapor deposition, sputtering, chemical deposition, and others known in the art. The walls may comprise a support such as a metal coated with graphite that may be pyrolytic graphite. The coating may be with pyrolytic graphite tiles. The coating may be boron carbide (e.g. $B_4C$), fluorocarbon polymer such as Teflon (PTFE), zirconia+8% yttria, Mullite, Mullite-zirconia, or Mullite-yttria stabilized zirconia (YSZ) that may operate at high temperature. The coating such as one on high-temperature stainless steel or copper may comprise anodized aluminum. The aluminum may be applied by coating methods known in the art such as thermal spray or arc spraying and electroplating. The aluminum coating may be anodized. The anodization may be performed in an electrolysis cell such as one comprising a sulfuric acid electrolyte. In an embodiment, the cell walls such as ones comprising surfaces that resist wetting or adhesion of the ignition product may be angled or tilted from the direction of the propagation trajectory of the ignition product particles to facilitate the ignition product particles deflection from the walls without adhesion. At least one of the cell walls and cell top may comprise a corrugated surface of a material such a anodized aluminum or graphite that resists ignition product adhesion so that the ignition product particles such as molten Ag particles do not impact perpendicularly and adhere. In an embodiment, the walls may comprise a foil that may be stretched to absorb impact from particles from the blast to prevent them from embedding. In another embodiment, the foil may be angled relative to the blast direction to deflect the particles to avoid adhesion. In an embodiment, the walls may comprise different materials in order to provide desired selective capabilities such as heat resistance and reflection of UV light in desired cell regions. For example, the top portion of the cell walls nearer the PV converter may comprise $MgF_2$ coated Al to reflected UV light, and the bottom portion of the cell walls at the electrodes and ignition product inlet may comprise graphite, Mo, or tungsten carbide to operate at high temperature. The high temperature of the bottom section of the walls may facilitate returning the ignition product close to or above its melting temperature to reduce the input energy to regenerate the fuel shot by the pelletizer. A hydrogen atmosphere, low oxygen partial pressure due to pumping, or an oxygen getter may protect the oxidizable components such as graphite and aluminum from oxidation. The same applies to oxidizable electrode components.

The ESP system may further comprise a barrier electrode section to charge the particles. In an embodiment, at least one of the walls and surface to the photovoltaic (PV) converter may be positively charged to repel positively charged silver particles to prevent them from adhering to the cell wall or PV converter. The particles may be positively charged by a high voltage coronal discharge. In another embodiment, at least one of the walls and the surface of the photovoltaic (PV) converter may comprise a barrier electrode or may have a barrier electrode between the region of ignition and the wall or PV converter. The barrier electrode may be charged to the same polarity as the ignition product particles to repel them and prevent adhesion to the wall or converter surface. In an exemplary embodiment, the particles such as silver particles are positively charged, and the barrier electrode is positively polarized to repel the particles.

In another embodiment, eddy currents are induced in the particles by time-varying fields such as radio frequency fields that comprise excitation fields. The eddy currents may induce a field to be produced by the particles. The induced field may interact with the excitation field to cause the particles to undergo at least one of trapping and translation. The excitation field may be controlled to achieve a translation away from at least one of the cell walls and the PV converter to prevent adhesion. At least one antenna and RF generator may apply the RF field. The at least one antenna may comprise a set of electrodes. The antenna may comprise an RF coil. The coil and RF generator or power source may comprise an inductively coupled heater. To prevent adhesion on at least one of the cell wall and the PV converter, the coil may surround the region where the ignition product is desired to be confined. In an embodiment, a standing electromagnetic wave is maintained in an inductively coupled cavity formed by opposing antennae orientations that induces eddy currents in the metallic particles and traps them in the cavity. The trapping action of the radio frequency field on the particles reduces their velocities acquired from the ignition blast so that gravity may eventually make them drop to the bottom of the cell to be collected into the inlet of the pelletizer. The system to prevent particle adhesion may comprise an RF source and at least one antenna to induce eddy currents in the particles and may further comprise an applied field such as at least one of a static magnetic field and a static electric field. The static magnetic field may be applied by at least one of a permanent and an electromagnet. The static electric field may be applied by a set of electrodes and a power supply. The frequency of the antennae-excited electromagnetic trapping system may be in at least one frequency range of about 1 Hz to 100 GHz, 1 kHz to 10 GHz, and 100 kHz to 100 MHz. The frequency may be selected based on the particle size. A higher frequency may be applied for smaller particles. One skilled in the art may test different coil geometries, power, and frequency to achieve a force such as levitation of the metal powder ignition product or its expulsion from the top cell region.

In an embodiment, ionized particles of the plasma formed by ignition of the solid fuel are prevented from electrostatically adhering to surfaces of the cell such as the window of the PV converter, the PV converter, and the cell walls. In an embodiment comprising magnets such as 8c (FIG. 2I10) that produce a magnetic field perpendicular to the direction of the ignition and plasma current across the electrodes, at least a portion of the ionized particles are swept away from the window of the PV converter and the PV converter by the Lorentz force, and at least a portion of the remaining unionized particles do not electrostatically adhere to the surfaces due to their electrical neutrality. The neutral particles may elastically scatter from the surfaces. In an embodiment, the particles are further prevented from electrostatically adhering to the surfaces by electrical neutralization by means such as grounding. The grounding may be achieved by using a conductor in contact with the unneutralized particles. The material may have at least one of the characteristics of a low work function, high surface area, high thermionic activity, and high photoelectric activity. The material may comprise a metal that is cessiated. In an embodiment, a means to neutralize the charged particles such as positively charged particles comprises a source of neutralizing electrons such as at least one an electrical ground path and free electron injector. The injection of free electrons may be by means such as an electron beam and a photocathode. The photocathode may emit photoelectrons due to the illumination with the appropriate high-energy light from the plasma. The photocathode may be one of the disclosure such as GaN. Neutralization may also be achieved by using a heated filament that emits electrons when heated such as a W or thoriated W filament. A positive bias may be applied between an accelerating grid and the filament to improve the amount of current injected into the plasma to neutralize it.

In an embodiment, at least one of the photovoltaic (PV) cells and panels are tilted away from being in the transverse plane to the propagation direction of the particles from the ignition of the solid fuel shots. The array of at least one of the PV cells and panels may be arranged as a Venetian blind such that the moving particles from the ignition graze them at an angle. In an embodiment, the grazing incidence prevents the particles from adhering to the at least one of the PV cells and panels. The particles may elastically scatter. Small particles have a high surface tension to form spheres that may facilitate the elastic scattering and non-adherence. The tilted PV cells and panels may elastically deflect or scatter the particles to a non-adhering surface such as a graphite, aluminum, zirconium, or WC surface. The non-adhering surface may comprise vertical slats connecting the upper edge of one member and the lower edge of a contiguous member of the array arranged as a Venetian blind configuration. The particles may drop or be transported from the non-adhering surface to the inlet of the pelletizer. The grazing incidence feature of the PV converter may be applied in combination with other methods of the disclosure to prevent adhesion of the particles such as the use of crossed current such as ignition current and magnetic fields applied by magnets to cause a Lorentz force deflection of the particles, and the PV cells may be each coated with an non-adhering surface such as aluminum. In an embodiment, the tiled or Venetian blind PV configuration may increase the surface area of the PV converter to permit higher power output.

In an embodiment, the plasma and plasma emission are incident each of a series of mirrors such as UV mirrors of the disclosure at shallow incidence angle. The shallow or grazing angle results in a much higher reflection coefficient than that of a more normal incidence angle. The series of mirrors selectively separates the light from the particles. The particles may undergo inelastic collisions with the mirrors to be removed from the plasma while the light is reflected through the series of mirrors to be directed onto the PV converter. The particles comprising the solid fuel ignition product are collected at the inlet to the pelletizer. The collection may be by gravity flow or other means of the disclosure.

In another embodiment, the collection electrode may comprise a mechanical transporter such as a bucket elevator. Alternatively, the transporter may comprise a conveyor belt wherein the powder may adhere electrostatically and be transported mechanically to the pelletizer. Charged electrodes may generate an electrostatic field that induces a mirror dipole in the conducting particles and holds the particles on the belt electrostatically by the charge and induced charge interaction. The belt may be charged by the mechanism of a van de Graaf generator. The conveyor may comprise a van de Graaf generator. Alternatively, the fields may be created with current carrying wires that alternate in current direction and are embedded in an insulator. Such a transporter is well known in the art of photocopying wherein an electrostatic binding plate binds and transports paper that has an oppositely induced polarization charging. The powder may be released where desired such as into the pelletizer by discharging the fields. The discharge may be achieved with illumination as in the case of the selenium plate of photocopying technology. In another embodiment, particles may adhere to a magnetized conveyor such as one comprising a belt that comprises surface electrodes that supply current through the particles when in contact with the conveyor surface. The particle current gives rise to a particle magnetic field that interacts with the magnetization of the conveyor belt to cause the particles to adhere. The particles may be released by terminating the current through the conducting particles. In both the electrostatic and magnetic embodiments, the particle may fly off of the belt due to the centrifugal force at top belt rollers. They may also be mechanically removed with a scraper for example. In an embodiment, the mechanical transporter such as the conveyor belt may replace the railgun injector shown in FIG. 2I6 wherein fuel shot replaces the particles of the present disclosure.

Other embodiments are anticipated by the disclosure by mixing and matching aspects of the present embodiments of the disclosure such as those regarding recovery systems, injection systems, and ignition systems. For example, the shot or pellets may drop directly into the roller electrodes from the pelletizer or shot dripper of the pelletizer from above the rollers (FIGS. 2H1-2H4 and 2I1-2I9). The ignition products may flow into the pelletizer that may be above or below the rollers. Shot may be formed below and transported above the rollers. Metal may be pumped above the rollers where shot may be made, and the shot may be dropped or injected into the rollers. In another embodiment, the ignition product may be transported to the pelletizer that may be above the rollers. The PV panels may be oriented to maximize the capture of the light wherein other positions than that shown for the photovoltaic converter 26a FIGS. 2H1, 2I1, and 2I2 are anticipated and can be determined by one skilled in the art with routine knowledge. The same applies to the relative orientation of other systems and combinations of systems of the disclosure.

Figure 23:
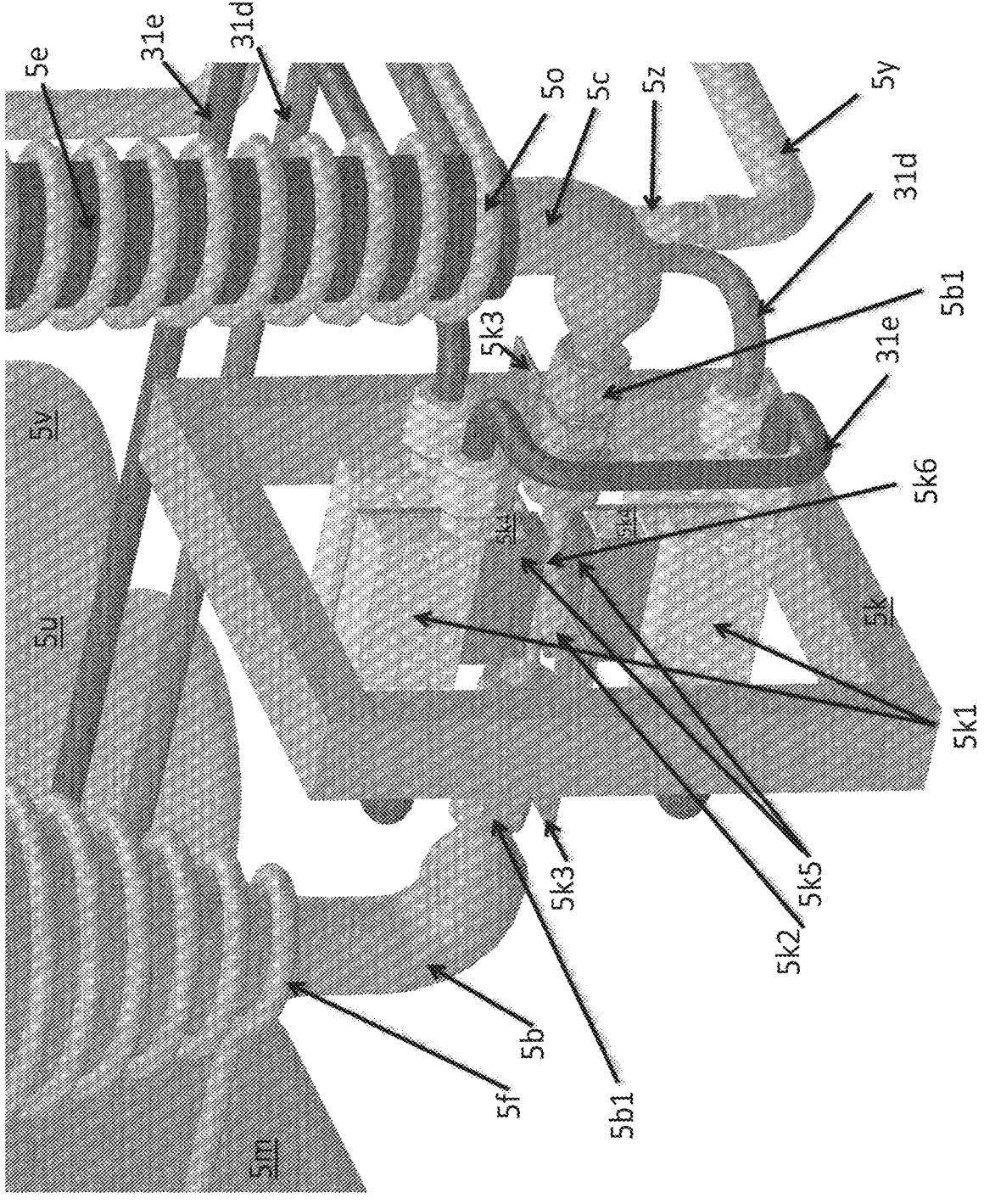
FIG. 23 (also referred to herein as 2I16) is a schematic drawing of a SF-CIHT cell power generator showing the details of an electromagnetic pump in accordance with an embodiment of the present disclosure.

In an embodiment shown in FIGS. 2I10-2I23, the ignition system comprises a pair of stationary electrodes 8 having a gap 8g between them that establishes an open circuit, a source of electrical power to cause ignition of the fuel 2, and a set of bus bars 9 and 10 connecting the source of electrical power 2 to the pair of electrodes 8. At least one of the electrodes and bus bar may be cooled by a cooling system of the ignition system. The gap 8g may be filled with conductive fuel with the concomitant closing of the circuit by the injection of molten fuel from the injection system such as that comprising an electromagnetic pump 5k and a nozzle 5q. The injected molten fuel may comprise spherical shots 5t that may be at least one of molten, partially molten, and molten with a solidified shell. The solid fuel may be delivered as a stream of shots, a continuous stream, or a combination of shot and a stream. The molten fuel feed to the electrodes may further comprise a continuous steam or intermittent periods of shots and continuous steam. The source of electricity 2 may comprise at least one capacitor such as a bank of capacitors charged by the light to electricity converter such as the PV or PE converter. The charge circuit may be in parallel with the source of electricity 2 and the electrodes 8. In another embodiment, the charging circuit may be in series with the source of electricity 2 and the rollers 2 wherein a switch connects the charging circuit to the source of electricity when the electrodes are in an open circuit state. The voltage may be in the range of about 0.1 V to 10 V. The desired maximum voltage may be achieved by connecting capacitors in series. A voltage regulator may control the maximum charging voltage. The peak current may be in the range of about 100 A to 40 kA. The desired maximum current may be achieved by connecting capacitors in parallel with a desired voltage achieved by parallel sets connected in series. The ignition circuit may comprise a surge protector to protect the ignition system against voltage surges created during ignition. An exemplary surge protector may comprise at least one capacitor and one diode such as Vishay diode (VS-UFB130FA20). The voltage and current are selected to achieve the ignition to produce the maximum light emission in the region that the power converter is selective while minimizing the input energy. An exemplary source of electrical power comprises two capacitors in series (Maxwell Technologies K2 Ultracapacitor 2.85V/3400F) to provide about 5 to 6 V and 2500 A to 10,000 A. An exemplary source of electrical power comprises two capacitors in series (Maxwell Technologies K2 Ultracapacitor 2.85V/3400F) to provide about 5 to 6 V and 2500 A to 10,000 A. Another exemplary source of electrical power comprises four capacitors in series (Maxwell Technologies K2 Ultracapacitor 2.85V/3400F) to provide about 9.5 V and about 4 kA. An exemplary source of electrical power comprises two sets of two capacitors in series (Maxwell Technologies K2 Ultracapacitor 2.85V/3400F) that are connected in parallel to provide about 5 to 6 V and 2500 A to 10,000 A.

Figure 13:
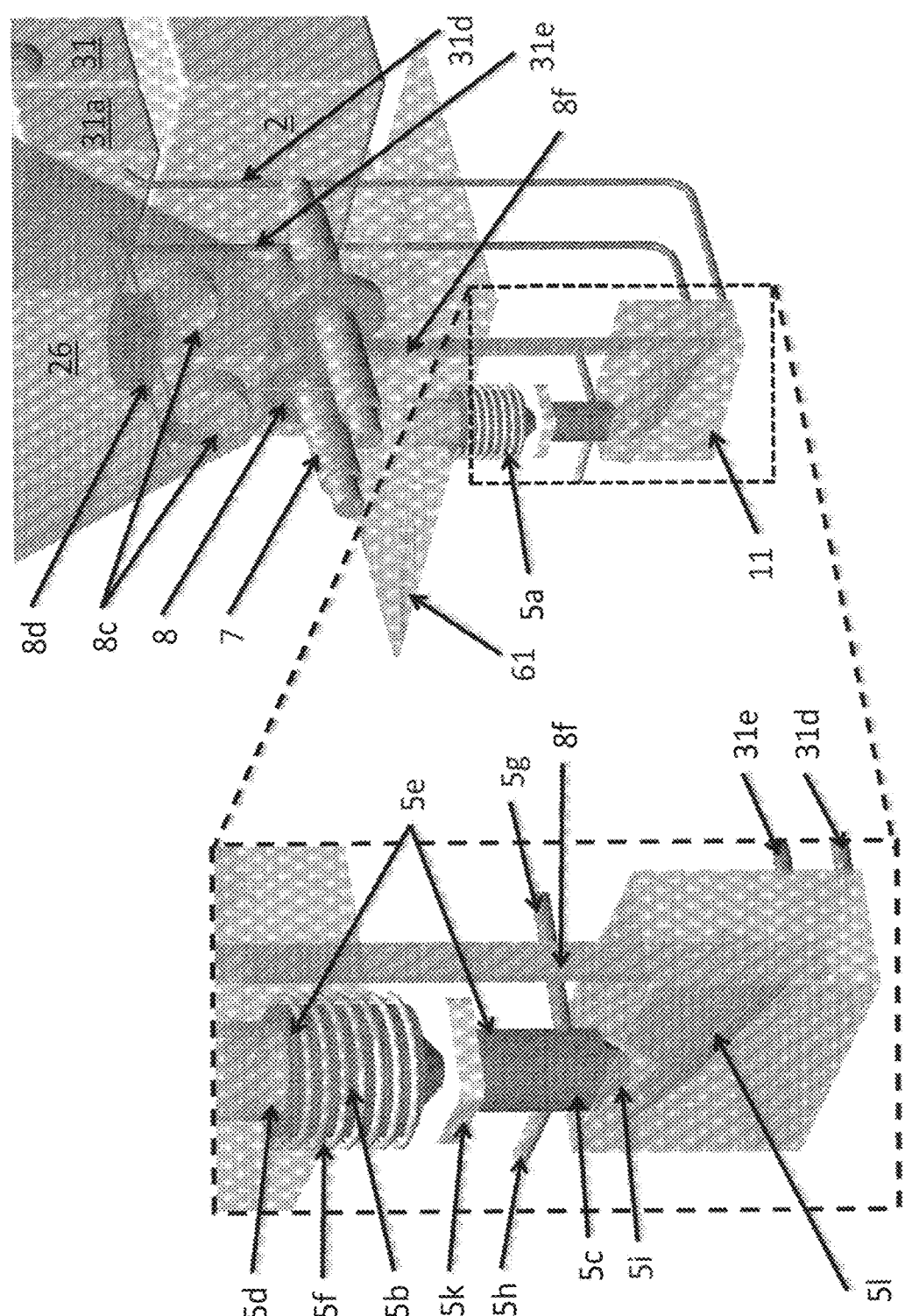
FIG. 13 (also referred to herein as 2I6) is a schematic drawing of a SF-CIHT cell power generator showing a cell capable of maintaining a vacuum, an ignition system having a railgun shot injection system fed directly from a pelletizer, augmented plasma railgun and gravity recovery systems, the pelletizer, and a photovoltaic converter system showing details of the injection system having a water slide single-file feed, the ignition system, the ignition product recovery systems, and the pelletizer to form shot fuel having an electromagnetic pump between vessels in accordance with an embodiment of the present disclosure.
Figure 14:
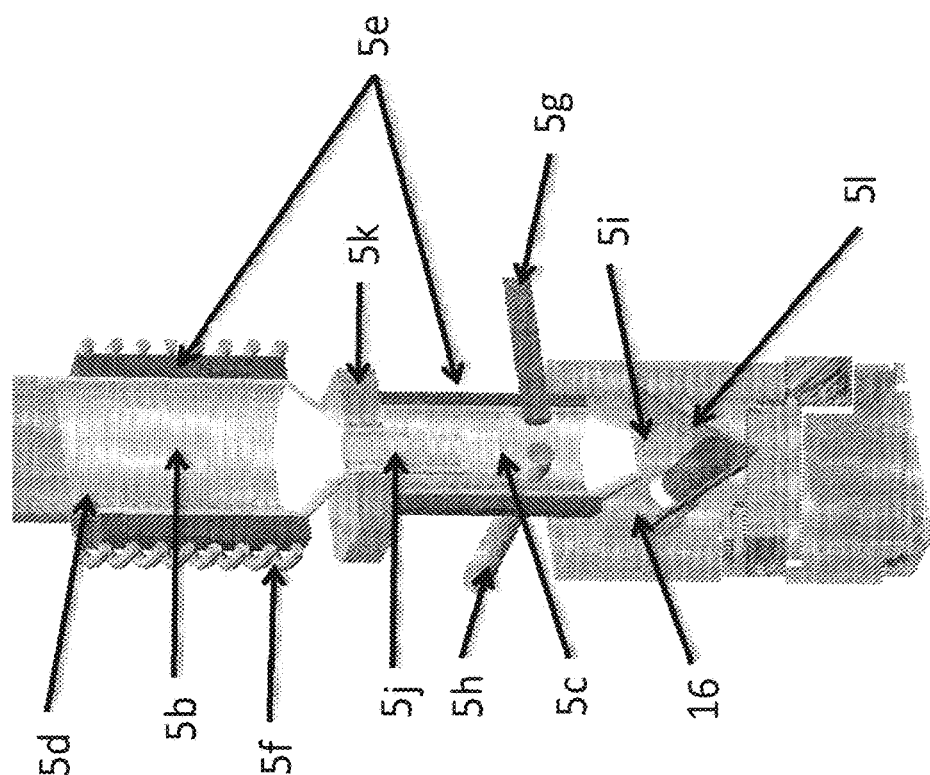
FIG. 14 (also referred to herein as 2I7) is a schematic drawing of a SF-CIHT cell power generator showing the cross section of the pelletizer shown in FIG. 2I6 in accordance with an embodiment of the present disclosure.

In an embodiment shown in FIGS. 2I13 and 2I14, the manifold and injectors comprise a pipe bubbler 5z running longitudinally inside of at least one of the first vessel 5b and the second vessel 5c. In an embodiment, the pipe bubbler 5z comprises a closed channel or conduit for gas and at least one perforation along its length to delivery gas into the fuel melt surrounding it. In an embodiment, the pipe bubbler has perforations or ports distributed over its surface along its length to deliver gas over its surface along its length. The pipe bubbler may be centerline inside at least one vessel. The centerline position may be maintained by spoke supports along the pipe bubbler. At its input end, the pipe bubbler may enter the inside of the first vessel 5b at the first vessel's open inlet and may run through at least one of the first vessel 5b and the second vessel 5c such that it ends before the nozzle 5q (FIG. 2I13). In another embodiment shown in FIG. 2I14 that avoids the pipe bubbler running through an electromagnetic pump 5k, the pipe bubbler runs in at least one of the first or second vessel without running through the pump 5k. The pipe bubbler 5z may make a penetration into the vessel at a wall region such as at a joint or elbow such that of the second vessel 5c (FIG. 2I16) and may terminate before entering a pump 5k (FIG. 2I14). The pipe bubbler may be supplied with at least one hydrogen gas line, liquid or gaseous water line, and a common hydrogen and liquid or gaseous water line such as a line 5y from a manifold connected to a source of at least one of $H_2$ and $H_2O$ and 5v and 5u.

In an embodiment, at least one of the first vessel 5b and the second vessel 5c may comprise a coil having a coiled pipe bubbler 5z that may increase the residence time to inject at least one of $H_2O$ and $H_2$ into the fuel melt. At least one of the pelletizer components such as the vessels 5b and 5c, the pump tube, and the pipe bubbler 5z may be comprised of a metal wherein the fuel melt may be heated indirectly. The pipe bubbler may be positioned inside of the vessels with setscrews through the walls of the vessels. For example, the pipe bubbler centering may be achieved by the adjusting the relative protrusion length of each of three screws set 120° apart around the circumference of the vessel.

The pelletizer may further comprise a chamber that receives melt from a vessel such as the first vessel. The chamber may comprise at least one bubbler tube such as a plurality of bubbler tubes in the chamber and may further comprise a manifold to feed the bubbler tubes. The water may be supplied to the chamber as steam to be incorporated into the melt such as molten silver. The steam may be preheated to at least the temperature of the chamber to avoid heat loss. The steam may be preheated by heat exchange from a heated section of the pelletizer such as the first vessel. The steam may be heated with a heater such as an inductively coupled heater. The at least one of steam and hydrogen treated melt such a molten silver may flow out of the chamber to the second vessel that may comprise tubing that may be heated with a heater such as an inductively coupled heater. The tubing may penetrate the cell wall and terminate in a nozzle 5q that injects the melt into the electrodes. The chamber may comprise a pump such as an electromagnetic pump in at least one of the chamber inlet and outlet.

In the case that the pipe bubbler attaches to both of the $H_2$ and $H_2O$ gas tanks, lines 5u and 5v, respectively, may attach to a gas mixer such as a manifold that then attaches to the pipe bubbler through a connecting pipe 5y (FIG. 2I14). In another embodiment, the pipe bubbler may comprise a plurality of pipe bubblers. Each may be independently connected to a separate gas supply such as the $H_2$ and $H_2O$ gas tanks by lines $5u$ and $5v$, respectively. The pipe bubbler may be comprise multiple sections that can be at least one of connected and disconnected during assembly and disassembly such as during fabrication and maintenance. The pipe bubbler may comprise suitable joints to achieve the connections. One first pipe bubbler section may serve to deliver gas into the melt up to the electromagnetic (EM) pump. A second pipe bubbler section may perform at least one of channel and deliver the gases along the EM pump section, and a third pipe bubbler section may deliver gases along the second vessel $5c$. In another embodiment, the multi-section pipe bubbler comprises a first section inside the first vessel running though its inlet and along its length and a second pipe bubbler section inside of the second vessel $5c$ that terminates before the nozzle $5q$. In an embodiment, the pipe bubbler may enter the vessel after the pump $5k$ such that the pressure from the injected gases does not cause the melt to reverse flow. The bubbler $5z$ may enter the vessel through a joining section such as an elbow that may connect dissimilar vessel materials such as metal and quartz (FIGS. 2I14 and 2I16) that are connected by joints $5b1$ of the disclosure. The inductively coupled heater may comprise two full coils. The first inductively coupled heater coil $5f$ heats the first vessel and the second inductively coupled heater coil $5o$ heats the second vessel $5c$. The pipe bubbler may comprise a metal or alloy resistant to reaction with $H_2O$ at the operating temperature, capable to maintaining its integrity and avoiding silver alloy formation at the melt temperature. Suitable exemplary materials that lack $H_2O$ reactivity with sufficient melting points are at least one of the metals and alloys from the group of Cu, Ni, CuNi, Hastelloy C, Hastelloy X, Inconel, Incoloy, carbon steel, stainless steel, chromium-molybdenum steel such as modified 9Cr-1Mo-V (P91), 21/4Cr-1Mo steel (P22), Co, Ir, Fe, Mo, Os, Pd, Pt, Re, Rh, Ru, Tc, and W.

The pipe bubbler may be attached at the input end to at least one of the $H_2$ and $H_2O$ gas tanks by lines $5u$ and $5v$, respectively. Alternatively, $H_2O$ is provided as steam by $H_2O$ tank, steam generator, and steam line $5v$. In an embodiment, the pelletizer comprises a steam generator $5v$ for adding the $H_2O$ to the melt such as silver melt in the vessel such as at least one of $5b$ and $5c$ that may comprise quartz vessels. In an embodiment, the steam generator comprises a capillary wick system that has a heat gradient to create steam at one end, and wick water out of a reservoir from the opposite end. In an embodiment, the steam generator comprises a high surface area heated material such as a metal foam or mat such as ones comprising nickel or copper to provide boiling sites for the conversion of water from a $H_2O$ reservoir into steam for hydrating the shot. Other exemplary high surface area materials comprise ceramics such as zeolite, silica, and alumina. The steam generator may be run under pressure to increase the steam temperature and heat content. The pressure may be obtained by controlling the size of the steam-flow outlet to control a restriction to flow such that steam is generated at a rate relative to the restricted output flow to cause a desired steam pressure. The line may comprise a pressure reducer. The steam generator may comprise a condenser to condense water droplets and low-temperature steam. The condensed water may reflux back into the cell. The steam may be flowed through the pipe bubbler $5z$ and injected into the melt such as molten silver that is injected into the electrodes $8$. In another embodiment such as one wherein the gaseous water is injected into the plasma by a gas injector of the disclosure, the pressure may be maintained low such as in at least one range of about 0.001 Torr to 760 Torr, 0.01 Tor to 400 Torr, and 0.1 Torr to 100 Torr. At least one of low heat, chilling liquid water, maintaining ice, and cooling ice may be applied to the water in a reservoir or tank such as $5v$ operated under reduced pressure to form low-pressure gaseous water. The chilling and ice may be maintained with a chiller such as $31$ and $31a$. The reduced pressure may be provided by the vacuum pump $13a$. In an embodiment, the wt % of water in the silver may be optimal for the hydrino reaction wherein the rate increases with $H_2O$ wt % starting from pure metal plasma, reaches a maximum rate and hydrino yield at the optimal wt %, and may decrease with further $H_2O$ plasma content due to competing processes such as hydrogen bonding of HOH to lower the nascent HOH concentration and recombination of atomic H to lower the atomic H concentration. In an embodiment, the $H_2O$ weight percentage (wt %) of the ignition plasma that comprises the conductive matrix such as a metal such as silver, silver-copper alloy, and copper is in at least one wt % range of about $10^{-10}$ to 25, $10^{-10}$ to 10, $10^{-10}$ to 5, $10^{-10}$ to 1, $10^{-10}$ to $10^{-1}$, $10^{-10}$ to $10^{-2}$, $10^{-10}$ to $10^{-3}$, $10^{-10}$ to $10^{-4}$, $10^{-10}$ to $10^{-5}$, $10^{-10}$ to $10^{-6}$, $10^{-10}$ to $10^{-7}$, $10^{-10}$ to $10^{-8}$, $10^{-10}$ to $10^{-9}$, $10^{-9}$ to $10^{-1}$, $10^{-8}$ to $10^{-2}$, $10^{-7}$ to $10^{-2}$, $10^{-6}$ to $10^{-2}$, $10^{-5}$ to $10^{-2}$, $10^{-4}$ to $10^{-1}$, $10^{-4}$ to $10^{-2}$, $10^{-4}$ to $10^{-3}$, and $10^{-3}$ to $10^{-1}$. In an embodiment wherein the shot comprises copper alone or with another material such as a metal such as silver, the cell atmosphere may comprise hydrogen to react with any copper oxide that may form by reaction with oxygen formed in the cell. The hydrogen pressure may be in at least one range of about 1 mTorr to 1000 Torr, 10 mTorr to 100 Torr, and 100 mTorr to 10 Torr. The hydrogen pressure may be one that reacts with copper oxide at a rate that it forms or higher and below a pressure that significantly attenuates the UV light from the fuel ignition. The SF-CIHT generator may further comprise a hydrogen sensor and a controller to control the hydrogen pressure in the cell from a source such as $5u$.

The stationary electrodes $8$ of FIGS. 2I10-2I23 may be shaped to cause the plasma and consequently the light emitted for the plasma to be projected towards the PV converter $26a$ (FIG. 2I2). The electrodes may be shaped such the molten fuel initially flows through a first electrode section or region $8i$ (FIG. 2I12) comprising a neck or narrower gap to second electrode section or region $8j$ having a broader gap. Ignition preferentially occurs in the second section $8j$ such that plasma expands from the second electrode section $8j$ towards the PV converter $26a$. The necked section may create a Venturi effect to cause the rapid flow of the molten fuel to the second electrode section. In an embodiment, the electrodes may comprise a shape to project the ignition event towards the PV converter, away from the direction of injection. Suitable exemplary shapes are a minimum energy surface, a pseudosphere, a conical cylinder, an upper sheet parabola, an upper half sheet hyperbola, an upper half sheet catenoid, and an upper half sheet astroidal ellipsoid with the apex truncated as a suitable inlet comprising the first section. The electrodes may comprise a surface in three dimensions with a split that may be filled with insulation $8h$ between half sections (FIG. 2I12) to comprise the two separated electrodes $8$ having an open circuit gap $8g$. The open circuit is closed by injection of the melt shot causing contact across the conductive parts of the geometric form comprising the gap $8g$. In another embodiment, the electrodes may comprise a rectangular section of the three-dimensional surface that is split. In either embodiment, the split $8h$ may be formed by machining away material such that the geometric form remains except for the missing material comprising the split 8*h*. In an embodiment, the velocity of the shot may be controlled to be sufficient to cause the plasma and emitted light to be in region 8*l* directed to the PV converter 26*a*. The power of the electromagnetic pump 5*k* and nozzle orifice size may be controlled to control the pressure at the nozzle 5*q* and the velocity of the shot.

Control of the site of ignition on the electrode surface may be used to control the region in the cell and direction of the plasma expansion and light emission. In an embodiment, the electrode 8 is shaped to mold the melt shot 5*t* to a geometric form having a focus region with reduced resistance to cause the current to concentrate in the focus region to selectively cause concentrated ignition in the focus region. In an embodiment, the selective concentrated ignition causes at least one of the plasma expansion and light emission into a region of the cell 8*l* directed towards the PV converter 26*a*. In an embodiment, the electrodes 8 may be partially electrically conductive and partially electrically insulated. The insulated section 8*i* may guide the fuel from the site of injection 8*k* into the conductive section 8*j* to be ignited such that the plasma preferentially expands into the region 8*l* towards the PV converter 26*a*. In an embodiment, the high current that causes ignition is delayed in time from the time that the melted shot initially completes the electrical connection between the electrodes. The delay may allow the shot melt to travel to a part of the electrodes 8*j* on the opposite side of the injection site 8*i*. The subsequent ignition on the opposite side 8*j* may direct the plasma and light towards the PV converter 26*a*. The delay circuit may comprise at least one of an inductor and a delay line.

In an embodiment, the electrodes may comprise a minimum energy surface such as a minimum energy surface, a pseudosphere, a conical cylinder, an upper sheet parabola, an upper half sheet hyperbola, an upper half sheet catenoid, and an upper half sheet astroidal ellipsoid with the apex truncated. "Dud" melt being absent hydrogen and $H_2O$ such that it is not capable of undergo ignition may be injected into the electrodes. The melt may distribute over the electrode surface according to the minimum energy. The distribution may restore the original electrode surface to repair any ignition damage. The system may further comprise a tool to reform the electrode surface to the original shape following the deposition of melt. The tool may be one of the disclosure such as a mechanical tool such as a mill or a grinder or an electrical tool such as an electrical discharge machining (EDM) tool. The fuel metal may be removed with a mechanical tool such as a wiper, blade, or knife that may be moved by an electric motor controlled by a controller.

In an embodiment, the electrodes may comprise a metal such as highly electrically conductive metal such as copper that is different from the conductive matrix of the fuel such as silver. Excess adherence of fuel metal such as silver to the electrodes may be removed by heating the electrode to a temperature that exceeds the melting point of the fuel metal but is below the melting point of the electrode metal. Maintaining the temperature below the melting point of the electrode may also prevent alloy formation of the electrode and fuel metals such as Cu and Ag. In this case, the excess metal may flow off of the electrodes to restore the original form. The excess metal may flow into the pelletizer to be recycled. The electrode heating may be achieved by using the heat from at least one of the ignition process using power from the source of electrical power 2 and the power from the formation of hydrinos. The heating may be achieved by reducing any cooling of the electrodes by the electrode cooling system.

In an embodiment, the electrodes may comprise a conductive material that has a higher melting point than the melting point of the shot. Exemplary materials are at least one of the metals and alloys from the group of WC, TaW, CuNi, Hastelloy C, Hastelloy X, Inconel, Incoloy, carbon steel, stainless steel, chromium-molybdenum steel such as modified 9Cr-1Mo—V (P91), 21/4Cr-1Mo steel (P22), Nd, Ac, Au, Sm, Cu, Pm, U, Mn, doped Be, Gd, Cm, Tb, doped Si, Dy, Ni, Ho, Co, Er, Y, Fe, Sc, Tm, Pd, Pa, Lu, Ti, Pt, Zr, Cr, V, Rh, Hf, Tc, Ru, doped B, Ir, Nb, Mo, Ta, Os, Re, W, and C and alloys. The electrodes may be operated at a temperature above the melting point of the shot such that the shot flows off the electrodes rather than solidifying and blocking the gap 8*g*. In the case of shot comprising Ag, the electrode operating temperature may be above 962° C. In an embodiment, the electrodes may comprise a conductive material that has a higher melting point than the boiling point of the shot. Exemplary materials are WC, refractory metals, Tc, Ru, doped B, Ir, Nb, Mo, Ta, Os, Re, W, and C. The electrodes may be operated at a temperature above the boiling point of the shot such that the shot flows and boils off the electrodes rather than solidifying or wetting the electrodes and blocking the gap 8*g*. In the case of shot comprising Ag, the electrode operating temperature may be above 2162° C. The high operating temperature may provide heat removal from the electrodes by at least one of conduction and radiation.

In an embodiment, the electrodes 8 may comprise a startup electrode heater to elevate the temperature of the electrodes. The electrodes may comprise a plurality of regions, components, or layers, any of which may be selectively heated by at least one heater or may comprise a heater. The heating may reduce the adhesion of the shot. The heater may comprise a resistive heater or other heater of the disclosure. In an embodiment for startup, the electrodes comprise a startup heater that heats them to prevent the shot from adhering. The electrode heater may comprise the source of electrical power 2 and a means to short the electrodes such as a movable conductive bridge between electrodes or a means to move the electrodes into contact to short them until the heating is achieved. Any electrode cooling may be suspended until the electrodes are trending over the operating temperature such as in the range of 100° C. to 3000° C. for suitable materials of the disclosure. The electrode temperature may be maintained below the melting point of the electrodes. The cooling may be suspended during the period of electrode warm-up during startup by pumping off the coolant. The chiller pump may pump off the coolant. The electrode may be operated at least one temperature range below the melting point of the shot, above the melting point of the shot, and above the boiling point of the shot wherein the electrodes comprise a material suitable for such temperature operation.

In an embodiment, the electrodes may comprise a bilayer. The bottom layer on the side 8*k* may comprise an insulator such as a ceramic such as an alkaline earth oxide, alumina, anodized aluminum, or zirconia, and the top layer on the side of 8*l* may comprise a conductor such as copper, silver, copper-silver alloy, molybdenum, tungsten carbide (WC), tungsten, Ta, TaW, Nb, and graphite coated conductor such as graphite coated Cu or W. The graphite coated W may form a metal-carbide-carbon (W—WC—C) structure that may be very durable for wear.

In an embodiment, the electrodes 8 comprise a metal to which silver has low adhesion or does not substantially wet such as at least one of aluminum, molybdenum, tungsten, Ta, TaW, tungsten carbide (WC), and graphite coated conductor such as graphite coated Cu or W. Low melting point electrodes such as aluminum electrodes may be cooled to prevent melting. The nonconductive bottom layer may comprise an insulator such as an alkaline earth oxide, alumina, or anodized aluminum. In an embodiment, the bottom layer may comprise a conductor of much lower conductivity than the electrodes. The bottom layer may be conductive but electrically isolated. The bilayer electrodes may further comprise a thin insulating spacer between electrically conductive layers wherein only the highly conductive layer such as the top layer is connected to the source of electricity 2. An exemplary bottom layer of low conductivity relative to the ignition portion of the electrode such as a silver, copper, Mo, tungsten, Ta, TaW, WC, or graphite coated conductor such as graphite coated Cu or W portion comprises graphite. In an embodiment, graphite serves as a layer to which the shot such as silver shot does not adhere.

In an embodiment, the electrodes may be maintained at an elevated temperature to prevent the melt from rapidly cooling and adhering to the electrodes that may cause undesired electrical shorting. Any adhering melt may be removed by at least one of an ignition event and ignition current. In an embodiment, the start-up power source may preheat the electrodes to prevent cooled melt from adhering to the electrodes. While in operation, the electrode cooling system may be controlled to maintain an electrode temperature that achieves ignition in the desired location on the electrodes while preventing the melt from adhering in an undesired manner.

The electrode temperature may be maintained in a temperature range that avoids wetting or adherence of the molten shot such as silver shot to the electrodes. The electrodes such as W electrodes may be operated at least one elevated temperature range such as about 300° C. to 3000° C. and 300° C. to 900° C. wherein a high Ag contract angle is favored. Alternatively, the electrodes such as WC electrodes may be operated at lower temperature such as about 25° C. to 300° C. wherein a high Ag contract angle is favored. The lower temperature may be achieved by cooling with electrode cooling system inlet and outlet 31f and 31g (FIG. 2I13). The bottom and top layers may each comprise a gap 8g that are connected. In an embodiment, the electrodes such as the W plate electrodes comprise gap between the W plates and the bus bars such as copper bus bars such that the W electrodes operate at a temperature to cause the silver to vaporize such as in the temperature range of about 1700 to 2500° C.

In a startup mode, the channel of electrode electromagnetic (EM) pump may be injected with molten solid fuel by EM pump 5k. The solid fuel may comprise silver that may solidify. Current from the source of electricity 2 may be flowed through the solid until its temperature is above the melting point, and the silver may pumped out of the channel by the electrode EM pump. The heating of the material in the channel of the electrode EM pump heats the electrodes. Thus, the channel of the electrode EM pump may serve as the startup heater.

The bilayer electrodes may serve to project the ignition event towards the PV converter, away from the direction of injection on the side 8k. The open circuit is closed by injection of the melt shot causing contact across the conductive parts of the gap 8g only in the top layer. The gap 8g of the bottom non-conductive layer may be sufficiently deep that the pressure resistance to the blast from the ignition of fuel may preferentially force the expanding light emitting plasma upward to emit in region 8l. In an exemplary embodiment, one bilayer set electrodes comprises copper, Mo, tungsten, Ta, TaW, tungsten carbide (WC), or graphite coated conductor such as graphite coated Cu or W upper electrodes on a bottom ceramic layer such as alumina, zirconia, MgO, or firebrick having a hole to the gap 8g of the top layer. The top and bottom layers may comprise opposing cones or conical sections with a neck at the interface of the two layers and a gap. Alternatively, the layers may form back-to-back V's in cross section. Such exemplary bilayer electrodes are a downward V-shaped graphite or zirconia bottom layer and an upward V-shaped W or WC upper layer. The electrodes are constant along the transverse axis to form V-shaped troughs with a gap that is filled with the shot to cause the circuit to be closed and ignition to occur. The downward facing V-shaped layer may have low conductivity and may guide the shot to the second layer of high conductivity that ignites the plasma. The upward V-shape of the top layer may direct the plasma and light towards the PV converter.

In an embodiment, the electrode may comprise a bilayer electrode such as one comprising a downward V-shaped layer such as graphite or zirconia bottom layer and a top layer having vertical walls or near vertical walls towards the gap 8g. Exemplary materials of the top layer are W, WC, and Mo. The open circuit is closed by injection of the melt shot causing contact across the conductive parts of the gap 8g only in the top layer.

In an embodiment, the electrode may comprise a trilayer electrode such as one comprising a bottom layer comprising a downward V-shape, a middle current delivery layer such as a flat plate with the plate edge slightly extended into the gap 8g, and an upward V-shaped electrode lead layer that is recessed away from the gap 8g. The bottom layer may comprise a material that resists adhesion of the shot melt such as silver shot melt. Suitable exemplary materials are graphite and zirconia. The graphite may be highly oriented with the face that best resists adhesion oriented to contact the shot. The graphite may be pyrolytic graphite. The middle current delivery layer may comprise a conductor with a high melting point and high hardness such as flat W, WC, or Mo plate. The top electrode lead layer may comprise a high conductor that may also be highly thermal conductive to aid in heat transfer. Suitable exemplary materials are copper, silver, copper-silver alloy, and aluminum. In an embodiment, the top lead electrode layer also comprises a material that resists adhesion of the shot melt such as silver or Ag—Cu alloy. Suitable exemplary non-adhering lead electrodes are WC and W. Alternatively, the lead electrode such as a copper electrode may be coated or clad with a surface that is resistant for the adherence of the shot melt. Suitable coatings or claddings are WC, W, carbon or graphite. The coating or cladding may be applied over the surface regions that are exposed to the shot melt during ignition. The open circuit may be closed by injection of the melt shot causing contact across the conductive parts of the gap 8g only in the middle layer. The top lead layer may be cooled such as cooled through internal conduits. The contact between the middle and top cooled layer may heat sink and cool the middle layer. The contact between the bottom and middle cooled layer may heat sink and cool the bottom layer. In a tested embodiment, the shot injection rate was 1000 Hz, the voltage drop across the electrodes was less than 0.5 V, and the ignition current was in the range of about 100 A to 10 kA.

The electrode may comprise a plurality of layers such as Mo, tungsten, Ta, TaW, WC, or graphite coated conductor such as graphite coated Cu or W on a lead portion such as a copper portion with ignition on the Mo, W, Ta, TaW, WC, or graphite coated conductor such as graphite coated Cu or W surface, and the electrode may further comprise a non-conductive layer to direct the ignition in the direction of the PV converter. The W or Mo may be welded to or electro-plated on the lead portion. The WC may be deposited by deposition techniques know in the art such as welding, thermospray, high velocity oxy fuel (HVOF) deposition, plasma vapor deposition, electro-spark deposition, and chemical vapor deposition. In another embodiment, the graphite layer of a bilayer electrode comprising graphite on a lead portion may comprise the ignition electrode. The graphite ignition electrode may thin and comprise a large area connection with a highly conductive lead such as copper or silver plate lead. Then the resistance may be low, and the graphite surface may prevent sticking. In an embodiment, the graphite electrode may comprise conductive elements such as copper posts in a graphite electrode to give the graphite more conductivity. The post may be added by drilling holes in the graphite and mechanically adding them or by pouring molten copper into the holes then machining a clean graphite-copper-post surface that faces the ignition.

Figure 15:
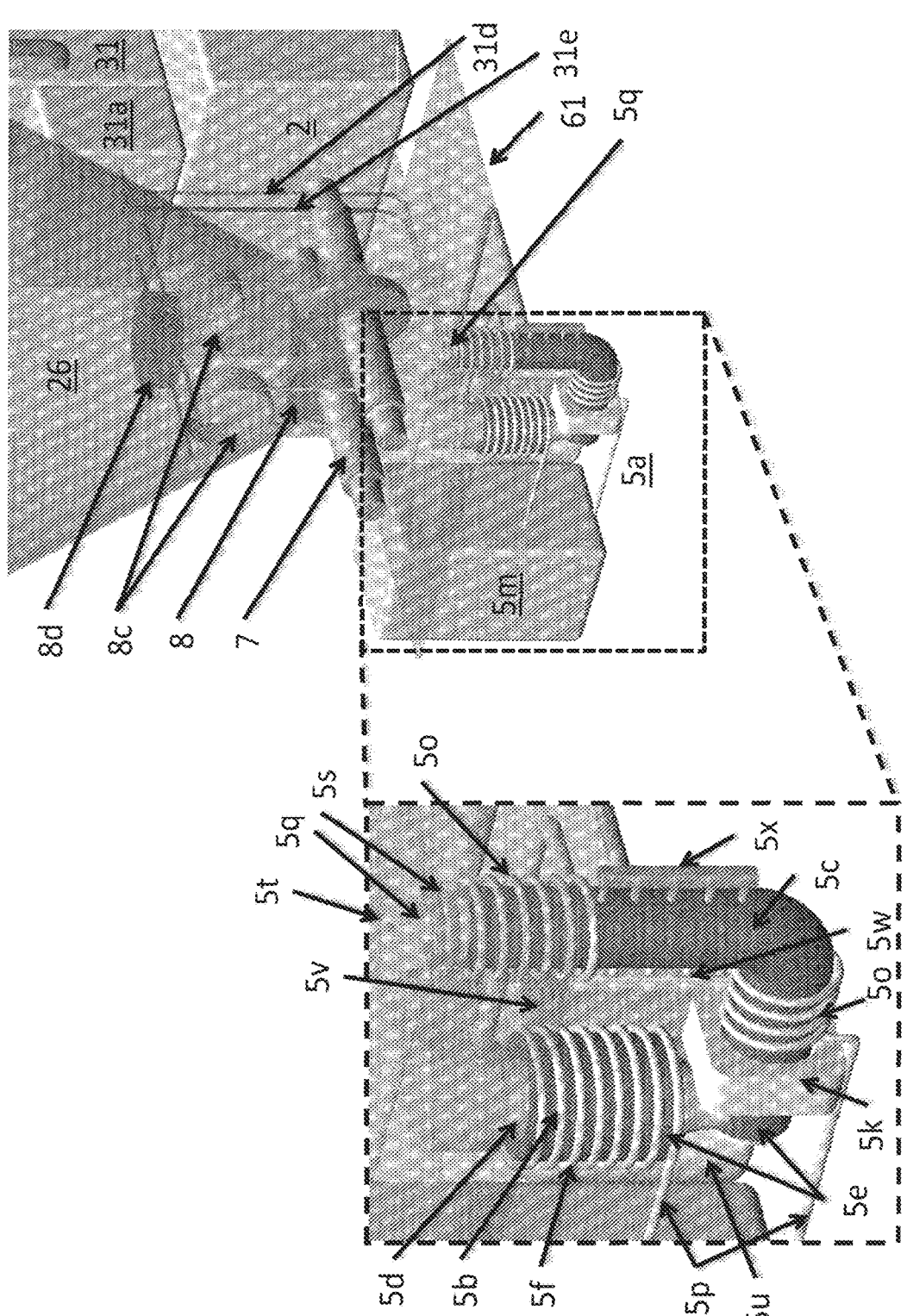
FIG. 15 (also referred to herein as 2I8) is a schematic drawing of a SF-CIHT cell power generator showing a cell capable of maintaining a vacuum, an ignition system having an electromagnetic injection system fed directly from a pelletizer, augmented plasma railgun and gravity recovery systems, the pelletizer, and a photovoltaic converter system showing details of the injection system having a electromagnetic pump and nozzle, the ignition system, the ignition product recovery systems, and the pelletizer to form shot fuel in accordance with an embodiment of the present disclosure.
Figure 17:
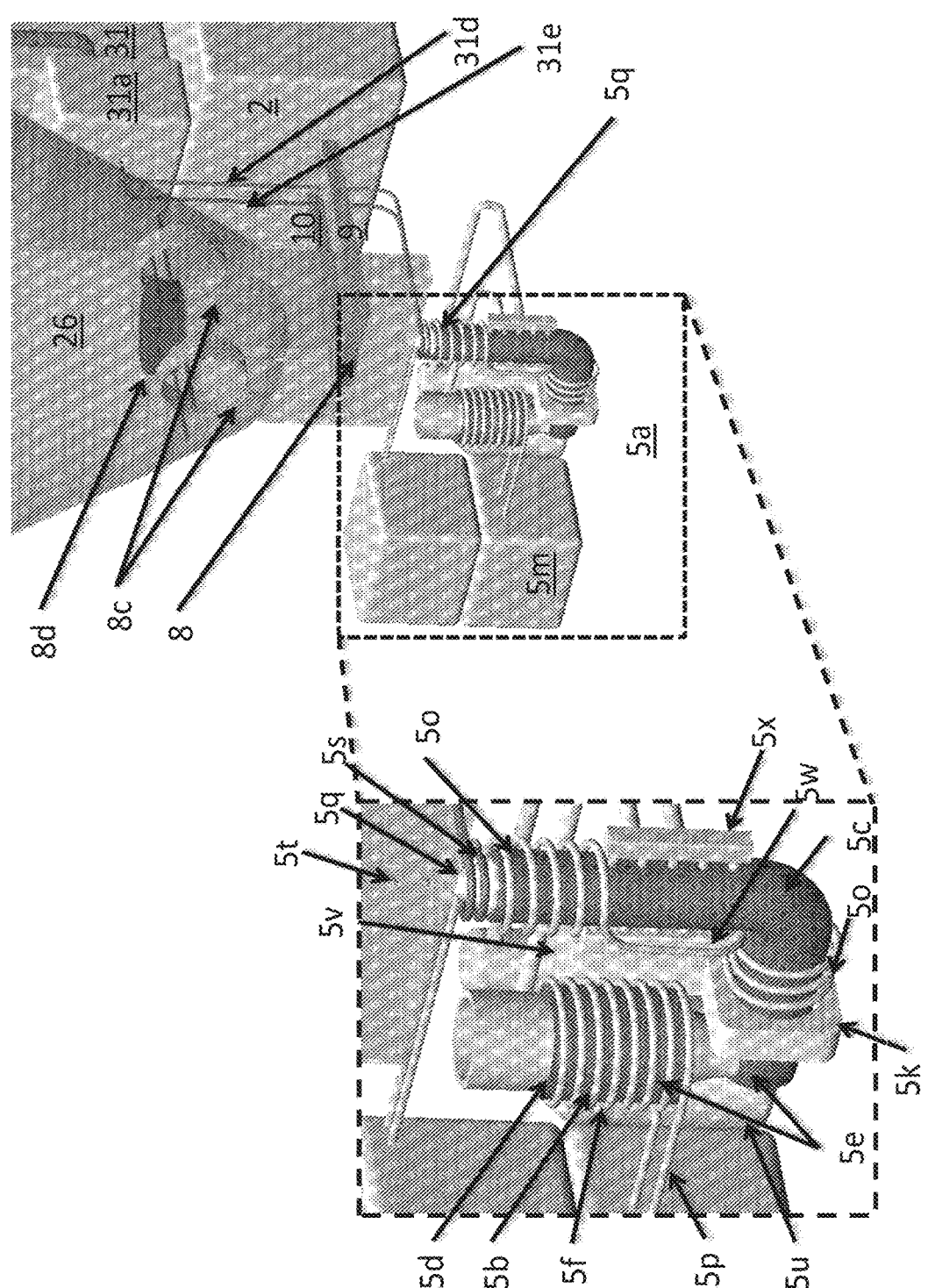
FIG. 17 (also referred to herein as 2I10) is a schematic drawing of a SF-CIHT cell power generator showing a cell capable of maintaining a vacuum, an ignition system having stationary electrodes and an electromagnetic injection system fed directly from a pelletizer, augmented plasma railgun and gravity recovery systems, the pelletizer, and a photovoltaic converter system showing details of the injection system having a electromagnetic pump and nozzle, the stationary electrode ignition system, the ignition product recovery systems, and the pelletizer to form shot fuel in accordance with an embodiment of the present disclosure.
Figure 28:
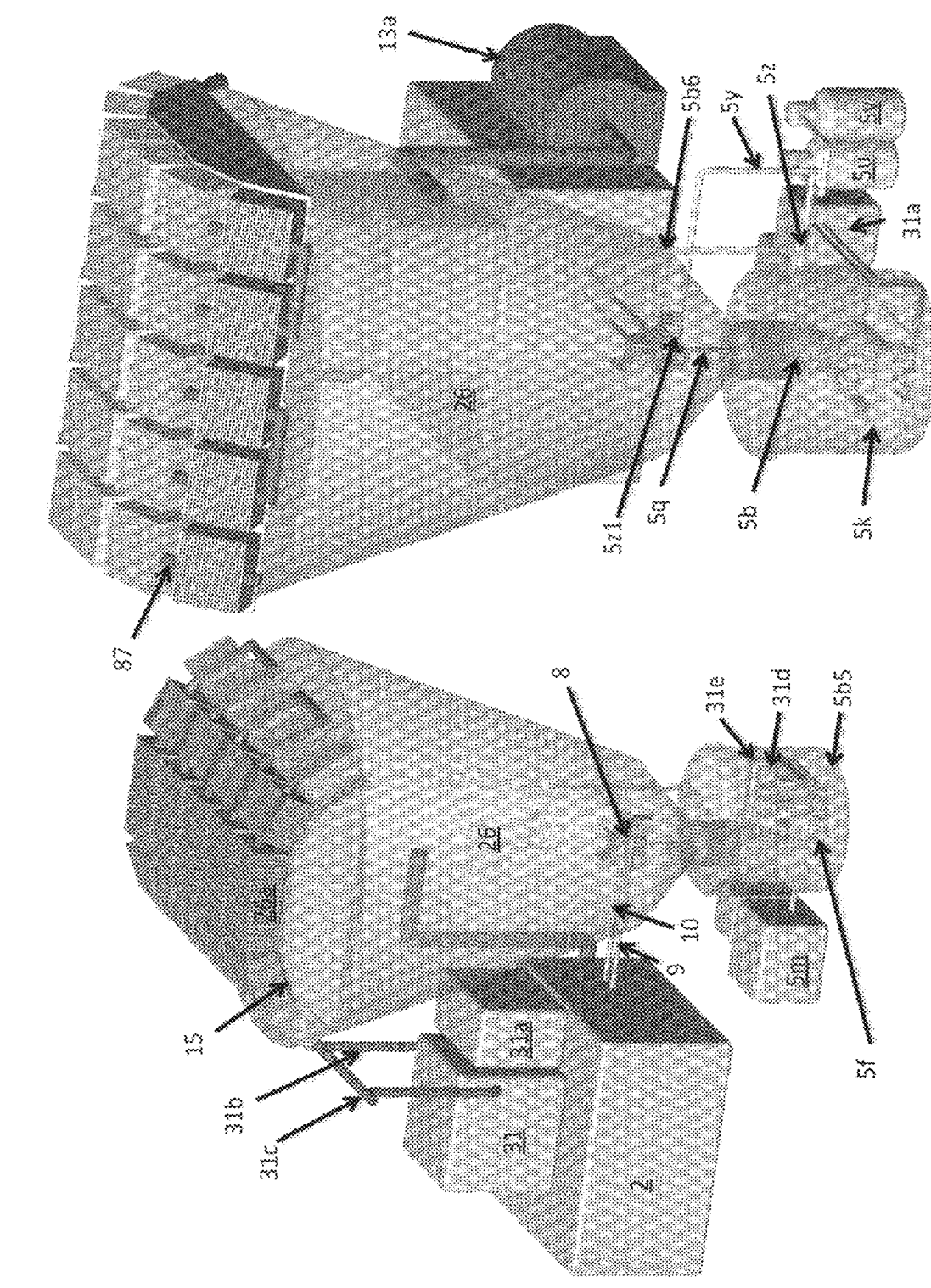
FIG. 28 (also referred to herein as 2I21) is a schematic drawing of two full views of the SF-CIHT cell power generator shown in FIG. 2I19 in accordance with an embodiment of the present disclosure.

A schematic drawing of a SF-CIHT cell power generator showing the cross section of the pelletizer having a pipe bubbler in the second vessel to introduce the gasses such as $H_2$ and steam to the melt, two electromagnetic pumps, and a nozzle to injection shot on the bottom and top of the electrodes is shown in FIGS. 2I14 and 2I17, respectively. Details of the corresponding injection and ignition systems are shown in FIGS. 2I15 and 2I18, respectively. Details of the electromagnetic (EM) pump and pipe bubbler vessel penetration are shown in FIG. 2I16. The electromagnetic pump 5k may comprise a plurality of stages and may be positioned at a plurality of locations along the pelletizer (FIG. 2I14). The electromagnetic (EM) pump assembly 5ka is shown in FIG. 2I28. The EM pump 5k (FIGS. 2I16 and 2I24-2I28) may comprise an EM pump heat exchanger 5k1, an electromagnetic pump coolant lines feed-through assembly 5kb, magnets 5k4, magnetic yolks and optionally thermal barrier 5k5 that may comprise a gas or vacuum gap having optional radiation shielding, pump tube 5k6, bus bars 5k2, and bus bar current source connections 5k3 having feed-through 5k31 that may be supplied by current from the PV converter. The pump tube 5k6 may be coated to reduce corrosion. Exemplary coatings are corrosion resistant metals with a higher melting point than the fuel metal such as nickel and a noble metal such as Pt or Ir in the case of Ag or Ag—Cu alloy melt. At least one of the magnets and the magnetic circuit may comprise a polished surface such as the end surface facing the gap to serve as the radiation shield. At least one of the magnets 5k4 and yoke 5k5 of the magnetic circuit may be cooled by EM pump heat exchanger 5k1 such as one that is cooled with a coolant such as water having coolant inlet lines 31d and coolant outlet lines 31e to a chiller 31a. The pump tube 5k6 of the EM pump 5k may be connected to the vessels such as the first vessel 5b, the second vessel 5c, and the vessel section to the nozzle 5q by joints of the disclosure 5b1. In an embodiment, the EM pump 5k may be position at the end of the first vessel 5b, and another may be position at the vessel wall at the end of the second vessel 5c. An extension of the pump tube of the latter may be used as the line that penetrates the cell wall and is sealed at the cell wall. The pump tube extension may comprise an S-shaped tube for injecting below the electrodes 8. In another embodiment, the pump tube extension may vertically enter the cell, transition horizontally at an elbow or bend, and the nozzle 5q may comprise a bend with an end outlet. Alternatively, the nozzle may comprise a hole in the sidewall of the tube that is capped at the end so that the pressure in the tube ejects the melt out the sidewall hole and into the electrodes 8. The section of the tube in the cell may be at least one of insulated and heated to maintain the melt at a desired temperature. The heating may be with an inductively coupled heater coil that penetrates the cell wall and encloses at least a portion of the tube. The tube section inside of the cell and any other objects in the cell such as heater coils and bus bars may be coated with a material that resists adhesion by the ignition products. Exemplary materials of the disclosure comprise graphite, tungsten, and tungsten carbide.

In an embodiment, the plasma and adhering metal shot are ejected from the electrodes, and fuel recirculation is achieved by using the Lorentz force, exploiting the principles of the railgun such as a shot and plasma armature type that may further comprise an augmented railgun type herein also referred to as an electrode electromagnetic pump. The Lorentz force may cause the flow of the adhering shot into the ignition section of the electrodes and causes the ignition plasma to be directed and flow into a collection region such as inlet of the fuel regeneration system such as the pelletizer.

In an embodiment shown in FIGS. 2I14 and 2I15, the electrodes may comprise a downward (negative z-axis oriented) V-shape with a gap at the 8g at the top of the V. The V may be formed by flat plate electrodes mounted on opposite faces of supports that form a V with a gap at the top. Exemplary electrode materials comprising a conductor that operates a high temperature and resists adhesion of Ag are W, WC, and Mo. The supports may be water-cooled. The supports may be a least partially hollow. The hollow portions may each comprise a conduit for coolant that flows through the conduits and cools the electrodes. In an embodiment, the electrodes may further comprise an upper section having vertical walls or near vertical walls at the gap 8g. The walls may form a channel. The open ignition circuit of the electrodes may be closed by injection of the melt shot causing contact across the conductive parts of the gap 8g at the top of the V.

The cell surfaces that may be exposed to ignition product may be coated with an adherence resistant material such as graphite or aluminum that may be anodized or another such material of the disclosure. The surfaces may be coated with alumina such as alpha alumina that may be sputter coated on a substrate such as a high-temperature metal. In another embodiment, the surfaces may be coated with a housing that comprises or is coated with a material that resists melt adherence such as one of the disclosure. The bus bars may penetrate the cell through separate of a common flange wherein each bus bar is electrically isolated. At least one of the bus bars, electrode mounts, and electrodes may be shaped to at least one of minimize the surface for adherence of the ignition product and posses a low cross section for accumulation of returning melt such as Ag or Ag—Cu melt. In an embodiment, the electrodes 8 may comprise straight rod bus bars 9 and 10 that are beveled at the ends to form the electrodes 8 or electrode mounts. The surface of each beveled bus bar may be covered with a fastened electrode plate. The bus bars may comprise flat copper bus bars having electrodes mounted to the inner surface. Each bus bar may be covered with a plate electrode such as a tungsten plate or other durable conductor. The plates may be curved to form a gap 8g. The curved plate may comprise at least one of a tube or a semicircular cross section of a tube that is electrically connected to the bus bar. The tube electrode may also connect to a bus bar of a different geometry such as a rod. The tube may be concentric to the rod connection points. An exemplary electrode separation across the gap 8g is in at least one range of about 0.05 to 10 mm, and 1 to 3 mm. The electrodes such as ones comprising plates or tubes may be capable of high temperature. The electrodes may comprise a refractory metal such as at least one of Tc, Ru, doped B, Ir, Nb, Mo, Ta, Os, Re, W, and C, and another such metal of the disclosure. The high temperature electrodes may serve as a blackbody radiator for thermophotovoltaic power conversion. The electrodes may comprise a heat embrittlement resistant composition. The electrodes may comprise a sintered material such as a sintered refractory metal. The electrodes may be at least one of segmented and thick to avoid breakage when heat embrittled. The electrodes may comprise a thermally insulating layer or gap between the refractory metal plate and the bus bar to permit the electrode temperature to be elevated relative to that of the bus bar. The curved plate electrodes may form a thermally insulating layer or gap. The thermally insulating material such as MgO or $Al_2O_3$ may comprise a ceramic that may be molded or machined. At least one of the bus bars and electrode mounts may be cooled such as water or air-cooled. Other coolants such as molten metals such as molten lithium are within the scope of the disclosure.

In an embodiment, the electrodes further comprise a source of magnetic field such as a set of magnets at opposite ends of the channel of the electrodes such as 8c of FIGS. 2I14 and 2I15. The magnets may be electrically isolated from the bus bars 9 and 10 when mounted across them by an electrical insulator such as a ceramic or high-temperature paint or coating such as a boron nitride coating that may be applied on the bus bar contact region by means such as spraying. An insulator sleeve such as a ceramic tube may electrically isolate fasteners such as bolts or screws. Other such parts may be electrically isolated from another electrified system by the electrically insulating materials of the disclosure. The magnets 8c and channel 8g supporting the ignition current may comprise an electromagnetic pump that performs the function of ejecting any shot adhering to at least one of the electrodes and the channel and ejecting ignition particles from the electrodes 8 and the channel 8g. The ejection may be by the Lorentz force according to Eq. (37) formed by a crossed applied magnetic field such as that from magnets 8c and ignition current through at least one of the plasma particles and shot such as silver shot adhering to the electrode surfaces such as those of the channel 8g. The current carrying particles may be charged. The plasma may additionally comprise electrons and ions. The ignition current may be from the source of electrical power 2 (FIG. 2I10). Current may be carried through metal that adheres and shorts the electrodes of the bottom layer. The current is crossed with the applied magnetic field such that a Lorentz force is created to push the adhering metal from the electrode surfaces. The direction of the magnetic field and current may be selected to cause shot and plasma particles such as those from the shot ignition to be directed away from the channel 8g (FIG. 2I15 and FIG. 2I17) in the positive or negative direction wherein the shot may be injected in the positive z-axis direction (FIGS. 2I14 and 2I15) or the negative z-axis direction (FIGS. 2I17 and 2I18). The magnets may produce a magnetic field along the y-axis parallel to the electrode or channel axis and perpendicular to the ignition current along the x-axis. The channel with crossed current and magnetic field comprising an electromagnetic (EM) pump directed along the positive z-axis may perform at least one function of pumping injected shot upward into the electrodes to be ignited, pumping adhering shot upward to be ignited, pumping adhering shot upward out of the electrodes and channel, and pumping ignition particles upward out of the electrodes and channel. Alternatively, by reversing one of the current or magnetic field direction, the Lorentz force due to the crossed ignition current and magnetic field may perform at least one function of pumping adhering shot downward to be ignited, pumping adhering shot downward out of the electrodes and channel, pumping ignition particles downward out of the electrodes and channel, pumping ignition particles downward away from the PV converter, and pumping ignition particles downward toward the inlet to the pelletizer to recover the ignition product. The strength of the crossed current and magnetic field and well as the dimensions of the channel provide the pump pressure through the channel comprising the electromagnetic pump tube. The width of the pump tube and any splay are selected to distribute the current from the source of electrical power 2 for ignition and pumping to achieve optimization of both. The electrode EM pump may further comprise a switch that may reverse the direction of the current to reverse the direction of the EM pump. In an exemplary embodiment wherein the shot is injected upward by EM pump 5k and the electrodes short due to adhering shot, the electrode EM pump switch may be activated to reverse the current and pump the shot downward to the inlet of the pelletizer. The electrodes may further comprise a sensor and a controller. The sensor may comprise a current sensor that may detect an electrode short. The sensor may feed the shorting data into the controller that may inactivate the EM pump 5k to stop further injection of shot and activate the switch to reverse the current of the electrode EM pump until the short is cleared. In other embodiments of the disclosure, the electrodes and magnets may be designed to direct the plasma in an upward arch to perform at least one function of (i) ejecting the shot and particles from the electrodes and channel such as 8g and (ii) recovering the ignition product and un-ignited shot to the pelletizer, while avoiding guiding ignition particles to the PV converter 26a.

In an embodiment, the electrodes may comprise a downward (negative z-axis oriented) V-shape with a gap 8g at the top of the V. The open circuit may be closed by injection of the melt shot causing contact across the conductive parts of the gap 8g at the top of the V. The V may be formed by flat plate electrodes mounted on opposite faces of supports that form a V with a gap at the top. Exemplary electrode materials comprising a conductor that operates a high temperature and resists adhesion of Ag are W, WC, and Mo. The electrodes may further comprise a first electrode EM pump comprising a channel at the top of the electrodes above the gap 8g with the source of magnetic field 8c crossed to the ignition current. In an exemplary embodiment, the melted shot may be injected from below in the positive z-axis direction (FIGS. 2I14 and 2I15), and the electrode EM pump may perform at least one function of facilitating the upward flow of the shot into the gap 8g to cause ignition, pumping adhering shot out of the electrodes and channel, and pumping ignition products out of the electrodes and channel 8g. In an embodiment, the electrodes comprises a second electrode EM pump comprising magnets 8c1 and second electrode channel 8g1 that produces a Lorentz force to at least one of force the particles away from the PV converter and facilitate recovery of the particles to the pelletizer. The second electrode EM pump may be above the first electrode EM pump to receive plasma and particles from the ignition and pump the particles away from the PV converter 26a. The polarity of the magnets of the second electrode EM pump may be opposite to those of the first while using a portion of the ignition current that is common to the electrodes and both electrode EM pumps. The electrode EM pumps may be augmented types. At least one of the first EM pump and the second electrode EM pump may comprise an independent source of current that may be in the same or different direction as the ignition current. The source of current may be from the PV converter. In an embodiment of the second electrode EM pump, the current may be in a direction different from that of the ignition current wherein the crossed magnetic field is oriented to at least one of produce a force on the ignition particles away from the PV converter and at least partially facilitate the transport of the particles to the inlet of the pelletizer. For example, the independent current may be in the opposite direction of the ignition current, and the magnetic field may be in the same direction as that of the first electrode EM pump. In an embodiment, at least one of the magnets and current of the second electrode EM pump may be less strong than those parameters of the first electrode EM pump such that the velocity of the ignition particles is reduced. In an embodiment, the particle direction may not be completely reversed. At least one of the Lorentz force and gravity may at least one of prevent the particles from impacting the PV converter and facilitate recovery of the particles.

In an embodiment, each of the first and second set of magnets of the first and second electrode pumps are mounted to the bus bars 9 and 10, and the magnets are protected from overheating by at least one method of thermally isolating or cooling the magnets. The magnets of each electrode electromagnetic pump may comprise at least one of a thermal barrier or thermal isolation means such as insulation or a thermally insulating spacer and a mean of cooling such as a cold plate or water cooling lines or coils and a chiller. The cool or cold plate may comprise a micro-channel plate such as one of a concentrator photo-voltaic cell such as one made by Masimo or a diode laser cold plate that are known in the art.

In another embodiment, the second electrode EM pump comprises a channel, a current source that may comprise a portion of the source of electricity to cause ignition, and magnets wherein the orientation of at least one of the channel, the current, and magnetic field produces a Lorentz force that may be along the positive or negative z-axis and have a component in the xy-plane. The Lorentz force of the second electrode EM pump may be oriented to at least one of produce a force on the ignition particles away from the PV converter and at least partially facilitate the transport of the particles to the inlet of the pelletizer. In an embodiment, the Lorentz force may be in the positive z-direction and have a component in the xy-plane. The crossed current and magnetic fields of the embodiments of the electrode EM pumps of the disclosure may cause the ejection of adhering shot and the flow of the plasma particles to the regeneration system such as the pelletizer. The trajectory of the pumped ignition particles may be such that impacting the PV converter may be avoided. The particle trajectory may further be towards a desired portion of the cell wall such as a portion with no penetrations such as the electrode penetrations.

In an embodiment, at least one of the electrodes and the ignition plasma has a component of the current along the z-axis and a component in the xy-plane, and the magnets such as 8c and 8c1 are oriented to provide a magnetic field that is crossed with the current. In an embodiment, the crossed applied magnetic field from magnets causes a Lorentz force having a component in the transverse xy-plane as well as the z-axis direction. The z-directed force may eject the plasma and any shot adhering to the electrodes. The xy-plane-directed force may cause the ignition particles to be forced to the cell walls to be recovered. In an embodiment, the electrodes are offset along the z-axis (one having a slightly higher height than the other) such that a component of at least one of the ignition and plasma current is along the z-axis as well as in xy-plane. In an embodiment, the ignition particles may be force along a curved trajectory in a clockwise or counter clockwise direction with the origin at the ignition point of the electrodes. The curved path may at least one of (i) direct the particles to the wall opposite the location of the penetrations of the bus bars 9 and 10 (FIG. 2I14) and electrodes 8 and (ii) transport the particles to the inlet of the pelletizer. The electrodes and any mirror surrounding them such as a parabolic dish may direct the emitted light to the PV converter 26a.

In an embodiment, the particles are prevented from impacting and adhering to the PV converter by at least one plasma and particle deflector such as a central cone in the exit of the channel with the tip of the cone facing the direction of the ignition electrodes. The deflector may comprise two cones joined at the base to facilitate return of particles to the pelletizer. The plasma may be directed to at least one additional plasma deflector that selectively deflects the plasma and light to the PV converter. The particles may collide with the plurality of deflectors to lose velocity and at least one of fall and flow into the inlet of the pelletizer. The plasma may follow about an S-shaped trajectory through the channel formed by the central and peripheral deflectors while the particles are stopped so that they may flow to the inlet of the pelletizer.

In an embodiment, the particles are prevented from impacting and adhering to the PV converter by at least one physical barrier that selectively transmits the plasma and light while at least partially blocking the ignition particles. The physical barrier may comprise a plurality of elements located along the z-axis, each comprising a partially open physical barrier wherein the line of site along the z-axis through an open portion of the nth element is at least partially blocked by another element of a series of n elements wherein n is an integer. The plurality of physical elements may comprise a plurality of horizontally staggered grids such as screens positioned along the direction from the point of ignition towards the PV converter. The elements may permit the physical transmission of plasma and light while blocking the particles. The plasma gas may flow around the staggered grid while the particles impact the blocking portion to lose momentum to facilitate the recovery of the particles into the inlet of the pelletizer.

In an embodiment, the electrode assembly may further comprise a source of magnetic fields such as permanent or electromagnets. Using magnetic fields, the plasma may be at least one of confined, focused, and directed to the region 8l (FIG. 2I12) such that the light from the plasma is directed to the PV converter. The electrode magnets may force the plasma from the gap 8g to the cell region 8l. The magnets may further provide confinement to the plasma to cause it to emit light in the direction of the PV converter. The confinement magnets may comprise a magnetic bottle. Magnets such as 8c of FIG. 2I10 may further comprise an ignition product recovery system of the disclosure.

The SF-CIHT cell may further comprise electrodes such as grid electrodes of the disclosure that may be circumferential to the plasma and contain the plasma predominantly in a selected region such that it emits in a desired direction such as in the direction of the PV converter 26a. In an embodiment, the plasma and the particles from the ignition may be oppositely charged and migrate at different rates such that their respective migrations in the cell are separated in time. The plasma may be comprised of ions and electrons. The particles may be relatively massive. The plasma may be negatively charged due to the much higher mobility of the electrons. The particles may be positively charged. The plasma may migrate much faster that the particles such that it expands from the electrodes before the particles. Electrodes such as grid electrodes that are open to the flow of particles may be used to at least one of selectively direct and confine the plasma such that the light is directed to the PV converter 26a while the Lorentz force directs the particles to a desired region of the cell such as away from the PV converter 26a and back to the pelletizer. The electrodes may be at least one of floating, grounded, and charged to achieve at least one of selective transport and confinement of the plasma to a desired region of the cell such 8l. The applied voltages and polarities may be controlled to achieved the at least one of selective transport and confinement of the plasma to a desired region of the cell such 8l.

In an embodiment, the shot may be formed to have a small diameter such that the surface tension to maintain about a spherical shape is greater than electrode adhesion forces; so, the shot does not adhere to the electrodes. The shot size may be in at least one diameter range of about 0.01 mm to 10 mm, 0.1 mm to 5 mm, and 0.5 mm to 1.5 mm. The shot may be made with a smaller diameter by using at least one of a smaller nozzle 5q, a higher melt flow rate, a higher melt pressure, and a lower melt viscosity.

In another embodiment that is effective in preventing the shot form adhering to the electrodes, the electrodes comprise a shot splitter such as at least one thin wire such as a refractory wire across the gap where the shot ignition is desired. Exemplary wires comprise at least one of copper, nickel, nickel with silver chromate and zinc plating for corrosion resistance, iron, nickel-iron, chromium, noble metals, tungsten, molybdenum, yttrium, iridium, palladium, carbides such as SiC, TiC, WC, and nitrides such as titanium nitride. The at least one wire may divide the shot into a plurality of segments that are spread out over a larger area than the un-split shot. The electrode gap may be sufficiently large such as larger than the shot such that the shot passes through the gap without firing in the absence of the splitter. The splitter may spread the shot and cause the current to flow through the spread shot. The spreading of the shot may cause the ignition to be confined to the wide gap region such that adherence to the electrode is avoided by way of avoiding contact of the shot with other regions of the electrode where the shot may otherwise adhere. The electrodes may be beveled to form an upright V-shape such that the light is emitted in region 5l directed towards the PV converter. The shot splitter may be movable and the electrode gap adjustable such that the spreading may be used during startup and elevated electrode temperature used during long duration operation to prevent the shot from adhering to the electrodes.

In an embodiment, the ignition system further comprises an alignment mechanism such as a mechanical or piezoelectric one that adjusts the position of at least one of the electrodes 8 and the nozzle 5q such that the shots 5t travel from the nozzle to the desired position of the electrodes such as the center hole or gap 8g. The alignment may be sensed and controlled by a sensor and controller such as an optical or electrical sensor and a computer. The alignment mechanism may further serve to short the electrodes during startup wherein the shorting serves to heat the electrodes. In an embodiment, the nozzle 5q may be off center at an angle to prevent melt from dripping back and disrupting the stream wherein the adjustment mechanism may maintain that the shots 5t are injected into the gap 8g from underneath the electrodes 8.

Figure 24:
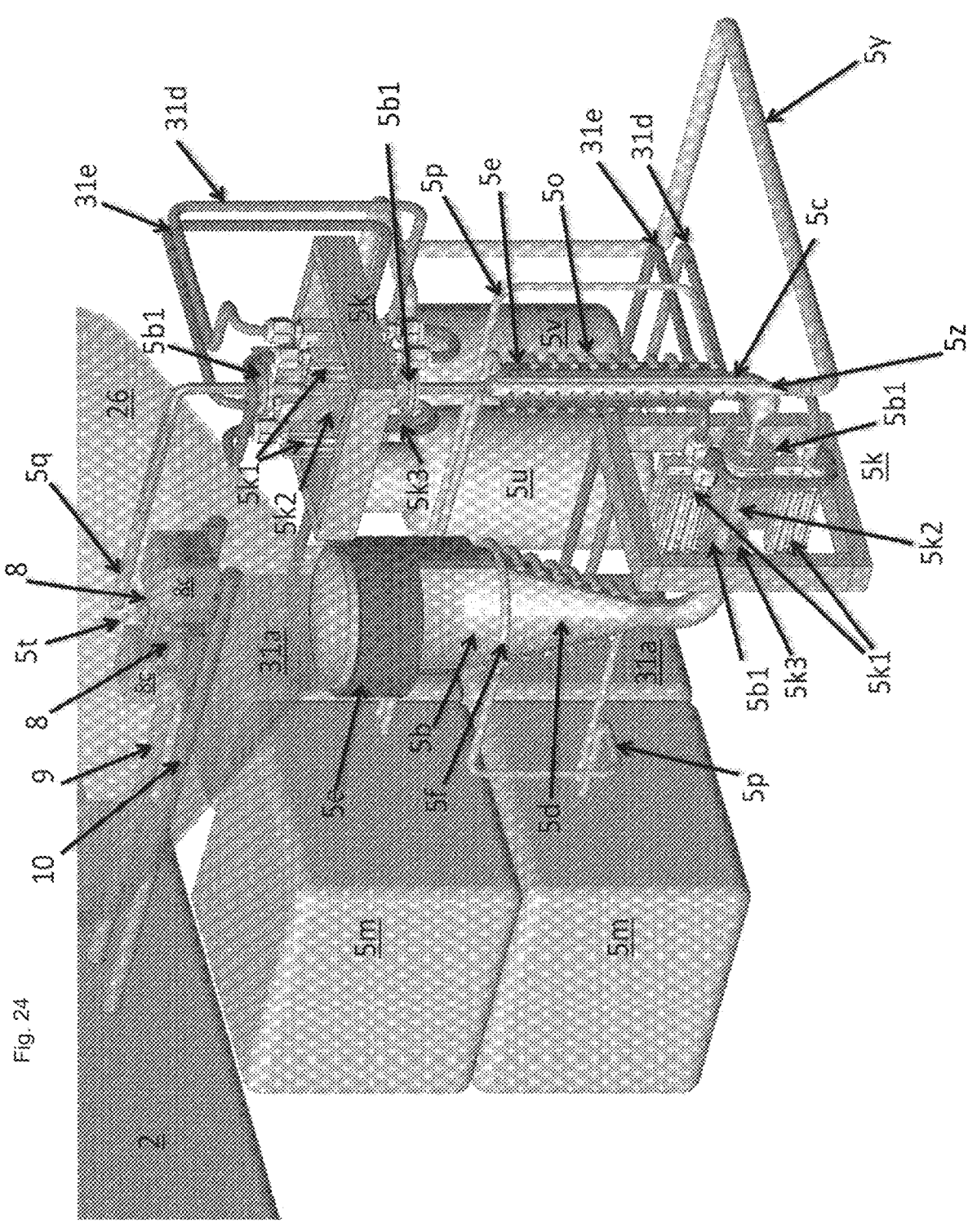
FIG. 24 (also referred to herein as 2I17) is a schematic drawing of a SF-CIHT cell power generator showing the cross section of the pelletizer having a pipe bubbler in the second vessel to introduce the gasses such as $H_2$ and steam to the melt, two electromagnetic pumps, and a nozzle to inject shot into the top of the electrodes in accordance with an embodiment of the present disclosure.
Figure 27:
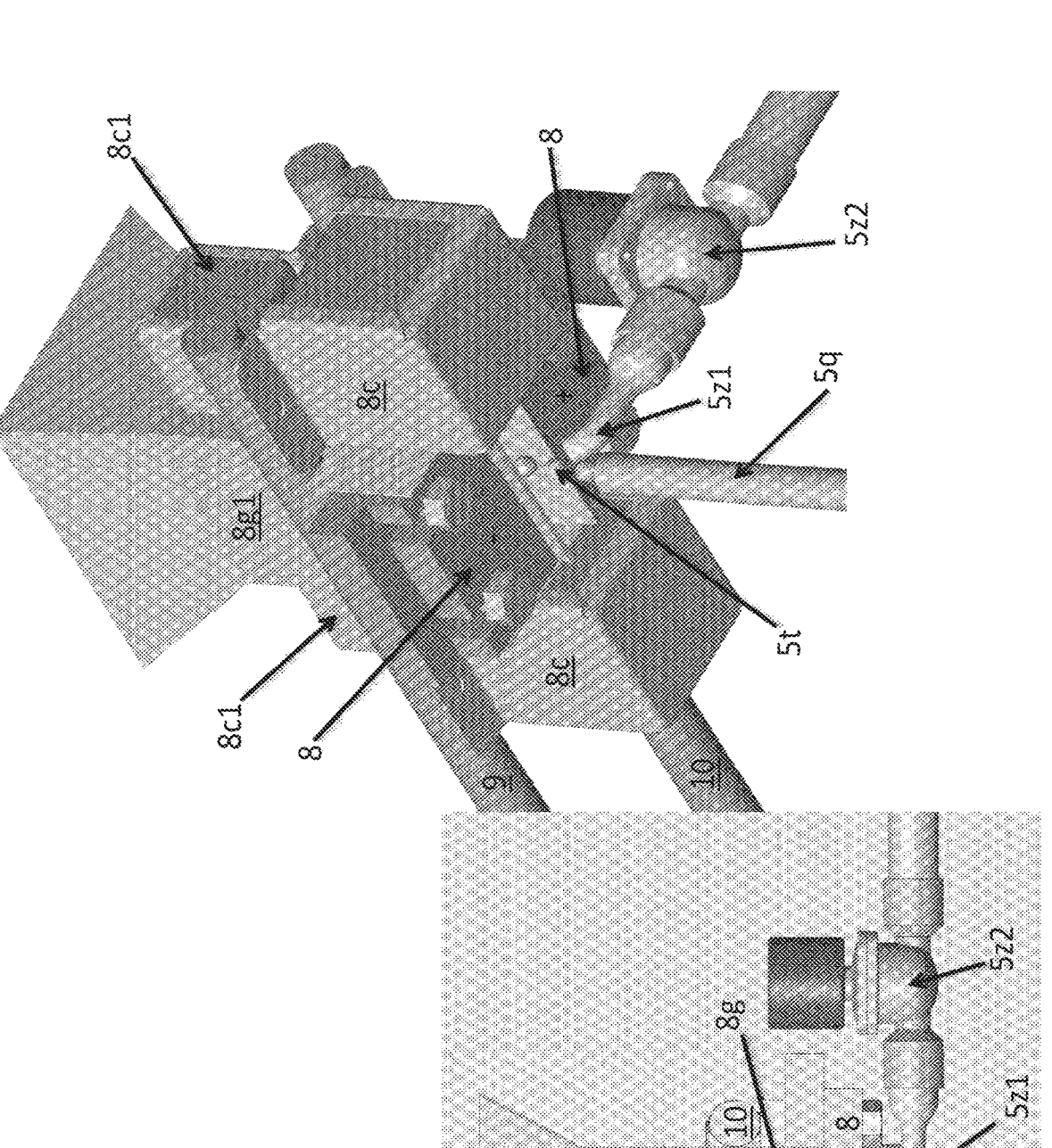
FIG. 27 (also referred to herein as 2I20) is a schematic drawing of a SF-CIHT cell power generator showing the electrodes with shot injection and gas injection such as $H_2$ and steam injection from the bottom in accordance with an embodiment of the present disclosure.
Figure 31:
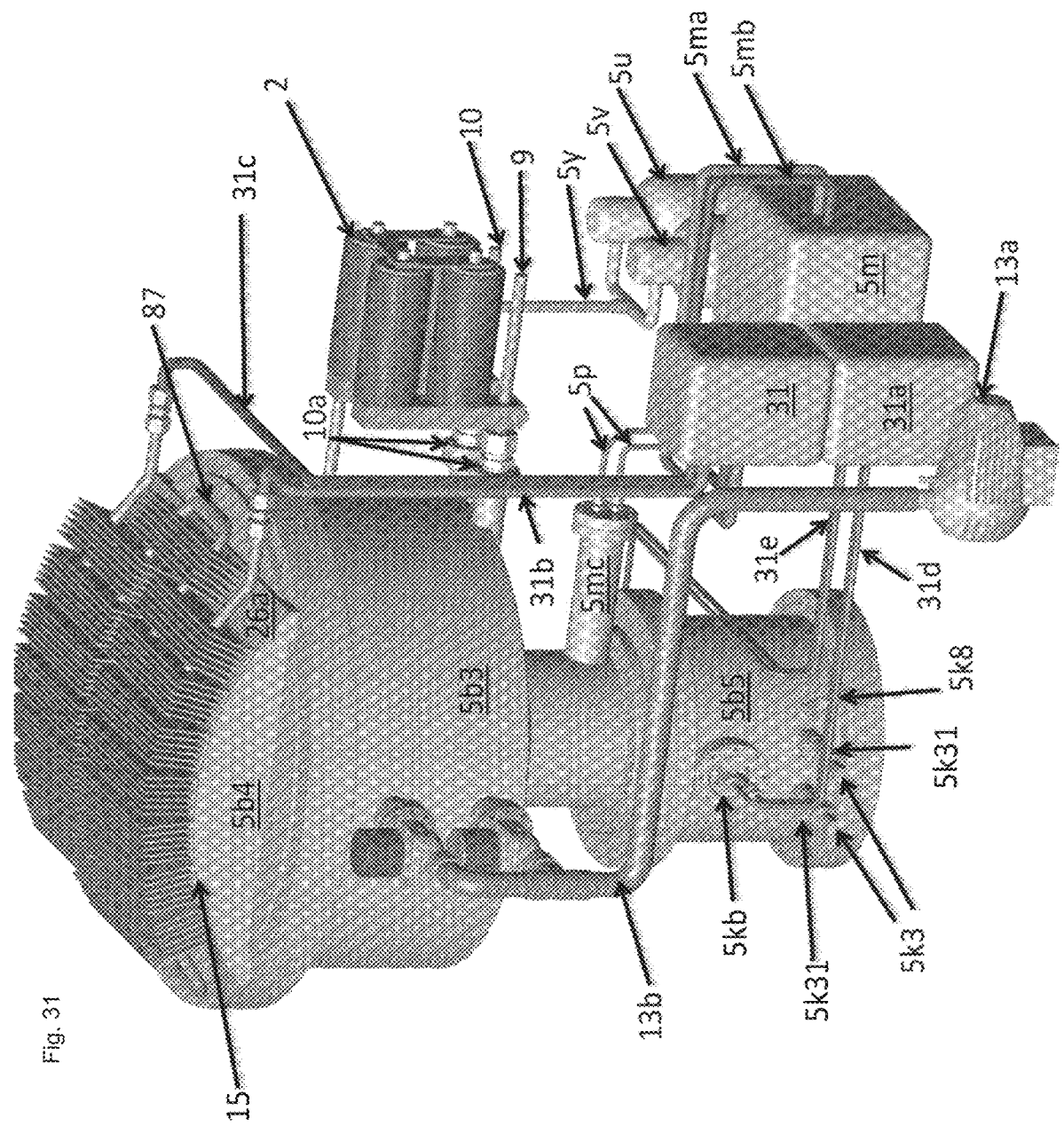
FIG. 31 (also referred to herein as 2124) is a schematic drawing of at least one of a thermophotovoltaic, photovoltaic, photoelectric, thermionic, and thermoelectric SF-CIHT cell power generator showing a capacitor bank ignition system in accordance with an embodiment of the present disclosure.

Referring to FIGS. 2I14 to 2I31, the cell may be operated under evacuated conditions. The cell 26 may comprise a vacuum chamber such as a cylindrical chamber or conical cylindrical chamber that may have domed end caps. The cell may comprise a right cylinder with a conical base to the fuel recovery and injection systems such as the pelletizer. The electrodes may penetrate at anodized feed throughs that may be vacuum tight. Alternatively, as shown in FIGS. 2I24 to 2I27 the cell 26 may be housed in a chamber 5b3 and the electromagnetic pump 5k may be housed in lower vacuum-capable chamber 5b5. The inlet of the pelletizer and the outlet such as the nozzle may feed through the cell wall into the vacuum space of the cell maintained with seals for each inlet and outlet feed through. The inside of the cell 26 may comprise surface that resists adherence of silver such as at least one of an Al, W, WC, Mo, and graphite surface. At least one of the inside of the cell 26, the bus bars 9 and 10, and electrode components other than those that directly contact the melt to supply the ignition current may be coated with material that resists adherence of the melt. Exemplary coatings comprise aluminum such as polished anodized aluminum, W, Mo, WC, graphite, boron carbide, fluorocarbon polymer such as Teflon (PTFE), zirconia+8% yttria, Mullite, or Mullite-YSZ. In another embodiment, the leads and electrode components may be covered with a housing such as a high-temperature stainless steel housing that may be coated with a material of the disclosure that resists adherence of the melt. The coatings may be sprayed, polished, or deposited by other means of the disclosure as well as others known in the art. The coating may be on a support such as a refractory metal such as zirconium, niobium, titanium, or tantalum, or a high temperature stainless steel such as Hastelloy X. The inside of the vacuum cell may comprise a conical liner having the anti-adhering surface. The liner may comprise the wall materials and coatings of the disclosure. The pelletizer may comprise at least a reducer from the first vessel 5b to the pump tube of first pump 5k, an expander from the pipe tube to the second vessel 5c, and straight reducer between the second vessel 5c and the pump rube of the second pump 5k. In an exemplary embodiment, the pump tube is about ⅜" OD and the vessels are each be about 1" ID. In an embodiment, the pelletizer inlet is at the bottom of the cell cone 26. The pelletizer outlet comprising the second vessel 5c and nozzle 5q may inject underneath the electrodes 8 (FIGS. 2I14 and 2I15) or at the top of the electrodes (FIGS. 2I17 and 2I18). At least one of the first electrode EM pump comprising magnets 8c and channel 8g and second electrode EM pump comprising magnets 8c1 and second electrode channel 8g1 may at least one of (i) facilitate injecting the shot and particles into the gap 8g to cause ignition, (ii) facilitate recovering the ignition product and un-ignited shot to the pelletizer, (iii) at least one of facilitate the directing and guiding of ignition particles away from PV converter 26a to avoid particle impact, and (iv) provide confinement to increase the yield of hydrinos. The confinement may create a pressure in at least one range of about 1 atm to 10,000 atm, 2 atm to 1000 atm, and 5 atm and 100 atm. The excess injected Ag shot and particles may be at least one of pumped, directed, and facilitated to the pelletizer inlet. The system may operate with a bottom wall temperature of about 1000° C. such that the silver remains molten. So, even if not all of shot participates in ignition, the energy loss may be mostly pump energy that may be very low. A minimum of heating in the first vessel may be necessary since some of the energy from ignition of the solid fuel may heat the silver.

In an embodiment, the cell floor comprising the cell wall in the region of the inlet to the pelletizer may be heated by at least one of the ignition product and the ignition process. The floor may be operated at a high temperature such as above the melting point of the metal of the fuel such as silver. The floor may heat at least a portion of the recovered product. The recovered product that is collected hot and the recovered product heated by the floor may flow into the pelletizer as preheated to consume less energy. The melted ignition product may flow from the floor to the pelletizer as a liquid. Shot $5t$ that does not ignite at the electrodes $8$ fall to the floor and flow into the pelletizer as well. The flow may be as a liquid or a solid. In the case of appreciable power being absorbed by the ignition product before being cleared, the ignition product may become very hot such that the energy dissipated in the pelletizer may be consequently lowered.

Figure 19:
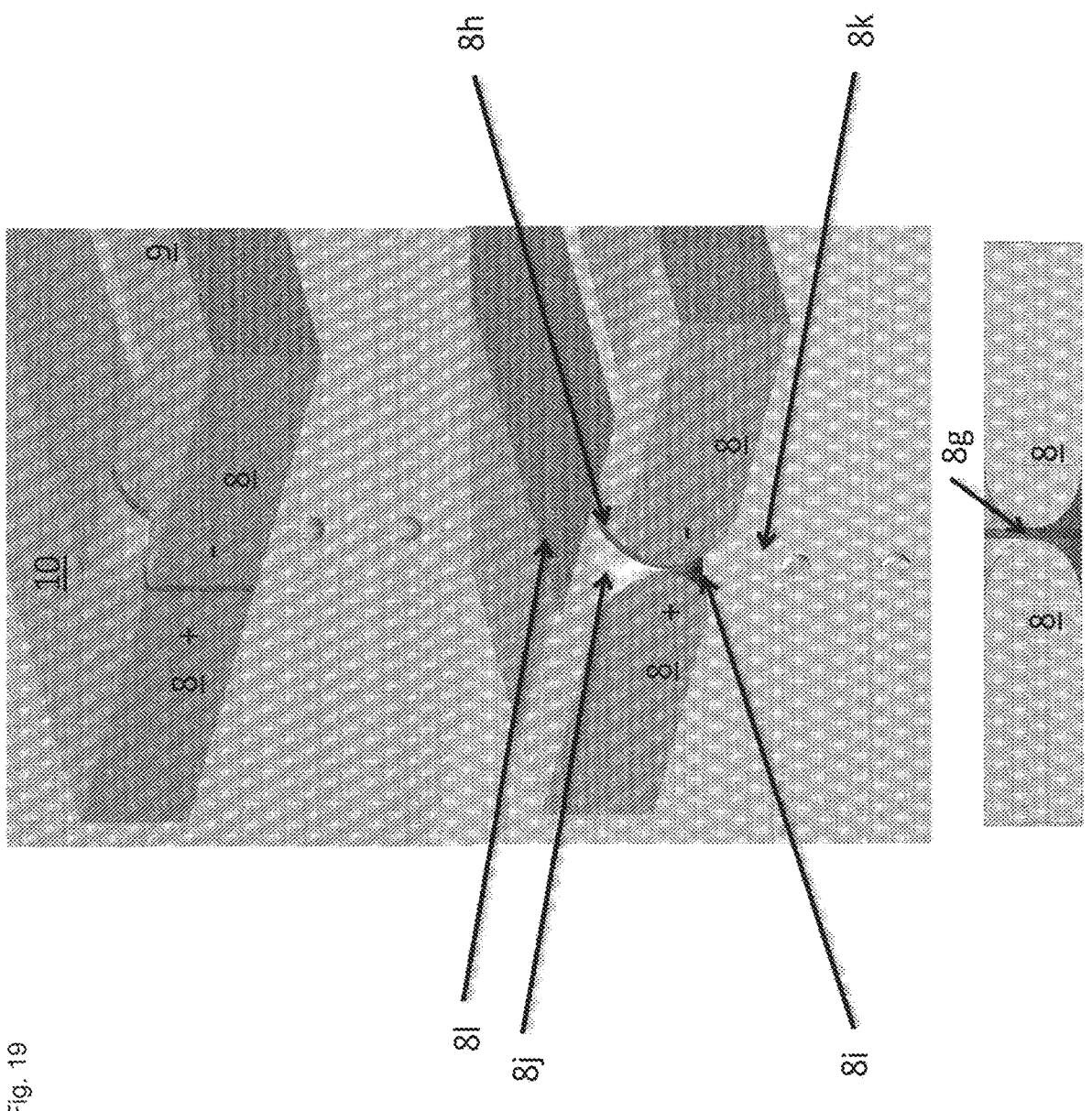
FIG. 19 (also referred to herein as 2I12) is a schematic drawing of a SF-CIHT cell power generator showing the electrodes and two cross sectional views of the electrodes shown in FIGS. 2I10 and 2I11 in accordance with an embodiment of the present disclosure.
Figure 21:
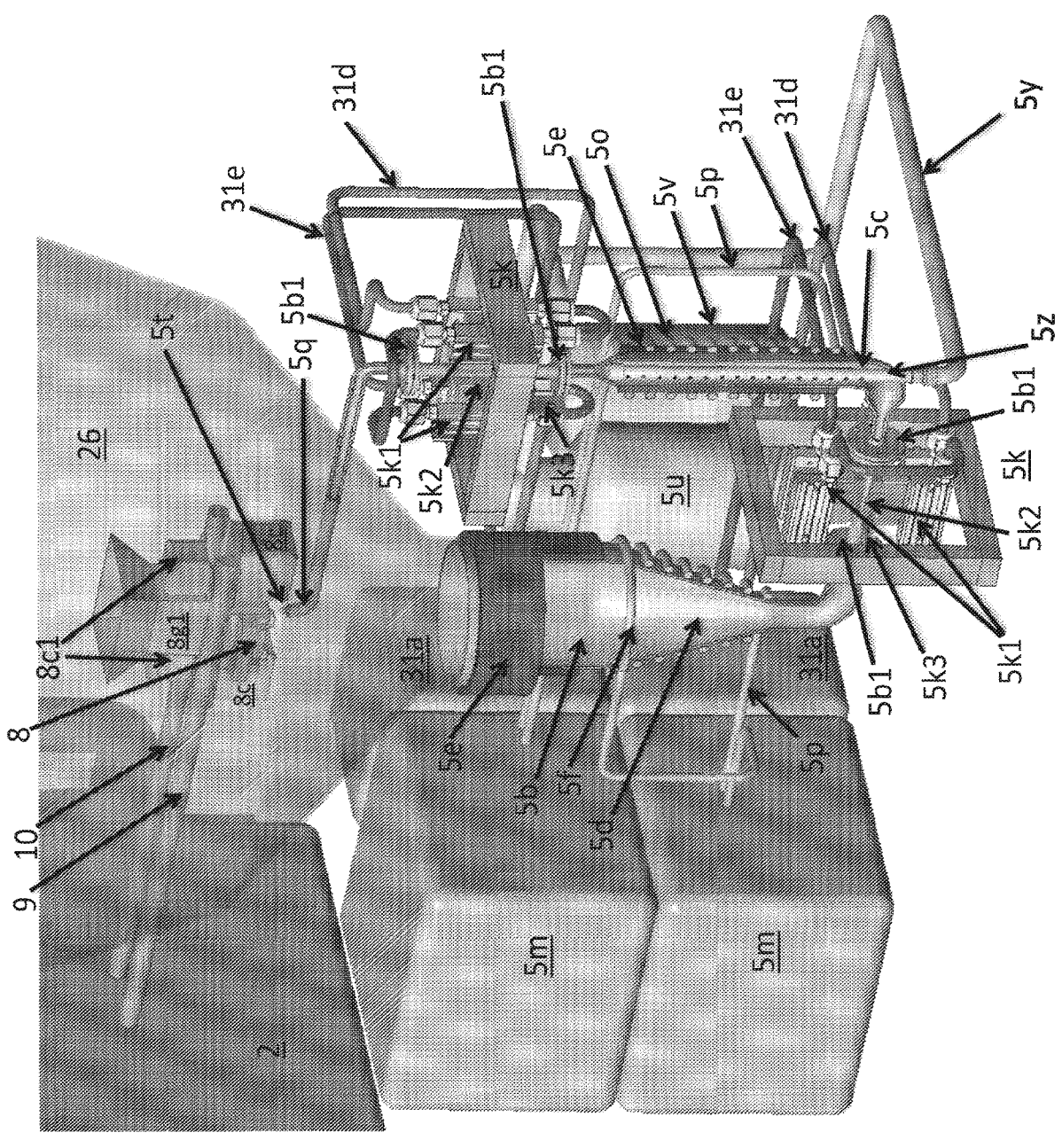
FIG. 21 (also referred to herein as 2I14) is a schematic drawing of a SF-CIHT cell power generator showing the cross section of the pelletizer having a pipe bubbler in the second vessel to introduce the gasses such as $H_2$ and steam to the melt, two electromagnetic pumps, and a nozzle to inject shot into the bottom of the electrodes in accordance with an embodiment of the present disclosure.

In an embodiment shown in FIGS. 2I19-2I21, the bottom of the cell cone comprises a melt reservoir or cone reservoir $5b$. The cell cone may comprise a material has at least one property of the group of silver adherence resistance, capable of high temperature, and non-magnetic. Exemplary materials for at least one component of the cell such as at least one of the cone reservoir and an upper cone comprising the cell walls are graphite, tungsten, molybdenum, tungsten carbide, boron nitride, boron carbide, silicon carbide, SiC coated graphite, and high temperature stainless steel. The material may be coated. Exemplary embodiments are SiC coated graphite, Mullite, and Mullite-YSZ coated stainless steel. At least one of the inside of the cell $26$, the bus bars $9$ and $10$, and electrode components other than those that directly contact the melt to supply the ignition current such as the magnets $8c$ and $8c1$, channel $8g1$, connection of the electrodes $8$ to the bus bars $9$ and $10$, nozzle $5q$, and injector $5z1$ may be coated with material that resists adherence of the melt. Exemplary coatings comprise aluminum such as polished anodized aluminum, W, Mo, WC, graphite, boron carbide, fluorocarbon polymer such as Teflon (PTFE), zirconia+8% yttria, Mullite, or Mullite-YSZ. In another embodiment, the leads and electrode components may be covered with a housing such as a high-temperature stainless steel housing that may be coated with a material of the disclosure that resists adherence of the melt. The SF-CIHT cell may further comprise a means to at least one of monitor the integrity of the coating and apply more coating such as graphite. For performing routine maintenance, the SF-CIHT cell may further comprise a graphite coating applicator such as a sprayer. The sprayer may comprise at least one nozzle that directs the spray comprising graphite onto the cone surface and a source of graphite such as dry graphite lubricant known in the art. The material such as graphite may be polished. The polished may be performed with a fine abrasive such as one comprising at least aluminum oxide, silicon carbide, and diamond powder. In an embodiment, the cone reservoir comprising graphite may be fabricated by 3D printing. In an embodiment, the cell cone cut from graphite by a cutter. The cutter may comprise a laser or water jet. The cutter may comprise a mechanical saw. The cutter may be angled and rotated. Alternatively, the cone may be cut from a tilted and rotated graphite block. The cone may be made in a plurality of sections such as an upper cylinder, a middle cone such as one with 45° walls, and a bottom cone reservoir.

In an embodiment, the cone comprises segmented pieces such as triangular pieces that are assembled to form a cone. The pieces may be sheets. The sheets may be cut in triangular pieces and fitted together to form the cone. The pieces may comprise cladding of a support structure such as a stainless steel conical frame or cone. The pieces comprising male pieces in an assembly mechanism may be fitted into top and bottom rings comprising female slots to receive the male pieces. The top and bottom rings may be fastened to a frame directly or indirectly such as the vacuum chamber $26$ wherein the fastening causes the pieces to be held together. The bottom ring may further comprise a flange that attaches to the cone reservoir $5b$. The attachment points of cone elements comprised of graphite may comprise expansion joints.

Exemplary embodiments of at least one of the upper cone and the cone reservoir are at least one of graphite and SiC coated graphite formed into a cone, at least one of graphite and SiC coated graphite lining a support such as a stainless cone, at least one of segmented graphite and SiC coated graphite plates lining a stainless cone, at least one of segmented graphite and SiC coated graphite plates mechanically held together, W foil formed into a cone, W plated stainless steel cone, W foil lining a support such as a stainless steel cone, segmented W plates lining a stainless steel cone, segmented W plates mechanically held together, stainless steel having a steep angle such as about 60° and Mullite or Mullite-YSZ coated, Mo foil formed into a cone, Mo plated stainless steel cone, Mo foil lining a support such as a stainless steel cone, segmented Mo plates lining a stainless steel cone, segmented Mo plates mechanically held together, stainless steel having a steep grade such as 60° angles that is Mullite or Mullite-YSZ coated. A cone such as a stainless steel cone that is heated above the melting point of the melt such as the Ag or Ag—Cu alloy melt. The heating may be achieved by at least one of a heater such as an inductively coupled heater and a resistive heater and by the hydrino reaction. Other materials for at least one of the upper cone, windows such as PV windows, and housings to prevent ignition product adhesion comprise at least one of sapphire, alumina, boro-silica glass, $MgF_2$, and ceramic glass.

In an embodiment, the cell walls above the cone reservoir may comprise a material such as a metal such as aluminum that may have a lower melting point than the operating temperature of the cone reservoir. In this case, the corresponding upper cone such as one comprising segmented aluminum pieces or plates may end before the cone reservoir and may further extend over the otherwise connecting edge with the cone reservoir such that returning melt may flow over the edge into the cone reservoir. The upper cone may at least one of comprise a heat sink such as thick plates and may be cooled to prevent melting. The surface may comprise an oxide such as aluminum oxide to prevent adhesion of the melt.

At least one of the conical cell $26$ and cone reservoir $5b$ may comprise or is coated with at least one of mica, wood, cellulose, lignin, carbon fiber, and carbon fiber-reinforced carbon wherein at least some of the surface may be carbonized to graphite. The heat from the hydrino process may cause the cone wall to overheat. The wood cone reservoir or cone cell may comprise a backing heat sink such as a metal sink that may be cooled. The cooling may comprise a heat exchanger that may be attached to the cone reservoir or cone cell wall. The heat exchanger may comprise a coolant that may be cooled by a chiller $31a$. The heat exchanger may comprise pipes that are fastened to the cone wall wherein a gas such as air is followed through the pipes by an air mover such as a fan. The system may be open such that the wall is cooled by air-cooling.

The metal in the reservoir may be melted or maintained in a molten state by heating. The metal may be heated indirectly by heating the outside of the reservoir or heat directly. The reservoir may be heated with a heater such as at least one of a resistive heater and an external or internal inductively coupled heater $5m$ comprising leads $5p$ and coil $5f$. Since silver has a high thermal conductivity, the internal heat should be rapidly and evenly transferred for an internal resistive heater. Suitable resistive heaters capable of high temperature are ones comprising Nichrome, graphite, tungsten, molybdenum, tantalum, SiC, or $MoSi_2$, precious metals, and refractory metal heating elements. The geometry may be such that there is rapid heat transfer with a minimization of space such as a pancake-shaped heater. The heater may be treated with the appropriate protective coating to interface with at least one of steam and hydrogen. Alternatively, the heating element may be protected from reaction with at least one of water and hydrogen by being wetted with the melt such as silver. The light from the ignition of the fuel propagates predominantly upward to the PV converter $26a$; however, any light and heat that propagates downward may serve to heat the ignition products such as those in the cone reservoir $5b$ to limit the amount of heater power consumed. The reservoir may be maintained in the vacuum of the cell provided by lower vacuum-capable chamber $5b5$ and vacuum connection $5b6$ to decrease heat loss by means such as conduction and convection. The reservoir may further comprise radiation shields that may have passages for the return of the ignition product such as molten silver. As in the exemplary case of a fuel cell, the reservoir may comprise a thermos or vacuum jacketed walls such that heat loss is minimum. In an idle condition of the SF-CIHT cell, the reservoir may only need heating periodically to maintain the melt such that the cell is in a ready condition to operate. As an exemplary case, it is known in the art of fuel cells that heating need be performed on a time frame of about every twelve to twenty-four hours.

The reservoir may comprise at least one bubbler tube $5z$ to supply and incorporate at least one of water and hydrogen into the melt. The bubbler tubes $5z$ may comprise a serpentine gas flow field or diffuser such as one known in the art of fuel cells such as molten fuel cells. The bubbler tubes may comprise an inverted cup to trap the injected gases such as $H_2O$ and $H_2$ to be at least one of dissolved and mixed into the melt. The gas may be released inside the inverted cup-shaped diffuser. The diffuser may be submerged under the melt, and the melt may flow around the top of the diffuser to the underside to receive the gases. The trapped gas may provide pressure to facilitate the flow of the melt into the electromagnetic pump $5k$. The bubbler tube $5z$ such as a flow field may comprise a material that silver does not wet such as at least one of graphite, W, and WC. The lack of wettability may prevent the silver from clogging the gas holes of the bubbler. The pipe bubbler $5z$ may comprise a hydrogen permeable membrane such as at least one comprising carbon such as wood, cellulose, or lignin wherein the surface may be carbonized, and graphite, carbon fiber-reinforced carbon, and Pd—Ag alloy, Ni, niobium, Pd, Pt, Ir, noble metal, and other hydrogen permeable membrane known in the art. The membrane may receive hydrogen gas such as from source $5u$ and facilitate its diffusion across the membrane to the melt such as at least one of Ag, Ag—Cu alloy, and Cu melt. The pipe bubbler $5z$ may further comprise a water-permeable membrane or frit such as a porous ceramic membrane or frit. The $H_2O$ permeable frit may comprise a material such as zirconia, Mullite, Mullite-YSZ, or porous graphite that is unreactive with $H_2O$ and is not wetted by the melt. The membrane may comprise a honeycomb. Other exemplary membranes and frits comprise yttria-stabilized zirconia, scandia stabilized zirconia, gadolinium doped ceria that may further comprise a cermet. Alternative membranes comprise cellulose, wood, carbonized wood, and carbon fiber-reinforced carbon. The pressure from the source such as $5u$ and $5v$ may control the rate that $H_2$ and $H_2O$ are supplied to the melt.

At least one of $H_2O$ and $H_2$ may be soluble in the melt in a manner dependent on the partial pressure of the corresponding applied gas. In an embodiment such as one shown in FIG. 2I17, the pelletizer $5a$ comprising a molten metal fuel further comprises at least two values to selectively, alternatively seal the second vessel $5c$ and the gas from manifold $5y$ such that pressurized gas such as at least one of $H_2O$ and $H_2$ are applied to the melt in the second vessel $5c$. First, a valve on the inlet of the second vessel $5c$ is closed to prevent backflow into the first EM pump $5k$, and a manifold valve is opened to allow the melt to be treated with pressured gases supplied through manifold $5y$. Next, at least one of the second pump $5k$ and the gas pressure may force the gas-treated melt out of the second vessel $5c$ and through the nozzle $5q$. Then, the valve to the manifold $5y$ is closed and the value at the inlet to the second vessel $5c$ is opened to allow the first EM pump $5k$ to pump melt into the second vessel $5c$ to repeat a cycle of pressured gas treatment and ejection of the treated melt. Alternative valve, pump, and gas and melt lines and connections known to those skilled in the art are within the scope of the disclosure. The pelletizer may comprise a plurality if second chambers $5c$ with inlet and manifold values. The fuel hydration may be synchronized between the chambers to achieve about continuous injection with treated melt.

The plurality of bubblers may be fed off a manifold $5y$. At least one of $H_2$ and $H_2O$ may be supplied a source of each gas such as $5u$ and $5v$. In an exemplary embodiment, at least one of water, water vapor, and steam are provided from source $5v$. At least one of water vapor and steam may be supplied by at least one of a water vapor generator and steam generator $5v$. The water vapor generator may comprise a carrier gas and a water source wherein the carrier gas is bubbled through the water such as water reservoir $5v$. Hydrogen may comprise the carrier gas bubbled through $H_2O$ to also serve as a reactant in the hydrino reaction. The SF-CIHT generator may further comprise a recovery and recirculation system of any unreacted $H_2$ that may be recycled. The recovery system may comprise a getter such as a metal that selectively binds hydrogen to provide it to the recirculation system such as a pump. The recovery system may comprise a selective filter for $H_2$ or other system known by those skilled in the art. In another embodiment, the carrier gas may comprise an inert gas such as a noble gas such as argon. The SF-CIHT generator may further comprise a recovery and recirculation system of the carrier gas that may be recycled. The recovery system may comprise a selective filter for the carrier gas or other system known by those skilled in the art. The fuel comprising melt that has absorbed at least one of $H_2O$ and $H_2$ may be transported out of the reservoir. The reservoir may outlet to an electromagnetic (EM) pump $5k$. In embodiments shown in FIGS. 2I14-2I18, the EM pump may outlet into the second vessel $5c$ comprising an injection tube that may be trace heated with a heater such as an inductively coupled heater $5o$. The tubing such as one of the disclosure may be very efficient at absorbing the inductively coupled heater radiation. The tube may have a low emissivity such as polished or electropolished tubing that may be run in a vacuum chamber.

Alternatively, the heater such as a resistive heater of the second vessel 5*c* may be inside of the second vessel wherein the second vessel has sufficient diameter or size to accommodate the internal heater.

For startup, the pump tube 5*k*6 may be filled with the fuel metal such as silver or silver-copper alloy to increase the heat transfer cross sectional area. The area may be increased to increase the rate that heat is conducted along the tubing from the heated cone reservoir 5*b* to the inlet to the pump 5*k*. Alternatively, the pump tubing may be heated with resistive trace heating, or the tubing may be insulated. In an embodiment, the tubing comprises insulation that is variable or adjustable to control the teat transfer between insulating and effect at heat transfer. The insulation may be made in a state of high insulation during pump startup, and the insulation may be made in a state that provides high heat transfer during operation to prevent the pump from overheating. In an embodiment, the variable, adjustable, or controllable insulation comprises a vacuum jacket the surrounds the pump tubing. The vacuum jacket may be evacuated during startup, and gas can be added to the jacket for rapid heat transfer after the pump is operating. The outside of manifold of the vacuum jacket may be cooled with water-cooling to provide addition heat removal capacity to prevent overheating. Alternatively, the pump tubing and bus bars may comprise a high temperature material such as Ta that is capable of operating at a temperature in excess of that achievable during operation of the pump. The high-temperature capable pump tube such a Ta pump tube may be coated with a high-temperature oxidation-resistant coating. The bus bars may comprise a more conductive metal than the pump tube metal. The bus bars may be capable of operating at high temperature. Radiative heat transfer may limit the maximum operating temperature. The pump tube may comprise elements such as fins that increase the surface area to increase the heat transfer. The high-temperature capable tube may comprise a coating to prevent oxidation. Alternatively, the pump tube may comprise a cooling system such a water coils in contact with its surface wherein the water is initially evacuated during startup. Once the pump is at operating at temperature, the water or other suitable coolant may be pumped through the cooling system to remove excess heat as needed in a controlled manner. The control may be achieved by controlling the coolant pump speed, the chiller heat rejection rate, and the coolant inlet and outlet temperatures. In another embodiment shown in FIG. 2I19, the electromagnetic pump is housed in a lower chamber 5*b*5 that may be filled with a heat transfer gas such as an inert gas such as argon or helium. The inert gas may further comprise hydrogen such as noble gas-hydrogen mixture such as one comprising about 1 to 5% $H_2$ in order to prevent the oxidation of the pump tube. The lower chamber 5*b*5 may be sealed to the cell 26 with a flange and a gasket such as a graphite gasket. The pressure may be adjusted to control the pump tube temperature. The cooling system may comprise an inert gas tank, pump, pressure gauge, pressure controller, and temperature recorder to control the heat transfer rate from the pump tube.

In another embodiment, the second vessel 5*c* comprises a bend at its inlet end and an injection section that ends at the nozzle 5*q* wherein it receives melt from the pump 5*k* and serves as a conduit to transport it to the nozzle 5*q* to be injected into the electrodes 8. The cell cone reservoir may tapper into the inlet of the pump tube 5*k*. The pump tube may be oriented vertically. The second vessel may bend in in an arc in the range of about 90° to 300° so that the injection section of the second vessel is oriented towards the electrodes 8. The second vessel 5*c* may travel back through the cone reservoir in route to inject the melt into the electrodes. The diameter or size of the pelletizer components such as the second vessel may be selected such that the drag on the flow is not excessive. Additionally, the second vessel may be heated such as trace heated by a heater such as a resistive or inductively coupled heater. The heater such as the inductively coupled heater to heat the injection section may comprise a coil such as 5*f* that heats the inlet portion and may further comprise coil 5*o* that may penetrate the wall of cell 26 and heat the injection section. The inlet portion of the second vessel may comprise a tubular loop that is heated by an inductively coupled heater having a coil 5*f* that surrounds the tubular loop.

In an embodiment shown in FIGS. 2I19 and 2I20, the cell wall 26 comprises a material resistant to silver adherence such as at least one of graphite, graphite coated metal such as graphite coated high temperature stainless steel, tungsten, and tungsten carbide. The cell wall may taper into a conical bottom. The cell bottom may comprise a flange that may connect to a mating flange connecting to a cone reservoir 5*b* to contain melt such as silver melt. The cone reservoir 5*b* may be capable of high temperature operation and may comprise a material such as graphite, tantalum, niobium, titanium, nickel, molybdenum, tungsten or other high-temperature or refractory material or metal such as a high temperature stainless steel. The cone reservoir may be lined with material that resists adherence of the melt such as silver melt. An exemplary cone reservoir and liner comprise graphite or tantalum or niobium lined with graphite. The graphite liner may be connected to the cell. The connection may be by mating flanges that are fastened together by fasteners such as high-temperature screws such as Mo, Ta, or Nb screws. The fasteners may comprise anchors with mating bolt or screws that thread into the anchors. In an embodiment wherein the cone reservoir is in vacuum or an inert atmosphere, it may also comprise graphite with no liner. The vacuum or inert atmosphere may be provided by a vacuum-capable lower chamber 5*b*5. The cone reservoir may comprise a bottom flange that connects to a mating flange of the inlet of a pump tube of an electromagnetic pump 5*k*. An inductively coupled heater comprising surrounding coil 5*f* may heat the cone reservoir 5*b* and at least a portion of the inlet to the pump 5*k* to a temperature above the melting point of the melted metal such as at least one of silver, silver copper alloy, and copper metal. Defining the flange connection as the origin, the tube may initially point downward and then form a loop having a suitable radius of curvature to place the tube in a vertical direction to intersect the cone reservoir 5*b*. The inlet may transition into the straight pump tube 5*k*6 wherein the direction of pumping may be oriented vertically. The outlet tube of the pump may run vertically to intersect the cone reservoir wall. The intersection may be at the cones largest radius to provide the maximal distance of the pump yoke and magnets 5*k*4 and 5*k*5 (FIG. 2I16) from the cone reservoir 5*b* to provide for operating these pump components at a suitably lower temperature than that of the cone reservoir. The pump magnetic circuit 5*k*4 and 5*k*5 may be oriented tangentially to the cone reservoir, and the bus bars 5*k*2 may be short and oriented perpendicularly to the cone reservoir with leads 5*k*3 to the current source at about 90° to the direction of the bus bars 5*k*2. The orientation of the magnetic circuit 5*k*4 and 5*k*5 may maximize the distance from the elevated temperature components. The high-operating-temperature components such as the cone reservoir and the inlet tube, pump tube 5*k*6, and outlet tube are required to be above the melting point of the melt, and the low-operating-temperature components such as the magnetic circuit $5k4$ and $5k5$ of the EM pump $5k$ are required to be at a much lower temperature such as less than about 300° C. To maintain a temperature separation between the two types of components, the pelletizer may comprise insulation between the components. Additionally, the magnetic circuit may be cooled by a cooling system such as one comprising water-cooled heat transfer plates $5k1$ and a chiller $31a$. The water-cooled coils of the inductively coupled heater $5f$ may also serve to cool the magnetic circuit of the electromagnetic pump $5k$ and vice versa. The cone reservoir and the pump inlet may comprise the first vessel $5b$. The electromagnetic (EM) pump $5k$ may pump the melt such as the silver melt from the cone reservoir to the electrodes through the second vessel $5c$ that may comprise pump outlet tube such as a tantalum or niobium tube of about ⅜ inch diameter and nozzle $5q$. The loop of the pump inlet and outlet tubes may comprise a bend of at least about 180° back through the cone reservoir wall. The tube $5c$ may travel inside of the cone reservoir $5b$ in a region such as one below the silver melt level contained in the cone reservoir, and protrude above the melt level ending in nozzle $5q$. The nozzle may be slightly above the melt level such that the melt remains molten while flowing in the tube without the need of a vessel heater. In other embodiments having the nozzle significantly distant from the melt level, heating is applied to the distal injection section of the second vessel by a heater such as an inductively coupled heater. In an embodiment such as the former case, the electrodes may be located very close to the level of the melt. In an embodiment, the separation distance of the melt and the electrodes is within at least one range of about 1 mm to 100 mm, 1 mm to 50 mm, and 1 mm to 10 mm. The cell may have a larger diameter vacuum housing flange at the bottom of the cell containing the inner cone reservoir flange and the inlet to the cone reservoir. A lower chamber $5b5$ capable of maintaining a vacuum or an inert atmosphere may be connected to the vacuum housing flange. The interior vacuum of the vacuum housing may be connected to the interior vacuum of the cell by a vacuum connection line $5b6$. Alternatively, the vacuum connection line $5b6$ may connect to a common manifold to the cell vacuum pump $13a$. The lower vacuum-capable chamber $5b5$ may comprise a right cylinder that may have a domed end cap. The lower vacuum-capable chamber $5b5$ may contain at least one of the cone reservoir $5b$, at least a portion of the electromagnetic pump $5k$ comprising the pump tube $5k6$ and its inlet and outlet, the EM pump bus bars $5k2$ and at least a portion of the magnetic circuit $5k4$ and $5k5$, and the heating coil $5f$. The electrical connection to bus bars of the EM pump $5k3$, the leads to the inductively coupled heater coil $5p$, and any sensor leads may penetrate the walls of the lower vacuum-capable chamber $5b5$. A portion of the EM pump magnetic circuit $5k4$ and $5k5$ may penetrate or have flux penetrate the lower vacuum-capable chamber $5b5$ wherein the magnets and optionally a portion of the magnetic circuit $5k4$ and $5k5$ may be outside of the lower vacuum-capable chamber $5b5$. The vacuum may protect air sensitive materials such as graphite, Ta, and Nb from oxidation. In another embodiment, the lower chamber $5b5$ capable of maintaining a vacuum or seal from atmosphere may not be connected to the vacuum of the cell. In this case, the lower chamber $5b5$ may be filled with an inert gas such as nitrogen or a noble gas such as argon. Further protection may be achieved by coating atmospheric gas reactive materials with a protective coating such as an electroplated or physical coating such as ceramic.

In an embodiment, the inductively coupled heater coil leads penetrate into a sealed section of the generator such as at least one of the cell $26$ or the lower chamber $5b5$. The lead $5p$ penetration of the corresponding wall such as at least one of the cell, chamber $5b5$, and a partition between the two such as a electromagnetic pump flange plate may be electrically isolated such that the leads $5p$ to not electrically short. The penetrations may occur at the wall or may occur at a location distant from the wall in order to provide a location wherein the temperature is lower than at the wall. The wall may be connected to the distant location by a conduit that houses the lead without electrical contact. The conduit end that is opposite the sealed penetrations may be welded to the wall to be penetrated to form a seal at the wall location. In an embodiment wherein the leads penetrate a hot conducting element wherein the vacuum seal is at the distant location, the lead may pass through a hole in the element such as the electromagnetic pump flange plate without making electrical contact with the element. The leads may be polished to lower the emissivity and heat transfer to the leads. The conduit may be vacuum-sealed about the lead with an electrical insulator at the opposite end of the conduit from the hot conducting element where the temperature is much lower. The insulator may comprise a low temperature seal such as a Teflon seal such as a Teflon Swagelok or Utra-Torr with Kalrez O-ring. Alternatively, the vacuum tight lead penetrations may comprise commercially available high-temperature RF penetrations.

Figure 26:
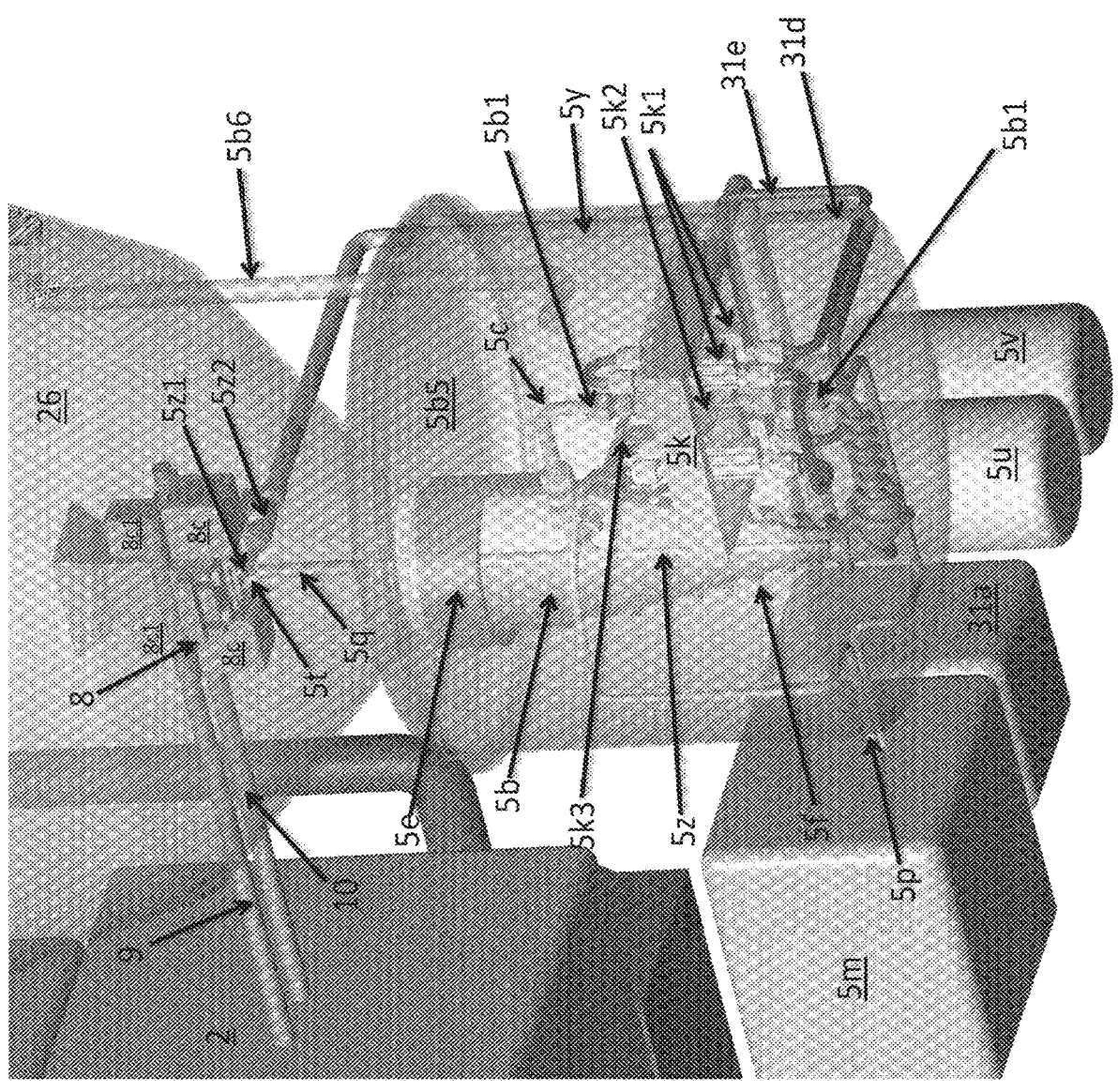
FIG. 26 (also referred to herein as 2I19) is a schematic drawing of a SF-CIHT cell power generator showing the cross section of the pelletizer having both a pipe bubbler in the cone reservoir and a direct injector to introduce the gasses such as $H_2$ and steam to the melt, one electromagnetic pump, and a nozzle to inject shot into the bottom of the electrodes in accordance with an embodiment of the present disclosure.

In an embodiment, the cone reservoir and chamber $5b$ are threaded and screwed together in the vacuum connector to a top plate of the vacuum housing. The pump tube may penetrate the top plate. Vessel $5b$ may be attached to the top plate by means such as welds. In an embodiment, the pump tube $5k6$ may be heated independently by a heater such as an inductively coupled heater that maintains the tube at a desired temperature above that of the melting point of the melt. In an embodiment, one inductively coupled heater RF power unit may be multiplexed to a plurality of inductively coupled heater coils. The pump tube heater may comprise a heater coil that is intermittently driven by the RF generator for the cone reservoir heater at a duty cycle of the RF generator that is switched over timed between driving the cone reservoir heater coil and the pump tube heater coil. The duty cycle may be controlled to maintain the cone reservoir and the pump tube at desired temperatures. An exemplary duty cycle range is about 10% to 90%. Alternatively, the EM pump tube may be heated by heat transferred from a hot section of the generator. The heat may be from a heater or from the hydrino reaction. In an embodiment, the heat transfer is from the heated cone reservoir $5b$ transferred by a conductive medium such as copper that may comprise heat transfer blocks $5k7$ (FIG. 2I26). The blocks may be machined or cast to contact the cone reservoir and the pump tube. To make better thermal contact between the pump tube $5k6$ and the heat transfer blocks $5k7$, the pump tube may be coated with a heat transfer compound such as Thermon T-99.

Each bus bar $9$ and $10$ may comprise a connection to a capacitor bank. The capacitor bank may comprise a plurality (e.g. two) of parallel sets of two capacitors in series with one connected to the positive bus bar and one connected to the negative bus bar with the corresponding opposite polarity capacitor terminals connected by a bus bar. The circuit may be completed with the arrival of shot between the electrodes. The capacitors may be connected to a source of electrical power to charge the capacitors and maintain their voltage during operation wherein the voltage is sensed at the capacitors. Each bus bar may vertically penetrate the cell wall and comprise a mount such as a copper block with threads to receive the threads of the terminal of the corresponding capacitor. A horizontal bus bar may screw into the threaded end of each vertical bus bar, and the electrodes may slide onto the ends of the horizontal sections. The electrodes may be secured by fasteners such as clamps with bolts or set screws.

Figure 29:
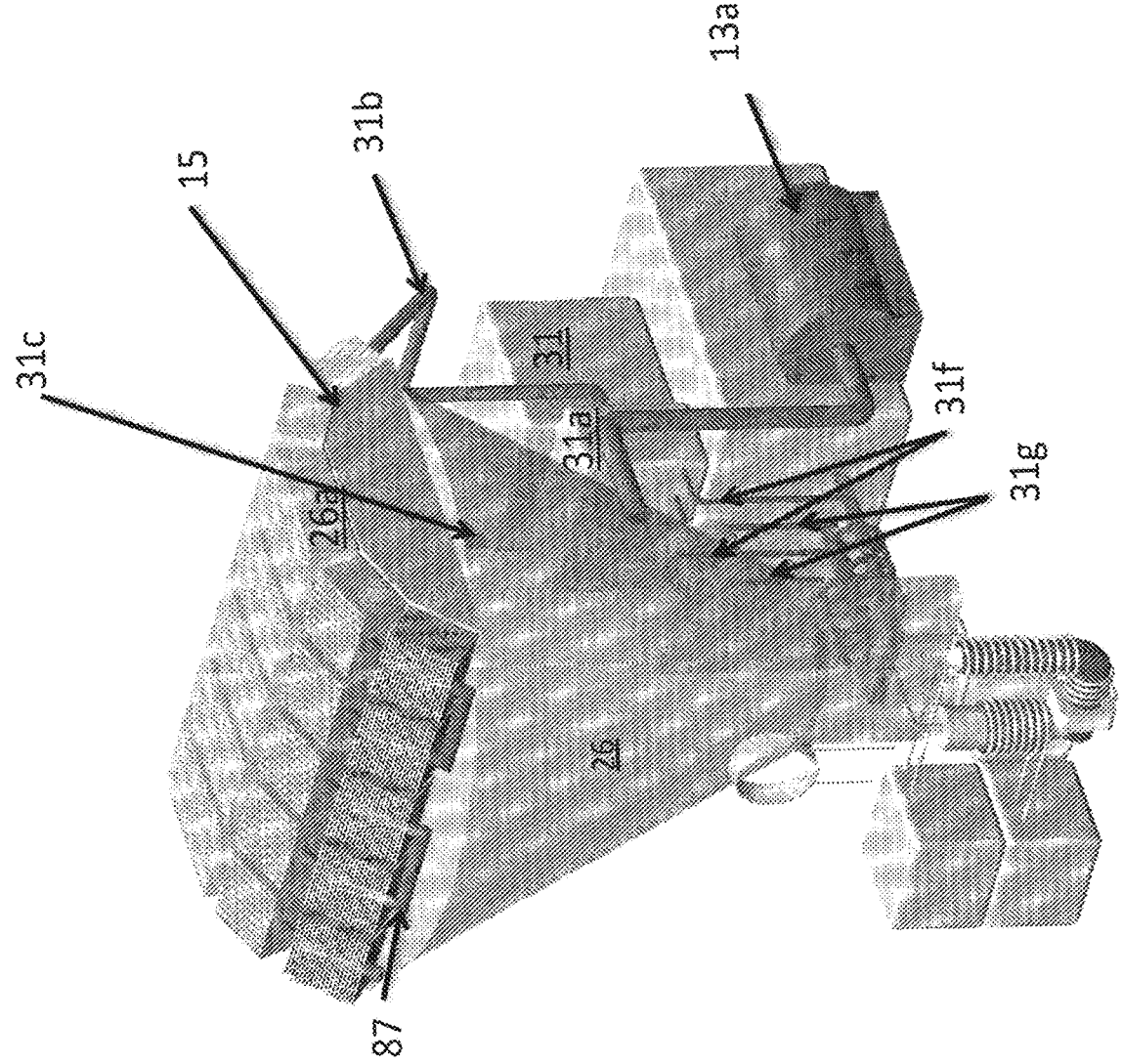
FIG. 29 (also referred to herein as 2I22) is a schematic drawing of a SF-CIHT cell power generator showing an electrode cooling system in accordance with an embodiment of the present disclosure.
Figure 30:
FIG. 30 (also referred to herein as 2123) is a schematic drawing of a SF-CIHT cell power generator showing two views of cells with passive photovoltaic converter cooling systems, active and passive electrode cooling systems, and gas getter systems in accordance with an embodiment of the present disclosure.

The electrodes may comprise one of the disclosure such as a downward V-shape the forms a channel at the gap 8 towards the PV converter 26a and further comprises an electrode EM pump comprising channel 8 and magnets 8c and optionally a second electrode EM pump comprising magnets 8c1 and channel 8g1. To prevent excessive heating of the magnets of either electrode EM pump, the magnets such as 8c and 8c1 may be located outside of the cell 26. The magnetic field may be supplied to the channel such as 8g and 8g1 by a magnetic circuit 8c (FIGS. 2I29-2I31) such as ferromagnetic yolks that may operate at high temperature such as at least one of iron, cobalt, and Hiperco® 50 Alloy (49% Co, 49% Fe, 2% V) yokes. In another embodiment, the yokes may comprise one material such as Co or Hiperco® 50 Alloy at the gap where the temperature is greatest and another material such as iron at the lower-temperature portion interfacing the magnets. The magnets may comprise a material that has a high maximum operating temperature such as CoSm magnets. To further thermally isolate the CoSm, the magnetic circuit may comprise an inner magnet that may operate at higher temperature such as an AlNiCo magnet that may operate at a maximum temperature of up to 525° C. compared to 350° C. for CoSm. The electrode EM pump magnetic circuit may comprise the magnets and the yokes and each may penetrate the cell wall 26. Alternatively, the magnetic flux may penetrate the wall from a first outside magnetic circuit section to a second magnetic circuit section inside of the cell. An exemplary wall material that permits the flux penetration is a high temperature stainless steel. In an alternative embodiment, the nozzle 5q may be positioned in close proximity to the electrodes 8 such that the pressure from the EM pump 5k pumps the melt through the electrode gap 8g and optionally 8g1 wherein at least one of the first and second electrode EM pumps are optional. The nozzle 5q may comprise a non-conductor such as quartz or a low conductor such as graphite such that it may be in proximity to the gap 8g or may be in contact with the electrodes 8 to facilitate direct pumping of the melt through at least one electrode gap or channel 8g and 8g1. Alternatively, the nozzle may be tipped with a non-conductor such as a quartz or ceramic sleeve, coated with a nonconductor such as boron nitride, or comprise a conductor such as the material of the pump tube, but a minimum gap may be maintained between the nozzle and electrodes 8. The cell may electrically floated, rather than being grounded to prevent the flow of electricity through the nozzle to other components in the cell. The cell walls, bus bars 9 and 10, and any other elements in the cell may be covered with a sheath that resists adherence of the melt such as silver or silver-copper alloy such as Ag 72 wt %-Cu 28 wt %. An exemplary sheath material is graphite, boron carbide, fluorocarbon polymer such as Teflon (PTFE), zirconia+8% yttria, Mullite, or Mullite-YSZ. The shot ignited by the electrodes may comprise molten metal such as molten Ag that may further comprise at least one of gas of the group of $H_2O$ and hydrogen. The cone reservoir 5b may comprise at least one gas or water line such as a line from a manifold 5y connected to a source of at least one of $H_2O$ and $H_2$ 5u and 5v and a pipe bubbler or gas flow field 5z to add the gases to the melt. The line may penetrate the wall of the cone reservoir 5b to connect to the pipe bubbler 5z or gas flow field.

Alternatively, at least one of $H_2O$ and $H_2$ may be added by injection by an injector 5z1 regulated by injector regulator and valve 5z2 at the electrodes 8. The injector 5z1 may inject at least one of $H_2O$ and $H_2$ into at least one of a portion of the ignition plasma, the center of the ignition plasma, into the a portion of the melt and substantially into the middle of the stream of the melt to maximize the incorporation of the at least one of $H_2O$ and $H_2$ into at least one of the melt and the plasma. An exemplary injector 5z1 comprises a stainless steel tube having a 50 um hole at the end that injects $H_2O$ directly into the plasma. The injector may comprise a nozzle comprising at least one pinhole such as each having a diameter in the range of about 0.001 um to 5 mm. The gas may directionally flow from the injector 5z1. The gas may comprise a gas jet or molecular beam such as at least one of a $H_2O$ and $H_2$ jet or beam. The nozzle may be located close to the point of ignition such as within 0.1 to 5 mm of the electrode gap 8g to efficiently supply the gases to the ignition while avoiding excess gas to be pumped from the cell. The injection may occur above of below the electrode gap 8g. The tip of the injector 5z1 may comprise a material that is resistant to heat damage such as a refractory metal such as one of the disclosure such as W or Mo. In another embodiment, the nozzle of the injector 5z1 may comprise a plurality or array of pinholes such as ones aligned along the length of the electrodes to inject gases into the molten metal. In an exemplary embodiment, the pinholes are about 25 um in diameter. The injection may be at high velocity. The high velocity may assist in impregnation of the metal with the gases so that the gases may be introduced to the reaction mixture with a greater yield. The molecular beam may facilitate the formation of HOH catalyst. In an embodiment, the tip of the injector 5z1 may comprise a diffuser to form a fine mist of the water injected into the plasma or fuel to be ignited.

In an embodiment, the injector 5z1 is designed to limit the heat transfer rate from the plasma to the injector such that the water at its flow rate to sustain a desired power from the hydrino process does not boil while within the injector. The injector 5z1 may comprise i.) a minimum surface area, ii.) material of low heat transfer rate, iii.) surface insulation, and iv.) radiation shields to limit the heat transfer to the flowing water. In an exemplary embodiment wherein the hydrino reaction is $H_2O$ to $H_2(1/4)+1/2O_2+50$ MJ, the minimum water flow rate to generate X watts of power is given by $$\text{Flow Rate} = (X \text{ watts}/50 \text{ MJ/mole } H_2O) \times (1 \text{ liter } H_2O/55 \text{ moles}) \quad (39)$$

In the exemplary case wherein X=500 kW, the flow rate is 0.18 ml/s. The power to cause 0.18 ml per second of water to boil from an initial temperature of 0° C. is 490 W. Thus, the injector 5z1 is designed such that its maximum rate of acceptance of heat from the cell such as from the plasma corresponds to a power of less than 490 W. Using the relation:

$$P = \frac{1}{2}\rho v^2 \quad (40)$$

wherein P is the pressure, $\rho$ is the density of water, and v is the velocity, a water injection pressure of 3 atm corresponds to a nozzle 5q flow rate of 25 m/s. The size of the orifice of the nozzle 5q to deliver 0.18 ml/s ($0.18 \times 10^{-6}$ m³) at this flow rate is $7.2 \times 10^{-9}$ m$^2$ (95 um diameter disk). Given a tube of twice this diameter with 3 cm immersed in the plasma, the plasma contract area of the tube is $1 \times 10^{-5}$ m$^2$ which requires that the heat transfer rate be less than 490 W/$1 \times 10^{-5}$ m$^2$ or $4.9 \times 10^7$ W/m$^2$. Exemplary heat resistant nozzles with a low heat acceptance rate comprise alumina or zirconia that may be stabilized with calcia or yttria. The nozzle $5q$ such as one comprising a pinhole may have a shape to cause the water stream to spread into a volume that disperses the water throughout a desired portion of the plasma. The spread may comprise an even dispersion of the water in the plasma. The water source $5v$ may comprise a water reservoir and a pump to supply the water to the injector $5z1$. The valve, flow meter, and regulator $5z2$ may control the rate of water flow to be injected through nozzle $5q$.

The injector $5z1$ may comprise a humidifier that may maintain a desired partial H$_2$O pressure in the region of the electrodes such as one in at least one range of about 0.01 Torr to 1000 Torr, 0.1 Torr to 100 Torr, 0.1 Torr to 50 Torr, and 1 Torr to 25 Torr.

The molecular beam may be cooled to form ice crystals that may increase the rate of the hydrino reaction. The cooling may be provided by chiller $31a$. The cooling may be achieved by cooling a carrier gas such as hydrogen or a noble gas. The water may be cooled to the limit of freezing. The freezing point may be lowered by dissolving carrier gas such as hydrogen in the water to form super-cooled water. The super-cooled water may be aerosolized by bubbling the carrier gas such as hydrogen. In an embodiment, micro-water droplets such as in the range of 0.1 to 100 um diameter may be formed by an aerosolizer such as an ultrasonic aerosolizer. The ultrasonic frequency may be high such as in a range of about 1 kHz to 100 kHz. The aerosolization may result in the formation of ice crystals. The water may be injected into vacuum. The expansion into vacuum may cool the water to form ice. The evaporation of the water injected into vacuum may form the ice. The evaporation may cool the tip of the injector $5z1$ that may cause the injected water to form ice. At least one of the injected water and tip may be cooled by chiller $31a$. The cooling may be to a temperature that results in ice crystal formation of the injected water while preventing the tip from icing up and clogging. The formation of ice crystals may be further facilitated by bubbling cooled carrier gas. The super-cooling may also be achieved by at least one of reducing the pressure and elimination of nucleation sites in the water reservoir such as the bubbler. In an embodiment, an additive may be added to the water to lower the freezing point. Exemplary additives are salts, inorganic compounds, and organic compounds. In the later case, the organic compound may be consumed and replaced during operation of the cell. Gas such as hydrogen gas may be bubbled through the water to form ice crystals that may be injected into the melt to serve as a source of at least one of H and HOH catalyst for the hydrino reaction. In an embodiment, ice may be sublimated and directed to the electrodes. The vaporized ice may be flowed through a manifold. The ice may nucleate or undergo deposition to larger crystals by physical contact with a suitable surface wherein the larger particles may be flowed into the ignition site. The flow may be through the manifold having a plurality of pinholes. In an embodiment, the injector may be located in the walls of the electrodes such as in the channel $8g$. In another embodiment, the injector $5z1$ is on the opposite side of the nozzle $5q$. In an exemplary embodiment, the nozzle $5q$ injects melt into the electrodes $8$, and the injector $5z1$ injects at least one of H$_2$O and H$_2$ from the top, on the other side of the electrodes such as in the channel $8g$.

The water may be in the form of at least one of fine ice crystals, vapor, and liquid water. In an embodiment, input gas from a source such as $5u$ and $5v$ is injected into the cell that is maintained under a vacuum. Controlling the input pressure that may be less atmospheric may control the flow rate of the gas through the injector $5z1$. At least one of the input gas pressures for injection and flow rate may be controlled by valve, pump, flow controller, and pressure monitor and controller $5z2$. The cell vacuum may be maintained with a water vapor condenser such as at least one of a chiller, cryopump, and vacuum pump $13a$. The cell vacuum may be maintained with a water trap and a pump such as a vacuum pump such as a Scroll pump. The water condenser may comprise at least one of a chiller and a cryotrap. In an embodiment, the pump may comprise a high-temperature pump that maintains the cell gas at an elevated temperature while pumping such that the water vapor component essentially behaves as an ideal gas. Any injected or formed water may be removed as steam that may serve as a means to cool the cell.

In another embodiment, the cell comprises a chemical getter for removing the water vapor from the cell gas to maintain vacuum. The getter may comprise a compound that reacts with water such as a metal that may form an oxide. The water reaction product may be reversible by heating. The getter may comprise a hydroscopic compound such as a desiccant such as at least one of a molecular sieve, silica gel, clay such as Montmorillonite clay, a dehydrated base such as an alkaline earth oxide such as CaO, a dehydrated hydrate compound such as an alkaline earth compound comprising an oxyanion such as a sulfate such as CaSO$_4$, and an alkali halide that forms a hydrate such as LiBr to absorb the water vapor in the cell. The compound may be regenerated by heating. The heat may be from the excess heat produced by the cell.

The compound may be cyclically removed from contact with cell gases, regenerated, and returned. The compound may remain in a sealed chamber when heated such that a steam pressure above atmospheric is generated. The steam at an initial high pressure may be vented through a valve that is opened. The valve may be closed at a reduced pressure relative to the initial pressure that is still greater than atmospheric such that air does not flow into the chamber. The chamber may be cooled and the compound exposed to cell gases to absorb water in a repeat cycle. In an embodiment wherein the compound is transported to achieve exposure to the cell gases to absorb water in one phase of the cycle and exposure to atmosphere to release the absorbed water in another, the transport of the compound may be by a means of the disclosure such as by mechanical means such as by an auger or by using a pump. Alternatively, the transport may be by using a pneumatic means such as one of the disclosure. In an embodiment comprising a reciprocating two-valve desiccant chamber water removal system wherein the compound is not transported to achieve exposure to the cell gases to absorb water in one phase of the cycle and exposure to atmosphere to release the absorbed water in another, the compound is in a chamber with at least two valves. A first absorption valve controls the connection with the cell gases and a second exhaust valve controls the connection to the water exhaust region such as the ambient atmosphere. During the water absorption phase, the absorption valve is opened and the exhaust valve is closed. During the water exhaust phase, the absorption valve is closed and the exhaust valve is open. The valves may alternately open and close to achieve the water absorption and exhaust. The absorption valve may comprise a large valve such as a gate valve to increase the gas flow exposed to the compound. The exhaust valve may comprise a smaller pressure-regulated valve such as a blow-off valve that opens at a desired pressure and closes at a lower desired pressure. The chamber may be in proximity to the cell such that the cell ordinarily heats it. During the absorption phase, the chiller such as 31*a* may cool the chamber. The cooling may be suspended to allow the cell to heat up during the exhaust phase. The suspension may be achieved by stopping the coolant flow. The coolant may have a boiling point that is higher than the highest operating temperature of the chamber. In another embodiment, heat may be removed or supplied to the chamber by a heat exchanger such as a heat pipe. In an embodiment, water may be removed continuously by a plurality of reciprocating two-valve desiccant chamber water removal systems wherein at least one system operates in the absorption phase while another operates in the exhaust phase.

In an embodiment, the ultraviolet and extreme ultraviolet light from the hydrino reaction causes the water vapor in the cell to dissociate into hydrogen and oxygen. The hydrogen and oxygen are separated by means of the disclosure to provide a supply of these valuable industrial gases. The hydrogen and oxygen product mixture of the photon disso-ciated water may be separated by at least one method known in the art such as one or more from the group of separation of $H_2$ by a micro-porous membrane, separation of $O_2$ by an electro-diffusion membrane such as a refractory oxide such as CaO, $CeO_2$, $Y_2O_3$, and $ZrO_2$, separation of $H_2$ by a nonporous metallic membrane such as a palladium or Pd—Ag membrane, gas separation by creating a high-speed jet using an orifice and a beam skimmer, gas separation by centrifugation, and gas separation by cryo-distillation. The gases may be converted into electricity by supplying the hydrogen and oxygen to a fuel cell such as at least one of a proton-exchange-membrane fuel cell, a molten carbonate fuel cell and other fuel cells known in the art. Alternatively, the hydrogen and the oxygen or atmospheric oxygen may be combusted in a heat engine such as at least one of an internal combustion engine, a Brayton cycle engine, a gas turbine, and other heat engines known in the art.

In an embodiment, the injector 5*z*1 may comprise a manifold having a plurality of pinholes to deliver at least one of $H_2$ and $H_2O$ wherein the $H_2O$ may comprise ice crystals. The injector further comprises a pump 5*z*2. The water reservoir 5*v* may be cooled to at least the freezing point of water. The reservoir may be operated under a pressure less than atmospheric by pump 5*z*2. The low pressure may cause ice to sublime in a super cooled state wherein the vapor has a temperature below the freezing point of water at atmo-spheric pressure. The surface area of ice may be increased to increase the sublimation rate. The pump 5*z*2 may compress the super cooled water vapor to cause it to freeze. The pump may change the pressure to cause a phase change form liquid to solid. The pump may comprise a peristaltic pump. Bubble chambers use a pressure change to cause a phase change as well as given in https://en.wikipedia.org/wikiBubble_cham-ber. This principle may be applied to cause the formation of fine ice crystal for injection into the ignition plasma, the plasma formed by igniting the hydrino reactants. The pump parts that contact the super cooled water vapor and the formed ice crystals may be cooled with a chiller such as 31*a*. The ice crystals may be pumped into the injector 5*z*1 such as the manifold having a plurality of pinholes by the pump 5*z*2, and the crystals may be injected into the fuel ignition site.

In an embodiment, the hydrogen injector 5*z*1 may com-prise a hydrogen permeable membrane such as a nickel, graphite or palladium-silver alloy membrane wherein the hydrogen permeates the membrane and is delivered to the melt that is maintained under low pressure. The hydrogen permeable membrane may decrease the hydrogen flow rate to a desirable one wherein the hydrogen is injected into a low-pressure region such as in the cell at the electrodes. The flow rate may be one that does not contributed to a corre-sponding significant consumption of power. The flow rate may be manageable for the vacuum pump 13*a* to maintain the cell pressure. The hydrogen flow rate may be in at least one range of about 0.1 standard cubic centimeters per minute (sccm) to 10 standard liters per minute (slm), 1 sccm to 1 slm, and 10 sccm to 100 sccm per a cell that produces about 100 kW of light. Electrolysis of $H_2O$ may comprise the source of hydrogen 5*u*. In an embodiment, the membrane such as a palladium or Pd—Ag membrane, may perform at least one function of separating hydrogen from oxygen of an aqueous electrolysis gas mixture, injecting $H_2$ into the hydrino plasma such as at the electrodes in a controlled manner, and dissociating molecular hydrogen into atomic hydrogen. The permeation rate and selectively for hydrogen permeation may be controlled by controlling the membrane temperature such as in the range of about 100° C. to 500° C. The hydrino plasma may provide the membrane heating. In other embodiments, hydrogen and oxygen of an electrolysis product mixture may be separated by at least one method known in the art such as one or more form the group of separation of $H_2$ by a microporous membrane, separation of $O_2$ by an electro-diffusion membrane such as a refractory oxide such as CaO, $CeO_2$, $Y_2O_3$, and $ZrO_2$, separation of $H_2$ by a nonporous metallic membrane such as a palladium or Pd—Ag membrane, gas separation by creating a high-speed jet using an orifice and a beam skimmer, gas separation by centrifugation, and gas separation by cryo-distillation.

In an embodiment, the injector supplies a jet of ice crystals into the molten metal wherein the ice crystals may be impregnated into the melt due to their high velocity. In the case that the jet comprises a carrier gas such as hydrogen or a noble gas such as argon for transporting water vapor, substitution of ice crystal for water vapor may significantly increase the amount and concentration of water delivered to the ignition per carrier gas volume. The ice crystals may also be formed mechanically by means known in the art such as by an ice shaver or chipper. The mechanical ice crystal machine may comprise at least one rotating blade that breaks solid ice into small ice particles of a desired size. The ice may be supplied to the electrodes by at least one machine tool such as a high-speed grinder such as a Dremel tool or a high-speed drill or grinder such as a dentist drill or grinder. The tool or drill may be rastered over an ice surface that may be advanced as it is consumed. The rastering may be produced by a raster mechanism. A column of ice with the surface at the top may be advanced by a corresponding mechanism with replenishment from a freezing front at the base. A chiller such as 31*a* may be used to achieve the freezing. The mechanical frequency may be in the range of about 1000 RPM to 50,000 RPM. The ice may be supplied chilling water in a reservoir such as 5*u* by a chiller such as 31*a*. In an embodiment, low temperature may limit the $H_2O$ vapor pressure to favor HOH formation. The Type I ice structure may also enhance the hydrino reaction rate. In an embodiment, the solid fuel reaction mixture to form hydri-nos comprises ice as a source of at least one of H and HOH. The ice may be in a physical form to provide a high surface area such as ice crystals that may be injected by injector 5*z*1.

The ice may be formed in an ice supply 5v that may further comprise a means to form fine powdered ice or small ice crystals such as a chiller such as 31a to freeze water and a grinder. Alternatively, the ice supply may comprise an ice crystal maker such as one comprising a source of chilled expanding or aerosolized $H_2O$.

In an embodiment, the injector 5z1 comprises an injection nozzle. The nozzle of the injector may comprise a gas manifold such as one aligned with the trough of the electrodes 8. The nozzle may further comprise a plurality of pinholes from the manifold that deliver a plurality of gas jets of at least one of $H_2O$ and $H_2$. In an embodiment, $H_2$ is bubbled through a reservoir of $H_2O$ such as 5v at a pressure greater than that of the cell, and the $H_2O$ is entrained in the $H_2$ carrier gas. The elevated pressure gas mixture flows through the pinholes into the melt to maintain the gas jets. The flow may be regulated by pressure controller or flow controller 5z2 that is supplied at an elevated pressure greater than that of the cell such as in at least one range of about 1 mTorr to 10,000 Torr, 1 mTorr to 1000 Torr, and 1 mTorr to 100 Torr. At the electrodes, the gas, that may be a mixture, may be combined with the conductive matrix, the metal melt. With the application of a high current, the corresponding fuel mixture may ignite to form hydrinos.

The pinholes may be laser, water jet, or mechanically drilled. The gases in the injector may be pressurized to facilitate the formation of a plurality of high velocity gas injection jets or molecular beams. Gas that is not consumed in formation of hydrinos may be collected by means such as the pump 13a and recycled. Water may be condensed and recycled. The condensation may be achieved using a cryopump. Hydrogen may be recycled wherein it may be separated from other gases before recycling. The separation may be achieved with a selective filter.

The timing of injection may be such that the creation of plasma in the shot and gases are simultaneous. The injection may be about continuous. The continuous gas flow rate may be adjusted to at least one of the ignition frequency and fuel flow rate. The fuel injection may be intermittent and synchronized with the ignition of the shot. The timing may be achieved by the mechanical resonances in the injector and the pressure wave of the nth ignition delaying and compressing the injection gases for the n+1th ignition, wherein n is an integer. Alternatively, a valve such as a solenoid valve 5z2 of the injector 5z1 may control the injection. The valve 5z2 may be activated by the ignition current. An exemplary valve is a mechanical feedback servo valve. The valve may comprise a pressure control valve such as one at the injector outlet wherein an excess pressure may be maintained in the supply side of the valve. The water may be at least one of supplied and injected as at least one of liquid or gas. The gas supplies may be from sources 5u and 5v.

In an embodiment, at least one of very high power and energy may be achieved by the hydrogen undergoing transitions to hydrinos of high p values in Eq. (18) in a process herein referred to as disproportionation as given in Mills GUT Chp. 5 which is incorporated by reference. Hydrogen atoms H(1/p) p=1, 2, 3, . . . 137 can undergo further transitions to lower-energy states given by Eqs. (10) and (12) wherein the transition of one atom is catalyzed by a second that resonantly and nonradiatively accepts m·27.2 eV with a concomitant opposite change in its potential energy. The overall general equation for the transition of H(1/p) to H(1/(p+m)) induced by a resonance transfer of m·27.2 eV to H(1/p') given by Eq. (41) is represented by $$H(1/p')+H(1/p) \rightarrow H+H(1/(p+m))+[2pm+m^2-p'^2+1]\cdot 13.6 \text{ eV} \tag{41}$$

The EUV light from the hydrino process may dissociate the dihydrino molecules and the resulting hydrino atoms may serve as catalysts to transition to lower energy states. An exemplary reaction comprises the catalysis H to H(1/17) by H(1/4) wherein H(1/4) may be a reaction product of the catalysis of another H by HOH. Disproportionation reactions of hydrinos are predicted to given rise to features in the X-ray region. As shown by Eqs. (5-8) the reaction product of HOH catalyst is $$H\left[\frac{a_H}{4}\right].$$

Consider a likely transition reaction in hydrogen clouds containing $H_2O$ gas wherein the first hydrogen-type atom $$H\left[\frac{a_H}{p}\right]$$

is an H atom and the second acceptor hydrogen-type atom $$H\left[\frac{a_H}{p'}\right]$$

serving as a catalyst is $$H\left[\frac{a_H}{4}\right].$$

Since the potential energy of $$H\left[\frac{a_H}{4}\right]$$

is $4^2 \cdot 27.2$ eV=$16 \cdot 27.2$ eV=435.2 eV, the transition reaction is represented by $$16 \cdot 27.2 \text{ eV} + H\left[\frac{a_H}{4}\right] + H\left[\frac{a_H}{1}\right] \rightarrow \tag{42}$$
$$H_{fast}^+ + e^- + H*\left[\frac{a_H}{17}\right] + 16 \cdot 27.2 \text{ eV}$$

$$H*\left[\frac{a_H}{17}\right] \rightarrow H\left[\frac{a_H}{17}\right] + 3481.6 \text{ eV} \tag{43}$$

$$H_{fast}^+ + e^- \rightarrow H\left[\frac{a_H}{1}\right] + 231.2 \text{ eV} \tag{44}$$

And, the overall reaction is $$H\left[\frac{a_H}{4}\right] + H\left[\frac{a_H}{1}\right] \rightarrow H\left[\frac{a_H}{1}\right] + H\left[\frac{a_H}{17}\right] + 3712.8 \text{ eV} \tag{45}$$

The extreme-ultraviolet continuum radiation band due to the $$H * \left[ \frac{a_H}{p+m} \right]$$

intermediate (e.g. Eq. (16) and Eq. (43)) is predicted to have a short wavelength cutoff and energy $$E_{\left( H \to H \left[ \frac{a_H}{p+m} \right] \right)}$$

$$E_{\left( H \to H \left[ \frac{a_H}{p+m} \right] \right)} = [(p+m)^2 - p^2] \cdot 13.6 \text{ eV} - m \cdot 27.2 \text{ eV} \qquad (46)$$

$$\lambda_{\left( H \to H \left[ \frac{a_H}{p+m} \right] \right)} = \frac{91.2}{[(p+m)^2 - p^2] \cdot 13.6 \text{ eV} - m \cdot 27.2 \text{ eV}} \text{ nm}$$

and extending to longer wavelengths than the corresponding cutoff. Here the extreme-ultraviolet continuum radiation band due to the decay of the $$H * \left[ \frac{a_H}{17} \right]$$

intermediate is predicted to have a short wavelength cutoff at E=3481.6 eV; 0.35625 nm and extending to longer wavelengths. A broad X-ray peak with a 3.48 keV cutoff was recently observed in the Perseus Cluster by NASA's Chandra X-ray Observatory and by the XMM-Newton [E. Bulbul, M. Markevitch, A. Foster, R. K. Smith, M. Loewenstein, S. W. Randall, "Detection of an unidentified emission line in the stacked X-Ray spectrum of galaxy clusters," The Astrophysical Journal, Volume 789, Number 1, (2014); A. Boyarsky, O. Ruchayskiy, D. Iakubovskyi, J. Franse, "An unidentified line in X-ray spectra of the Andromeda galaxy and Perseus galaxy cluster," (2014), arXiv:1402.4119 [astro-ph.CO]] that has no match to any known atomic transition. The 3.48 keV feature assigned to dark matter of unknown identity by BulBul et al. matches the $$H \left[ \frac{a_H}{4} \right] + H \left[ \frac{a_H}{1} \right] \to H \left[ \frac{a_H}{17} \right]$$

transition and further confirms hydrinos as the identity of dark matter.

In an embodiment, the generator may produce high power and energy with a low pressure of $H_2O$. The water vapor pressure may be in at least one range of about 0.001 Torr to 100 Torr, 0.1 mTorr to 50 Torr, 1 mTorr and 5 Torr, 10 mTorr to 1 Torr, and 100 mTorr to 800 Torr. The low $H_2O$ vapor pressure may be at least one of supplied and maintained by a source of water vapor and a means to control at least one of the flow rate and pressure. The water supply may be sufficient to maintain a desired ignition rate. The water vapor pressure may be controlled by at least one of steady state or dynamic control and equilibrium control. Low-pressure water may be added to the plasma by humidifying the atmosphere in the region of the ignition such as the inter-electrode and electrode EM pump channel region 8g. The generator may comprise a pump 13a that maintains a lower water vapor pressure in a desired region such as one outside of the electrode region. The water may be removed by differential pumping such that the regions of the cell outside of the electrode region may have a lower pressure such as a lower partial pressure of water. The lower pressure may be maintained to decrease the attenuation of light such as EUV light that may be made incident to PV converter 26a.

The cell water vapor pressure may be maintained by a water reservoir/trap in connection with the cell. The cell water vapor pressure may be in at least one of steady state or equilibrium with the water vapor pressure above the water surface of the water reservoir/trap. The water reservoir/trap may comprise a means to lower the vapor pressure such as at least one of a chiller to maintain a reduced temperature such as a cryo-temperature, a $H_2O$ absorbing material such as activated charcoal or a desiccant, and a solute. The water vapor pressure may be a low pressure established in equilibrium or steady state with ice that may be super-cooled. The cooling may comprise a cryo-chiller or bath such as a carbon dioxide, liquid nitrogen, or liquid helium bath. A solute may be added to the water reservoir/trap to lower the water vapor pressure. The vapor pressure may be lowered according to Raoult's Law. The solute many be highly soluble and in high concentration. Exemplary solutes are sugar and an ionic compound such as at let one of alkali, alkaline earth, and ammonium halides, hydroxides, nitrates, sulphates, dichromates, carbonates, and acetates such as $K_2SO_4$, $KNO_3$, $KCl$, $NH_4SO_4$, $NaCl$, $NaNO_2$, $Na_2Cr_2O_7$, $Mg(NO_3)_2$, $K_2CO_3$, $MgCl_2$, $KC_2H_3O_2$, $LiCl$, and $KOH$. The trap desiccant may comprise a molecular sieve such as exemplary molecular sieve 13X, 4-8 mesh pellets.

In an embodiment to remove excess water, the trap can be sealed and heated; then the liquid water can be pumped off or it can be vented as steam. The trap can be re-cooled and rerun. In an embodiment, $H_2$ is added to the cell 26 such in a region such as at the electrodes to react with $O_2$ reaction product to convert it to water that is controlled with the water reservoir/trap. The $H_2$ may be provided by electrolysis at a hydrogen permeable cathode such as a PdAg cathode. The hydrogen pressure may be monitored with a sensor that provides feedback signals to a hydrogen supply controller such an electrolysis controller.

In an exemplary embodiment, the water partial pressure is maintained at a desired pressure such as one in the range of about 50 mTorr to 500 mTorr by a hydrated molecular sieve such as 13X. Any water released from the molecular sieve may be replaced with a water supply such as one from tank 5v supplied by manifold and lines 5x. The area of the molecular sieves may be sufficient to supply water at a rate of at least that required to maintain the desired partial pressure. The off gas rate of the molecular sieve may match the sum of the consumption rate of the hydrino process and the pump off rate. At least one of the rate of release and the partial pressure may be controlled by controlling the temperature of the molecular sieves. The cell may comprise a controller of the molecular sieves with a connection to the cell 26. The container may further comprise a means to maintain the temperature of the molecular sieve such as a heater and a chiller and a temperature controller.

In an alternative steady state embodiment, the water vapor pressure is maintained by a flow controller such as one that controls at least one of the mass flow and the water vapor pressure in the cell. The water supply rate may be adjusted to match that consumed in the hydrino and any other cell reactions and that removed by means such as pumping. The pump may comprise at least one of the water reservoir/trap, a cryopump, a vacuum pump, a mechanical vacuum pump, a scroll pump, and a turbo pump. At least one of the supply and removal rates may be adjusted to achieve the desired cell water vapor pressure. Additionally, a desired partial pressure of hydrogen may be added. At least one of the $H_2O$ and $H_2$ pressures may be sensed and controlled by sensors and controllers such as pressure gauges such as Baratron gauges and mass flow controllers. The gas may be supplied by a syringe pump. As an alternative to a mass flow controller, the water vapor pressure may be maintained by a high precision electronically controllable valve such as at least one of a needle valve, proportional electronic valve, and stepper motor valve. The valve may be controlled by a water vapor pressure sensor and a computer to maintain the cell water vapor pressure at a desired value such as in the range of about 0.5 Torr to 2 Torr wherein the control may be to a small tolerance such as within 20%. The valve may have a fast response to maintain the tolerance with rapid changes in water vapor pressure in the cell. The dynamic range of the flow through the valve may be adjusted to accommodate different minimum and maximum ranges by changing the water vapor pressure on the supply side of the valve. The supply side pressure may be increased or decreased by increasing or decreasing the temperature, respectively, of a water reservoir 5v.

In another embodiment, the pump 5k comprises a submersible pump such as an electromagnetic pump that is submerged in the melt contained in the cone reservoir and pumps the melt vertically to the electrodes through a conduit such as a vessel such as a tube attached to the outlet of the pump 5k. An exemplary pump containing single-phase electromagnetic windings is given in U.S. Pat. No. 5,277,551, Jan. 11, 1994. The pump materials are capable of high temperature. In an embodiment, the submersible electromagnetic pump may comprise a vertically (z-axis) oriented pump tube having its inlet submerged in the melt. The pump may comprise a DC electromagnetic pump that may be oriented such that the current is along the x-axis and the magnetic field is applied along the y-axis. The y-axis aligned magnetic circuit of the EM pump to apply the magnetic field of the Lorentz force may comprise mirror image sets of an optional peripheral magnet cooling system such as a water cooled heat sink, a magnetic circuit comprising peripheral magnets such neodymium magnets, a magnetic yoke that may further comprise a thermal barrier or insulation in contact with the hot pump tube, and an optional cold plate that abuts the pump tube. In an embodiment, the thermal barrier comprises at least one of a gas gap or vacuum gap. The thermal barrier may further comprise a means to reduce the thermal radiation across the gap such as at least one of a radiation reflector or shield and a reduced emissivity of the hot parts of the pump such as the magnetic circuit parts such as the yokes, bus bars and the pump tube. The emissivity may be decreased by means such as forming a smooth surface such as a polished, electroplated, or electro-polished surface. In an exemplary embodiment, the Fe or Co yokes are electroplated with a material such as chromium that renders it to have low emissivity. A layer of copper may be first applied and then chromium. An exemplary EM pump design comprises wide, highly conductive bus bars attached to the short side wall of the rectangular pump tube, and the perpendicular magnetic circuit having the layout: magnets such as neodymium or SmCo magnets (cooled)/yoke such as ferrite, iron, or cobalt (cooled)/vacuum or gas gap/pump tube/vacuum or gas gap/yoke such as ferrite, iron, or cobalt (cooled)/neodymium or SmCo magnets (cooled). The y-axis aligned pair of mirror-image current bus bars may be connected to a source of high current at the peripheral end and abutted to the side of the pump tube on the opposite end. The xy-plane of the pump comprising the magnetic circuit and the current bus bars may be elevated outside of at least one of the melt and the hottest zone of the cone reservoir. Alternatively, the pump may be placed in a protective housing at or below the melt level to maintain a gravity feed of melt to the pump, or the pump may be maintained in a primed state with metal in the pump current carrying section. At least one of the bus bar and magnetic circuit may be at least partially located outside of the cell with penetrations through the cell walls. The magnetic circuit may comprise magnets outside of the cell that provide flux through a nonmagnetic wall such as a stainless steel wall wherein the magnetic flux is concentrated in internal yolks of the magnetic circuit and guided across the pump tube. The bus bar penetrations may each comprise a flange with a ceramic insulated conductor penetrating through the flange or other high-temperature-capable electrical feed-through known to those skilled in the art. The materials of the EM pump such as the pump tube, magnets, and magnetic yolk may be capable of operating at high temperature. Alternatively, the EM pump may comprise insulation, cold plates, heat exchangers, and other heat removal systems known in the art to cool the materials. Exemplary ferromagnetic materials having a high Curie temperature suitable for the magnets and magnetic circuit are Co (1400K), Fe (1043K), neodymium magnets (583-673K), and AlNiCo (973-1133K). In an embodiment, the magnets such as neodymium, AlNiCo, SmCo, and iron magnets have a high maximum operating temperature. In the case of magnets that are sensitive to demagnetization such as AlNiCo magnets, the magnets comprise a wrapper such as mu metal that will shield DC fields and a metal screen (Faraday cage) will screen RF fields. These aspects apply to other embodiments of the EM pump of the disclosure. The components of the pump such as the magnetic circuits and bus bars may each be covered with a housing that allows returning ignition products to flow over the housing and into the cone reservoir. The housing may comprise or may be coated with a material that is resistant to the ignition products adhering. Exemplary non-adhering materials for silver are graphite, WC, W, and Al. The outlet of the pump tube may connect to an injection section of the pelletizer comprising a conduit or vessel such as a tube to the nozzle 5q that injects the molten fuel such as molten silver comprising at least one of $H_2O$ and $H_2$ into the electrodes 8. A heater such as the inductively coupled heater to heat the injection section may comprise a coil such as 5o that may penetrate the wall of cell 26 and heat the injection section.

In an embodiment, the cell cone reservoir can serve to store the metal that is pumped backwards by the EM pump with a reversal of the pump electrical current to evacuate the vessels and EM pump. The metal may be allowed to solidify by removing heating power. Then during startup, first the heaters and then the EM pump may be activated with the pump action in the forward direction to return the SF-CIHT generator to operation.

In an embodiment, water may be sprayed into the plasma using a sprayer wherein the pressure may be maintained low to avoid attenuation of short wavelength light such as UV light by the water vapor. The water vapor pressure may be maintained less than 10 Torr. In another embodiment, the at least one of water such as steam and hydrogen may be simultaneously injected with the molten metal shot such as silver shot. The at least one of water, steam, and hydrogen injector may comprise a delivery tube that is terminated in a fast solenoid valve. The solenoid vale may be electrically connected in at least one of series and parallel to the electrodes such that current flows through the valve when current flows though the electrodes. In this case, the at least one of water such as steam and hydrogen may be simultaneously injected with the molten metal shot such as silver shot. In another embodiment, the injector system comprises an optical sensor and a controller to cause the injections. The controller may open and close a fast valve such as a solenoid valve when the shot is sensed. In an embodiment, lines for the injection of at least two of the melt such as silver melt, water such as steam, and hydrogen may be coincident. The coincidence may be through a common line. In an embodiment, the injector comprises an injection nozzle. The nozzle of the injector may comprise a gas manifold such as one aligned with the trough of the electrodes 8. The nozzle may further comprise a plurality of pinholes from the manifold that deliver a plurality of gas jets of at least one of $H_2O$ and $H_2$. In an embodiment, $H_2$ in bubbled through a reservoir of $H_2O$ at a pressure greater than that of the cell, and the $H_2O$ is entrained in the $H_2$ carrier gas. The elevated pressure gas mixture flows through the pinholes into the melt to maintain the gas jets. At the electrodes, the gas, that may be a mixture, may be combined with the conductive matrix, the metal melt. With the application of a high current, the corresponding fuel mixture may ignite to form hydrinos.

The cross section of the pelletizer having a pipe bubbler in the second vessel to introduce the gasses such as $H_2$ and steam to the melt, two electromagnetic pumps, and a nozzle to injection shot on the top of the electrodes is shown in FIG. 2I17, details of the electrodes is shown in FIG. 2I18. In an embodiment shown in FIG. 2I17, the pelletizer 5a inlet at the first vessel 5b may be solely located at the bottom of the cell 26. The cell may be shaped in cone or funnel that causes the ignition product to flow into the inlet of the pelletizer. The first vessel 5b, second vessel 5c, and nozzle 5q may form at least a portion of a loop with the first vessel 5b at the bottom of the cell 26 to receive ignition products and the second vessel 5c and nozzle 5q in a separate location to deliver shot to the electrodes 8. The second vessel 5c may penetrate the side of the cell 26. In an embodiment, the second vessel 5c and nozzle 5q may elevate the ejection point of the fuel above the electrodes 8. The nozzle may deliver the fuel to the second electrode section 8j (FIGS. 2I12 and 2I18) such that the ignition expansion and light emission occurs in the second cell region 8l. The ejection may be facilitated by at least one of gravity and pressure from the pump. In an embodiment, the first electrode section may comprise the electrode gap only or may be closed by an insulator such that the plasma only expands in the direction of the photovoltaic converter 26a.

In an embodiment, the electrodes may comprise a bilayer set of electrodes comprising a top conductive layer upon which ignition occurs and a bottom plate of an insulator to form a floor in the gap 8g. The conducting top layer may comprise at least one of copper, Mo, Ta, TaW, tungsten, tungsten carbide (WC), or graphite coated conductor such as graphite coated Cu or W, and the bottom non-conducting bottom layer may comprise a ceramic such as alumina, zirconia, MgO, and firebrick. The top conduction layer may comprise or may be covered with a material to which silver does not stick such as aluminum that may be cooled, molybdenum, tungsten, Ta, TaW, tungsten carbide (WC), and graphite coated conductor such as graphite coated Cu or W electrodes 8. Materials that are wetted by silver such as copper, silver, and CuAg alloy may each be covered with a material to which the shot such as silver shot does not adhere.

The electrode may comprise a plurality of layers such as a covering layer, an ignition layer, and a bottom non-conducting plate. The non-adhering cover layer may comprise at least one of an insulator, a conductor of low conductivity relative to the portion of the electrode that causes the fuel ignition, and a conductor. In the case that the non-adhering layer is conductive, it may be electrically isolated from the ignition portion of the electrode. The electrode may comprise a top shot non-adhering layer, a thin insulating spacer layer, and a highly conductive ignition portion layer that is exclusively connected to the source of electricity 2. An exemplary top layer of low conductivity relative to the ignition portion of the electrode such as a silver or copper portion comprises graphite. In an exemplary embodiment, graphite or zirconia serves as a layer to which the shot such as silver shot does not adhere. The non-adhering layer may be electrically isolated from the ignition portion such as a copper portion by an insulating layer such as a ceramic layer. The non-adhering layer may comprise a funnel to guide shot into the gap 8g of the ignition portion of the electrodes.

In an embodiment, the electrode may comprise a bilayer electrode such as one comprising an upward V-shaped top layer such as graphite or zirconia top layer. The top layer may guide the shot to a bottom ignition layer. The bottom layer comprising a conductor may have vertical walls or near vertical walls towards the gap 8g. Exemplary materials of the bottom or ignition layer are W, WC, and Mo. The open circuit is closed by injection of the melt shot causing contact across the conductive parts of the gap 8g only in the bottom layer. In an embodiment, the shot may be delivered along the y-axis. The nozzle 5q may deliver the shot horizontally along the y-axis to the top of the electrodes (FIGS. 2I17 and 2I18). The light may constrained to predominantly propagate upward due to an electrode design that permits the plasma from the ignited top-loaded shot to expand predominantly in the positive z-direction along the z-axis towards the PV converter 26a.

In an embodiment, the electrode may comprise a trilayer electrode such as one comprising a top layer comprising a upward V-shape, a middle current delivery layer such as a flat plate with the plate edge slightly extended into the gap 8g, and an downward V-shaped electrode layer that is recessed away from the gap 8g. The top layer may comprise a material that resists adhesion of the shot melt such as silver shot melt. Suitable exemplary materials are at least one of a nonconductor or poor conductor such as anodized aluminum, graphite, and zirconia or a conductor such as aluminum, molybdenum, tungsten, Ta, TaW, tungsten carbide (WC), and graphite coated conductor such as graphite coated Cu or W. Low melting point electrodes such as aluminum electrodes may be cooled to prevent melting. The top layer may be electrically insulated for the middle layer. The middle current delivery layer may comprise a conductor with a high melting point and high hardness such as flat W, WC, or Mo plate. In an embodiment, the source of electricity 2 is may be connected to at least one of the middle layer and the bottom layer that may serve as a lead layer. The bottom electrode lead layer may comprise a high conductor that may also be highly thermal conductive to aid in heat transfer. Suitable exemplary materials are copper, silver, copper-silver alloy, and aluminum. In an embodiment, the bottom lead electrode layer also comprises a material that resists adhesion of the shot melt such as silver. Suitable exemplary non-adhering lead electrodes are WC and W. Alternatively, the lead electrode such as a copper electrode may be coated or clad with a surface that is resistant for the adherence of the shot melt. Suitable coatings or claddings are WC, W, carbon or graphite, boron carbide, fluorocarbon polymer such as Teflon (PTFE), zirconia+8% yttria, Mullite, Mullite-YSZ, and zirconia. The coating or cladding may be applied over the surface regions that are exposed to the shot melt during ignition. The open circuit may be closed by injection of the melt shot causing contact across the conductive parts of the gap 8g only in the middle layer. The bottom layer may be cooled by a coolant flow system such one comprising electrode internal conduits. The contact between the middle and bottom cooled layer may heat sink and cool the middle layer. The contact between the top and middle cooled layer may heat sink and cool the top layer. In a tested embodiment, the shot injection rate was 1000 Hz, the voltage drop across the electrodes was less than 0.5 V, and the ignition current was in the range of about 100 A to 10 kA.

Figure 12:
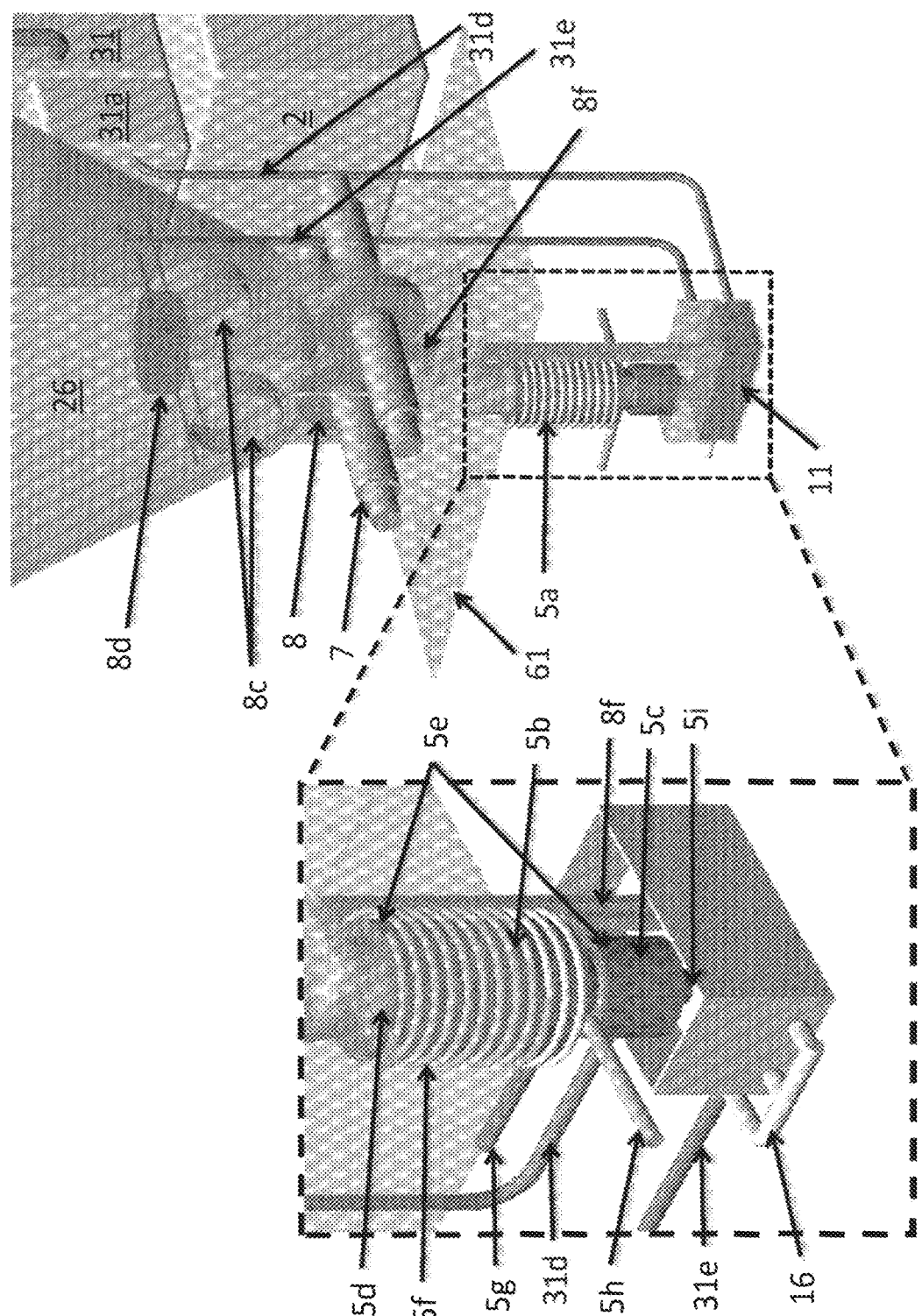
FIG. 12 (also referred to herein as 2I5) is a schematic drawing of a SF-CIHT cell power generator showing a cell capable of maintaining a vacuum, an ignition system having a railgun shot injection system fed directly from a pelletizer, augmented plasma railgun and gravity recovery systems, the pelletizer, and a photovoltaic converter system showing the details of the injection system having a water jet agitator, the ignition system, the ignition product recovery systems, and the pelletizer to form shot fuel in accordance with an embodiment of the present disclosure.

Magnets such as 8c of FIGS. 2I17 and 2I18 may cause plasma particles such as those from the shot ignition to be directed away from the region 8k (FIG. 2I12). In an exemplary embodiment wherein the Lorentz force is directed in the negative z-axis direction, the magnets and channel 8g comprises an electromagnetic pump that performs at least one function of (i) injecting shot in region 8j into the gap 8g to be ignited, (ii) pumping shot that has adhered to the upper part of the electrodes such as at region 8j into the gap 8g to be ignited, (iii) ejecting un-ignited shot and particles from the region 8i and the gap 8g and (iv) recovering the ignition product and un-ignited shot to the pelletizer. The ejection and recovery may be by the Lorentz force formed by a crossed applied magnetic field such as that from magnets 8c and ignition current through at least one of the plasma particles and shot such as silver shot adhering to the electrode surfaces such as 8i, 8g, and 8j. The ignition current may be from the source of electrical power 2 (FIG. 2I10).

Consider the Cartesian coordinates with the z-axis from region 8k to 8l of FIG. 2I12. In an embodiment, the electrodes may comprise an upward (positive z-axis oriented) V-shape with a gap at the 8g at the bottom of the V (FIGS. 2I17 and 2I18). The open circuit may be closed by injection of the melt shot 5t from nozzle 5q causing contact across the conductive parts of the gap 8g at the bottom of the V. The V may be formed by flat plate electrodes mounted on opposite faces of supports that form a V with a gap at the bottom. Exemplary electrode materials comprising a conductor that operates a high temperature and resists adhesion of Ag are W, WC, and Mo. The supports may be water-cooled. The supports may be a least partially hollow. The hollow portions may each comprise a conduit for coolant that flows through the conduits and cools the electrodes.

In an embodiment, the electrodes may further comprise a lower section having vertical walls or near vertical walls at the gap 8g. The walls may form a channel. In an embodiment, the electrodes further comprise a source of magnetic field such as a set of magnets at opposite ends of the channel of the electrodes. The magnets may produce a magnetic field parallel to the electrodes or channel axis and perpendicular to the ignition current. The channel with crossed current and magnetic field may comprise an electromagnetic (EM) pump. The EM pump may pump adhering shot into the electrodes to be ignited. In an embodiment, the Lorentz force due to the crossed magnetic field and ignition current may at least one of pump the shot adhering to the walls of the upper portion of the electrode downward to be ignited and pump ignition particles downward away from the PV converter to be recovered in the inlet to the pelletizer.

In an exemplary embodiment, the shot 5t may be injected horizontally long the y-axis, on top of the V-shaped electrodes 8 (FIGS. 2I17 and 2I18). In an embodiment, magnets 8c are positioned to apply a magnetic field along the y-axis, along the trough of the V-shaped electrodes 8. The circuit is closed and x-axis-directed ignition current flows by shot providing a current path across the gap 8g wherein the magnetic field is transverse to the current. The crossed current and magnetic field create a Lorentz force according to Eq. (37) to push out any metal shot adhering to the electrodes. The Lorentz force may further push the ignition particles downward to region 8k (FIG. 2I12) to recover un-ignited shot and to recover ignition particles. The Lorentz force causes the flow of the adhering shot into the ignition section of the electrodes at the gap 8g and causes the ignition plasma to be directed and flow into a collection region such as inlet of the fuel regeneration system such as the pelletizer. In other embodiments of the disclosure, the electrodes and magnets may be designed to direct the plasma in an upward arch to perform at least one function of (i) injecting shot in region 8i into the gap 8g to be ignited, (ii) ejecting shot that has adhered to the upper part of the electrodes such as at region 8j, (iii) ejecting un-ignited shot and particles from the regions 8i, 8j, and the gap 8g and (iv) recovering the ignition product and un-ignited shot to the pelletizer, while avoiding guiding ignition particles to the PV converter 26a.

In an embodiment, the shot is delivered along the y-axis (FIGS. 2I17 and 2I18). The nozzle 5q may deliver the shot horizontally along the y-axis to the top of the electrodes. The solid fuel may be delivered as a stream of shots, a continuous stream, or a combination of shot and a stream. The light may constrained to predominantly propagate upward due to an electrode design that permits the plasma from the ignited top-loaded shot to expand predominantly in the positive z-direction along the z-axis towards the PV converter 26a. The electrodes may further comprise at least one magnet such as a set of magnets 8c separated at opposite ends of the electrodes to produce a magnetic field in a direction perpendicular to the ignition current. The Lorentz force due to the crossed current and magnetic field may cause the ejection of adhering shot and the flow of the plasma particles to the regeneration system such as the pelletizer. The Lorentz force may be in the negative z-direction. In the case that the Lorentz force is in the negative z-direction, a region, section, or layer such as the ignition layer of the electrodes 8 may comprise a channel that may act as an electromagnetic pump for the ejection of ignition particles and shot that is not ejected as particles and plasma. The size of the channel may be selected to provide flow restriction to the high pressure expanding ignition plasma that forces the plasma and light to expand towards the region 8l of the electrodes (FIG. 2I12). The ignition portion of the electrodes may form a shallow channel comprising a short electromagnetic pump tube such that the particles and adhering shot fills the pump tube and restricts the path for the emitted light to be only along the positive z-axis. The strength of the crossed current and magnetic field and well as the dimensions of the channel provide the pump pressure through the channel comprising the electromagnetic pump tube. The width of the pump tube and any splay are selected to distribute the current from the source of electrical power 2 for ignition and pumping to achieve optimization of both.

In the case that the shot is injected on the same side as that desired for the expansion of the plasma such as side 8l, the source of electrical power may deliver the ignition current without substantial time delay. The injection may be timed to avoid the n+1 th injection from being disrupted by the pressure wave from the ignition blast of the nth injection wherein n is an integer. The timing may be achieved with blast and injection sensors such as at least one of optical, current, voltage, and pressure sensors and a controller. The controller may control at least one of the electromagnetic pump pressure, the nozzle valve, and the ignition current.

Figure 22:
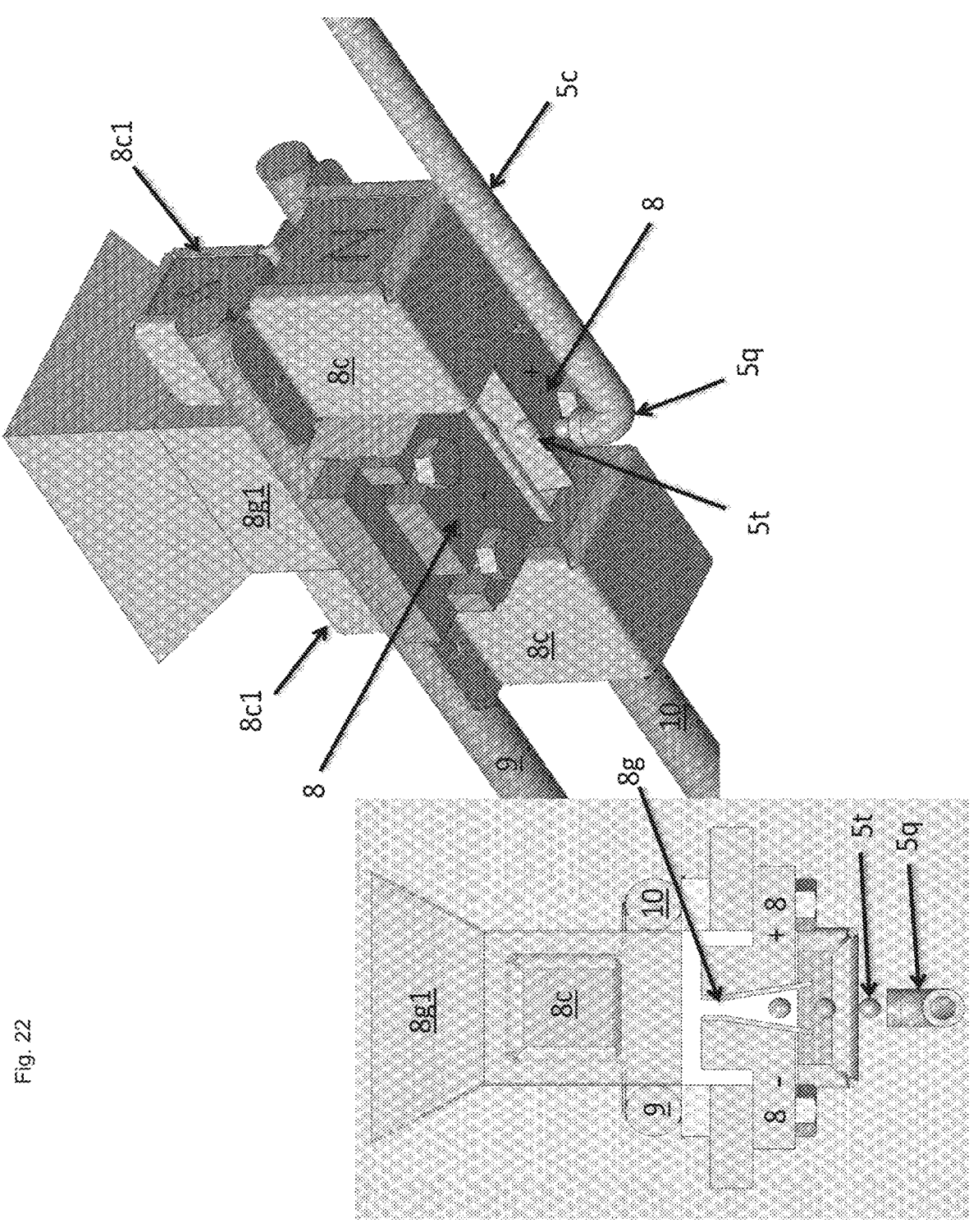
FIG. 22 (also referred to herein as 2I15) is a schematic drawing of a SF-CIHT cell power generator showing the electrodes with shot injection from the bottom in accordance with an embodiment of the present disclosure.

In an embodiment, the SF-CIHT generator may comprise a plurality of electrodes wherein each set may utilize at least one of (i) a common or separate, dedicated injection system, (ii) a common or separate, dedicated source of electrical power to cause ignition, and (iii) a common or separate, dedicated PV conversion system. The ignition system may further comprise a cooling system of the ignition system as shown in FIG. 2I22. In an embodiment, the cooling system may comprise conduits through the bus bars 9 and 10 (FIG. 2I14) and electrodes 8 or inlet 31*f* and outlet coolant lines 31*g* and a coolant pump and chiller 31*a* to cool the coolant that is pumped through the conduits or lines. The electrode coolant system may comprise one pair of coolant lines 31*f* and 31*g* that serve both electrodes (FIG. 2I23), or each electrode may have an independent inlet line 31*f* an outlet line 31*g* (FIG. 2I22). In case of shared lines, the area of contact of the line with the electrode may be adjusted depending on the average local coolant temperature to achieve efficient heat transfer from the electrode to the coolant. In another embodiment shown in FIG. 2I23, the electrodes and bus bars of the ignition system may be cooled by a passive cooling system 31*h* comprising a heat exchanger such as one comprising air fins and optionally heat pipes to the air fins. In an embodiment shown in FIG. 2I23, the photovoltaic conversion system may also be cooled by a passive cooling system 31*i* comprising a heat exchanger such as one comprising air fins and optionally heat pipes to the air fins. In an embodiment shown in FIG. 2I22, the photovoltaic (PV) cells or panels 15 of the photovoltaic converter 26*a* are cooled with heat exchanger 87 wherein the hot coolant flows into the photovoltaic converter cooling system 31 through inlet 31*b* and chilled coolant exits through outlet 31*c*. The PV cells may be operated at elevated temperature such as 30° C. to 450° C. and may be operated under reduced cell pressure to prevent water vapor from condensing on the PV cells.

In an embodiment to improve the energy balance of the generator, the chiller such as at least one of 31 and 31*a* may be driven by thermal power that may comprise heat produced by the cell. The heat power may be from internal dissipation and from the hydrino reaction. The chiller may comprise an absorption chiller known by those skilled in the art. In an embodiment, heat to be rejected is absorbed by a coolant or refrigerant such as water that may vaporize. The adsorption chiller may use heat to condense the refrigerant. In an embodiment, the water vapor is absorbed in an absorbing material (sorbent) such as Silicagel, Zeolith, or a nanostructure material such as that of P. McGrail of Pacific Northwest Laboratory. The absorbed water is heated to cause its release in a chamber wherein the pressure increases sufficiently to cause the water to condense.

In an embodiment, at least one of the velocity of the fuel, the shot size, the melt shot viscosity, the width of the gap 8*g* between the electrodes, and the shape of the electrodes 8 is selected to cause the ignition to occur predominantly in a region on the opposite side of the electrodes 8*l* relative to the injection side or region 8*k*. In an embodiment, the second section of the electrodes 8*j* serves as the inlet to the second region of the cell 8*l* wherein the plasma and light are preferentially directed toward the PV converter 26*a* (FIG. 2I2). The velocity of the fuel such as the molten fuel may be in at least one range of about 0.01 m/s to 1000 m/s, 0.1 m/s to 100 m/s, and 0.1 m/s to 10 m/s. At least one of pressure at the nozzle 5*q* and the viscosity of the fuel may be used to control the fuel velocity. The size of the nozzle orifice, the melt pressure, the melt flow rate, the melt viscosity, and the melt temperature may be used to control the melt shot size. The heat balance may be controlled to control the temperature of the melt that in turn controls the melt viscosity. The power of the electromagnetic pump 5*k* and nozzle orifice size may be controlled to control the pressure at the nozzle 5*q*. At least one of the heating power, insulation, cooling, and melt flow rate may be use to control the heat balance. The electromagnetic pump power may be used to control the melt flow rate. The melt temperature may be used to control the melt surface tension. The electrode gap 5*g* may be selected manually. Alternatively, an adjustable or deformable electrode gap may be adjusted be means such as mechanically, hydraulically, or piezoelectrically. The electrode shape may be selected manually. Alternatively, an adjustable or deformable electrode may be adjusted be mean such as mechanically, hydraulically, or piezoelectrically. In an embodiment, a control system such as a computer, electromagnetic pump, nozzle valve, and heater control parameters such as the pressure, nozzle size, and melt temperature and viscosity to control the ejection velocity as well as the ejection rate. The ejection velocity may be controlled to compensate for the deceleration of gravity to maintain a desire injection rate. The height of the nozzle 5*q* may be adjusted to support a maximum injection rate. The maximum height may be based on the rate a stream of fuel melt forms isolated spheres or melt shot. In an embodiment, the SF-CIHT generator comprises a user interface such as a touch-screen display of a computer to control the generator further comprising a computer with sensors and control systems of the injection system, the ignition system, the fuel recovery system, the fuel regeneration system such as the pelletizer, and the converter system such as at least one of the photovoltaic and photoelectron converter system. The a computer with sensors and control systems may sense and control the electromagnetic pump, inductively coupled heaters, injector flow, nozzle, ignition system current and pulse rate, product recovery system such as applied magnets and currents and electrostatic precipitator (ESP), photovoltaic (PV) converter system, cooling systems, power conditioning and other system monitoring and controls to operate the generator known by those skilled in the art. The sensors may provide input to controller protect systems such as ones for melt flow and volume in the heated vessel sections and melt flow and volume input to the EM pump wherein the controllers shut off the heaters and EM pump when the flow or volume is below a tolerable limit. The control system may further comprise programmable logic controllers and other such devices known by those skilled in the art in order to achieve control.

The SF-CIHT generator comprises the components having the parameters such as those of the disclosure that are sensed and controlled. In embodiments the computer with sensors and control systems may sense and control, (i) the inlet and outlet temperatures and coolant pressure and flow rate of each chiller of each cooled system such as at least one of the PV converter, the electrodes, the inductively coupled heater, and the nozzle chiller, (ii) the ignition system voltage, current, power, frequency, and duty cycle, (iii) the shot trajectory using a sensor such as an optical sensor and controller, and the EM pump injection flow rate using a sensor such as an optical, Doppler, or electrode resistance sensor and controller, (iv) the voltages, currents, and powers of the inductively coupled heater, the augmented plasma railgun, the electromagnetic pump 5k, the electrode electromagnetic pump, and electrostatic precipitator recovery systems, (v) the pressure in the cell, (vi) the wall temperature of the cell, (vii) the consumption state of any getter, (viii) the heater power in each section, (ix) current and magnetic flux of the electromagnetic pump, (x) the silver melt temperature, flow rate, and pressure in the vessels and at key locations such as at the manifolds and nozzle, (xi) the pressure, temperature, and flow rate of each injected gas such as $H_2$ and $H_2O$ and mixtures formed by the regulator in case of a common gas injection manifold, (xii) the intensity of incident light to the PV converter, (xiii) the voltage, current, and power output of the PV converter, (xiv) the voltage, current, power, and other parameters of any power conditioning equipment, and (xv) the SF-CIHT generator output voltage, current, and power to at least one of the parasitic loads and the external loads, (xvi) the voltage, current, and power input to any parasitic load such as at least one of the inductively coupled heater, the electromagnetic pump, the chillers, and the sensors and controls, and (xii) the voltage, current, and charge state of the starter circuit with energy storage. In an embodiment, a parameter to be measured may be separated from a region of the system that has an elevated temperature that would damage the sensor during its measurement. For example, the pressure of a gas such as at least one of $H_2$ and $H_2O$ may be measured by using a connecting gas line such as a cooling tower that connects to the cell such as 5b or 5c and cools the gas before entering a pressure transducer such as a Baratron capacitance manometer.

The cell may comprise few to no or moving parts. In an embodiment, the cooling may comprise heat rejection to an air-cooled heat exchanger. Exemplary, air-cooled systems for the electrodes 31h and PV conversion system 31i are shown in FIG. 2I23. In this case, the cell may comprise no or very few moving parts. The only moving part may comprise a mechanical pump to circulate coolant, and it may be replaced with one with no moving parts. In the case that the coolant is a liquid metal such as an alkali metal such as sodium, the pump may comprise an electromagnetic pump that may have no moving parts. In an embodiment, the electromagnetic pump coolant may be nonflammable. Alternatively, heat pipes and air fins or Peltier chillers may be used to remove the heat as a means of non-mechanical heat rejection. Exemplary heat pipes are a copper heat pipe with soldered longitudinal copper fins using water or acetone as the working fluid and an aluminum heat pipe with soldered longitudinal aluminum fins using ammonia as the working fluid. The source of heat may be the ignition electrodes wherein the heat may be rapidly conducted away from the electrode surface to the cooling system by large cross section thermal bus bars 9 and 10 comprising highly thermal conductive material such as copper, silver, or a silver-copper alloy. The source of heat may also comprise the PV converter.

The mechanical vacuum pump may also be replaced to eliminate it as a system with moving parts. In an embodiment, the vacuum in the cell may be maintained by at least one getter 13b (FIG. 2I23) such as at least one for oxygen, hydrogen, and water. An oxygen getter such an oxygen reactive material such as carbon or a metal that may be finely divided may scavenge any oxygen formed in the cell. In the case of carbon, the product carbon dioxide may be tapped with a $CO_2$ scrubber that may be reversible. Carbon dioxide scrubbers are known in the art such as organic compounds such as amines such as monoethanolamine, minerals and zeolites, sodium hydroxide, lithium hydroxide, and metal-oxide based systems. The finely divided carbon getter may also serve the purpose of scavenging oxygen to protect oxygen sensitive materials in the cell such as vessels or pump tube comprising oxygen sensitive materials such as Mo, W, graphite, and Ta. In this case, the carbon dioxide may be removed with a $CO_2$ scrubber or may be pumped off with the vacuum pump where fine-divided carbon is used solely for component protection.

The metal getter may selectively react with oxygen over $H_2O$ such that it can be regenerated with hydrogen. Exemplary metals having low water reactivity comprise those of the group of Cu, Ni, Pb, Sb, Bi, Co, Cd, Ge, Au, Ir, Fe, Hg, Mo, Os, Pd, Re, Rh, Ru, Se, Ag, Tc, Te, Tl, Sn, W, and Zn. The getter or oxygen scrubber may be removed from the SF-CIHT cell and regenerated. The removal may be periodic or intermittent. The regeneration may be achieved by hydrogen reduction. The regeneration may occur in situ. The in situ regeneration may be intermittent or continuous. Other oxygen getters and their regeneration such as zeolites and compounds that form reversible ligand bonds comprising oxygen such as salts of such as nitrate salts of the 2-aminoterephthaiato-linked deoxy system, $[\{(bpbp)Co_2^{II}(NO_3)\}_2(NH_2bdc)]$ $(NO_3)_2 \cdot 2H_2O$ $(bpbp^-=2,6\text{-bis(N,N-bis}$ (2-pyridylmethyl)aminomethyl)-4-tert-butylphenolato, $NH_2bdc^{2-}=2\text{-amino-1,4-benzenedicarboxylato})$ are known to those skilled in the art. Highly combustible metals may also be used as the oxygen getter such as exemplary metals: alkali, alkaline earth, aluminum, and rare earth metals. The highly combustible metals may also be used as a water scavenger. Hydrogen storage materials may be used to scavenge hydrogen. Exemplary hydrogen storage materials comprise a metal hydride, a mischmetal such as M1: La-rich mischmetal such as $M1Ni_{3.65}Al_{0.3}Mn_{0.3}$ or M1(NiCoMn Cu)$_5$, Ni, R—Ni, R—Ni+about 8 wt % Vulcan XC-72, LaNi$_5$, Cu, or Ni—Al, Ni—Cr such as about 10% Cr, Ce—Ni—Cr such as about 3/90/7 wt %, Cu—Al, or Cu—Ni—Al alloy, a species of a M-N—H system such as $LiNH_2$, $Li_2NH$, or $Li_3N$, and a alkali metal hydride further comprising boron such as borohydrides or aluminum such as aluminohydides. Further suitable hydrogen storage materials are metal hydrides such as alkaline earth metal hydrides such as $MgH_2$, metal alloy hydrides such as $BaReH_9$, $LaNi_5H_6$, $FeTiH_{1.7}$, and $MgNiH_4$, metal borohydrides such as $Be(BH_4)_2$, $Mg(BH_4)_2$, $Ca(BH_4)_2$, $Zn(BH_4)_2$, $Sc(BH_4)_3$, $Ti(BH_4)_3$, $Mn(BH_4)_2$, $Zr(BH_4)_4$, $NaBH_4$, $LiBH_4$, $KBH_4$, and $Al(BH_4)_3$, $AlH_3$, $NaAlH_4$, $Na_3AlH_6$, $LiAlH_4$, $Li_3AlH_6$, LiH, $LaNi_5H_6$, $La_2Co_1Ni_9H_6$, and $TiFeH_2$, $NH_3BH_3$, polyaminoborane, amine borane complexes such as amine borane, boron hydride ammoniates, hydrazine-borane complexes, diborane diammoniate, borazine, and ammonium octahydrotriborates or tetrahydroborates, imidazolium ionic liquids such as alkyl(aryl)-3-methylimidazolium N-bis(trifluoromethanesulfonyl)imidate salts, phosphonium borate, and carbonite substances. Further exemplary compounds are ammonia borane, alkali ammonia borane such as lithium ammonia borane, and borane alkyl amine complex such as borane dimethylamine complex, borane trimethylamine complex, and amino boranes and borane amines such as aminodiborane, n-dimethylaminodiborane, tris(dimethylamino)borane, di-n-butylboronamine, dimethylaminoborane, trimethylaminoborane, ammonia-trimethylborane, and triethylaminoborane. Further suitable hydrogen storage materials are organic liquids with absorbed hydrogen such as carbazole and derivatives such as 9-(2-ethylhexyl)carbazole, 9-ethylcarbazole, 9-phenylcarbazole, 9-methylcarbazole, and 4,4'-bis(N-carbazolyl)-1,1'-biphenyl. The getter may comprise an alloy capable of storing hydrogen, such as one of the $AB_5$ (LaCePrNdNiCoMnAl) or $AB_2$ (VTiZrNi-CrCoMnAlSn) type, where the "$AB_x$" designation refers to the ratio of the A type elements (LaCePrNd or TiZr) to that of the B type elements (VNiCrCoMnAlSn). Additional suitable hydrogen getters are those used in metal hydride batteries such as nickel-metal hydride batteries that are known to those skilled in the Art. Exemplary suitable getter material of hydride anodes comprise the hydrides of the group of R—Ni, $LaNi_5H_6$, $La_2Co_1Ni_9H_6$, $ZrCr_2H_{3.8}$, $LaNi_{3.55}Mn_{0.4}Al_{0.3}Co_{0.75}$, $ZrMn_{0.5}Cr_{0.2}V_{0.1}Ni_{1.2}$, and other alloys capable of storing hydrogen, such as one of the $AB_5$ (LaCePrNdNiCoMnAl) or $AB_2$ (VTiZrNiCrCoMnAlSn) type, where the "$AB_x$" designation refers to the ratio of the A type elements (LaCePrNd or TiZr) to that of the B type elements (VNiCrCoMnAlSn). In other embodiments, the hydride anode getter material comprises at least one of $MmNi_5$ (Mm=misch metal) such as $MmNi_{3.5}Co_{0.7}Al_{0.8}$, the $AB_5$-type: $MmNi_{3.2}Co_{1.0}Mn_{0.6}Al_{0.11}Mo_{0.09}$ (Mm=misch metal: 25 wt % La, 50 wt % Ce, 7 wt % Pr, 18 wt % Nd), $La_{1-y}R_yNi_{5-x}M_x$, $AB_2$-type: $Ti_{0.51}Zr_{0.49}V_{0.70}Ni_{1.18}Cr_{0.12}$ alloys, magnesium-based alloys such as $Mg_{1.9}Al_{0.1}Ni_{0.8}Co_{0.1}Mn_{0.1}$ alloy, $Mg_{0.72}Sc_{0.28}(Pd_{0.012}+Rh_{0.012})$, and $Mg_{80}Ti_{20}$, $Mg_{80}V_{20}$, $La_{0.8}Nd_{0.2}Ni_{2.4}Co_{2.5}Si_{0.1}$, $LaNi_{5-x}M_x$ (M=Mn, Al), (M=Al, Si, Cu), (M=Sn), (M=Al, Mn, Cu) and $LaNi_4Co$, $MmNi_{3.55}Mn_{0.44}Al_{0.3}Co_{0.75}$, $LaNi_{3.55}Mn_{0.44}Al_{0.3}Co_{0.75}$, $MgCu_2$, $MgZn_2$, $MgNi_2$, AB compounds such as TiFe, TiCo, and TiNi, $AB_n$ compounds (n=5, 2, or 1), $AB_{3-4}$ compounds, and $AB_x$ (A=La, Ce, Mn, Mg; B—Ni, Mn, Co, Al). Other suitable hydride getters are $ZrFe_2$, $Zr_{0.5}Cs_{0.5}Fe_2$, $Zr_{0.8}Sc_{0.2}Fe_2$, $YNi_5$, $LaNi_5$, $LaNi_{4.5}Co_{0.5}$, (Ce, La, Nd, Pr)$Ni_5$, Mischmetal-nickel alloy, $Ti_{0.98}Zr_{0.02}V_{0.43}Fe_{0.09}Cr_{0.05}Mn_{1.5}$, $La_2Co_1Ni_9$, FeNi, and $TiMn_2$. Getters of the disclosure and others known to those skilled in the art may comprise a getter of more than one species of cell gas. Additional getters may be those known by ones skilled in the art. An exemplary multi-gas getter comprises an alkali or alkaline earth metal such as lithium that may getter at least two of $O_2$, $H_2O$, and $H_2$. The getter may be regenerated by methods known in the art such as by reduction, decomposition, and electrolysis. In an embodiment, the getter may comprise a cryotrap that at least one of condenses the gas such as at least one of water vapor, oxygen, and hydrogen and traps the gas in an absorbing material in a cooled state. The gas may be released form the absorbing material at a higher temperature such that with heating and pumping the off-gas, the getter may be regenerated. Exemplary materials that absorb at least one of water vapor, oxygen, and hydrogen that can be regenerated by heating and pumping is carbon such as activated charcoal and zeolites. The timing of the oxygen, hydrogen, and water scrubber regeneration may be determined when the corresponding gas level increases to a non-tolerable level as sensed by a sensor of the corresponding cell gas content. In an embodiment, at least one of the cell generated hydrogen and oxygen may be collected and sold as a commercial gas by systems and methods known by those skilled in the art. Alternatively, the collected hydrogen gas may be used in the SunCell.

The hydrogen and water that is incorporated into the melt may flow from the tanks $5u$ and $5v$ through manifolds and feed lines $5w$ and $5x$ under pressure produced by corresponding pumps such as mechanical pumps. Alternatively, the water pump may be replaced by creating steam pressure by heating the water tank, and the hydrogen pump may be replaced by generating the pressure to flow hydrogen by electrolysis. Alternatively, $H_2O$ is provided as steam by $H_2O$ tank, steam generator, and steam line $5v$. Hydrogen may permeate through a hollow cathode connected with the hydrogen tank that is pressurized by the electrolysis. These replacement systems may eliminate the corresponding systems having moving parts.

In an embodiment, the SF-CIHT generator may comprise a valve and reservoir and optionally a reservoir pump such as one of the disclosure such as a mechanical pump. The fuel metal such as silver may be pumped by at least the electromagnetic pump $5k$ into the reservoir for storage. The transfer of the metal may be for shutdown. The reservoir may comprise a heater such as an inductively coupled heater to melt the fuel metal such as silver to restart the generator. The metal may flow back into at least one of the first vessel $5b$, the second vessel $5c$, and the electromagnetic pump $5k$ by at least one of gravity and pumping. The pumping may be by the reservoir pump. The power for at least one of the heating and flow such as by pumping may be supplied by the energy storage of the disclosure such as by a battery or capacitor. In another embodiment, the electromagnetic pump $5k$ may comprise an electromagnetic pump heater such as a resistive or an inductively coupled heater. The resistive heater may at least partially comprise the current source of the pump that generates the Lorentz force. In an embodiment, the electromagnetic pump and the heaters are stopped for shutdown. Startup is achieved by melting the fuel metal such as silver using the inductively coupled heaters such as those of $5f$ and $5o$ as well as the electromagnetic pump heater. The power may be from the energy storage of the disclosure. In another embodiment, the generator is not shutdown, but remains operating at a minimum power level to maintain the flow of the fuel metal.

In an embodiment, the SF-CIHT comprises a switch on at least one of the electromagnetic pumps such as $5k$ that reverses the polarity of the pump current to reverse the Lorentz force and the pumping direction. In another embodiment comprising electromagnetic (EM) pumps comprising electromagnets, the direction of the magnetic field may be reversed to reverse the pumping direction. The direction of pumping of the melt may be reversed to transport the metal to storage. The storage may comprise at least one of a portion of the cell at its base such as the base cone at the inlet to the first vessel $5b$, the first vessel $5b$, and the inlet of first EM pump $5k$. The melt may solidify in storage by removal of heating power. Startup may be achieved by applying heat to the first vessel $5b$ with the first inductively coupled heater $5f$ and applying heat to the EM pump $5k$ by the EM pump heater wherein the pump current flowing though the metal in the pump tube may serve as the pump heater. The resulting melt may be pumped into the other sections of the pelletizer such as the second vessel $5c$ and nozzle $5q$ with heating by the other heaters such as the inductively coupled heater $5o$ that heats the second vessel $5c$. The power for at least one of the heating and flow such as by pumping may be supplied by the energy storage of the disclosure such as by a battery or capacitor.

In an embodiment, the SF-CIHT cell components and system are at least one of combined, miniaturized, and otherwise optimized to at least one of reduce weight and size, reduce cost, and reduce maintenance. In an embodiment, the SF-CIHT cell comprises a common compressor for the chiller and the cell vacuum pump. The chiller for heat rejection may also serve as a cryopump to maintain the vacuum in the cell. $H_2O$ and $O_2$ may be condensed by the cryopump to maintain the desired level of vacuum. In an embodiment, the ignition system comprising a bank of capacitors is miniaturized by using a reduced number of capacitors such as an exemplary single 2.75 V, 3400 F Maxwell super-capacitor as near to the electrodes as possible. In an embodiment, at least one capacitor may have its positive terminal directly connected to the positive bus bar or positive electrode and at least one capacitor may have its negative terminal directly connected to the negative bus bar or negative electrode wherein the other terminals of the capacitors of opposite polarity may be connected by a bus bar such that current flows through the circuit comprising the capacitors when shot closes the circuit by bridging the electrodes. In an embodiment, threaded capacitor terminals may be screwed directly into threaded electrodes, electrode mounts, or bus bars. The set of capacitors connected across the electrodes in series may be replicated by an integer multiple to provide about the integer multiple times more current, if desirable. In an embodiment, the voltage on the capacitors may be maintained within a desired range by charging with power from the PV converter. Since the voltage drop on the charging bus bars is a function of the variable charging current, the voltage to control the charging current may be sensed at the capacitors. This remotely sensed voltage may be used by a controller such as a computer to control the charging current. The capacitors and connecting bus bar or bars may be located such the nozzle 5$q$ may have a clear path for shot injection and the ignition plasma is not unduly impeded to emit light to the PV converter.

The proximity of the source of electrical power 2 eliminates the extra voltage required to drive the high peak ignition current through extensive bus bars. The reduced capacitance ignition system may be mounted at the electrodes and charged continuously with a steady current that may be significantly less that the pulsed high ignition current such as that given by the peak pulse current times the duty cycle. The circuit that carries the high current to the electrodes may comprise circuit elements having desired characteristics such as inductance, capacitance, and resistance to permit impedance matching of the capacitor to the ignition load.

The power conditioning of the SF-CIHT generator may be simplified by using all DC power for intrinsic loads wherein the Dc power is supplied by the PV converter. In an embodiment, DC power from the PV converter may supply at least one of the (i) the DC charging power of the capacitors of the ignition system comprising the source of electrical power 2 to the electrodes 8, (ii) the DC current of the at least one electromagnetic pump, (iii) the DC power of the resistive or inductively coupled heaters, (iv) the DC power of the chiller comprising a DC electric motor, (v) the DC power of the vacuum pump comprising a DC electric motor, and (vi) the DC power to the computer and sensors. The output power conditioning may comprise DC power from the PV converter or AC power from the conversion of DC power from the PV converter to AC using an inverter.

In an embodiment, the light to electricity converter comprises the photovoltaic converter of the disclosure comprising photovoltaic (PV) cells that are responsive to a substantial wavelength region of the light emitted from the cell such as that corresponding to at least 10% of the optical power output. In an embodiment, the PV cells are concentrator cells that can accept high intensity light, greater than that of sunlight such as in the intensity range of at least one of about 1.5 suns to 75,000 suns, 10 suns to 10,000 suns, and 100 suns to 2000 suns. The concentrator PV cells may comprise c-Si that may be operated in the range of about 1 to 1000 suns. The PV cells may comprise a plurality of junctions such as triple junctions. The concentrator PV cells may comprise a plurality of layers such as those of Group III/V semiconductors such as at least one of the group of InGaP/InGaAs/Ge; InAlGaP/AlGaAs/GaInNAsSb/Ge; GaInP/GaAsP/SiGe; GaInP/GaAsP/Si; GaInP/GaAsP/Ge; GaInP/GaAsP/Si/SiGe; GaInP/GaAs/InGaAs; GaInP/GaAs/GaInNAs; GaInP/GaAs/InGaAs/InGaAs; GaInP/Ga(In)As/InGaAs; GaInP—GaAs-wafer-InGaAs; GaInP—Ga(In)As—Ge; and GaInP—GaInAs—Ge. The plurality of junctions such as triple or double junctions may be connected in series. In another embodiment, the junctions may be connected in parallel. The junctions may be mechanically stacked. The junctions may be wafer bonded. In an embodiment, tunnel diodes between junctions may be replaced by wafer bonds. The wafer bond may be electrically isolating and transparent for the wavelength region that is converted by subsequent or deeper junctions. Each junction may be connected to an independent electrical connection or bus bar. The independent bus bars may be connected in series or parallel. The electrical contact for each electrically independent junction may comprise grid wires. The wire shadow area may be minimized due to the distribution of current over multiple parallel circuits or interconnects for the independent junctions or groups of junctions. The current may be removed laterally. The wafer bond layer may comprise a transparent conductive layer. An exemplary transparent conductor is a transparent conductive oxide (TCO) such as indium tin oxide (ITO), fluorine doped tin oxide (FTO), and doped zinc oxide and conductive polymers, graphene, and carbon nanotubes and others known to those skilled in the art. Benzocyclobutene (BCB) may comprise an intermediate bonding layer. The bonding may be between a transparent material such a glass such as borosilicate glass and a PV semiconductor material. An exemplary two-junction cell is one comprising a top layer of GaInP wafer bonded to a bottom layer of GaAs (GaInP//GaAs). An exemplary four-junction cell comprises GaInP/GaAs/GaInAsP/GaInAs on InP substrate wherein each junction may be individually separated by a tunnel diode (/) or an isolating transparent wafer bond layer (//) such as a cell given by GaInP//GaAs//GaInAsP//GaInAs on InP. All combinations of diode and wafer bonds are within the scope of the disclosure. An exemplary four-junction cell having 44.7% conversion efficacy at 297-times concentration of the AM1.5d spectrum is made by SOITEC, France. The PV cell may comprise a single junction. An exemplary single junction PV cell may comprise a monocrystalline silicon cell such as one of those given in Sater et al. (B. L. Sater, N. D. Sater, "High voltage silicon VMJ solar cells for up to 1000 suns intensities", Photovoltaic Specialists Conference, 2002. Conference Record of the Twenty-Ninth IEEE, 19-24 May 2002, pp. 1019-1022.) which is herein incorporated by reference in its entirety. Alternatively, the single junction cell may comprise GaAs or GaAs doped with other elements such as those from Groups III and V. In an exemplary embodiment, the PV cells comprise triple junction concentrator PV cells or GaAs PV cells operated at about 1000 suns. In another exemplary embodiment, the PV cells comprise c-Si operated at 250 suns. In an exemplary embodiment, the PV may comprise GaAs that may be selectively responsive for wavelengths less than 900 nm and InGaAs on at least one of InP, GaAs, and Ge that may be selectively responsive to wavelengths in the region between 900 nm and 1800 nm. The two types of PV cells comprising GaAs and InGaAs on InP may be used in combination to increase the efficiency. Two such single junction types cells may be used to have the effect of a double junction cell. The combination may implemented by using at least one of dichroic mirrors, dichroic filters, and an architecture of the cells alone or in combination with mirrors to achieve multiple bounces or reflections of the light as given in the disclosure. In an embodiment, each PV cell comprises a polychromat layer that separates and sorts incoming light, redirecting it to strike particular layers in a multi junction cell. In an exemplary embodiment, the cell comprises an indium gallium phosphide layer for visible light and gallium arsenide layer for infrared light where the corresponding light is directed.

The cell may comprise a multi p-n junction cell such as a cell comprising an AlN top layer and GaN bottom layer to converter EUV and UV, respectively. In an embodiment, the photovoltaic cell may comprise a GaN p-layer cell with heavy p-doping near the surface to avoid excessive attenuation of short wavelength light such as UV and EUV. The n-type bottom layer may comprise AlGaN or AlN. In an embodiment, the PV cell comprises GaN and $Al_xGa_{1-x}N$ that is heavily p-doped in the top layer of the p-n junction wherein the p-doped layer comprises a two-dimensional-hole gas. In an embodiment, the PV cell may comprise at least one of GaN, AlGaN, and AlN with a semiconductor junction. In an embodiment, the PV cell may comprise n-type AlGaN or AlN with a metal junction. In an embodiment, the PV cell responds to high-energy light above the band gap of the PV material with multiple electron-hole pairs. The light intensity may be sufficient to saturate recombination mechanisms to improve the efficiency.

The converter may comprise a plurality of at least one of (i) GaN, (ii) AlGaN or AlN p-n junction, and (iii) shallow ultra-thin p-n heterojunction photovoltaics cells each comprising a p-type two-dimensional hole gas in GaN on an n-type AlGaN or AlN base region. Each may comprise a lead to a metal film layer such as an Al thin film layer, an n-type layer, a depletion layer, a p-type layer and a lead to a metal film layer such as an Al thin film layer with no passivation layer due to the short wavelength light and vacuum operation. In an embodiment of the photovoltaic cell comprising an AlGaN or AlN n-type layer, a metal of the appropriate work function may replace the p-layer to comprise a Schottky rectification barrier to comprise a Schottky barrier metal/semiconductor photovoltaic cell.

In another embodiment, the converter may comprise at least one of photovoltaic (PV) cells, photoelectric (PE) cells, and a hybrid of PV cells and PE cells. The PE cell may comprise a solid-state cell such as a GaN PE cell. The PE cells may each comprise a photocathode, a gap layer, and an anode. An exemplary PE cell comprises GaN (cathode) cessiated/AlN (separator or gap)/Al, Yb, or Eu (anode) that may be cessiated. The PV cells may each comprise at least one of the GaN, AlGaN, and AlN PV cells of the disclosure. The PE cell may be the top layer and the PV cell may be the bottom layer of the hybrid. The PE cell may convert the shortest wavelength light. In an embodiment, at least one of the cathode and anode layer of the PE cell and the p-layer and the n-layer of a PV cell may be turned upside down. The architecture may be changed to improve current collection. In an embodiment, the light emission from the ignition of the fuel is polarized and the converter is optimized to use light polarization selective materials to optimize the penetration of the light into the active layers of the cell. The light may be polarized by application of a field such as an electric field or a magnetic field by corresponding electrodes or magnets such as magnets 8c.

In an embodiment, the fuel may comprise silver, copper, or Ag—Cu alloy shot or melt having at least one of trapped hydrogen and trapped $H_2O$. The light emission may comprise predominantly ultraviolet light and extreme ultraviolet such as light in the wavelength region of about 10 nm to 300 nm. The PV cell may be response to at least a portion of the wavelength region of about 10 nm to 300 nm. The PV cells may comprise concentrator UV cells. The incident light intensity may be in at least one range of about 2 to 100,000 suns and 10 to 10,000 suns. The cell may be operated in a temperature range known in the art such as at least one temperature range of about less than 300° C. and less than 150° C. The PV cell may comprise a group III nitride such as at least one of InGaN, GaN, and AlGaN. In an embodiment, the PV cell may comprise a plurality of junctions. The junctions may be layered in series. In another embodiment, the junctions are independent or electrically parallel. The independent junctions may be mechanically stacked or wafer bonded. An exemplary multi junction PV cell comprises at least two junctions comprising n-p doped semiconductor such as a plurality from the group of InGaN, GaN, and AlGaN. The n dopant of GaN may comprise oxygen, and the p dopant may comprise Mg. An exemplary triple junction cell may comprise InGaN//GaN//AlGaN wherein // may refer to an isolating transparent wafer bond layer or mechanical stacking. The PV may be run at high light intensity equivalent to that of concentrator photovoltaic (CPV). The substrate may be at least one of sapphire, Si, SiC, and GaN wherein the latter two provide the best lattice matching for CPV applications. Layers may be deposited using metalorganic vapor phase epitaxy (MOVPE) methods known in the art. The cells may be cooled by cold plates such as those used in CPV or diode lasers such as commercial GaN diode lasers. The grid contacts may be mounted on the front and back surfaces of the cells as in the case of CPV cells. In an embodiment, the surface of the PV cell such as one comprising at least one of GaN, AlN, and GaAlN may be terminated. The termination layer may comprise at least one of H and F. The termination may decrease the carrier recombination effects of defects. The surface may be terminated with a window such as AlN.

In an embodiment, at least one of the photovoltaic (PV) and photoelectric (PE) converter may have a protective window that is substantially transparent to the light to which it is responsive. The window may be at least 10% transparent to the responsive light. The window may be transparent to UV light. The window may comprise a coating such as a UV transparent coating on the PV or PE cells. The coating may be applied by deposition such as vapor deposition. The coating may comprise the material of UV windows of the disclosure such as a sapphire or $MgF_2$ window. Other suitable windows comprise LiF and $CaF_2$. Any window such as a $MgF_2$ window may be made thin to limit the EUV attenuation. In an embodiment, the PV or PE material such as one that is hard, glass-like such as GaN serves as a cleanable surface. The PV material such as GaN may serve as the window. In an embodiment, the surface electrodes of the PV or PE cells may comprise the window. The electrodes and window may comprise aluminum. The window may comprise at least one of aluminum, carbon, graphite, zirconia, graphene, $MgF_2$, an alkaline earth fluoride, an alkaline earth halide, $Al_2O_3$, and sapphire. The window may be very thin such as about 1 Å to 100 Å thick such that it is transparent to the UV and EUV emission from the cell. Exemplary thin transparent thin films are Al, Yb, and Eu thin films. The film may be applied by MOCVD, vapor deposition, sputtering and other methods known in the art. In an embodiment, at least one of the gravity recovery system, the plasma confinement system, the augmented plasma railgun recovery system, and the electrostatic precipitation recovery system may ameliorate the contact and impact of the ignition product with PV or its window. The SF-CIHT generator may comprise a means to remove ignition product from the surface such as a mechanical scraper or an ion-sputtering beam. The scraper may comprise carbon that is not wetted by silver and also is non-abrasive.

In an embodiment, the cell may covert the incident light to electricity by at least one mechanism such as at least one mechanism from the group of the photovoltaic effect, the photoelectric effect, the thermionic effect, and the thermoelectric effect. The converter may comprise bilayer cells each having a photoelectric layer on top of a photovoltaic layer. The higher energy light such as extreme ultraviolet light may be selectively absorbed and converted by the top layer. A layer of a plurality of layers may comprise a UV window such as the $MgF_2$ window. The UV window may protect ultraviolet UV) PV from damage by ionizing radiation such as damage by soft X-ray radiation. In an embodiment, low-pressure cell gas may be added to selectively attenuate radiation that would damage the UV PV. Alternatively, this radiation may be at least partially converted to electricity and at least partially blocked from the UV PV by the photoelectronic converter top layer. In another embodiment, the UV PV material such as GaN may also convert at least a portion of the extreme ultraviolet emission from the cell into electricity using at least one of the photovoltaic effect and the photoelectric effect.

The photovoltaic converter may comprise PV cells that convert ultraviolet light into electricity. Exemplary ultraviolet PV cells comprise at least one of p-type semiconducting polymer PEDOT-PSS: poly(3,4-ethylenedioxythiophene) doped by poly(4-styrenesulfonate) film deposited on a Nb-doped titanium oxide (SrTiO3:Nb) (PEDOT-PSS/SrTiO3: Nb heterostructure), GaN, GaN doped with a transition metal such as manganese, SiC, diamond, Si, and $TiO_2$. Other exemplary PV photovoltaic cells comprise n-ZnO/p-GaN heterojunction cells.

Figure 33:
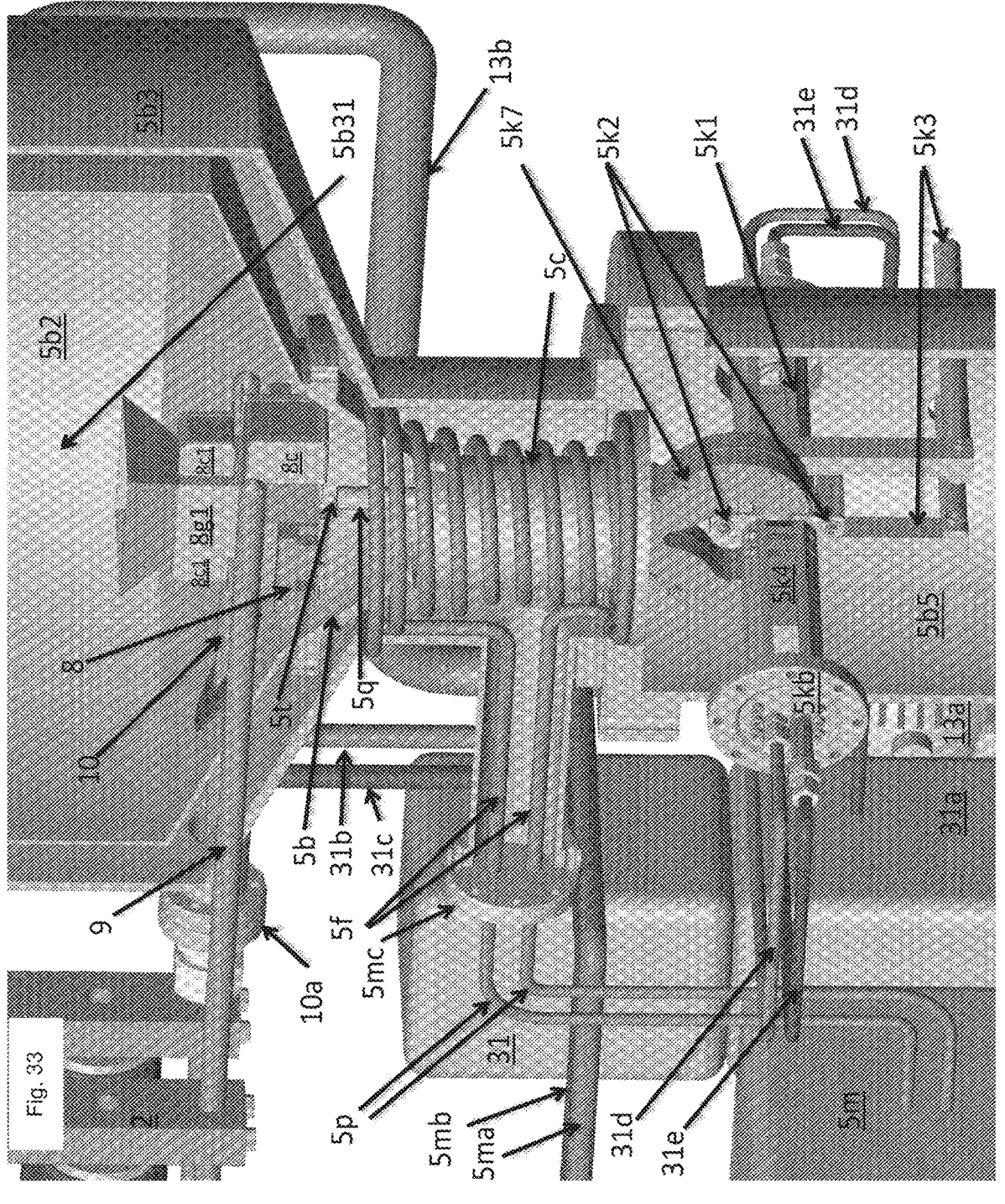
FIG. 33 (also referred to herein as 2126) is a schematic drawing of an internal view of the further details of the injection and ignition systems of the SF-CIHT cell power generator shown in FIG. 2125 in accordance with an embodiment of the present disclosure.
Figure 34:
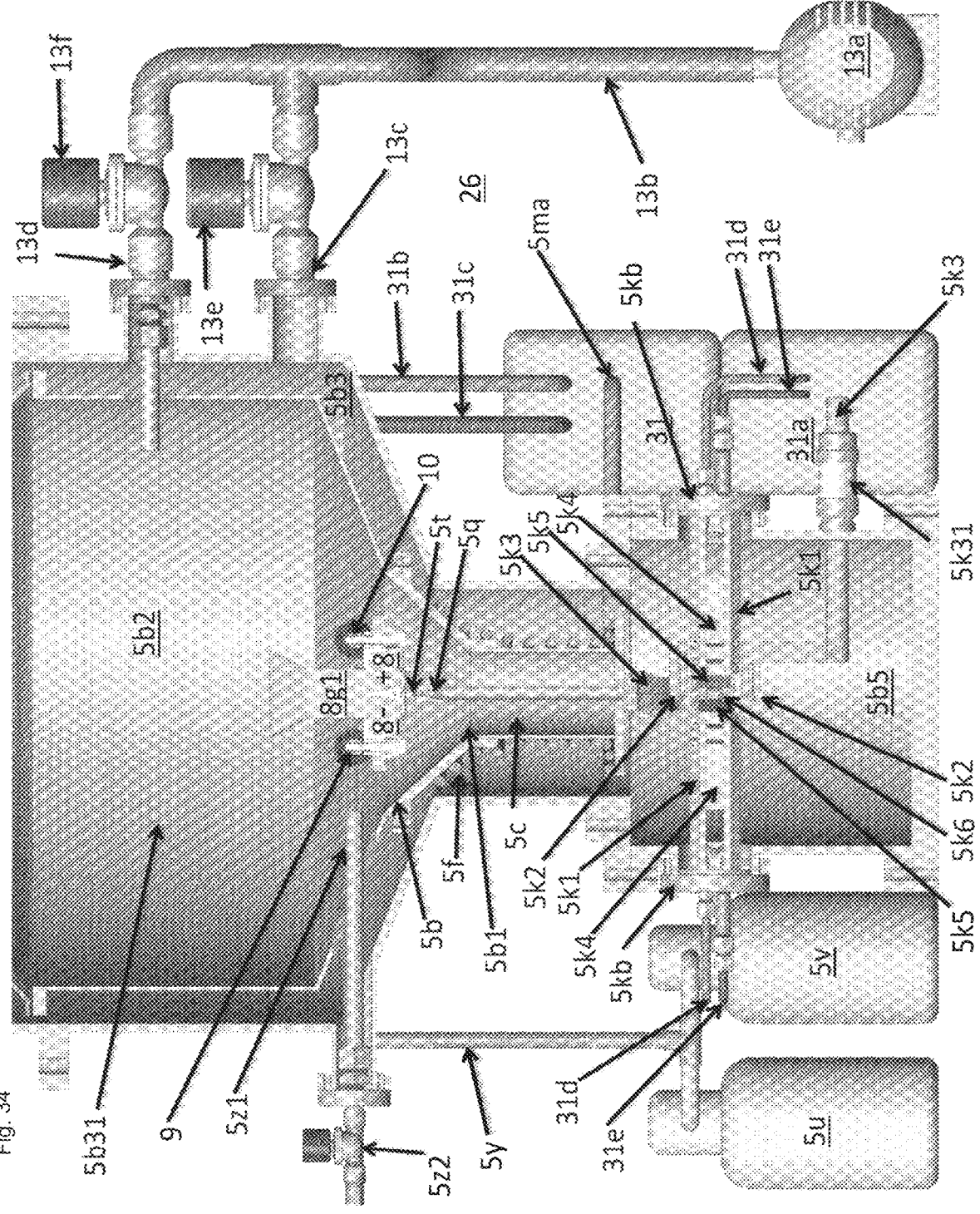
FIG. 34 (also referred to herein as 2127) is a schematic drawing of an internal view of additional details of the injection and ignition systems of the SF-CIHT cell power generator shown in FIG. 2126 in accordance with an embodiment of the present disclosure.
Figure 35:
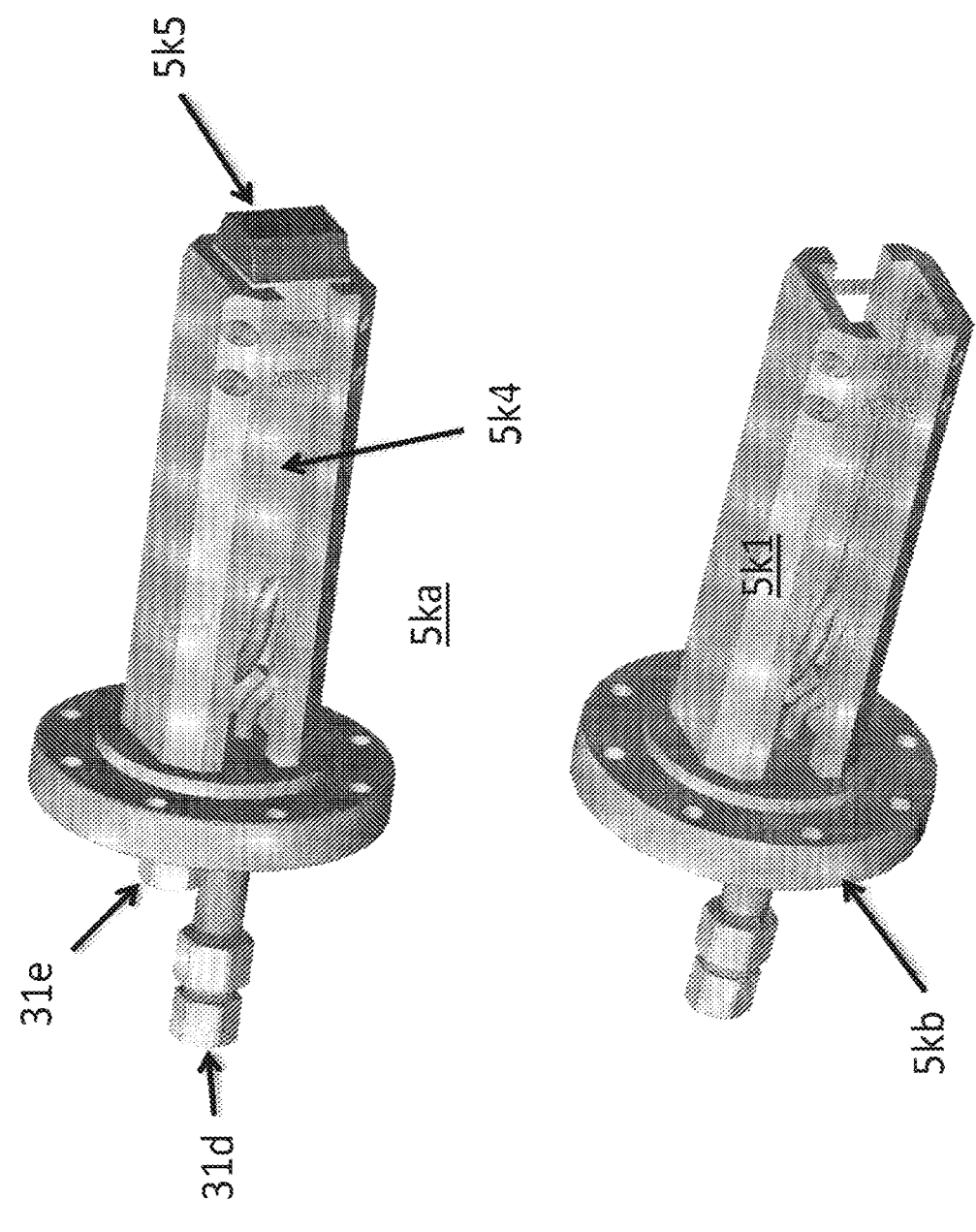
FIG. 35 (also referred to herein as 2128) is a schematic drawing of magnetic yoke assembly of the electromagnetic pump of SF-CIHT cell power generator shown in FIG. 2127 with and without the magnets in accordance with an embodiment of the present disclosure.
Figure 36:
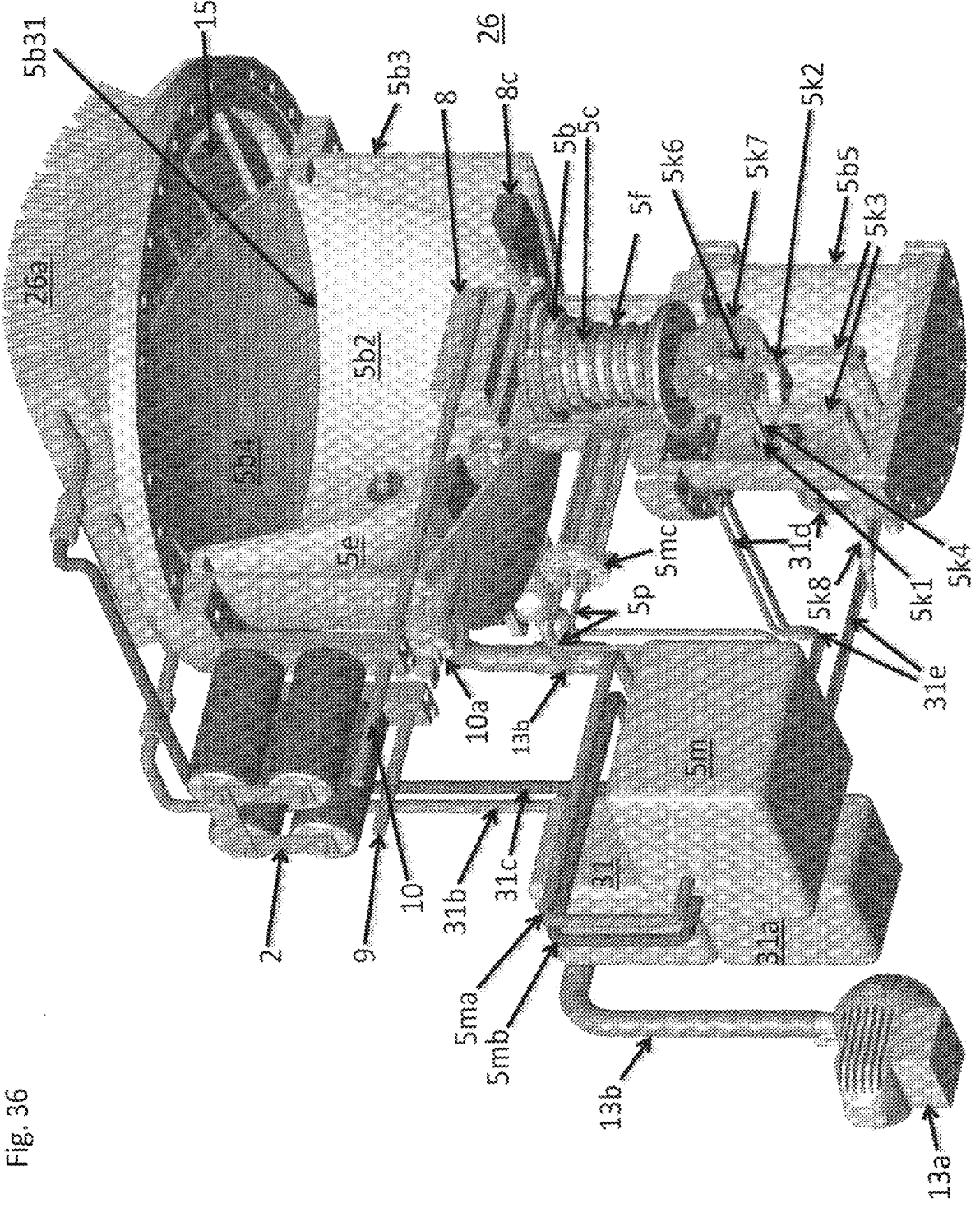
FIG. 36 (also referred to herein as 2129) is a schematic drawing of at least one of a thermophotovoltaic, photovoltaic, photoelectric, thermionic, and thermoelectric SF-CIHT cell power generator showing blade electrodes held by fasteners and an electrode electromagnetic pump comprising a magnetic circuit in accordance with an embodiment of the present disclosure.
Figure 37:
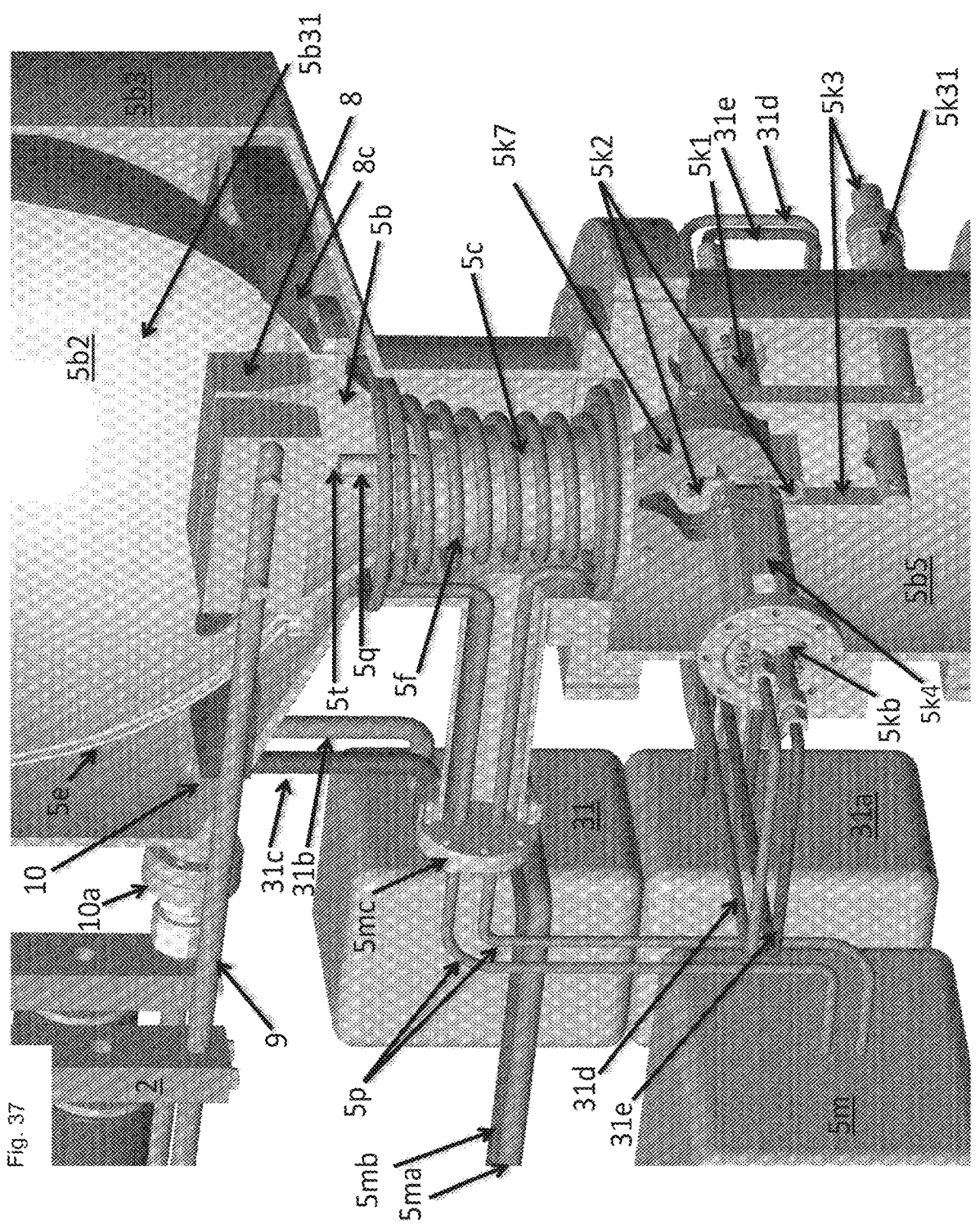
FIG. 37 (also referred to herein as 2130) is a schematic drawing of an internal view of the further details of the injection and ignition systems of the SF-CIHT cell power generator shown in FIG. 2129 in accordance with an embodiment of the present disclosure.
Figure 38:
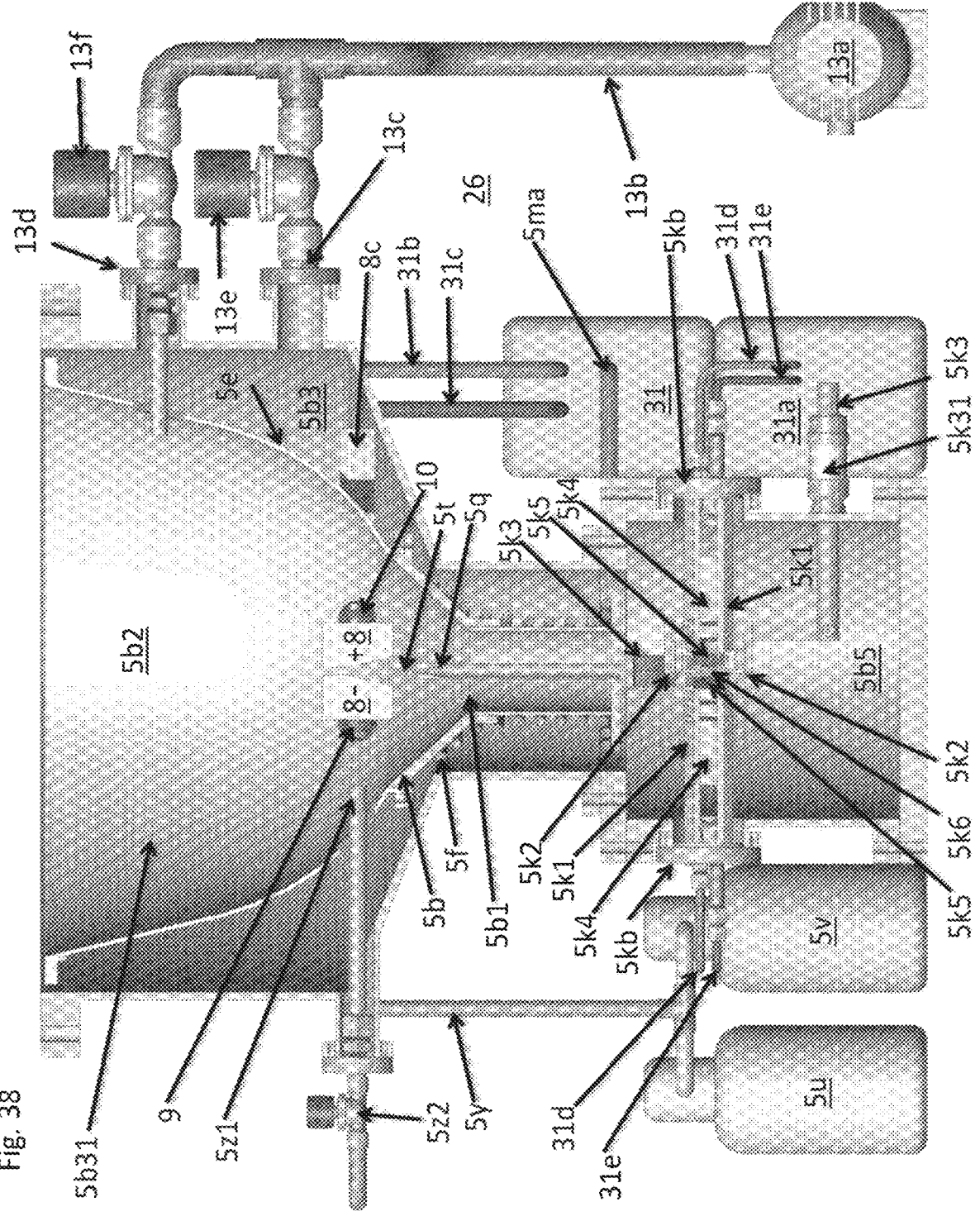
FIG. 38 (also referred to herein as 2131) is a schematic drawing of a cross sectional view of the further details of the injection and ignition systems of the SF-CIHT cell power generator shown in FIG. 2129 in accordance with an embodiment of the present disclosure.
Figure 39:
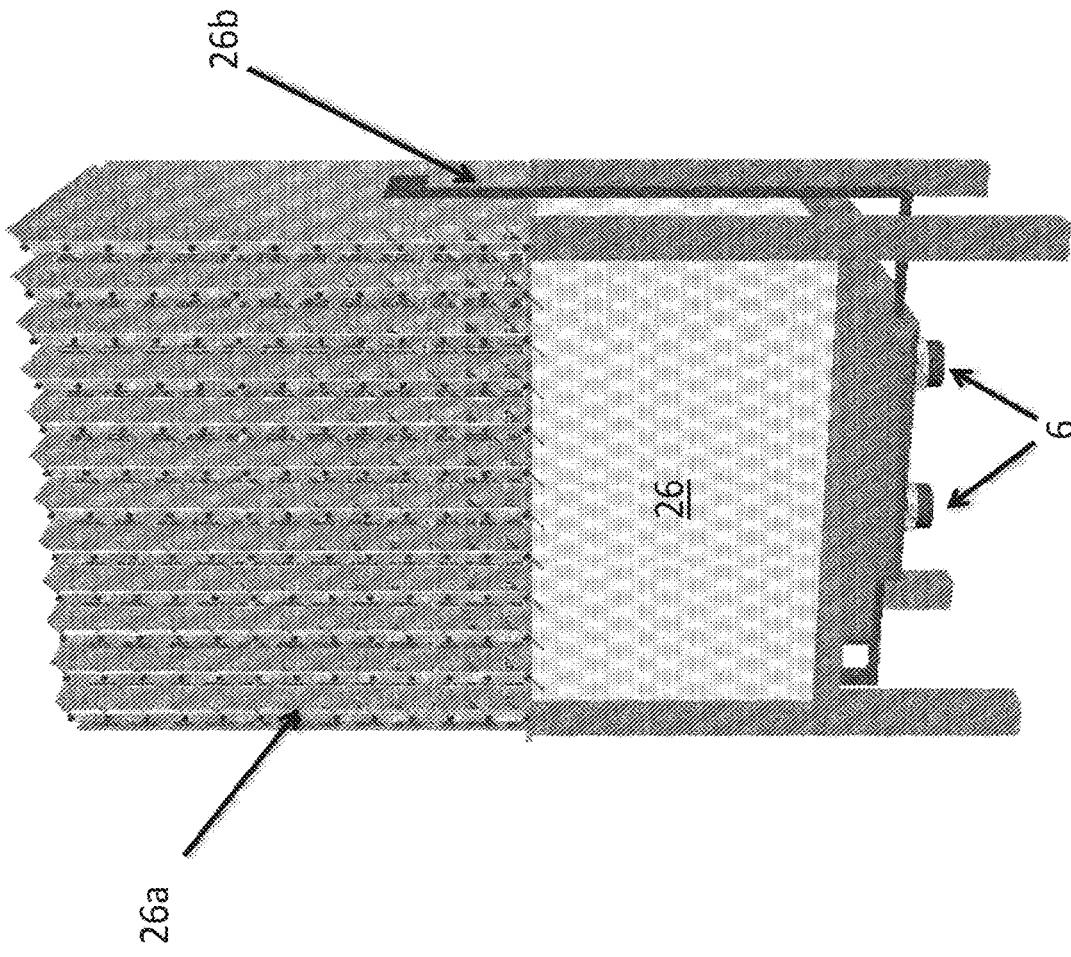
FIG. 39 (also referred to herein as 2132) is a schematic drawing of a SF-CIHT cell power generator showing an optical distribution and the photovoltaic converter system in accordance with an embodiment of the present disclosure.
Figure 40:
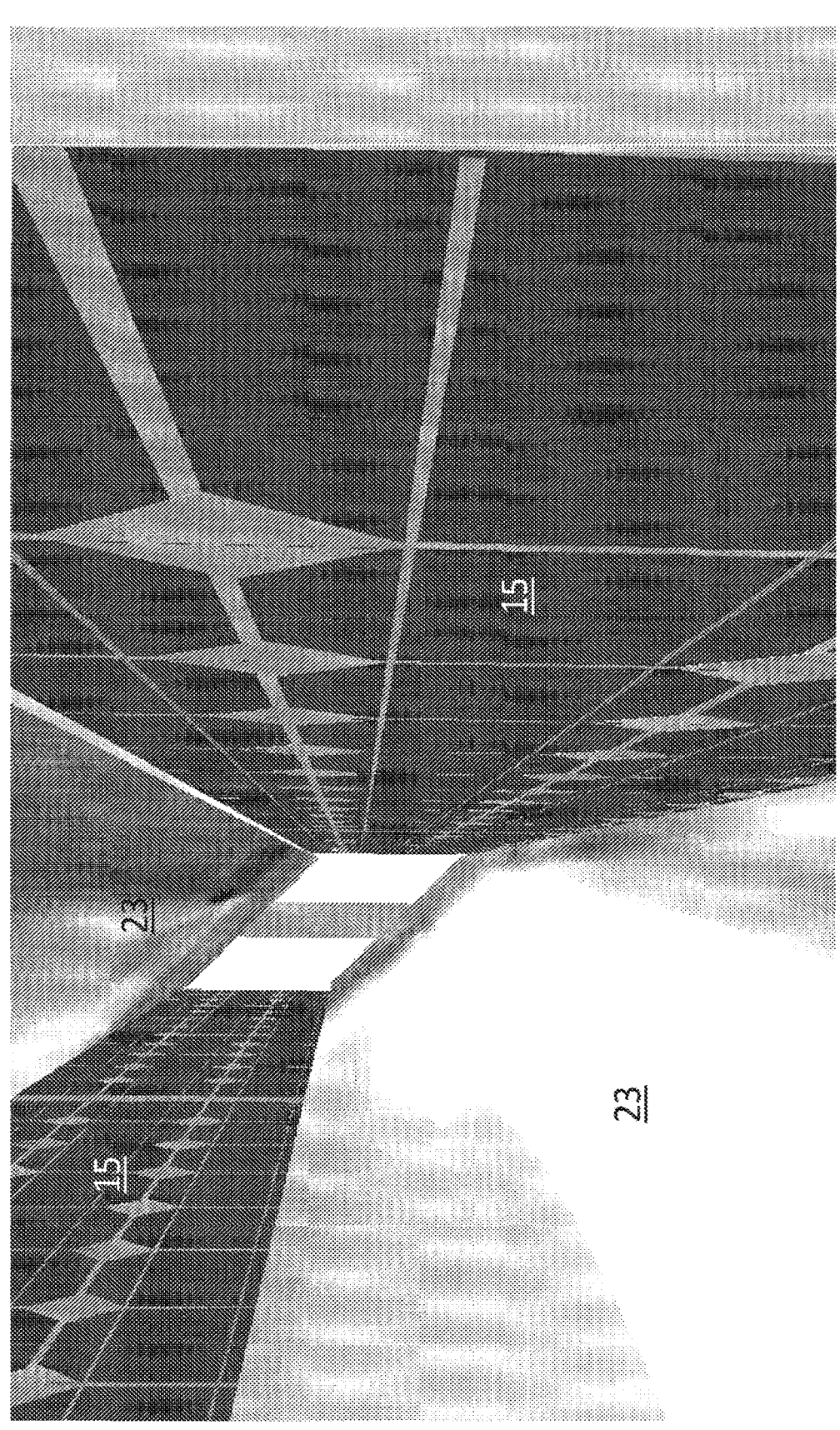
FIG. 40 (also referred to herein as 2133) is a schematic drawing of a SF-CIHT cell power generator showing details of an optical distribution and the photovoltaic converter system in accordance with an embodiment of the present disclosure.
Figure 41:
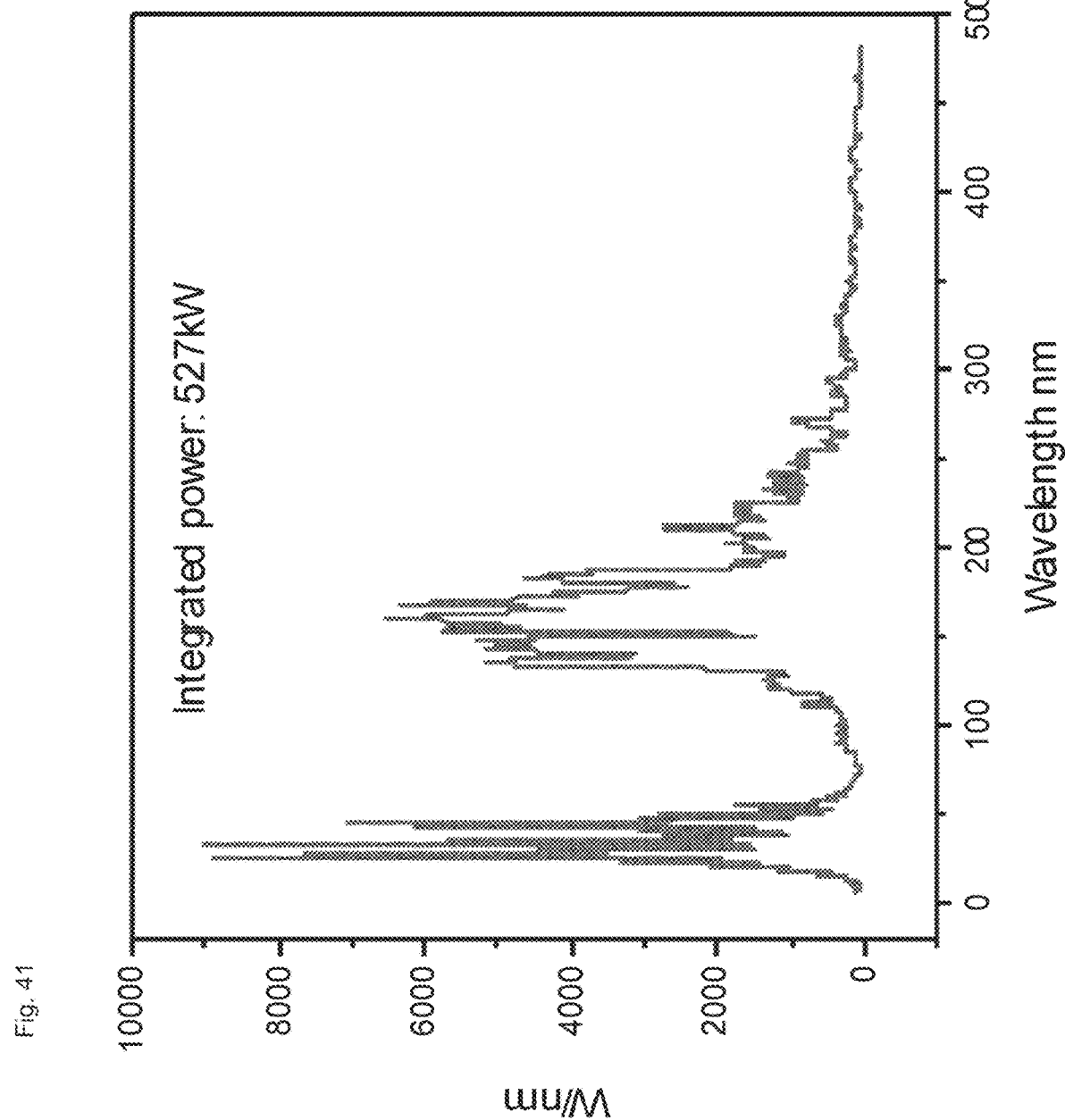
FIG. 41 is the absolute spectrum in the 5 nm to 450 nm region of the ignition of a 80 mg shot of silver comprising absorbed $H_2$ and $H_2O$ from gas treatment of silver melt before dripping into a water reservoir showing an average optical power of 527 kW, essentially all in the ultraviolet and extreme ultraviolet spectral region according to a fuel embodiment.
Figure 42:
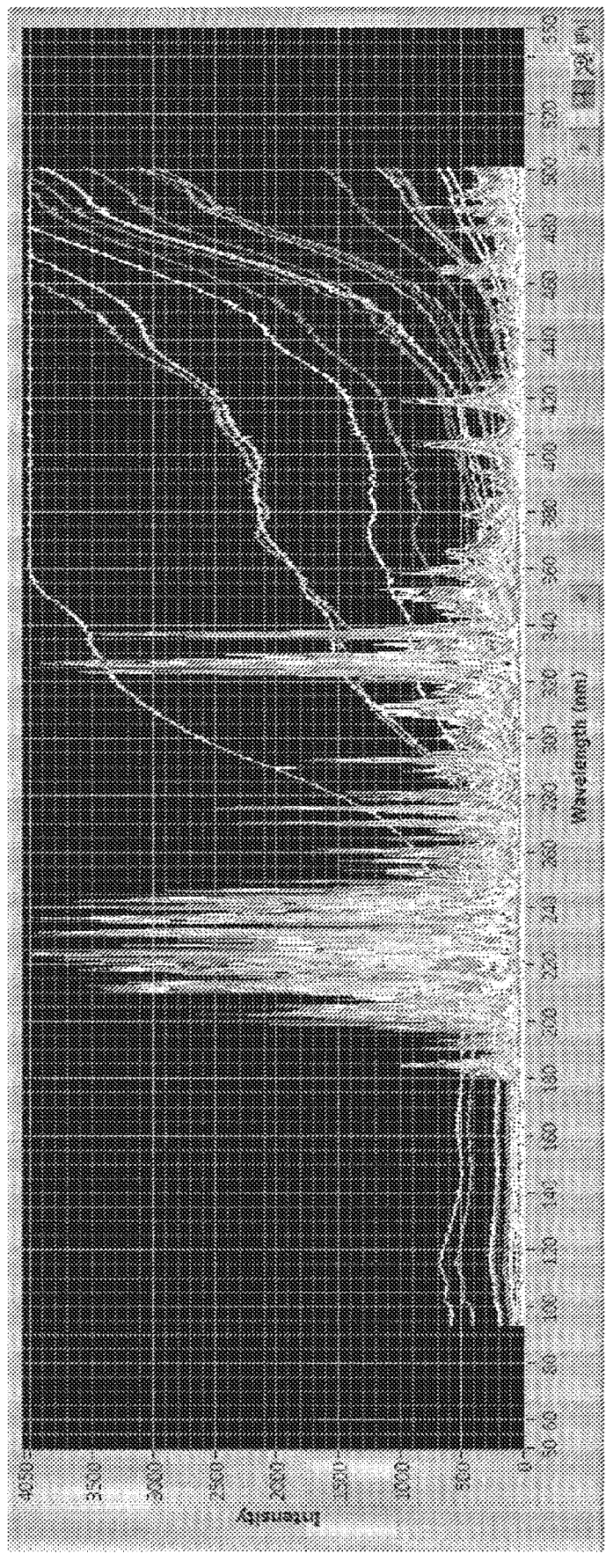
FIG. 42 is the spectrum (100 nm to 500 nm region with a cutoff at 180 nm due to the sapphire spectrometer window) of the ignition of a molten silver pumped into W electrodes in atmospheric argon with an ambient $H_2O$ vapor pressure of about 1 Torr showing UV line emission that transitioned to 5000K blackbody radiation when the atmosphere became optically thick to the UV radiation with the vaporization of the silver in accordance with an embodiment of the present disclosure.
Figure 43:
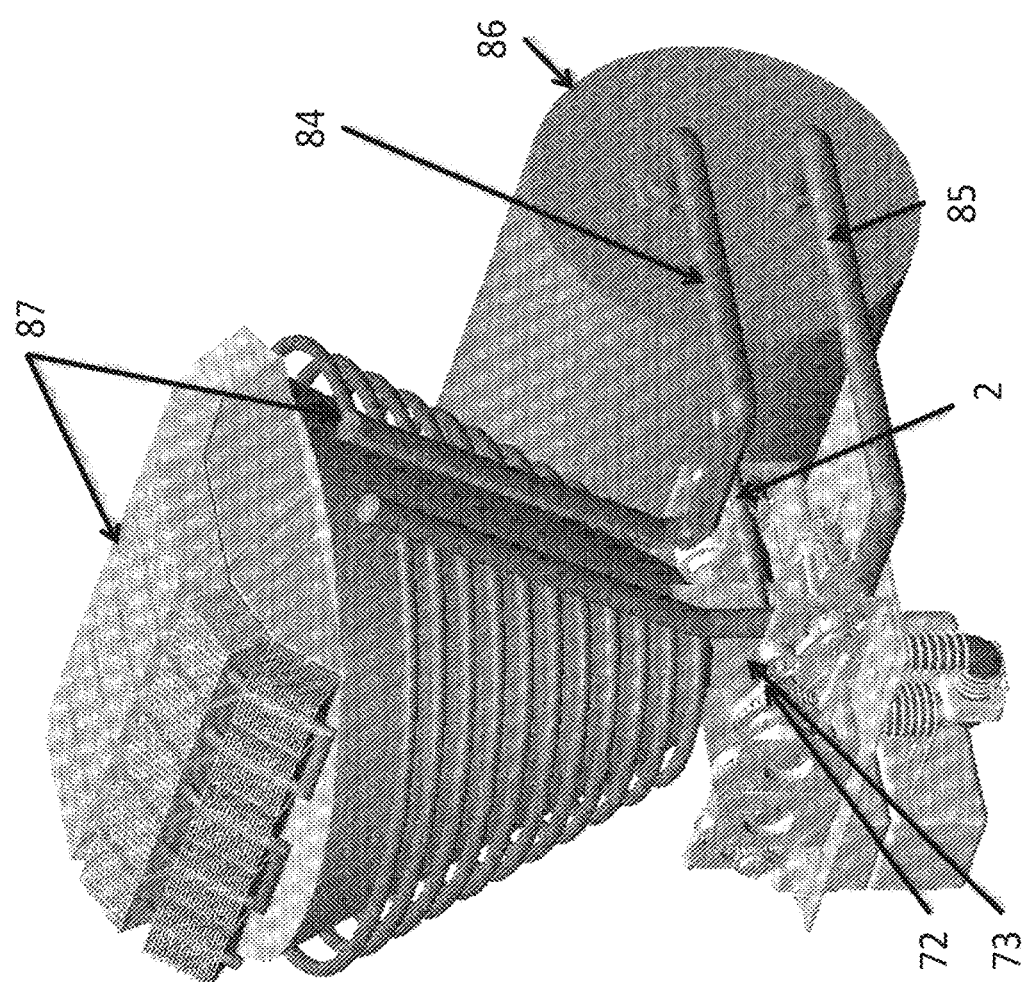
FIG. 43 is a schematic of a thermal power system in accordance with an embodiment of the present disclosure.

To convert the high intensity light into electricity, the generator may comprise an optical distribution system 26a such as that shown in FIGS. 2I32 and 2I33. The light to electricity panels 15 may comprise at least one of PE, PV, and thermionic cells. The window to the converter may be transparent to the cell emitted light such as short wavelength light. The window to the PV converter may comprise at least one of sapphire, LiF, $MgF_2$, and $CaF_2$, other alkaline earth halides such as fluorides such as $BaF_2$, $CdF_2$, quartz, fused quartz, UV glass, borosilicate, and Infrasil (ThorLabs). The semitransparent mirrors 23 may be transparent to short wavelength light. The material may be the same as that of the PV converter window with a partial coverage of reflective material such as mirror such as UV mirror. The semitransparent mirror 23 may comprise a checkered pattern of reflective material such as UV mirror such as at least one of $MgF_2$-coated Al and thin fluoride films such as $MgF_2$ or LiF films or SiC films on aluminum.

In an embodiment, the hydrino power converter may comprise a thermophotovoltaic (TPV) power converter. The electrodes such as Mo or W electrodes may be maintained at elevated temperature to produce radiation such as blackbody radiation that may converted into electricity using photovoltaic cells. In an embodiment, the melt such as Ag or AgCu melt is heated by the hot electrodes and is vaporized such that the region around the electrode becomes optically thick to the short wavelength light such as EUV and UV. The vaporized metal may participate in the ignition plasma. The power from the ignition of the fuel to form hydrinos may heat the plasma to a high blackbody temperature. The temperature of the blackbody may be controlled by controlling the rate of the hydrino reaction by means such as by controlling the fuel flow rate, the firing rate, the water vapor pressure and other means of the disclosure. In an embodiment, the electrode spacing or gap 8 and current are adjusted to achieve a plasma that emits predominantly blackbody radiation over UV and EUV emission. The electrode gap 8 may be adjusted by means of the disclosure. In an embodiment, the current may be constant with superimposed pulses. The constant current may be in at least one range of about 50 A to 30,000 A, 100 A to 10,000 A, and 200 A to 2000 A. The peak current pulses may be in at least one range of about 50 A to 30,000 A, 500 A to 10,000 A, and 1000 A to 5000 A. The frequency of the current pulses may be in at least one range of about 1 Hz to 20,000 Hz, 100 Hz to 10,000 Hz, and 500 Hz to 5000 Hz.

In an embodiment, the generator further comprises a switch such as an IGBT or another switch of the disclosure or known in the art to turn off the ignition current in the event that the hydrino reaction self propagates by thermolysis. The reaction may self sustain at least one of an elevated cell and plasma temperature such as one that supports thermolysis at a sufficient rate to maintain the temperature and the hydrino reaction rate. The plasma may comprise optically thick plasma. The plasma may comprise a blackbody. The optically thick plasma may be achieved by maintaining a high gas pressure. In an exemplary embodiment, thermolysis occurred with injection of each of molten silver and molten silver-copper (28 wt %) alloy at tungsten electrodes with a continuous ignition current in the range of 100 A to 1000 A with superimposed pulses in the range of about 2 kA to 10 kA, a plasma blackbody temperature of 5000 K and an electrode temperature in the range of about 3000K to 3700K. The thermolysis may occur at high temperature of at least one of the plasma and cell component in contact with the plasma. The temperature may be in at least one range of about 500K to 10,000K, 1000K to 7000K, and 1000K to 5000K. The cell component may be at least one of the electrodes 8, cone reservoir 5b, cone 5b2, and top cover 5b4. In another embodiment, at least one of the cell components such as the cone reservoir 5b2 may serve as a cooling agent to cool the thermolysis H to present it from reverting back to H2O. At least one of the bus bars and cone reservoir may be cooled to serve as the cooling agent.

The maintained blackbody temperature may be one that emits radiation that may be converted into electricity with a photovoltaic cell. In an exemplary embodiment, the blackbody temperature may be maintained in at least one range of about 1000 K to 3690 K. The photovoltaic cell may comprise a thermophotovoltaic (TPV) cell. Exemplary photovoltaic cells for thermophotovoltaic conversion comprise crystalline silicon, germanium, gallium arsenide (GaAs), gallium antimonide (GaSb), indium gallium arsenide (InGaAs), indium gallium arsenide antimonide (InGaAsSb), and indium phosphide arsenide antimonide (InPAsSb) cells. The converter may comprise mirrors to at least one of direct and redirect radiation onto the thermophotovoltaic converter. In an embodiment, back mirrors reflect unconverted radiation back to the source to contribute to the power that is re-radiated to the converter. Exemplary mirrors comprise at least one of the cone material such as aluminum and anodized aluminum, $MgF_2$-coated Al and thin fluoride films such as $MgF_2$ or LiF films or SiC films on aluminum and sapphire, alumina such as alpha alumina that may be sputter coated on a substrate such as stainless steel, $MgF_2$ coated sapphire, boro-silica glass, alkali-aluminosilicate glass such as Gorilla Glass, LiF, MgF$_2$, and CaF$_2$, other alkaline earth halides such as fluorides such as BaF$_2$, CdF$_2$, quartz, fused quartz, UV glass, borosilicate, Infrasil (ThorLabs), and ceramic glass that may be mirrored on the outer surface when transparent. The mirror such as the anodized aluminum mirror may diffuse the light to uniformly irradiate the PV converter. Transparent materials such as at least one of sapphire, alumina, boro-silica glass, LiF, MgF$_2$, and CaF$_2$, other alkaline earth halides such as fluorides such as BaF$_2$, CdF$_2$, quartz, fused quartz, UV glass, borosilicate, Infrasil (ThorLabs), and ceramic glass may serve as the window for the TPV converter. Another embodiment of the TPV converter comprises blackbody emitter filters to pass wavelengths matched to the bandgap of the PV and reflect mismatched wavelengths back to the emitter wherein the emitter may comprise a hot cell component such as the electrodes.

To optimize the performance of a thermophotovoltaic converter comprising a multi-junction cells, the blackbody temperature of the light emitted from the cell may be maintained about constant such as within 10%. Then, the power output may be controlled with power conditioning equipment with excess power stored in a device such as a battery or capacitor or rejected such as rejected as heat. In another embodiment, the power from the plasma may be maintained by reducing the reaction rate by means of the disclosure such as by changing the firing frequency and current, the metal injection rate, and the rate of injection of at least one of H$_2$O and H$_2$ wherein the blackbody temperature may be maintained by controlling the emissivity of the plasma. The emissivity of the plasma may be changed by changing the cell atmosphere such as one initially comprising metal vapor by the addition of a cell gas such as a noble gas.

In an embodiment, the cell gases such as the pressure of water vapor, hydrogen, and oxygen, and the total pressure are sensed with corresponding sensors or gauges. In an embodiment, at least one gas pressure such as at least one of the water and hydrogen pressure are sensed by monitoring at least one parameter of the cell that changes in response to changes in the pressure of at least one of these cell gases. At least one of a desirable water and hydrogen pressure may be achieved by changing one or more pressures while monitoring the effect of changes with the supply of the gases. Exemplary monitored parameters that are changed by the gases comprise the electrical behavior of the ignition circuit and the light output of the cell. At least one of the ignition-current and light-output may be maximized at a desired pressure of at least one of the hydrogen and water vapor pressure. At least one of a light detector such as a diode and the output of the PV converter may measure the light output of the cell. At least one of a voltage and current meter may monitor the electrical behavior of the ignition circuit. The generator may comprise a pressure control system such as one comprising software, a processor such as a computer, and a controller that receives input data from the monitoring of the parameter and adjusts the gas pressure to achieve the optimization of the desired power output of the generator. In an embodiment comprising a fuel metal comprising copper, the hydrogen may be maintained at a pressure to achieve reduction of the copper oxide from the reaction of the copper with oxygen from the reaction of H$_2$O to hydrino and oxygen wherein the water vapor pressure is adjusted to optimize the generator output by monitoring the parameter. In an embodiment, the hydrogen pressure may be controlled at about a constant pressure by supplying H$_2$ by electrolysis. The electrolysis current may be maintained at about a constant current. The hydrogen may be supplied at a rate to react with about all hydrino reaction oxygen product. Excess hydrogen may diffuse through the cell walls to maintain a constant pressure over that consumed by the hydrino reaction and reaction with oxygen product. The hydrogen may permeate through a hollow cathode to the reaction cell chamber 5b31. In an embodiment, the pressure control system controls the H$_2$ and H$_2$O pressure in response to the ignition current and frequency and the light output to optimize at least one. The light may be monitored with a diode, power meter, or spectrometer. The ignition current may be monitored with a multi-meter or digital oscilloscope. The injector rate of the molten metal of the electromagnetic pump 5k may also be controlled to optimize at least one the electrical behavior of the ignition circuit and the light output of the cell.

In another embodiment, the sensor may measure multiple components. In an exemplary embodiment, the cell gases and the total pressure are measured with a mass spectrometer such as a quadrupole mass spectrometer such as a residual gas analyzer. The mass spectrometer may sense in batch or in trend mode. The water or humidity sensor may comprise at least one of an absolute, a capacitive, and a resistive humidity sensor. The sensor capable of analyzing a plurality of gases comprises a plasma source such as a microwave chamber and generator wherein the plasma excited cell gases emit light such as visible and infrared light. The gases and concentrations are determined by the spectral emission such as the characteristic lines and intensities of the gaseous components. The gases may be cooled before sampling. The metal vapor may be removed from the cell gas before the cell gas is analyzed for gas composition. The metal vapor in the cell such as one comprising at least one of silver and copper may be cooled to condense the metal vapor such that the cell gases may flow into the sensor in the absence of the metal vapor. The SF-CIHT cell also herein also referred to as the SF-CIHT generator or generator may comprise a channel such as a tube for the flow of gas from the cell wherein the tube comprises an inlet from the cell and an outlet for the flow of condensed metal vapor and an outlet of the non-condensable gas to at least one gas sensor. The tube may be cooled. The cooling may be achieved by conduction wherein the tube is heat sunk to a cooled cell component such as at least one of the cone reservoir and its metal content, the electrodes, the bus bar, and the magnets of the electrode electromagnetic pump such as 8c. The tube may be actively cooled by means such as water-cooling and passive means such as a heat pipe. The cell gas comprising metal vapor may enter the tube wherein the metal vapor condenses due to the tube's lower temperature. The condensed metal may flow to the cone reservoir by means such as at least one of gravity flow and pumping such that the gases to be sensed flow into the sensors in the absence of metal vapor.

In an embodiment, the oxygen may be sensed indirectly by means such as by measuring a parameter of an oxidation product or due to an oxidation product. In an exemplary embodiment, the generator may comprise a melt conductivity sensor. The decrease in conductivity of the Ag—Cu alloy melt in the cone reservoir due to CuO on the top of the alloy melt may serve as an indication to add a higher H$_2$ flow rate. In another exemplary embodiment, the generator comprises a scale and material that reversibly absorbs oxygen based on its concentration or presence. The oxygen sensor may comprise an oxidizable metal having a H$_2$ reducible metal oxide wherein the presence of oxygen is determined by a weight change. In an embodiment, the pressure of a highly permeable gas such as hydrogen gas in reaction cell chamber 5*b*31 is controlled by supplying gas to the cell chamber 5*b*3. The gas pressure may be measured with a corresponding gas sensor in cell chamber 5*b*3. The cell chamber gas pressure may be used to control the flow of hydrogen into the cell chamber 5*b*3 that subsequently flows or permeates into the reaction cell chamber 5*b*31. In an embodiment, the gas such as hydrogen flows or permeates through at least one wall of the cell 26 such as that of the cone 5*b*2 or top cover 5*b*4 from the cell chamber 5*b*3 to the reaction cell chamber 5*b*31. In an embodiment, the $H_2$ in the reaction chamber 5*b*31 is maintained at a pressure that consumes the oxygen in the reaction chamber 5*b*31 to a desired pressure. In an exemplary embodiment, the hydrogen pressure is maintained at a sufficient concentration to consume the oxygen formed in the reaction cell chamber 5*b*31. In an embodiment shown in FIGS. 2I24-2I31, the lower chamber 5*b*5 is in continuity with the cell chamber 5*b*3 wherein the diameter of the plate at the base of the reservoir 5*c* provides a gap between the chambers. Both chambers may be filled with the same gas such as hydrogen that may also permeate into the reaction cell chamber 5*b*31. In an embodiment, a non-permeable gas is supplied directly to reaction chamber 5*b*31 in a manner such that metal vapor does not fowl the supply outlet. In an embodiment, the water supply injector 5*z*1 comprises a sufficiently small diameter nozzle such that the water vapor flow rate is sufficient to present the metal vapor from flowing into the injector such as into the nozzle and $H_2O$ vapor injection tube of the injector 5*z*1.

In an embodiment shown in FIGS. 2I24 to 2I28, the cone 5*b* may comprise a plurality of materials that may be operated at different temperatures. For example, the bottom section may comprise a heat resistant metal such as a high temperature stainless steel such as Hastelloy that may have an oxide coat, and the top portion may comprise anodized aluminum. The anodized aluminum may be coated on another material such as stainless steel. The oxide coat of the material may be maintained by controlling the temperature and atmosphere in the reaction cell chamber 5*b*31 such as the partial pressure of at least one of oxygen and water. In an embodiment, the walls of the cell 26 such as those of the cone 5*b*2 may comprise sapphire. The sapphire may comprise segments or panels. Each panel may be backed by a reflector such as a silver sheet to reflect incident from the cell back into the cell and towards the PV converter. The reflectors may be separated from the sapphire by a gap that may be maintained under reduced pressure such as vacuum to maintain the reflectors at a lower temperature that the sapphire panels. The low-pressure condition may be achieved by having the gap in continuity with the evacuated cell. The cell may further comprise a sapphire window to the PV converter 26*a*.

In an embodiment, the walls of the cell 26 may comprise a cone 5*b*2 and at top cover 5*b*4 that form a reaction cell chamber 5*b*31 that may comprise a dome. The dome may be resistant to wetting by the fuel melt such as Ag or Ag—Cu alloy melt. The dome may be maintained at elevated temperature to prevent wetting by the melt. The temperature may be maintained in the range of about 100° C. to 1800° C. The dome may be transparent. The transparent dome may comprise at least one of sapphire, quartz, $MgF_2$, and alkali-aluminosilicate glass such as Gorilla Glass. The dome may be inverted such that the open ½ sphere is oriented towards the PV converter 26*a*. The bottom of the inverted dome may be sectioned to form a circular connection to the circular cone reservoir 5*b*. The inverted dome may comprise penetrations, cutouts, or feed throughs of at least one of the bus bars 9 and 10, the electrodes 8, and the gas injector such as the water injector 5*z*1. The inverted dome may comprise at least one of a metal ring at the top edge and an outer metal mirror coating such as a refractory metal coating such as a W or Mo mirroring. The mirroring may be applied by vapor deposition such as by organic metal chemical vapor phase deposition (MOCVD). An exemplary chemical for the deposition is molybdenum or tungsten hexa-carbonyl. Alternatively, the inverted dome may comprise a matching outer circumferential, mirrored dome reflector that may have a separating gap. The reflector partial dome may be separated from the sapphire dome by a gap that may be maintained under reduced pressure such as vacuum to maintain the reflectors at a lower temperature than the sapphire dome. The low-pressure condition may be achieved by having the gap in continuity with the evacuated cell. The cell may further comprise a window 5*b*4 such as a sapphire window to the PV converter 26*a*. The inverted dome may comprise the cone 5*b*2 and the open top of the cone 5*b*2 may be covered by a window 5*b*4 that may comprise sapphire. The window may have a desired shape for transmitting light to the PV converter. The shape may be a match to the geometry of the PV converter such as planar or dome shaped. At least one of the cone reservoir 5*b*, the window 5*b*4, the bus bars 9 and 10, or electrodes 8 may be joined to the cone 5*b*2 comprising an inverted dome with a gasket such a graphite gasket such as a Graphoil gasket. In other embodiments, the inverted dome may comprise other geometries or shapes. Exemplary alternative shapes of the inverted dome comprise a fraction of a cover such as a portion of a covering in the range of 90% to 10% of the surface of the corresponding sphere, parabola, trapezoid, or cube.

In an embodiment, the dome may serve as the cone 5*b*2 and the window 5*b*4. The dome may comprise a circular section of a sphere with an open portion. The dome may be non-inverted with the open portion in connection with the cone reservoir 5*b*. In other embodiments, the non-inverted dome may comprise other geometries or shapes. Exemplary alternative shapes of the non-inverted dome comprise a fraction of a cover of the cone reservoir such as a portion of a covering in the range of 90% to 10% of the surface of the corresponding sphere, parabola, trapezoid, cube, or other enclosure of the cone reservoir. The lower portion of the dome closest to the cone reservoir Sb may be mirrored or comprise circumferential reflectors to comprise the cone 5*b*2, and the top portion may be transparent to comprise the window 5*b*4 to the PV converter 26*a*.

The cone 5*b*2 may comprise a single dome or segmented geodesic structure, and the window 5*b*4 may be separate or a portion of the dome. At least one of the cone 5*b*2 and window 5*b*4 may be maintained at a temperature above that which prevents the fuel melt such as Ag or Ag—Cu melt from adhering. The temperature may be maintained in at least one range of about 200° C. to 2000° C., 300° C. to 1500° C., and 400° C. to 1100° C. The temperature may be maintained by a heater such as an inductively coupled heater such as during startup. The combination of the cone 5*b*2 such as a sapphire dome and window 5*b*4 may comprise a high-temperature blackbody light source emitting predominantly through the window 5*b*4 that may be may small enough to be conveniently heated in startup mode by an inductively coupled heater. The cone segments may be held in place by fasteners such as clamps or brackets that may comprise a refractory metal such as Mo. The brackets may he supported by a frame. The backing reflector panels such as silver panels may also be fastened to the frame with clamps or brackets. Alternatively, the panels may be bolted, screwed, or welded to the frame. The segments and any feed-throughs such as one for the electrodes may be joined or lined with a joint material such as one that accommodates expansion and contraction and is heat resistant. An exemplary joint material comprises graphite such as Graphoil. Parts such as bus bars such as those to the electrodes and the electromagnetic pump may be insulating at the contact points such as ones at feed-throughs of the cell chamber $5b3$ or lower vacuum chamber $5b5$ by electrical insulating means such as insulating coatings such as Mullite or boron nitride at the contact points.

In an embodiment, the electrodes 8 comprise a plurality of parts that may comprise different materials. The electrodes may comprise a plasma contact layer that operates at high temperature. Suitable plasma contact layer materials are a refractory metal such as W, Ta, or Mo. The plasma contact layer may be mounted on another mount layer that may comprise the bus bar 9 and 10. The mount layer may be recessed such that only a portion such as portion at the ends of the plasma contact layer contact the mount layer to provide electrical connectivity. The recess may create a gap between the plasma contact layer and the mount layer to permit the plasma contact layer to operate at a higher temperature than the mount layer. The attachments at the contact regions may be made by welds, brackets, clamps, or fasteners such as screws or bolts that may be recessed such as counter-sunk screws or recessed hex-bolts such as cap-head bolts. Any parts that screw together may be coated with a lubricant such a graphite to prevent silver sticking to the treads. The electrodes may comprise blades (FIGS. 2I29-2I31) that may be attached to the bus bars 9 and 10 by means such as fasteners at the bus bar ends of the blades. The blades may be oriented to form a V to accept injected metal into the widest part of the V. In an embodiment, the electrodes comprise only a refractory metal such as W or Mo. The electrodes may be scaled in electrical cross section to compensate for the about 3.5 times lower conductivity relative to copper wherein exemplary bus bar comprise copper. The refractory metal electrode may be attached to the bus bars by a weld or by a fastener such as bolts or screws. At least one of the electrode emissivity, surface area, conductive heat sinking, and passive and active cooling may be selected to maintain the electrode within a desired operational temperature range such as in a range that vaporizes the metal of the melt such as Ag or Ag—Cu alloy and below the melting point of the refractory metal of the electrode. The losses may be predominantly by blackbody radiation. The electrode may be maintained in the temperature range of about 1000° C. to 3400° C.

To permit an adjustment of the electrode gap 8g, the electrodes and bus bar assembly may comprise an articulating jointed bus bar to electrode connector. The articulating arms may be offset along the bus bars so that any fasteners on the ends to electrodes such as tungsten blade electrodes are staggered to permit close spacing of the electrodes without close contact of any protruding fasteners. To achieve further close approach the electrodes may be bent towards the end connections and straight in the ignition region. To support high temperature operation, the feed-throughs such as at least one of those to the bus bars of the ignition system 10a (FIG. 2I24) and those to the bus bars to the EM pump may comprise electrically insulated ceramic feed-throughs such as those known in the art. The ceramic feed-throughs may be cooled by means such as gas or water-cooling. The feed-throughs may comprise a micromanipulation system to control at least one of the spacing and tilt angle of the attached electrodes such as blade electrodes. The feed-throughs may comprise bellows feed-throughs to permit movement of the bus bars to effect the positioning of the electrodes by the micromanipulation system such one known by those skilled in the art. In another embodiment, the adjustment mechanism of the electrode gap 8g comprises threaded bolts connected to the bus bars 9 and 10 wherein a movement of the electrodes 8 may be effected by moving the bus bars. The electrode gap 8g may be adjusted by the threaded bolts that push against the bus bars 9 and 10 to deflect them with applied pressure, and the bus bars undergo spring restoration when the bolts are loosened. In another embodiment, the threaded bolts may pull on the bus bars.

In an embodiment, the generator may comprise an automated control system to adjust the electrode gap 8g such as one of the disclosure or another known by tghose skilled in the art. The automated gap control system may comprise a computer, at least one sensor, and at least one of a mechanical mechanism such as a servomechanism and motor, and a solenoidal, an electromagnetic, and a piezoelectric positioner or micromanipulator that may be controlled by the computer with input from at least one sensor such as a position or a current sensor. The electrode separation comprising the gap may effect the current density and reaction confinement wherein both may be increased with a smaller gap. The hydrino reaction rate may be increased by increasing the current density. In an embodiment, the molten metal injection rate may be controlled to localize the metal to increase the current density. The electrode width may be increased to increase the confinement wherein the electrode length may be reduced to maintain a high current density. The shortened length may also increase the operating temperature that is optimized to increase the hydrino reaction rate. In an embodiment, the injection is controlled to cause the ignition current to pulse to increase the current density by the skin effect. In an embodiment, the reaction confinement may increase the rate of the hydrino reaction. In an embodiment, the electrodes vibrate to enhance the hydrino reaction rate. The vibration may be caused by the Lorentz force due to the currents in at least one of the electrodes and bus bars. Alternatively, the generator may comprise a vibrator that vibrates the electrodes. Exemplary vibrators are those of the disclosure such as an electromagnetic or piezoelectric vibrator. The vibration rate may be in at least one range of about 1 Hz to 100 MHz, 100 Hz to 10 MHz, and 100 Hz to 1 MHz. At least one of the electrode current, mass, spring constant, length, and damping fixtures may be selected to achieve at least one of a desired vibration frequency and amplitude. The vibration may further serve to pump melt through the electrodes.

In an embodiment shown in FIGS. 2I24 to 2I28, the electrodes 8 may be electrically connected to the source of electrical power 2 by feed-throughs 10a mounted in separate or a single vacuum flange. The wall of the cone 5b2 may comprise a single aperture for the passage of the electrodes 8. The aperture may comprise a cover plate around at least one of the bus bars 9 and 10 and electrodes to seal the cone 5b2 or dome to loss of melt such as Ag or Ag—Cu melt. In an embodiment, a sapphire cover plate covers a penetration or aperture for the electrodes through the cone or dome such as the sapphire dome. The cell 26 may be housed in a vacuum chamber 5b3. The cell walls may comprise the cone 5b2 or dome. The bus bars and electrodes may pass through a circular conduit through the cell chamber wall and the dome wall. A flange with electrode feed-throughs may seal the chamber, and a sapphire cover plate or plates with bus bar cutouts may seal the dome.

In an embodiment shown in FIGS. 2I24 to 2I28, at least one of the cone 5b2, the inner cone surface, and the outer cone surface may be comprised of a material such as a metal with a low reactivity to water. Exemplary metals having low water reactivity comprise those of the group of Cu, Ni, Pb, Sb, Bi, Co, Cd, Ge, Au, Ir, Fe, Hg, Mo, Os, Pd, Re, Rh, Ru, Se, Ag, Tc, Te, Tl, Sn, W, and Zn. In an embodiment, at least one of the cone 5b2, the inner cone surface, and the outer cone surface may be comprised of a material such as a metal with a higher melting point than that of the fuel melt such as Ag (M. P.=962° C.) or Ag—Cu alloy (M. P.=779° C.) and may further have a low emissivity. Exemplary cone and cone surface materials comprise polished metal surfaces such as those comprising steel, steel type PH-15-7 MO, Ni, Fe, Mo, Ta, galvanized metal such as steel or iron, and Pt or Au plated or clad metals such as Ni or Ti. The cell components such as the cone reservoir 5b and cone 5b2 may comprise a high melting point, high emissivity material on at least one of the inner and outer walls to radiate high power back into the cell wherein the thermal power can be preferentially radiated into the cell by using circumferential radiation shields to the cell component such as the cone 5b2.

In an embodiment shown in FIGS. 2I24 to 2I28, the cone 5b2 comprises a high-melting-point metal that has a low emissivity on the inner surface to reflect the blackbody radiation to the PV converter 26a. In exemplary embodiments, the cone 5b2 comprises Mo or W that is operated at a temperature of about that of the melting point of the fuel melt such as about 1000° C. to 1100° C. in the case of Ag or Ag—Cu alloy fuel melt. The high reflectivity may be maintained by preventing the oxidation of the reflective surface. A partial hydrogen atmosphere may be maintained in the reaction cell chamber 5b31 to reduce any metal oxide to metal or to react with any oxygen created to form $H_2O$. Alternatively, the cell 26 may comprise a counter electrode in contact with the cell atmosphere and a power supply that maintains a negative potential on the inner cone surface that serves as the cathode with an applied voltage to prevent oxidation of the reflective cathode surface. The cone metal such as those of the disclosure may be selected to have a low reactivity with water. Cell oxygen may be maintained at a low partial pressure by at least one of the vacuum pump 13a and the hydrogen supply 5u and 5w wherein the $H_2$ consumes oxygen.

The blackbody radiation power at 1300 K with an emissivity of 1 is 162 $kW/m^2$. In order to heat the cone to a temperature such as 1000° C. during startup at a fraction of this power, the emissivity may be maintained low. The outer cone surface may comprise a material with a low emissivity. In exemplary embodiments, the outer cone surface comprises polished Mo or electrolytic Ni wherein the emissivities at 1000° C. are 0.18 and 0.16 respectively. Polished W has an emissivity of 0.04 at room temperature. Polished silver (M.P.=962° C.) has an emissivity of 0.03 at 1093° C. wherein the lower temperature melting Ag—Cu alloy (M.P. 28% Cu=779° C.) may be used as the fuel metal. The surface may be heated with a heater such as an inductively coupled heater during startup. The window may be heated with a heater such as an inductively coupled heater during startup. In an embodiment comprising a closed reaction cell chamber 5b31 comprising a sufficiently thick inner wall of the insulated cone 5b2 shown in FIGS. 2I24-2I27 to conduct heat along the wall, a single inductively coupled heater coil 5f and inductively coupled heater 5m may be sufficient during startup to heat the entire reaction cell chamber 5b31 to a desired temperature such as one that prevents the fuel melt from solidifying and adhering to the surfaces of the chamber.

An exemplary wall thickness is about ¼ inches. The blackbody radiation created in the cell may be directed to the window of the PV converter wherein the metal of the ignition product may be prevented for adhering by maintaining the temperature of the window such as the temperature of the top cover 5b4 above the melting point of the fuel melt.

Figure 25:
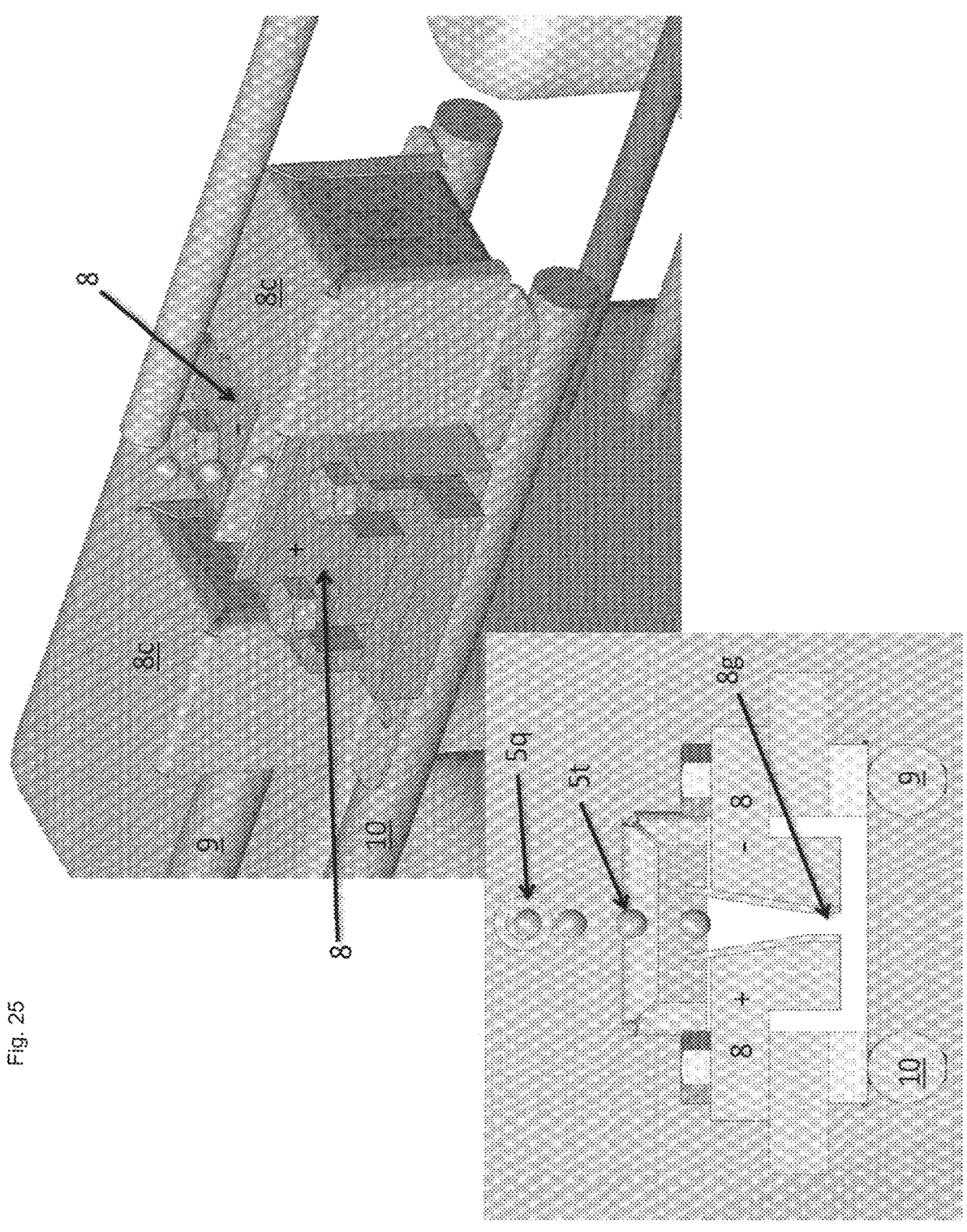
FIG. 25 (also referred to herein as 2I18) is a schematic drawing of a SF-CIHT cell power generator showing the electrodes with shot injection from the top in accordance with an embodiment of the present disclosure.

In an embodiment wherein the plasma becomes optionally thick due to vaporization of the fuel such as one comprising Ag or Ag—Cu alloy, the vapor is contained in the cell 26. At least one of cell components shown in FIGS. 2I24 to 2I28 such as the pump tube 5k6, pump bus bars 5k2, heat transfer blocks 5k7, cone reservoir 5b, reservoir 5c, and cone 5b2 may be comprised of a refractory material such as at least one of Mo, Ta, and W. In an embodiment, at least one cell component comprises a crucible material such as SiC, graphite, MgO, or other ceramic type material known by those skilled in the art. A cell component such as the cone 5b2 may be surrounded by radiation shields. At least one of the cone 5b2 and shields may comprise an inverted metal dome (open end up towards the PV converter 26a). The dome may be fabricated by metal spinning. In an embodiment, the cone 5b2 of the cell 26 comprises a plurality of radiation shields such as heat shields. The shields may comprise a refractory metal such as those of the disclosure such as Mo, Ta, or W. The shields may comprise a design such as that of a high temperature vacuum furnace such as one known in the art. The heat shields may comprise sheet or foil that may be rolled and fastened. The sheets or foils may overlap at the ends with a raised end bends or a tongue and grove. The shields may be conical and concentric to direct the plasma power to the PV converter 26a. The cone may comprise a large emission aperture or aspect angle to the PV converter 26a. The cone 5b2 may comprise outer heat shields that provide an outer seal at the base of the cone 5b2. Alternatively, the cone 5b2 may comprise a sealed vessel such as reaction cell chamber 5b31 comprising inner heat shields. The cone 5b2 such as one comprising heat shields may be sealed to the cone reservoir 5b to contain cell gas or vapor such as at least one of water vapor, hydrogen, and fuel metal vapor. The seal may comprise a wet seal such as one of the molten fuel metal. In an embodiment, at least one of the base of the wall of the cone 5b2 and one of inner or outer heat shields are immersed in a molten reservoir of the fuel metal such as molten Ag or Ag—Cu alloy to form a wet seal. In another embodiment, the wet seal may comprise a trough such as one circumferential to the cone reservoir 5b that contains molten fuel metal, and at least one of the base of the wall of the cone 5b2 and the base of at least one heat shield are immersed in the molten metal. Alternatively, the wet seal may comprise at least one of the base of the wall of the cone 5b2 and the base of at least one heat shield and the recycled molten metal of the cone reservoir 5b wherein the former are immersed in the latter. The heat shields may comprise submerged legs to set on the bottom of the cone reservoir 5b to permit flow of the melt under the shields while maintaining the wet seal. At least one of the wall of the cone 5b2 and the heat shields that are sealed at the base may have sufficient vertical height towards the PV converter 26a such that the metal vapor does not exceed the height of the reaction cell chamber 5b31 formed by the cell components as shown in FIG. 2I25. The reaction cell chamber 5b31 may be operated under vacuum. The temperature of the plasma may determine the height of the vapor in the reaction cell chamber 5b31 against gravity. Controlling the power generated by the SF-CIHT generator may control the temperature of the plasma. In an embodiment, the power from the hydrino process is controlled to control the height of the metal vapor in the reaction cell chamber 5b31. The cell power may be controlled by control means of the disclosure. Exemplary means comprise controlling the ignition parameters such as frequency, current, and voltage, the pump rate by controlling the pump current, and the water vapor pressure.

In an embodiment, the metal vapor may become charged during operation. The charging may decease or inhibit the hydrino reaction rate until the particles discharge. The particles may discharge by spontaneous discharge on the walls of the cell 26. The generator may comprise a means to facilitate the charged particle discharge. The generator may comprise a means to discharge the static charge on the metal vapor particles. The generator may comprise a set of electrodes. One of the electrodes may comprise a conductive wall of the cell 26. One electrode may be immersed in the metal vapor gas that may comprise plasma. The charge may be discharged by application of a field such as an electric field between the electrodes 88 and 26 (FIG. 2I23) by a voltage source. The generator may comprise at least one of electrodes and an electric field source to discharge charged metal vapor to propagate and maintain the hydrino reaction. The generator may comprise an electrostatic precipitator (ESP) (FIG. 2I23) such as one of the disclosure. In an embodiment, an ESP system may be installed to discharge the metal vapor particles to maintain a constant hydrino reaction rate.

In an embodiment, the generator is operated to create at least a partial metal vapor atmosphere in the cell 26 such as in the reaction chamber 5b31. The cell atmosphere comprising metal vapor such as silver or silver-copper alloy vapor may be formed by vaporization at the electrodes. The vaporization power may be supplied by at least one of the ignition power and the hydrino reaction power. The hydrino reaction rate and corresponding power may be controlled by means of the disclosure to achieve a suitable or desirable hydrino power contribution to achieve the suitable or desirable metal vapor pressure. The metal vapor pressure may be controlled by controlling at least one of the molten metal injection rate and the temperature of the molten metal but means such as those of the disclosure such as controlling the pumping rate and the rate of heating or removing heat. In an embodiment, the pumping rate and subsequent metal vaporization may control the rate of heat removal form the electrodes to maintain the electrodes at a desired temperature. The metal vapor pressure may be in at least one range of about 0.01 Torr to 100 atm, 0.1 Torr to 20 atm, and 1 Torr to 10 atm. The metal vapor may enhance the hydrino reaction rate. Plasma may form in the metal vapor atmosphere that further comprises at least one of water vapor and hydrogen. The plasma may support at least one of H and catalyst formation. The temperature may be high such that thermolysis may support at least one of H and catalyst formation. The catalyst may comprise nascent water (HOH). The metal vapor may serve as a conductive matrix. The conductive matrix may serve as a replacement to a high current to remove electrons formed by the ionization of the catalyst. The removal of the ionized electrons may prevent space charge build up that may inhibit the hydrino reaction rate. The ignition current and pulsing frequency applied to the electrodes may be within the range of the disclosure. In an embodiment, the current may have at least one of a pulsing and constant current component in the range of about 100 A to 15,000 A. In an exemplary mode of operation wherein the hydrino reaction produces blackbody radiation the current is constant and is in the at least one range of about 100 A to 20 kA, 1 kA to 10 kA, and 1 kA to 5 kA. The blackbody condition may depend on the metal vapor atmosphere. The atmosphere may be optically thick to the high-energy emission of the hydrino reaction.

The injector nozzle 5q may be at the end of the electrodes 8 such as blade electrodes (FIGS. 2I29-2I31) wherein the blade electrodes may be fastened at the opposite end to the bus bars 9 and 10. The nozzle pump tube may be end capped, and the nozzle 5q may be in the tube sidewall to inject shot into the side of the electrode at their end. Alternatively, the shot may be injected from on top of the electrodes as shown in FIGS. 2I17 and 2I18. In the case the pump tube and nozzle 5q are further from the molten metal of the cone reservoir, heat may be transferred from the molten metal in the cone reservoir 5b to the end of the nozzle 5q to heat it during startup. The nozzle end of the pump tube may comprise a heat transfer sleeve or block such as one comprising a refractory metal such as Mo or W to cause the heat transfer. Alternatively, a nozzle startup heater may comprise a connector such as a solenoid driven connector between the nozzle 5q and one electrode 8 to form a high current connection to serve as a resistive heater. The connector may comprise a high melting point material such as Mo or W.

In another embodiment, the window may be at a sufficient vertical distance from the electrodes such that ignition products do not reach the window due to gravity. The particles may also be prevented from being incident the window by the electrode EM pump. The EM pump may further reduce at least one of the quantities of ignition products ejected on the upper section of the cone walls and on the cone walls. In an embodiment, such as one shown in FIGS. 2I19 and 2I20, the shot is injected vertically and the EM pump comprising magnets 8c pumps the ignition products downward. The nozzle 5q may be positioned and oriented to cause the shot to have a transverse as well as vertical component of its injection trajectory. The nozzle position and offset to cause the shot trajectory along an axis with an angle to the vertical may be selected to reduce or prevent the downwardly pumped ignition products from colliding with the injected shot.

The ignition product may be prevented from reaching the PV converter by an electromagnetic pump on the electrodes. The electrode EM pump may force the ignition products downward. In an embodiment shown in FIGS. 2I24 and 2I27, the magnets may be cooled through the bus bars 8 and 9 such as tungsten or thermally insulated copper bus bars. The electrode EM pump magnetic field may be provided by a single magnet such as the one on the bus bar cell penetration side wherein the cooling may be provided through the bus bars. At least one of the bus bars, electrodes 8, and electrode EM pump magnets such as 8c and 8c1 may be cooled by a coolant such as water that may be at atmospheric pressure or high pressure that flows through the bus bars. The bus bar cooling system such as a water-cooling system may comprise an inlet pipe through a center-bored channel of each bus bar with a return flow in the annulus between the center pipe and the channel. Alternatively, the cooling system may comprise an inlet center-bored coolant channel in one bus bar with a return center-bored coolant channel in the other bus bar. The coolant line connection between bus bars may comprise an electrical insulator. The ends of the bus bars 9 and 10 at the electrode-fastened end may comprise a hollow section to serve as a thermal barrier to the main section of the bus bars. The magnet may comprise insulation such as a high temperature insulation of the disclosure such as AETB, Zicar, ZAL-45, or SiC-carbon aerogel (AFSiC). The insulation may be between the bus bar such as 8 and 9 the magnets such as 8c and 8c1 and covering the magnets while permitting sufficient thermal contact of the through-bus-bar cooling system such as coolant loops with the magnets. The magnets may be capable of operating at a high temperature such as CoSm (350° C.) or AlNiCo (525° C.).

The magnet cooling may also be supplied through cooling loops that run peripherally from the magnets such as 8c and 8c1 to outside of the cell such as those of the EM pump cooling system given in the disclosure. Alternatively, the electrode EM pump magnets may be external to the cell 26 to prevent them from overheating. The external electrode electromagnetic pump magnets may be located outside of the cell with a gap between the magnets and the cell wall to maintain the temperature of the magnets below their Curie point. The magnets may comprise individual isolated magnets that provide flux across the axis of the electrodes. The magnets may comprise a single magnet or a magnetic circuit (FIGS. 2I29-2I31) that comprises at least one magnet wherein each may run circumferentially to the cone or cone reservoir and extend from the region of one end of the electrodes to the other end. The magnetic circuit may comprise at least one magnet and yolk material having a high permeability comprising the remaining portion of the circuit. The magnets may comprise a single magnet or magnetic circuit that provides flux along the electrode axis at a gap in the magnet or circuit. The electrodes may comprise blade electrodes having the single magnet or a magnetic circuit spanning a half loop or semicircle from one end to the other and providing flux along the electrode axis and across the gap at the electrodes. The magnetic circuit may be in the shape of a C. The magnet or magnetic circuit section in between the electrodes may be designed to avoid shorting the electrodes. The short may be avoided with electrical insulators or by avoiding an electrical contact between the electrodes. In an exemplary embodiment, the magnets comprise CoSm or neodymium magnets each having about 10 to 30 cm$^2$ cross section in a C-shaped magnetic circuit having a yolk comprising at least one of cobalt of high purity iron wherein the gap is about 6 to 10 cm. The magnets may be cooled by means of the disclosure. The magnets may be placed on the floor of the chamber housing the cell at a position outside of the cell wall. The magnets may be at least one of heat sunk to the chamber floor and cooled by means of the disclosure. For example, the magnets comprise at least one cooling coil with a circulating coolant that transfers heat to a chiller such as 31 or 31a that rejects heat and cools at least one of the magnets(s) and magnetic circuit.

In an embodiment, the magnet(s) may be housed in a separate chamber off of the cell chamber. The magnets of the electrode electromagnetic (EM) pump may be cooled in an electrode magnet chamber. The electrode electromagnetic (EM) pump assembly may comprise that of the EM pump 5ka shown in FIG. 2I28. The electrode electromagnetic (EM) pump cooling system assembly may comprise one of the cooling system 5k1 of the EM pump (FIG. 2I28). The electrode EM may comprise an electromagnetic pump coolant lines feed-through assembly 5kb, magnets 5k4, magnetic yolks and optionally thermal barrier 5k5 that may comprise a gas or vacuum gap having optional radiation shielding, pump tube 5k6, bus bars 5k2, and bus bar current source connections 5k3 that may be supplied by current from the PV converter. The magnets may produce a field that is parallel to the bus bars. The magnet at the bus bar end may comprise a notch for passage of at least one of the bus bars and electrodes. The electrode EM pump may comprise a single magnet having a geometry that produces a field predominantly parallel to the bus bars. The single magnet may be located close to the ignition site such as near the ends of the electrodes. The at least one EM pump magnet may comprise an electromagnet that may be activated in startup. Once the cell walls are hot such that the ignition products flow to the cone reservoir, the magnetic field may be terminated. In another embodiment, the magnetic field may be terminated by removing or retracting the magnet(s) such as a permanent magnet(s). The magnet may be retracted by a moving means such as a mechanical system or electromagnetic system. Exemplary magnet retracting systems comprise a servomotor and a screw driven table on rail guides or a solenoidal driven table on rail guides. Other moving means are known to those skilled in the art. Alternatively, the magnetic field may be removed by the insertion of a magnetic shield such as a mu metal shield in between the magnet and the electrodes. The shield may be applied using a moving means such as a mechanical system or electromagnetic system such as those of the magnet retracting system. In an embodiment, once the cell is at temperature the direction of the magnetic field or the polarity of the ignition current may be switched to reverse the Lorentz force and the pumping direction to pump the injected metal upwards rather than downwards to increase the flow rate through the electrodes and thus the power output. The polarity of the DC ignition current may be reversed with a switch such as an IGBT or another switch of the disclosure or known in the art. Reversing the current of an electromagnet or by mechanically reversing the orientation of permanent magnets may reverse the magnetic field polarity. The cell 26 components such as the cone 5b2 may comprise a ceramic such as MgO, ZrB$_2$, BN, or others of the disclosure that is thermally insulating such the inner wall temperature rises quickly.

In an embodiment, the height of the cell may be sufficient that ignition products do not reach the PV converter against gravity or are blocked by a window such as a sapphire window. The window may be maintained sufficiently hot to prevent the ignition products from adhering. In another embodiment, the magnetic field from a magnet such as the permanent magnet or electromagnet to cause a downward Lorentz force on the ignition products may not be terminated. In another embodiment, the cell may comprise a baffle 8d to retard or stop the ignition particles from being incident the PV window. The baffle may be opaque and capable of secondarily emitting blackbody radiation. The baffle may comprise a grid or plate that may comprise a refractory material such as W or Mo. Alternatively, the baffle may be transparent to the blackbody light. Exemplary transparent baffles comprise at least one of sapphire, quartz, and alkali and alkaline earth crystals such as LiF and MgF$_2$.

Embodiments comprising at least one of a thermophotovoltaic, photovoltaic, photoelectric, thermionic, and thermoelectric SF-CIHT cell power generator showing a capacitor bank ignition system 2 are in FIGS. 2I24 to 2I31. In an embodiment, the cell 26 comprises a cone 5b2 comprising a reaction vessel wall, a cone reservoir 5b and reservoir 5c that forms the floor of a reaction cell chamber 5b31 and serves as a reservoir for the fuel melt, and a top cover 5b4 that comprises the top of the reaction cell chamber 5b31. In an embodiment, the cell is contained in a cell chamber 5b3. The cell chamber 5b3 and the reaction cell chamber 5b31 may be evacuated by pump 13a through vacuum connection 13b. The chambers may be selectively evacuated using at least one or both of reaction cell vacuum pump line and flange 13c and cell chamber vacuum pump line and flange 13d with the selective opening and closing of at least one of cell chamber vacuum pump line valve 13e and reaction cell vacuum pump line valve 13f.

In an embodiment, the cone 5b2 comprises a parabolic reflector dish with one or more heat shields about the electrodes 8. It is understood that the heat shields may also comprise others forms of thermal insulation 5e such as ceramic insulation materials such as MgO, fire brick, $Al_2O_3$, zirconium oxide such as Zicar, alumina enhanced thermal barrier (AETB) such as AETB 12 insulation, ZAL-45, and SiC-carbon aerogel (AFSiC). An exemplary AETB 12 insulation thickness is about 0.5 to 5 cm. The insulation may be encapsulated between two layers such as an inner refractory metal wall that may comprise the reflector such as that of cone 5b2 and an outer insulation wall that may comprise the same or a different metal such as stainless steel. The reflector assembly comprising the cone 5b2, insulation, and outer insulation encapsulation wall may be cooled. The outer insulation encapsulation wall may comprise a cooling system such as one that transfers heat to a chiller such as 31 or 31a. In an embodiment, the chiller may comprise a radiator and may further comprise at least one fan and one coolant pump to cool the radiator and circulate the coolant. The radiator may be air-cooled. An exemplary radiator comprises a car or truck radiator. The chiller may further comprise a coolant reservoir or tank. The tank may serve as a buffer of the flow. The radiator may serve as the tank. The chiller such as the radiator and fan may have a flow to and from the tank. Similarly, each component to be cooled such as the inductively coupled heater, electrodes, cell 26, and PV converter 26a may have a separate coolant flow loop with the tank that is cooled by the chiller such as the radiator and fan. Each loop may have a separate pump that may be independently controlled by its controller such as a heat sensor such as at least one of a thermocouple, a flow meter, a controllable value, pump controller, and a computer. In another embodiment, the coolant loops of a plurality of cooled cell components may be combined. A heat exchanger or heat conductor such as heat transfer blocks or a heat pipe may cool from the outer wall of the cone 5b2 or the outer insulation encapsulation wall. In an embodiment, graphite is a direction heat conductor that may be used as a high temperature insulator along the radial path and a heat conductor along the axial path parallel to the cone wall. It is also understood that the reflector such as the cone 5b2 may comprise other geometric and structural forms than a parabolic dish to reflect the light from the hydrino reaction such as blackbody radiation to the PV converter 26a. Exemplary other forms are a triangular prism, spherical dish, hyperbolic dish, and parabolic trough. At least one of the parabolic reflector dish and heat shields may comprise a refractory metal such as Mo, Ta, or W. In an exemplary embodiment, the cone reservoir 5b may be comprise a high temperature material such as Mo, Ta, or W, the reservoir 5c and the EM pump tube 5k6 may comprise a high temperature stainless steel, and the EM pump bus bars 5k2 may comprise nickel or stainless steel. The parabolic reflector dish such as cone 5b2 with one or more heat shields or insulation 5e may be sealed to the cone reservoir. The cell comprising the cone 5b2 and cone reservoir 5b may be housed in a vacuum chamber 5b3 that may be sealed. At least one of the parabolic reflector dish and heat shields or insulation may be sealed to the cone reservoir 5b. The seal may comprise at least one of a wet seal, a weld, threads, and one comprising fasteners. At least one of the parabolic reflector dish and heat shields or insulation may comprise penetrations for the electrodes. The penetrations may be sealed. The seal may comprise a high temperature electrical insulator such as a ceramic.

In an embodiment, such as a thermophotovoltaic one, the hydrino reaction heats the fuel melt to cause it to become vaporized. The vapor causes the cell gas to become optically thick to the radiation produced by the hydrino reaction. The absorbed radiation creates intense, high temperature blackbody emission. The cone 5b2 comprising a parabolic reflector dish with one or more heat shields or insulation may reflect the blackbody emission to the PV converter 26a. At least one of the parabolic reflector dish with one or more heat shields or insulation that are heated by the plasma may operate at a lower temperature than the plasma and a higher temperature than least one component of the cone 5b2, the cone reservoir 5b, the reservoir of the melt such as molten Ag or Ag—Cu 5c, and the EM pump. An exemplary range of blackbody temperatures of the plasma is about 1000° C. to 8000° C. The parabolic reflector dish with one or more heat shields or insulation may be operated below their melting points such as below about 2623° C. in the case on Mo and below about 3422° C. in the case of W. At least one component of the cell 26 such as the cone 5b2, the cone reservoir 5, the reservoir of the melt such as molten Ag or Ag—Cu 5c, and the EM pump such as 5k4 may be cooled. At least one component of the cell 26 such as the cone 5b2, the cone reservoir 5b, the reservoir of the melt 5c, and the EM pump may be operated below the failure temperature of their materials such as below about 1100° C. in the case of high temperature stainless steel cell components. In an embodiment, at least one component of the cell 26 such as the cone 5b2, the cone reservoir 5b, the reservoir of the melt 5c, and the EM pump may be operated at a temperature below the boiling point of the fuel melt. The vapors of the vaporized fuel melt may condense in cone reservoir 5b due to its temperature being below the boiling point. An exemplary temperature range for silver fuel melt is about 962° C. to 2162° C. In an embodiment, the generator may comprise a counter current recirculator of heat from condensing vapor at the cone reservoir to at least one of the injected metal and the ignition plasma. The generator may comprise an injection system preheater or after heater wherein the heat released in the metal vapor condensation may heat the molten metal to increase its temperature. The preheater may comprise a heat exchanger that may transfer the heat to the nozzle 5q. The preheater may comprise heat shields. The heat released by condensation may be made incident on the top cover 5b4 and transferred to the PV converter 26a. In an embodiment, the widow 5b4 to the PV converter 26a such as a quartz, alkali-aluminosilicate glass, or sapphire window may be operated at a temperature range above the melting point of the ignition products and below the failure temperature of the material comprising the window such as in the range of about 800° C. to 2000° C. in the case of Ag—Cu (28 wt %) as the ignition product and sapphire as the window material. In an embodiment, the generator comprises at least one sensor such as a thermocouple to sense a component to the system such as the temperature. The sensed parameter may be input to a computer to control the parameter to be within a desired range. In the event that the parameter exceeds at desire range such as an excessive temperature is experienced, the generator may comprise a safety shut off mechanism such as one know in the art. The shut off mechanism may comprise a computer and a switch that provides power to at least one component of the generator that may be opened to cause the shut off. An exemplary thermocouple with its feed-through 5k8 such as a ceramic feed-through is shown in FIGS. 2I24 and 2I31.

In an embodiment, at least one of the cell components such as the cone 5b2, the inner cone surface, and the outer cone surface may be comprised of a material such as a metal with at least one of a low reactivity to water, a high melting point, and a high emissivity. In the case that the emissivity is high, the cell component may become elevated in temperature from thermal power from the hydrino reaction and secondarily radiate blackbody radiation to the PV converter 26a to be converted into electricity. Suitable materials are refractory metals such as those of the disclosure such as Mo, Ta, and W and graphite. The surface of the material such as a metal may be at least one of oxidized and roughened to increase the emissivity. The cell component may comprise a large emission aperture or aspect angle to the PV converter 26a.

In an embodiment, the cell 26 comprising the cone 5b2, the cone reservoir 5b, the reservoir of the melt 5c, and the EM pump comprise a vessel that is closed by an opaque top cover 5b4 that replaces the transparent window. Cell components may be sealed at connections or joints by welds or with gaskets wherein the joints held by fasteners. An exemplary gasket material is graphite such as Graphoil. The reaction cell chamber is sealed to confine at least one of the fuel gas such as at least one of water vapor and hydrogen and the metal vapor of the fuel melt such as Ag or Ag—Cu alloy vapor. The top cover 5b4 may comprise a material capable of operating at a very high temperature such as in the range of about 1000° C. to 4000° C. that can serve as a blackbody. In an embodiment, the top cover 5b4 is not transparent to radiation such that it heats up to become a high temperature blackbody radiator. The top cover may comprise a refractory metal such as Mo. Ta, or W. Alternatively, the top cover may comprise graphite or a ceramic such as SiC, MgO, alumina, Hf—Ta—C, or other high temperature material known in the art that can serve as a blackbody. The top cover absorbs blackbody radiation from the plasma and secondary blackbody radiation from the cone and other components of the cell to heat up to its high operating temperature. The top cover may have a high emissivity such as one close to one. In an embodiment, the emissivity may be adjusted to cause blackbody power that match the capability of the PV converter. In exemplary embodiments, the emissivity may be increased or decreased by means of the disclosure. In an exemplary case of a metal top cover 5b4, the surface may be at least one of oxidized and roughened to increase the emissivity. The emissivity of the may be non-linear with wavelength such as inversely proportional to the wavelength such that short wavelength emission is favored from its outer surface. In a thermophotovoltaic embodiment, the top cover 5b4 comprises a blackbody radiator that provides light incident to the PV converter 26a. At least one of lenses and mirrors in the gap between the top cover blackbody radiator 5b4 and the PV converter 26a may be selective for passing short wavelength light to the PV converter while returning infrared light to the radiator 5b4. In an exemplary embodiment, the operating temperature of a W top cover 5b4 is the operating temperature of a W incandescent light bulb such as up to 3700 K. With an emissivity of 1, the blackbody radiator power is up to 10.6 MW/m² according to the Stefan Boltzmann equation. In an embodiment, the blackbody radiation is made incident the PV converter 26a comprising concentrator photovoltaic cells 15 such as those of the disclosure that are responsive to the corresponding radiation such as one responsive to visible and near infrared light. The cells may comprise multi junction cells such as double or triple junction cells comprising III/V semiconductors such as those of the disclosure. The SF-CIHT generator may further comprise a blackbody temperature sensor and a blackbody temperature controller. The blackbody temperature of the top cover 5b4 may be maintained and adjusted to optimize the conversion of the blackbody light to electricity. The blackbody temperature of the top cover 5b4 may be sensed with a sensor such as at least one of a spectrometer, an optical pyrometer, the PV converter 26a, and a power meter that uses the emissivity to determine the blackbody temperature. A controller such as one comprising a computer and hydrino reaction parameter sensors and controllers may control the power from the hydrino reaction by means of the disclosure. In exemplary embodiments to control the temperature and the stability of the blackbody temperature, the hydrino reaction rate is controlled by controlling at least one of the water vapor pressure, fuel injection rate, ignition frequency, and ignition current. For a given hydrino reaction power from the reaction cell chamber 5b31 heating the top cover 5b4, a desired operating blackbody temperature of the top cover 5b4 comprising a blackbody radiator may be achieved by at least one of selecting and controlling the emissivity of at least one of the inner and outer surface of the top cover 5b4. In an embodiment, the radiated power from the top cover 5b4 is about a spectral and power match to the PV converter 26a. In an embodiment, the emissivity of the outer surface is selected, such as one in the range of about 0.1 to 1, in order that the top cover 5b4 radiates a power to the PV converter that does not exceed its maximum acceptable incident power at a desired blackbody temperature. The blackbody temperature may be selected to better match the photovoltaic conversion responsiveness of the PV cell so that the conversion efficiency may be maximized. The emissivity may be changed by modification of the top cover 5b4 outer surface. The emissivity may be increased or decreased by applying a coating of increased or decreased emissivity. In an exemplary embodiment, a SiC coating may be applied to the top cover 5b4 to increase its emissivity. The emissivity may also be increased by at least one of oxidizing and roughening the surface, and the emissivity may be decreased by at least one of reducing an oxidized surface and polishing a rough surface. The generator may comprise a source of oxidizing gas such as at least one of oxygen and $H_2O$ and a source of reducing gas such as hydrogen and a means to control the composition and pressure of the atmosphere in the cell chamber. The generator may comprise gas sensors such as a pressure gauge, a pump, gas supplies, and gas supply controllers to control the gas the composition and pressure to control the emissivity of the top cover 5b4.

The top cover 5b4 and the PV converter 26a may be separated by a gap such as a gas or vacuum gap to prevent the PV converter from overheating due to heat conduction to the PV converter. The top cover 5b4 may comprise a number of suitable shapes such as a flat plate or a dome. The shape may be selected for at least one of structural integrity and optimization of transmitting light to the PV area. To enhance the cell electrical output and efficiency, the area of the blackbody emitter 5b4 and receiving PV converter 26a may be maximized to limit the area of the cone 5b2 that does not emit light. In an embodiment, other cell component may comprise a material such as a refractory metal such as W to serve as a blackbody radiator to the PV converter that is arranged circumferentially to the component to receive the blackbody radiation. At least one of the cell 26 components such as the top cover 54b and the cone 5b2 may comprise a geometry that optimizes the stacking of the PV cells 15 to accept light from the component. In an exemplary embodiment, the cell component may comprise faceted surfaces such as polygons such as at least one of triangles, pentagons, hexagons, squares, and rectangles with a matching geometry of the PV cells 15. The cells may be arranged in arrays having the matching geometry.

In an embodiment, the emissivity of the inner cell 26 walls such as those comprising the cone is determined by the metal vapor that deposits on the walls. In this case, the cone may comprise a material selected for parameter other than a desired emissivity such as at least one of easy of fabrication, cost, durability, and high temperature operation. The cone may comprise at least one of graphite (sublimation point=3642° C.), a refractory metal, a ceramic, a ultra-high-temperature ceramic, and a ceramic matrix composite such as at least one of borides, carbides, nitrides, and oxides such as those of early transition metals such as hafnium boride ($HfB_2$), zirconium diboride ($ZrB_2$), hafnium nitride (HfN), zirconium nitride (ZrN), titanium carbide (TiC), titanium nitride (TiN), thorium dioxide ($ThO_2$), niobium boride ($NbB_2$), and tantalum carbide (TaC) and their associated composites. Exemplary ceramics having a derived high melting point are magnesium oxide (MgO) (M.P.=2852° C.), zirconium oxide (ZrO) (M.P.=2715° C.), boron nitride (BN) (M.P.=2973° C.), zirconium dioxide ($ZrO_2$) (M.P.=2715° C.), hafnium boride ($HfB_2$) (M.P.=3380° C.), hafnium carbide (HfC) (M.P.=3900° C.), hafnium nitride (HfN) (M.P.=3385° C.), zirconium diboride ($ZrB_2$) (M.P.=3246° C.), zirconium carbide (ZrC) (M.P.=3400° C.), zirconium nitride (ZrN) (M.P.=2950° C.), titanium boride ($TiB_2$) (M.P.=3225° C.), titanium carbide (TiC) (M.P.=3100° C.), titanium nitride (TiN) (M.P.=2950° C.), silicon carbide (SiC) (M.P.=2820° C.), tantalum boride ($TaB_2$) (M.P.=3040° C.), tantalum carbide (TaC) (M.P.=3800° C.), tantalum nitride (TaN) (M.P.=2700° C.), niobium carbide (NbC) (M.P.=3490° C.), niobium nitride (NbN) (M.P.=2573° C.), vanadium carbide (VC) (M.P.=2810° C.), and vanadium nitride (VN) (M.P.=2050° C.), and a turbine blade material such as one or more from the group of a superalloy, nickel-based superalloy comprising chromium, cobalt, and rhenium, one comprising ceramic matrix composites, U-500, Rene 77, Rene N5, Rene N6, PWA 1484, CMSX-4, CMSX-10, Inconel, IN-738, GTD-111, EPM-102, and PWA 1497. The ceramic such as MgO and ZrO may be resistant to reaction with $H_2$. An exemplary cell component such as the cone 5b2 comprises MgO, ZrO, $ZrB_2$, or BN. The cone material such as graphite may be coated with another high temperature or refractory material such as a refractory metal such as tungsten or a ceramic such as $ZrB_2$ or another one of the disclosure or known in the art. Another graphite surface coating comprises diamond-like carbon that may be formed on the surface by plasma treatment of the cone. The treatment method may comprise one known in the art for depositing diamond-like carbon on substrates. In an embodiment, silver vapor may deposit on the surface by pre-coating or during operation to protect the cone surface from erosion. In an embodiment, the reaction cell chamber 5b31 may comprise reaction products of carbon and cell gas such as at least one of $H_2O$, $H_2$, and $O_2$ to suppress further reaction of the carbon.

The cone 5b2 may be cast, milled, hot pressed, sintered, plasma sintered, infiltrated, and spark plasma sintered and formed by other methods known to those in the art. A refractory metal cone such as a W cone may be formed as a wire wrapping or weave. The cone 5b2 may comprise flanges to mate with the cone reservoir 5b and the top cover 5b4 wherein the flanges are bound permanently to the cone and may be incorporated during fabrication of the cone.

Alternativley, the cone may be fastened to adjoining cell components such as the top cover 5b4 and the cone reservoir 5b by compression using a corresponding mechanism such as clamps, brackets, or springs. The top cover 5b4 and cone reservoir 5b may be clamped to the cone 5b2. The joints may each be sealed with a gasket such as a Graphoil gasket. The mating components may be grooved or have faceted to latch together to form a seal capable of containing the metal vapor. The inner surface of the cone may be smooth and may be covered with the fuel melt such as silver during operation. The cone may be pre-coated with the metal of the fuel melt before operation to lower the emissivity during start-up. In an embodiment at least one of the cone reservoir, reservoir, EM pump tube, EM pump bus bars, and heat transfer block may comprise Mo. In another embodiment wherein the fuel melt is silver the heat transfer blocks may comprise a material such as iron, aluminum nitride, titanium, or silicon carbide that has a higher melting point than that of the metal of the fuel melt. In the case that the block are magnetic, they may be operated above their Curie temperature.

In an embodiment, the atmosphere of reaction cell chamber 5b31 may comprise a noble gas atmosphere such as helium atmosphere having a sufficient difference in density to cause the metal vapor such as Ag or Ag—Cu metal vapor to settle to bottom of the cone 5b and cone reservoir 5b. In an embodiment, the density difference is controlled by controlling the cell gas and pressure to cause the plasma to focus in more proximity to the focus of a parabolic cone 5b2. The focus may cause more direct illumination of the top cover 5b4 to subsequently illuminate the thermophotovoltaic converter 26a. In other embodiments, the thermophotovoltaic converter is replaced by a at least one of a photovoltaic, photoelectric, thermionic, and thermoelectric converter to receive the emission or heat flow from the top cover 5b4 comprising a blackbody radiator. In the case of thermionic and thermoelectric embodiments, the thermionic or thermoelectric converter may be in direct contact with the hot top cover 5b4. The hot top cover 5b4 may also transfer heat to a heat engine such as a Rankine, Brayton, or Stirling heat engine or heater that may server as the heat-to-electricity converter. In an embodiment, a medium other than standard ones such as water or air may be used as the working medium of the heat engine. In exemplary embodiments, a hydrocarbon may replace water in a Rankine cycle of a turbine-generator, and supercritical carbon dioxide may be used as the working medium of Brayton cycle of a turbine-generator. Alternatively, the hot cover 5b4 may serve as a heat source or a heater or a light source. The heat flow to the heat engine or heater may be direct or indirect wherein the SF-CIHT generator may further comprise a heat exchanger or heat transfer means such as one of the disclosure.

At least one of the cell chamber 5b3 and the reaction cell chamber comprising the chamber formed by the cone 5b2 and top cover 5b4 may be evacuated with pump 13a through pump lines 13b and 13c, respectively. Corresponding pump line valves 13d and 13e may be used to select the pumped vessel. The cell may further comprise a high temperature capable sensor or sensors for at least one of oxygen, hydrogen, water vapor, metal vapor, and total pressure. The water and hydrogen pressure may be controlled to a desired pressure such as one of the disclosure such as a water vapor pressure in the range of 0.1 Torr to 1 Torr by means of the disclosure. In an exemplary embodiment, the desired gas pressure is maintained by a valve and a gas supply wherein the valve opening is controlled to supply a flow to maintain the desired pressure of the gas with feedback using the measured pressure of the gas. The $H_2O$ and $H_2$ may be supplied by hydrogen tank and line $5u$ that may comprise an electrolysis system to provide $H_2$, $H_2O$/steam tank and line $5v$, hydrogen manifold and feed line $5w$, $H_2O$/steam manifold and feed line $5x$, H2/steam manifold $5y$, direct $H_2O/H_2$ injector $5z1$, and direct $H_2O/H_2$ injector valve $5z2$. Oxygen produced in the cell may be reacted with supplied hydrogen to form water as an alternative to pumping off or gettering the oxygen. Hydrino gas may diffuse through the walls and joints of the cell or flow out a selective gas valve.

The metal vapor in the sealed reaction cell chamber $5b31$ may coat the cell walls to suppress vaporization and migration of the wall material. In an embodiment, a surface such as an inner cell surface may be initially coated with a material such as a coating of the disclosure, a metal, or another metal having a lower vapor pressure than the material of the surface. For example, a Mo cone may be internally coated with W to lower the internal Mo vapor pressure. The coating may further protect the surface from at least one of oxidation and evaporation of the material of the surface. A composition of matter such as a gas may be added to the reaction cell chamber $5b31$ atmosphere to stabilize or regenerate at least one surface in the cell. For example, in the case that at least one of the cone $5b2$ and the top cover $5b4$ comprise tungsten, iodine gas may be added to the reaction cell chamber $5b31$ atmosphere to cause W to redeposit on at least one of the W cone $5b2$ and W top cover $5b4$ surfaces. The external surfaces of the cone $5b2$ and top cover $5b4$ may similar be regenerated. The cone reservoir $5b$ may be operated at a lower temperature than at least one of the top cover $5b4$ and cone $5b2$ to cause the metal vapor of the fuel melt to condense in the cone reservoir $5b$ to supply the regeneration of the fuel such as one comprising injected molten fuel metal and at least one of $H_2O$ and $H_2$. At least one of the reaction cell chamber $5b31$ and the cell chamber $5b3$ housing the cell 26 may be operated under vacuum to prevent oxidation of the cell components such as the cone $5b2$ and top cover $5b4$. Alternatively, at least one of the reaction cell chamber $5b31$ and the cell chamber $5b3$ may be filled with an inert gas to prevent at least one of oxidation and evaporation of the cone $5b2$ and the top cover $5b4$. In an embodiment, the metal vapor from the fuel melt coats the inner surfaces of the reaction cell chamber $5b31$ and protects them from oxidation by the $H_2O$ fuel. As given in the disclosure the addition of $H_2$ gas or the application of a negative voltage to the cell components such as the cone $5b2$ and top cover $5b4$ may reduce or avoid their oxidation. The top cover $5b4$ may comprise the material of an incandescent light bulb such as tungsten or tungsten-rhenium alloy. The inert gas may be one used in an incandescent light bulb as known by those skilled in the art. The inert gas may comprise at least one of a noble gas such as argon, krypton, or xenon, and nitrogen, and hydrogen. The inert gas may be at reduced pressure such as a pressure used in an incandescent bulb. The inert gas pressure may be in the range of about 0.01 atm to 0.95 atm. In an embodiment wherein the metal of the top cover $5b4$ such as Mo or W is transferred by evaporation and deposition to another cell component such as the outer wall of the cone $5b2$, the cell chamber that houses the cell, and a component of the PV converter $26a$, the metal such as a metal coating maybe be removed and recycled by exposing the coating to oxygen and collecting the metal oxide. The oxygen exposure may be at an elevated temperature. A metal coating on the PV panels 15 may be cleaned by exposing the panel surface to oxygen and cleaning off the metal oxide.

All particles independent of size and density experience the same gravitational acceleration. In an embodiment, the reaction cell chamber $5b31$ is operated under vacuum or the absence of cell gas other than fuel such as water vapor such that metal vapor particles may be confined to a desired region of the reaction cell chamber $5b31$ by the effect of gravity. The region may comprise the electrode region. In another embodiment, the reaction cell chamber $5b31$ is operated under a partial vacuum with a heat transfer gas present to cause the metal vapor to form particles that fall under the force of gravity to cause confinement of the metal vapor. The confinement may be to the electrode region. The heat transfer gas may comprise hydrogen or an inert gas such as a noble gas such as helium that comprises a high heat transfer agent. The pressure of the heat transfer gas may be adjusted to achieve the desired confinement. The desired confinement condition may comprise a balance of the effects of aerosolization by the gas and gravity.

In another embodiment, the reaction cell chamber $5b31$ is operated under an inert atmosphere. The inert gas may have a lower density than the metal vapor of the solid fuel melt such as the vapor from molten Ag or Ag—Cu. Exemplary lower density inert gases are at least one of hydrogen and a noble gas such as at least one of helium or argon. The metal vapor may be confined to the electrode region of the parabolic reflector dish $5b2$ due to the presence of the more buoyant inert gas. The difference in densities of the metal vapor and the inert gas may be exploited to control the extent of the confinement such as the volumetric displacement of the metal vapor. At least one of the selection of the inert gas based on its density and the pressure of the inert gas may be controlled to control the confinement of the metal vapor. The SF-CIHT generator may comprise a source of inert gas such as a tank, and at least one of a pressure gauge, a pressure regulator, a flow regulator, at least one valve, a pump, and a computer to read the pressure and control the pressure. The inert gas pressure may be in the range of about 1 Torr to 10 atm. In an embodiment, any atmospheric convection currents due to temperature gradients in the atmosphere of the reaction cell chamber $5b31$ may be formed to favor a desired confinement of the metal vapor. The cone reservoir $5b$ may be cooler than the metal vapor and other proximal cell components in contact with the metal vapor such as the parabolic reflector dish $5b2$. The gas convection current may be towards the cone reservoir $5b$ due to its lower operating temperature. The metal vapor may condense in the cone reservoir $5b$ to enhance the vapor flow direction towards the cone reservoir $5b$ and increase the metal vapor confinement. The cone reservoir $5b2$ may be cooled. The coolant coil comprising the antenna of the inductively coupled heater $5f$ may be used to cool the cone reservoir $5b$, or it may be cooled by a separate cooling coil or heat exchanger. In the case that heat is removed through the reservoir $5c$, the corresponding thermal power may be controlled by controlling the heat gradient along the reservoir $5c$ and its cross sectional area. A schematic of the inductively coupled heater feed through assembly $5mc$ is shown in FIGS. 2I24-2I26. The inductively coupled heater comprises leads $5p$ that also serve as coolant lines connect to a chiller 31 through inductively coupled heater coolant system inlet $5ma$ and inductively coupled heater coolant system outlet $5mb$. In an embodiment, the inductively coupled heater coil leads penetrate into a sealed section of the generator such as at least one of the cell 26 or the lower chamber $5b5$. The lead $5p$ penetrations of a wall to the cell component that is heated such as at least one of the penetrations of the flange of the inductively coupled heater feed through assembly $5mc$ and the penetrations of the lower vacuum chamber 5*b*5 may be electrically isolated such that the leads 5*p* do not electrically short.

In an embodiment, the confinement of the metal vapor may be controlled by forced gas flow using at least one blower as given in the disclosure for metal powder. In another embodiment, the metal vapor may be confined by flowing a current through the vapor using a current source and by the application of magnetic flux to cause a Lorentz force towards the cone reservoir 5*b* as given in the disclosure. In another embodiment, the metal vapor may be confined with an electrostatic precipitator as given in the disclosure.

In an embodiment, following startup the heater may be disengaged, and cooling may be engaged to maintain the cell components such as the cone reservoir 5*b*, EM pump, electrodes 8, cone 5*b*2, window 5*b*4, and PV converter 26*a* at their operating temperatures such as those given in the disclosure.

The SF-CIHT cell power generation system includes a photovoltaic power converter configured to capture plasma photons generated by the fuel ignition reaction and convert them into useable energy. In some embodiments, high conversion efficiency may be desired. The reactor may expel plasma in multiple directions, e.g., at least two directions, and the radius of the reaction may be on the scale of approximately several millimeter to several meters, for example, from about 1 mm to about 25 cm in radius. Additionally, the spectrum of plasma generated by the ignition of fuel may resemble the spectrum of plasma generated by the sun and/or may include additional short wavelength radiation. FIG. 3 shows an exemplary the absolute spectrum in the 5 nm to 450 nm region of the ignition of a 80 mg shot of silver comprising absorbed $H_2$ and $H_2O$ from gas treatment of silver melt before dripping into a water reservoir showing an average optical power of 527 kW, essentially all in the ultraviolet and extreme ultraviolet spectral region. The ignition was achieved with a low voltage, high current using a Taylor-Winfield model ND-24-75 spot welder. The voltage drop across the shot was less than 1 V and the current was about 25 kA. The high intensity UV emission had a duration of about 1 ms. The control spectrum was flat in the UV region. In an embodiment, the plasma is essentially 100% ionized that may be confirmed by measuring the Stark broadening of the H Balmer $\alpha$ line. The radiation of the solid fuel such as at least one of line and blackbody emission may have an intensity in at least one range of about 2 to 200,000 suns, 10 to 100,000 suns, 100 to 75,000 suns.

The UV and EUV spectrum may be converted to blackbody radiation. The conversion may be achieved by causing the cell atmosphere to be optically thick for the propagation of at least one of UV and EUV photons. The optical thickness may be increased by causing metal such as the fuel metal to vaporize in the cell. The optically thick plasma may comprise a blackbody. The blackbody temperature may be high due to the extraordinarily high power density capacity of the hydrino reaction and the high energy of the photons emitted by the hydrino reaction. The spectrum (100 nm to 500 nm region with a cutoff at 180 nm due to the sapphire spectrometer window) of the ignition of molten silver pumped into W electrodes in atmospheric argon with an ambient $H_2O$ vapor pressure of about 1 Torr is shown in FIG. 4. The source of electrical power 2 comprised two sets of two capacitors in series (Maxwell Technologies K2 Ultracapacitor 2.85V/3400F) that were connected in parallel to provide about 5 to 6 V and 300 A of constant current with superimposed current pulses to 5 kA at frequency of about 1 kHz to 2 kHz. The average input power to the W electrodes (1 cm×4 cm) was about 75 W. The initial UV line emission transitioned to 5000K blackbody radiation when the atmosphere became optically thick to the UV radiation with the vaporization of the silver by the hydrino reaction power. The power density of a 5000K blackbody radiator with an emissivity of vaporized silver of 0.15 is 5.3 $MW/m^2$. The area of the observed plasma was about 1 $m^2$. The blackbody radiation may heat a component of the cell 26 such as top cover 5*b*4 that may serve as a blackbody radiator to the PV converter 26*a* in a thermophotovoltaic embodiment of the disclosure.

In an embodiment, the converter comprises a plurality of converters that are ganged to comprise combined cycles. The combined cycle converters may be selected from the group of a photovoltaic converter, a photoelectronic converter, a plasmadynamic converter, a thermionic converter, a thermoelectric converter, a Sterling engine, a Brayton cycle engine, a Rankine cycle engine, and a heat engine, and a heater. In an embodiment, the SF-CIHT cell produces predominantly ultraviolet and extreme ultraviolet light. The converter may comprise a combined cycle comprising a photoelectron converter then a photoelectric converter wherein the photoelectric converter is transparent to ultraviolet light and may be primarily responsive to extreme ultraviolet light. The converter may further comprise additional combined cycle converter elements such as at least one of a thermoelectric converter, a Sterling engine, a Brayton cycle engine, and a Rankine cycle engine.

In an embodiment, the high current of the disclosure through the fuel activates the hydrino process without detonation. This aspect of the disclosure was confirmed experimentally by applying 25 kA at a voltage drop of about 1 V across a Mo foil using a spot welder (Taylor-Winfield model ND-24-75 spot welder, 75 KVA). A photoelectron effect was observed at a metal foil photocathode from UV emission in the absence of visible emission. The effect successively diminished to zero as the welder was repetitively activated. The result was attributed to residual hydrogen reacting to form hydrinos wherein the high current initiated the reaction. The dark nature of the effect indicated the selective emission of UV photons by the hydrino process to cause the photoelectron effect. The effect diminished as the hydrogen in the Mo foil was consumed or driven out by the applied welder power.

V. Other Applications

In an embodiment, the output power of the SF-CIHT cell is emitted as electromagnetic radiation that is transmitted to a load by the load receiving the radiation with an antenna. The emission may be achieved by powering a transmitter with electrical power generated by the SF-CIHT cell. The radiation may be directional by using directional and aligned emitting and receiving devices such as antenna. In another embodiment, the power is transferred by induction such as magnetic induction. The magnetic induction may be at radio frequencies such as in the frequency range of about 1 kHz to 1 GHz, at any desired power level.

In an embodiment shown in FIG. 5, the generator comprises a thermal power converter comprising a heat exchanger 87 in the walls of the cell, at least one heat exchanger coolant inlet line 84, at least one heat exchanger coolant outlet line 85, optionally a second heat exchanger, a boiler, a turbine such as a steam turbine, and a generator 86. In an embodiment, the thermal power converter comprises a coolant other than water that is known to those skilled in the art. In another embodiment, the walls of the cell comprise the heat exchanger that heats the coolant. The coolant such as water may boil in response to receiving heat from the cell. The gas formed by boiling may be flowed into a heat engine such as a turbine such as a steam turbine in the case that the gas is steam. In an embodiment, the cell may comprise the boiler. The system may further comprise at least another heat exchanger, as well as heaters, preheaters, boilers, condensers and other components of a thermal power converter such as those known by one skilled in the art.

In another embodiment, at least a portion of the cell wall comprises a heat exchanger that is in contact with a heat engine such as a Stirling engine. The wall and the heat engine may be connected by a thermal conduit such as a heat pipe that transfers heat from at least one of the cell and the cell wall to the heat engine.

Stirling engine with engine head plate comprising a flat plate supported with micro-channels for heat transfer such as that of a cold plate of CPV. The micro-channels may be manufactured using electrical discharge machining.

The SF-CIHT generator may further comprise at least one of a light source and a chemical reactor to form hydrinos. The light source may comprise an intense ultraviolet and extreme ultraviolet light source. To serve as a light source, the SF-CIHT cell may further comprise a window transparent to the desired light. The hydrinos may be collected as a gas or trapped in a getter such as KOH—KCl. The hydrino gas may be collected cryogenically.

What is claimed is:

1. A power system comprising:
at least one vessel capable of a maintaining a pressure of below, at, or above atmospheric;
reactants, the reactants comprising:
$H_2O$ gas or vapor;
$H_2$ gas; and a molten metal, wherein the $H_2O$ gas or vapor and $H_2$ are flowed into the vessel and into the molten metal;
at least one ignition system comprising a source of electrical power to deliver electrical energy between at least one set of electrodes that are separated to form an open circuit and
a molten metal injection system for injecting the molten metal in contact with the $H_2O$ gas or vapor and $H_2$ gas between the electrodes and, such that the open circuit is closed by the injection of the molten metal between the electrodes, wherein the molten metal injection system comprises an electromagnetic pump comprising at least one magnet providing a magnetic field and current source to provide a vector-crossed current component, and
wherein the source of electrical power induces a current to flow between the electrodes when the circuit is closed to deliver the electrical energy to result in the formation of light; and
at least one power converter or output system of at least one of light output produced from delivering electrical energy to the reactants to electrical power.

2. The power system of claim 1 wherein the electrodes comprise a refractory metal.

3. The power system of claim 2 wherein the source of electrical power comprises at least one supercapacitor.

4. The power system of claim 1 wherein the current is in the range of 500 A to 50,000 A.

5. The power system of claim 1 wherein the molten metal comprises at least one of silver, silver-copper alloy, and copper.

6. The power system of claim 1 wherein the system comprises a computer,
$H_2O$ and $H_2$ pressure sensors, and
flow controllers for $H_2O$ and $H_2$ gas wherein the flow of $H_2O$ and $H_2$ gas through the flow controllers is controlled by the pressure sensor and the computer to maintain at least one of the $H_2O$ and $H_2$ gas pressure at a desired value in the vessel.

7. The power system of claim 6 wherein the desired value of the $H_2O$ vapor pressure is in the range of 0.1 Torr to 1 Torr.

8. The power system of claim 1 wherein the vessel comprises walls capable of providing flow to the melt under gravity, and
the system further comprises a reservoir in communication with the vessel; and a cooling system to maintain the reservoir at a lower temperature the walls of the vessel to cause metal vapor of the molten metal to condense in the reservoir when the cooling system is operative.

9. The power system of claim 1 wherein the vessel capable of a maintaining a pressure of below, at, or above atmospheric comprises an inner reaction cell, a top cover comprising a blackbody radiator, and an outer chamber capable of maintaining the pressure of below, at, or above atmospheric.

10. The power system of claim 9 wherein the top cover comprising a blackbody radiator is maintained at a temperature in the range of 1000 K to 3700 K.

11. The power system of claim 10 wherein at least one of the inner reaction cell and top cover comprising a blackbody radiator comprises a refractory metal having a high emissivity.

12. The power system of claim 1 wherein the at least one power converter of the reaction power output comprises at least one of the group of a thermophotovoltaic converter, a photovoltaic converter, a photoelectronic converter, a plasmadynamic converter, a thermionic converter, a thermoelectric converter, a Sterling engine, a Brayton cycle engine, a Rankine cycle engine, a heat engine, and a heater.

13. The power system of claim 9 wherein the inner reaction cell and blackbody radiator is predominantly blackbody radiation comprising visible and near infrared light, and the photovoltaic cells are concentrator cells that comprise at least one compound chosen from crystalline silicon, germanium, gallium arsenide (GaAs), gallium antimonide (GaSb), indium gallium arsenide (InGaAs), indium gallium arsenide antimonide (InGaAsSb), indium phosphide arsenide antimonide (InPAsSb), InGaP/InGaAs/Ge; InAlGaP/AlGaAs/GaInNAsSb/Ge; GaInP/GaAsP/SiGe; GaInP/GaAsP/Si; GaInP/GaAsP/Ge; GaInP/GaAsP/Si/SiGe; GaInP/GaAs/InGaAs; GaInP/GaAs/GaInNAs; GaInP/GaAs/InGaAs/InGaAs; GaInP/Ga (In) As/InGaAs; GaInP—GaAs-wafer-InGaAs; GaInP—Ga (In) As—Ge; and GaInP—GaInAs—Ge.

14. The power system of claim 12 wherein the light emitted by the cell is predominantly ultraviolet light, and the photovoltaic cells are concentrator cells that comprise at least one compound chosen from a Group III nitride, GaN, AlN, GaAlN, and InGaN.

15. The power system of claim 1 further comprising a vacuum pump and at least one chiller.

16. The power system of claim 1, wherein said reactants comprise oxygen.

17. The power system of claim 1, wherein the current is in the range of 500 A to 50,000 A, the $H_2O$ gas or vapor and $H_2$ gas pressure are maintained in the range of 0.1 Torr to 1 Torr in the vessel during the ignition.

* * * * *